US007266615B2

(12) United States Patent
Yoneya et al.

(10) Patent No.: US 7,266,615 B2
(45) Date of Patent: Sep. 4, 2007

(54) SYSTEM FOR CONTROLLING INFORMATION PROCESSING FREQUENCY AT EACH STAGE IN A LOOP BASED ON RECEIVER'S UPDATED REQUEST INFORMATION

(75) Inventors: Satoshi Yoneya, Kanagawa (JP); Yuichi Kojima, deceased, late of Kanagawa by Taeko Kojima, legal representative Kanagawa (JP); Norikazu Ito, Kanagawa (JP)

(73) Assignee: Sony Corporation, Tokyo (JP)

( * ) Notice: Subject to any disclaimer, the term of this patent is extended or adjusted under 35 U.S.C. 154(b) by 683 days.

(21) Appl. No.: 10/405,507

(22) Filed: Apr. 2, 2003

(65) Prior Publication Data

US 2003/0221010 A1 Nov. 27, 2003

(30) Foreign Application Priority Data

Apr. 3, 2002 (JP) ............................. 2002-101743

(51) Int. Cl.
*G06F 15/16* (2006.01)
(52) U.S. Cl. ...................... 709/237; 709/224; 709/233
(58) Field of Classification Search ................ 709/227, 709/228, 235, 237, 224, 233; 701/201, 1; 342/357.09; 455/99; 345/531
See application file for complete search history.

(56) References Cited

U.S. PATENT DOCUMENTS

| 5,864,678 | A | * | 1/1999 | Riddle | 709/235 |
| 6,285,315 | B1 | * | 9/2001 | Pratt | 342/357.09 |
| 2002/0135585 | A1 | * | 9/2002 | Dye et al. | 345/531 |
| 2002/0198632 | A1 | * | 12/2002 | Breed et al. | 701/1 |
| 2003/0182052 | A1 | * | 9/2003 | DeLorme et al. | 701/201 |
| 2004/0198254 | A1 | * | 10/2004 | Mizui et al. | 455/99 |

\* cited by examiner

*Primary Examiner*—Le Hien Luu
(74) *Attorney, Agent, or Firm*—Frommer Lawrence & Haug LLP; William S. Frommer; Thomas F. Presson

(57) ABSTRACT

Disclosed is a method for interchanging contents information and a system for interchanging contents information. A loop that a receiving side CL1 sends a request signal CL1a carrying position data pd to a sending side SV1 through a communication system NT, the sending side SV1 sends back contents information corresponding thereto as a sending signal SV1a, and the receiving side CL1 displays the signal is repetitively updated and performed at a high frequency by repetitively updating and sending the position data pd at a high frequency. Since the achievable frequency of repetitive updating and performing the loop varies by the combination of receiving side CL1, communication system NT, and sending side SV1, the achievable maximum frequency mxfQ for each loop is determined from a given table or by actual measurement. A standard frequency stfQ which does not exceed the thus determined frequency is set, the processes along the loop are performed at the standard frequency stfQ or a lower frequency. As a result, power consumption is reduced and communication load is mitigated.

13 Claims, 71 Drawing Sheets

<A1.1.1>

<A1.1.2>

OUTPUT DATA 202a FROM THE CAPTURING MEANS 0202

REQUEST DATA 203a OUTPUT FROM THE COMPILING MEANS 0203
CASE <A1.1.1>

CASE <A2.1.1>

CASE <A2.2.1>

SENDING SIGNAL SV1a WHICH THE RECEIVING MEANS 0205 RECEIVES

DATA CAPTURED BY THE CAPTURING MEANS 0202

DATA 202b OUTPUT FROM THE CAPTURING MEANS 0202

REQUEST DATA 203b OUTPUT FROM THE COMPILING MEANS 0203

SENDING SIGNAL SV1a RECEIVED BY THE RECEIVING MEANS 0205

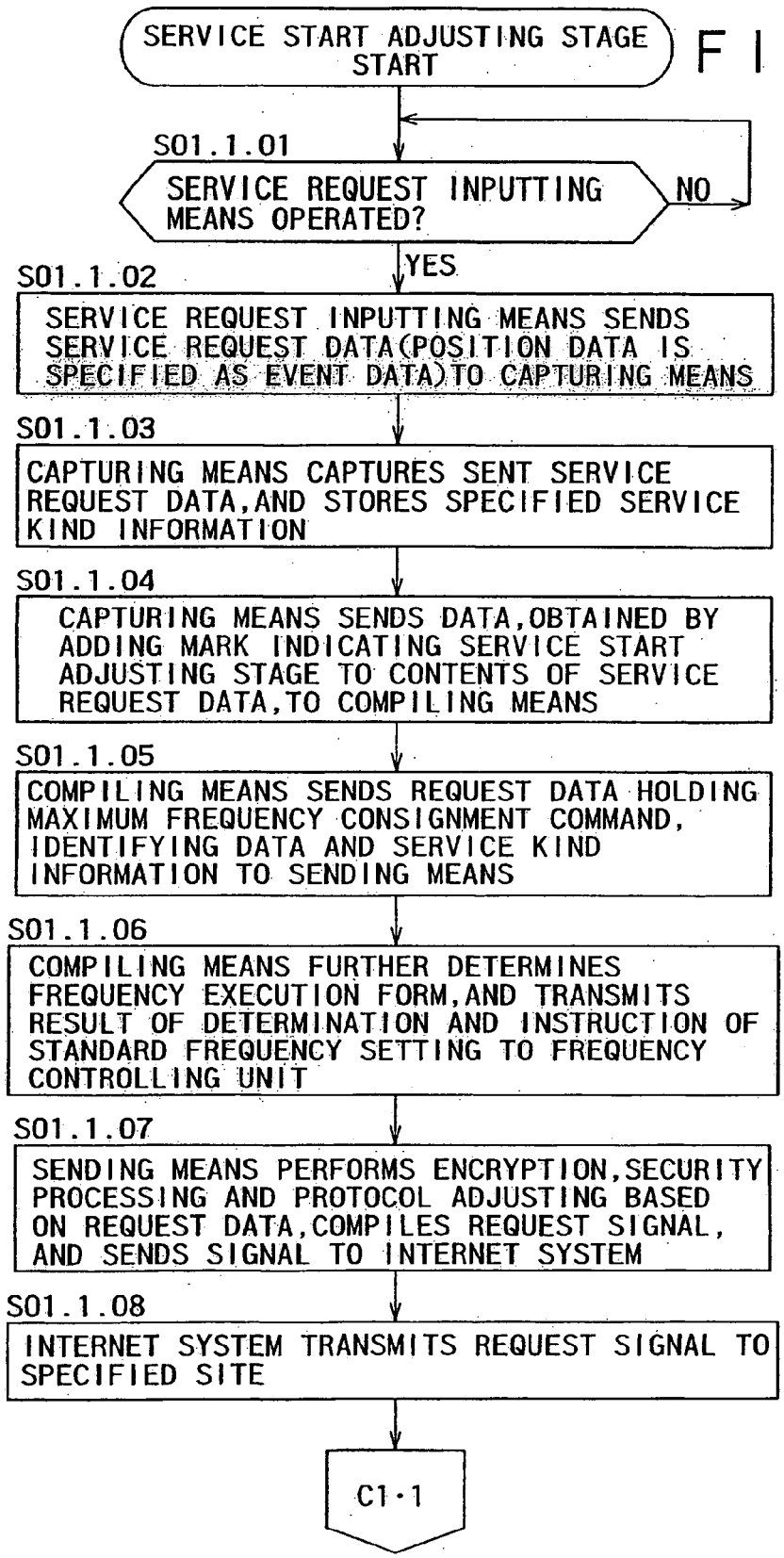

FIG. 40

( SERVICE START ADJUSTING STAGE START )

S04.1.01
THE USER ENTERS INFORMATION OF THE DESIRED SERVICE KIND INFORMATION AND THE DESIRED SCREEN UPDATING FREQUENCY rqfQ

S04.1.02
THE SERVICE REQUEST INPUTTING MEANS SENDS IT(AS THE SERVICE REQUEST DATA) TO THE CAPTURING MEANS

S04.1.03
THE CAPTURING MEANS CAPTURES THE SERVICE REQUEST DATA AND STORES AND HOLDS THE SPECIFIED SERVICE KIND INFORMATION

S04.1.04
THE CAPTURING MEANS SENDS THE COMPILING MEANS THE DATA TO WHICH IS ATTACHED A MARK SHOWING THE SERVICE START ADJUSTING STAGE

S04.1.05
THE COMPILING MEANS RECEIVES THE DATA TO WHICH IS ATTACHED THE MARK AND JUDGES IT AS THE START OF THE SERVICE START ADJUSTING STAGE

S04.1.06
THE COMPILING MEANS SENDS THE FREQUENCY CONTROLLING UNIT AN INSTRUCTION TO SET UP THE STANDARD FREQUENCY stfQ BASED ON THE REALIZABLE SCREEN UPDATING FREQUENCY avfQ WRITTEN IN THE SPECIFICATION TABLE AND A NOTICE THAT THE OBJECT OF THE FREQUENCY CONTROL IS THE POSITION DATA PROVIDING MEANS

S04.1.07
THE FREQUENCY CONTROLLING UNIT READS OUT THE REALIZABLE SCREEN UPDATING FREQUENCY avfQ FROM THE SPECIFICATION TABLE

S04.1.08
THE FREQUENCY CONTROLLING UNIT SETS UP THE STANDARD FREQUENCY stfQ WITHIN THE RANGE NOT EXCEEDING THE SCREEN UPDATING FREQUENCY avfQ

S04.1.09
THE FREQUENCY CONTROL UNIT ISSUES THE CONTROL SIGNAL AT THE STANDARD FREQUENCY stfQ AND STARTS THE SUPPLY TO THE POSI- TION DATA PROVIDING MEANS

S04.1.10
THE POSITION DATA PROVIDING MEANS UPDATES THE POSITION DATA AT THE TIMING OF THE CONTROL SIGNAL AND OFFERS IT TO THE CAPUTURING MEANS

C4-1

FIG. 44
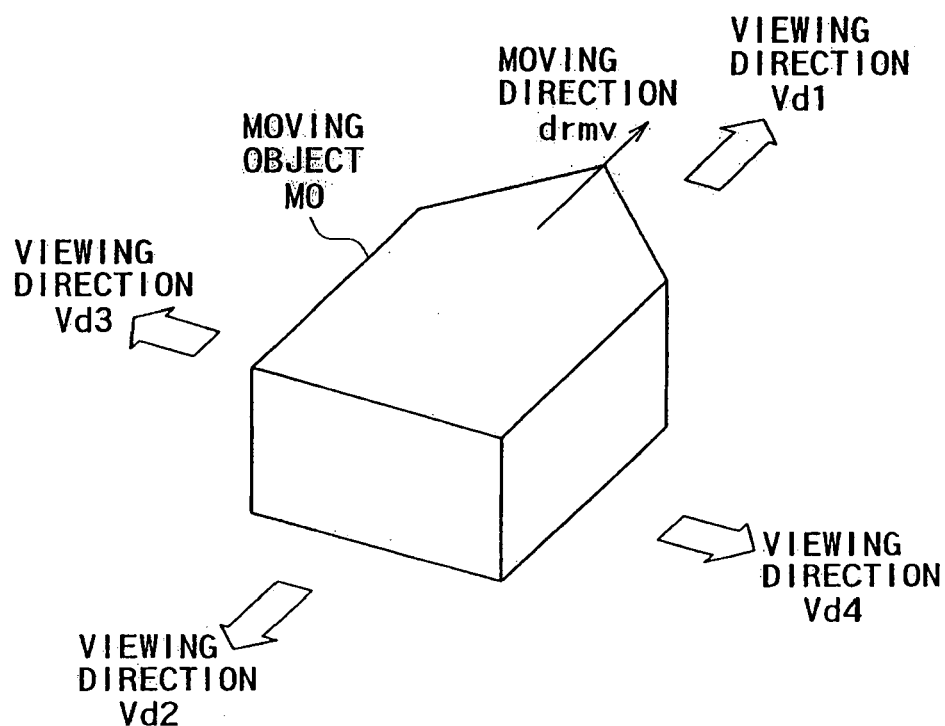
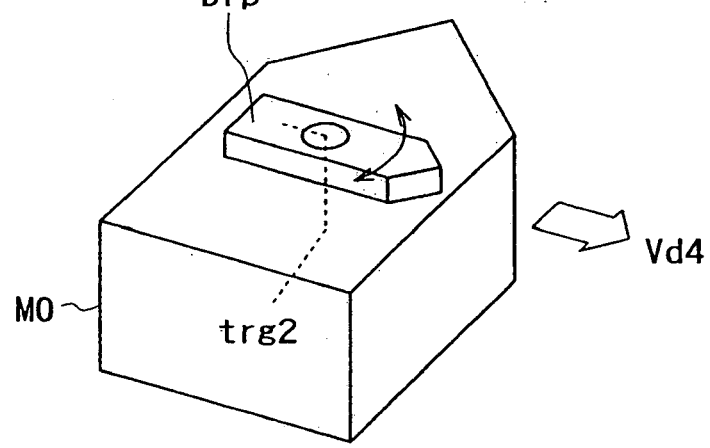

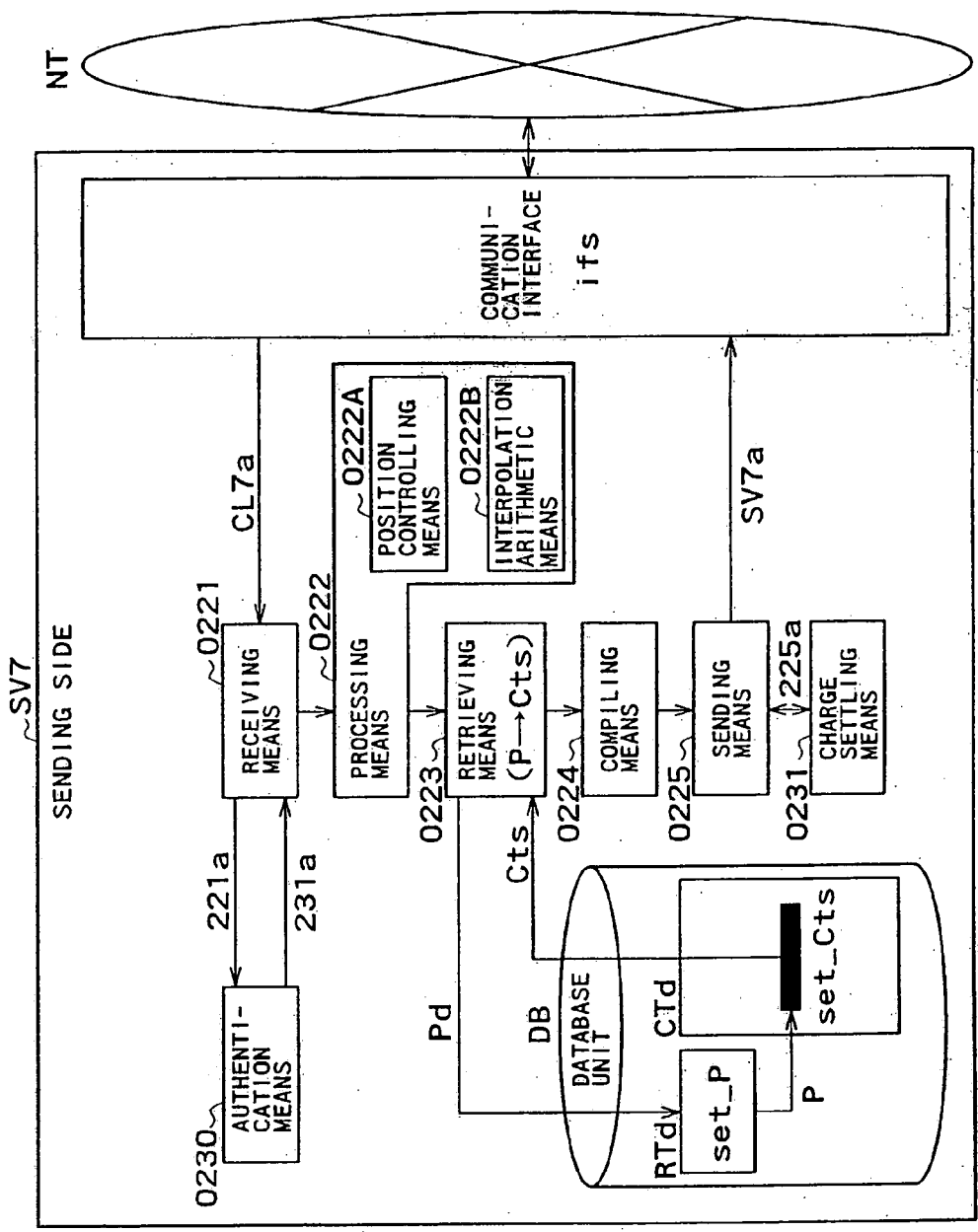
F I G. 54

THE CAPTURING MEANS CAPTURES POSITIONING DATA FROM THE POSITION DATA PROVIDING MEANS EACH TIME THE DATA IS GENERATED, CAPTURES MOVING DATA FROM THE MOVING DATA INPUTTING MEANS, AND SENDS THESE PIECES OF DATA TO THE COMPILING MEANS

S07.1.10
POSITIONING DATA? OR, MOVING DATA?

- POSITIONING DATA → S07.1.11
- MOVING DATA → S07.1.12

S07.1.11
COMPILE REQUEST DATA CARRYING IDENTIFYING DATA, SERVICE TYPE INFORMATION, AND POSITIONING DATA WITH SIGN

S07.1.12
COMPILE REQUEST DATA CARRYING IDENTIFYING DATA, SERVICE TYPE INFORMATION, AND MOVING DATA WITH SIGN

S07.1.13
THE COMPILING MEANS SENDS THE REQUEST DATA TO THE SENDING MEANS

S07.1.14
THE COMPILING MEANS SENDS A SIGNAL FOR ACTUATION TO THE ACTUAL MEASUREMENT MEANS AND CAUSES IT TO START OPERATION

S07.1.15
THE COMPILING MEANS SENDS TO THE FREQUENCY CONTROLLING MEANS AN INSTRUCTION TO SET A STANDARD FREQUENCY stfQ BASED ON THE RESULT OF ACTUAL MEASUREMENT

S07.1.16
THE SENDING MEANS SUBJECTS THE REQUEST DATA TO CRYPTOGRAPHIC SECURITY PROCESSING AND PROTOCOL ADJUSTMENT TO COMPILE A REQUEST SIGNAL AND SENDS THE SIGNAL TO THE COMMUNICATION SYSTEM

S07.1.17
THE COMMUNICATION SYSTEM TRANSMITS THE REQUEST SIGNAL TO A SPECIFIED SERVER

S07.2.32
THE RETRIEVING MEANS SEARCHES THE DATABASE UNIT BASED ON THE SERVICE TYPE INFORMATION AND THE POSITION DATA.

S07.2.33
THE RETRIEVING MEANS SENDS TO THE COMPILING MEANS MATCHED CONTENTS INFORMATION OBTAINED AS THE RESULT OF SEARCH.

S07.2.34
THE COMPILING MEANS READS IDENTIFYING DATA PRESENTLY REGISTERED AND STORED.

S07.2.35
THE COMPILING MEANS SENDS TO THE SENDING MEANS SENDING DATA CONSISTING OF THE IDENTIFYING DATA AND THE CONTENTS INFORMATION.

S07.2.36
THE SENDING MEANS COMMISSIONS THE CHARGE SETTLING MEANS TO PERFORM CHARGING PROCESSING, AND, IF THE CHARGING PROCESSING NORMALLY COMPLETES, SUBJECTS THE SENDING DATA TO PROTOCOL ADJUSTMENT AND SENDS THE DATA TO THE CLIENT THROUGH THE COMMUNICATION SYSTEM.

S07.1.34
THE RECEIVING MEANS RECEIVES AND SUBJECTS THE SENDING SIGNAL TO PROTOCOL PROCESSING, DECODING, AND THE LIKE TO RESTORE THE CONTENT INFORMATION TO ITS ORIGINAL STATE.

S07.1.35
THE RECEIVING MEANS GENERATES RECEIVING DATA BASED ON THE CONTENTS INFORMATION AND SUPPLIES THE DATA TO THE DISPLAY DEVICE.

S07.1.36
THE DISPLAY DEVICE PRESENTS THE DESIRED CONTENTS INFORMATION AS SCREEN WITH/WITHOUT AUDIO AT THE STANDARD FREQUENCY $stfQ$.

S09.2.01 THE RECEIVING MEANS OF THE SERVER SUBJECTS THE INCOMING REQUEST SIGNAL TO PROTOCOL PROCESSING AND THE LIKE TO RESTORE THE REQUEST DATA TO ITS ORIGINAL STATE AND EXTRACTS THE IDENTIFYING DATA.

S09.2.02 THE RECEIVING MEANS SENDS TO THE AUTHENTICATING MEANS A COMMAND TO AUTHENTICATE AUTHORIZED USER AND IDENTIFYING DATA.

S09.2.03 AUTHORIZED USER?
- NO → (to S09.2.05)
- YES ↓

S09.2.04 THE RECEIVING MEANS REGISTERS A NEW SERVICE SESSION.

S09.2.06 THE RECEIVING MEANS SENDS SERVICE TYPE INFORMATION, TIME DATA, POSITION DATA, AND VIEWING DIRECTION DATA TO THE PROCESSING MEANS

S098.2.07 VALID DATA FORMAT?
- NO → (to S09.2.05)
- YES ↓

S08.2.08 COVERAGE OF SERVICE?
- NO → (to S09.2.05)
- YES ↓

S09.2.05 ERROR HANDLING

S09.2.09 THE PROCESSING MEANS SENDS SERVICE TYPE INFORMATION, TIME DATA, POSITION DATA, AND VIEWING DIRECTION DATA TO THE RETRIEVING MEANS.

S09.2.10 THE RETRIEVING MEANS SEARCHES THE DATABASE UNIT BASED ON THE SERVICE TYPE INFORMATION, TIME DATA, POSITION DATA, AND VIEWING DIRECTION DATA.

S09.2.11 THE RETRIEVING MEANS SENDS TO THE COMPILING MEANS MATCHED CONTENTS INFORMATION OBTAINED AS THE RESULT OF SEARCH.

S09.2.12
THE COMPILING MEANS READS IDENTIFYING DATA PRESENTLY REGISTERED AND STORED.

S09.2.13
THE COMPILING MEANS SENDS TO THE SENDING MEANS SENDING DATA CONSISTING OF THE IDENTIFYING DATA AND THE CONTENTS INFORMATION.

S09.2.14
THE SENDING MEANS COMMISSIONS THE CHARGE SETTLING MEANS TO PERFORM CHARGING PROCESSING.

S09.2.15 ⟨CHARGING PROCESSING NORMALLY COMPLETES?⟩ NO → S09.2.05 / YES ↓

S09.2.16
THE SENDING MEANS SUBJECTS THE SENDING DATA TO PROTOCOL ADJUSTMENT AND SENDS THE DATA TO THE RELEVANT CLIENT THROUGH THE COMMUNICATION SYSTEM.

S09.1.09
WHEN THE SENDING SIGNAL ARRIVES, THE RECEIVING MEANS SUBJECTS THE SIGNAL TO PROTOCOL PROCESSING AND THE LIKE, CHECKS THE IDENTIFYING DATA, AND RECEIVES THE SIGNAL.

S09.1.10
THE RECEIVING MEANS DECOMPRESSES DATA (E.G. JPEG) TO RESTORE THE CONTENTS INFORMATION TO ITS ORIGINAL STATE.

S09.1.11
THE RECEIVING MEANS GENERATES RECEIVING DATA BASED ON THE CONTENTS INFORMATION AND SUPPLIES THE DATA TO THE DISPLAY DEVICE.

S09.1.12
THE DISPLAY DEVICE PRESENTS THE DESIRED CONTENTS INFORMATION AS SCREEN WITH/WITHOUT AUDIO.

( FIN )

FIG. 75
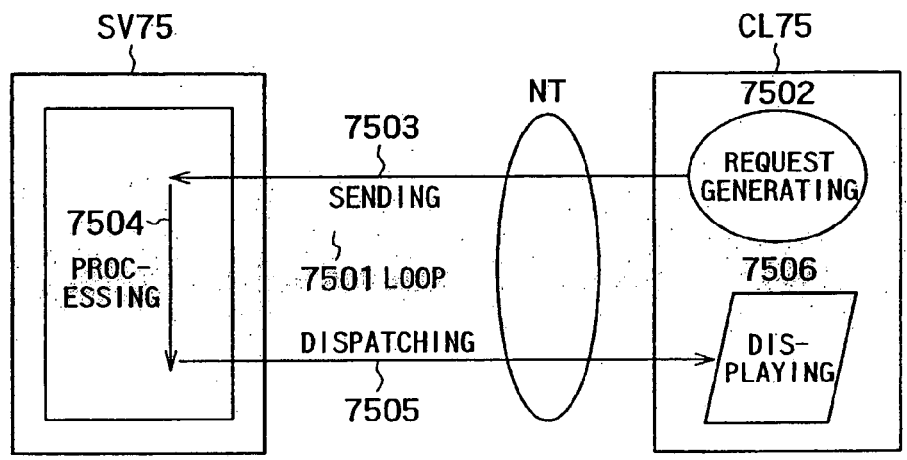
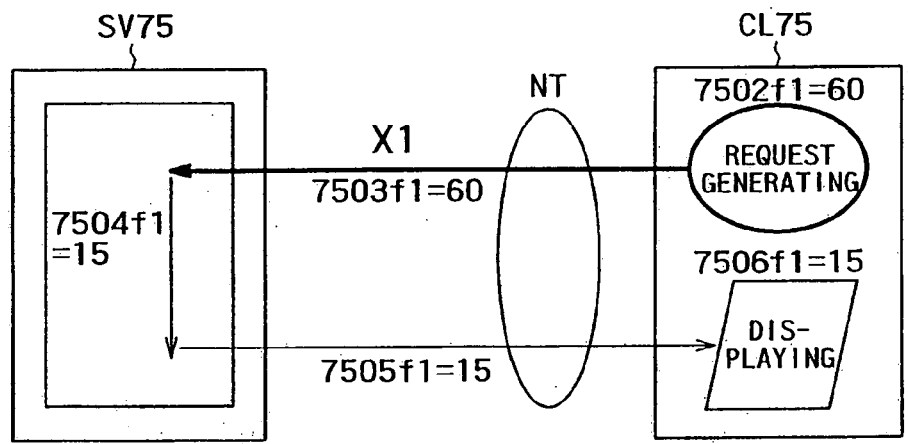
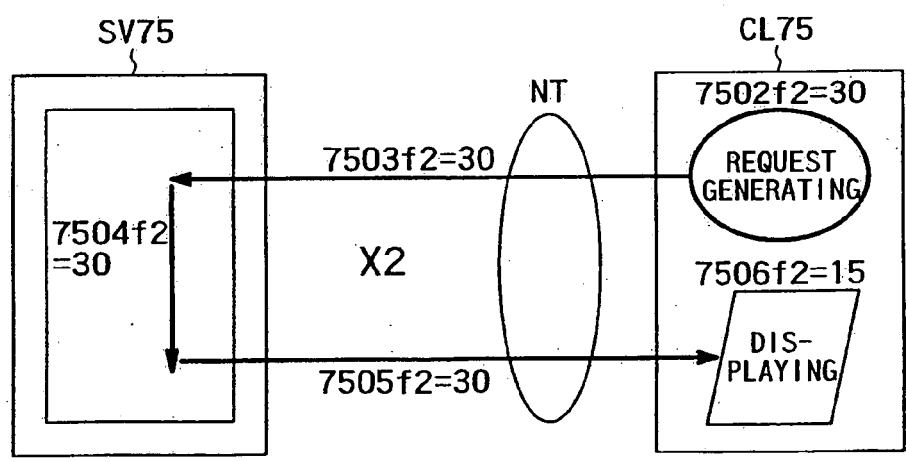

SYSTEM FOR CONTROLLING INFORMATION PROCESSING FREQUENCY AT EACH STAGE IN A LOOP BASED ON RECEIVER'S UPDATED REQUEST INFORMATION

BACKGROUND OF THE INVENTION

1. Field of the Invention

The present invention relates to a method for interchanging contents information and a system for interchanging contents information. More particularly, the present invention relates to a method for interchanging contents information and a system for interchanging contents information, which are intended to reduce communication loads when contents information is interchanged at a high screen updating frequency, thereby saving power consumption.

2. Description of the Prior Art

With the recent wide spread of the broadband communication environment, a remarkable technical development has been made in the field of interchanging contents information, mainly that of image. In particular, the broadband wireless communication environment, which permits the application of portable telephones and portable remote terminals, is shaping up. In this environment, people can readily obtain a comparatively large amount of information by accessing the central database through a moving terminal. In this connection, a great development is expected in various sectors of business.

In related fields not limited to mobile communication, there have been proposed several techniques for receiving information from a remote terminal at an arbitrary position and providing the position-relating information through a communication line.

An example of them is a system to provide terrestrial photographic image information, as disclosed in Japanese Patent Laid-open No. 188800/2001. This system prepares a database in which map information corresponds to terrestrial photographic image information (which is a static image) and to provide this information through a communication network.

To be more specific, this system stores terrestrial photographic image information (such as photographs taken from satellites and airplanes) and advertisement information and provides specific pieces of such information meeting the geographic requirements according to the geographical information which has been sent from a terminal through a network. The system is constructed as shown in FIG. 73. It has a server system 7301, which consists of a database 7302 of terrestrial photographic image information (which stores and accumulates information of terrestrial photographic images taken from above and information of coordinate positions corresponding thereto) and a database 7303 of advertisement information (which stores correspondence between coordinate position information and advertisement information). On receipt of information 7304 (about position and specified requirements) from a user's terminal 7305 through a network 7307, the server system searches for the database 7302 of terrestrial photographic image information and the database 7303 of advertisement information in response to the received information. Then it transmits the corresponding terrestrial image and advertisement information 7306 to the user's terminal 7305 through the network 7307.

A new system has been disclosed in Japanese Patent Laid-open Nos. 66058/1998 and 193481/2000. This system consists of cameras (or any imaging devices) which have previously been arranged at prescribed positions, so that they take the actual scenes, and distributes the thus taken images in real-time through a communication network. The cameras in this system are so arranged that the user can specify any one of them and direct it to any direction be wants. Thus the system can provide the user in real-time with actual scenes (dynamic or static images) observed at a fixed point.

The system at the user's side is shown in FIG. 74. It consists of a GPS (Global Positioning System) receiver 7402, an advance direction input unit 7403 (which measures the direction in which the user is moving on foot or by vehicles or trains), a liquid crystal display 7404, and a control unit 7401 consisting of a personal computer to control the entire operation. To the control unit 7401 is on-line connected the actual scene image input device 7409 and the server 7408 for map database through the public telephone network 7407 for communications. The server 7408 for map database contains a Japan's nationwide map which is associated with identifying data such as coordinate data (longitude and latitude).

The actual scene image input device 7409 consists of a plurality of video cameras which are installed at various positions from which actual scenes are to be taken. It provides on-line a plurality of users, upon their request, with the actual scene images of the video cameras through the public telephone network 7407 for communications. The coordinate data of each actual scene point is previously set up, and the identifying data for these points are controlled by the map database server 7408.

Using the input device (keyboard 7405 or mouse 7406), the user instructs to display the actual scene which is viewed in his advancing direction. In compliance with this instruction, the control unit 7401 receives the user's present position and advancing direction (in terms of coordinate data and direction data) from the GPS receiver 7402 and the advancing direction input unit 7403. Then the control unit 7401 sends the coordinate data to the map database server 7408 through the public telephone network 7407 for communications, thereby inquiring the identifying data. On the basis of the thus acquired identifying data, the control unit 7401 specifies the actual scene image input device 7409 and its video camera and then accesses the actual scene image input device 7409 through the public telephone network 7407 for communications, thereby receiving on-line the actual scene, and displays it on the liquid crystal display 7404.

The above-mentioned system may also permit the user to specify any desired coordinate data (by using a pointing device, say, by clicking the mouse 7406) on a map instead of his present position. Thus the user can specify any one of the video cameras (constituting the actual scene image input device 7409) which is installed at the specified position and in the desired direction, and hence can view the actual scene as if the actual scene image input device 7409 performs fixed point observation.

Unfortunately, the conventional construction as mentioned above is designed for fixed point observation. In other words, it merely transmits and displays static mages (such as photographs and maps which do not change frequently from time to time). It can take dynamic images, but its position is fixed although its direction is variable. In other words, it can transmit dynamic images (contents information) only when the receiving side does not request to change the positions frequently. There is not frequent interactive information interchange.

Therefore, the above-mentioned system is suitable for transmission of limited contents information, but it lacks functions to transmit and display images very frequently. Such functions are required in the case where the user frequently demands the updating of position and viewing direction (and hence interactive information interchange). For example, the user moving at high speeds by car may want to know his present position continuously and also want the car navigator to display his present position with frequent updating.

In addition, the above-mentioned conventional system lacks provisions to relieve loads on communication networks and to save power consumption. Interactive information interchange necessarily increases loads, and the user's mobile unit needs batteries. It is necessary to eliminate waste communication and excess data for power saving.

Moreover, the above-mentioned conventional system is not suitable for storing or providing past images (say, 3 years ago or before 1945) or future images (say, 10 or 10,000 years later) which are of historical value, even though the images are taken at the fixed position and in the fixed direction, In addition, it is not designed to record images which change with time.

The present invention was completed in view of the foregoing. It is an object of the present invention to provide a method for interchanging contents information and a system for interchanging contents information. The method and system adequately provide contents information when there is a frequent demand for updating. They control the amount of communication, thereby reducing communication loads and communication tariff. They are suitable for preparing and storing contents information which changes with time.

SUMMARY OF THE INVENTION

Before the means to solve these problems is given blow, those terms used in the present invention are defined first.

"Sending side" One which provides service for contents information desired. In the case of client/server system, it denotes the server.

"Receiving side" One which receives service for contents information. In the case of client/server system, it denotes the client. The receiving sides sends request data to the sending side at a high frequency. On receipt of such request data, the sending side sends corresponding "contents information" (mentioned later) to the receiving side at a high frequency. In other words, "contents information" is provided to the receiving side at a high frequency in the interactive data interchange environment.

"Position" One which identifies a certain spot in the real or virtual space. It is treated as the position data or position information in the system. "Position" is associated with "contents information". In other words, one "position" corresponds to at least one piece of "contents information".

"Image" One which can be displayed on the screen by the unit of frames.

Any object for observation is originally a physical entity which exists continuously but is discontinuous chronologically. In video working by observation, it is made into individual static images (frames) by sampling along the time axis. Sampling gives chronologically discontinuous frames. When updated continuously, they are seen as dynamic images. This holds true also for images whose frames are not physical entities.

Thus, dynamic images are a string of data forming the discontinuous frames which are obtained by sampling or updating real physical entities at a high frequency. Updating the display of these frames at a high frequency yields dynamic images owing to the afterimaging effect.

For efficient storage and transmission, dynamic image data and static image data undergo data compression and expansion. In the case of dynamic image data, data compression is sometimes applied to those frames preceding and following one frame. Therefore, the resulting data is constructed such that one screen of dynamic image does not necessarily correspond with one sheet of static image. In principle, however, the dynamic image is formed by frequently updating static images.

"Contents information" This is any information which contains at least one of image, image plus voice, and voice. In the present invention, contents information is associated with "position" mentioned above. In other words, contents information corresponds to at least one "position".

In addition, according to the present invention, contents information may also be associated with "viewing direction" and "time", which are defined later.

The contents information which is treated in the present invention is divided into two large classes.

The first class includes images and voices at a certain point indicated by "position". Such contents information will be typically used for network navigation (either actual one or simulation one) mentioned later.

The second class includes contents information which is required to be associated with the point. It is not mere images and voices (or scenes) at a certain point but it covers shops and buildings (reported and introduced by dynamic images) and historical events originating from that point. The content varies from one point to another; however, it is different from scenes and sights at a certain point as mentioned first. For example, such information as is given during orienteering and treasure-hunting (either actual ones or virtual ones on a computer) belongs to this second class.

"A set of contents information" This is a collection of contents information accumulated in databases. It is denoted as "set of contents information set_Cts" where the symbol Cts represents contents information.

"Time series of contents information" This is a flow of contents information at the time of streaming transmission of contents information. It is denoted as "time series of contents information srs_Cts".

"Mark" This is a simple symbol indicating the principle of each embodiment of the present invention. It is used as follows. On the left side is shown the required condition to be sent from the receiving side (or client). Its transmission is denoted by an arrow mark (→). On the right side is shown the information which the sending side (or server) sends to the receiving side (or client) according to the required condition. An example of such a mark is pd→Cts. This means that "the client sets up the position data pd as the required condition and sends it to the server, and the server compiles the contents information Cts corresponding to this position data pd and sends it the client which has transmitted the required condition".

"Moving direction" This is the direction in which the observer moves from one position to another. The observer may be a user who makes observation on receipt of the contents information when he uses this system. On the other hand, the observer may be a video camera to record the contents information when data is built up for this system.

For example, the moving direction is the direction in which an image observer or a camera moves by a car, train, or airplane. The moving direction may be two-dimensional (latitude and longitude) or three-dimensional (latitude, longitude, and altitude).

"Viewing direction" This is the same direction as the sight line of a moving observer or the direction in which observation is to be made. It may be two-dimensional (latitude and longitude) or three-dimensional (latitude, longitude, and altitude), if an observer is a camera, then the "viewing direction" is the camera direction.

Consequently, the moving direction and the viewing direction do not agree with each other in principle. For example, for an observer in a car, the moving direction is the direction in which the car runs, and if the observer is facing forward, then the viewing direction agrees with the running direction. If the observer on an observation car at the end of a train watches the scene getting far, then the viewing direction is opposite to the running direction.

The flow of images differs as a matter of course depending on the moving direction (with the same viewing direction) or the viewing direction (with the same moving direction). In one case, the observer sees a scene getting close, and in another case, the observer sees a scene getting far. Likewise, the observer may see, from a window of a train, scenes which flow from right to left or from left to right. In addition, simulation images taken at a space institution or taken from a tornado coaster in an amusement park will flow laterally as well as vertically and also vary depending on the viewer's direction. In this system, the viewing direction is treated as viewing direction data or viewing direction information.

"Time" This is intended to specify one point on the time axis. The user specifies his desired era and data (past, present, and future). In this system, it is treated as time data or time information. "Time" is associated with "contents information". In other words, "contents information" corresponds to at least one "time". Thus, the "contents information" is a piece of information specified by "time".

"Frequency" This indicates how many times various processing is carried out in a unit time. The processing includes data transmission and data capture (to be carried out by the client or server), data manipulation, data retrieval, and data presentation. Frequency is indicated by a symbol "fQ". For example, if the client sends request signals 120 times per second, then the indication will be "transmission frequency. Req·fQ1=120 times/sec". Moreover, if contents information Cts is updated on the client's display at a rate of 15 frames per second, then the indication will be "frequency of screen updating of contents information Cst·fQ1=15 frames/sec". In addition, in the case of images with voices (audio), voice parts are treated as though they follow each image.

"Display" This is defined as including at least any one of displaying, printing, sounding, and data (signal) output.

Now, the summary of the present invention is given in the following,

The method and system according to the present invention are basically constructed as follows. The receiving side which wants to receive contents information (as an example of information) generates a request containing position data and other various event data and then sends it to the sending side through the communication system. The sending side retrieves and reads out relevant information (meeting this request) from databases and sends the retrieved data to the receiving side through the communication system, and the receiving side updates and displays it as the desired contents information. For example, each time position data is transmitted, one frame image is displayed. The receiving side updates and sends the above-mentioned request at a high frequency, so that contents information is retrieved, transmitted, and displayed at a high frequency. Position data may be updated and sent at a high frequency, say, tens of times per second, and the display is updated as frequently as the frame image data is received. Thus the displayed image data is viewed as a dynamic image.

In this way a loop is formed which starts with the generation of request and ends with the display of contents information. The first point of the present invention resides in performing at a high frequency the repeated updating in the way of interactive information interchange between the receiving side and the sending side.

Therefore, as a preferred construction, the client/server system suitable for broadband communication is applied. The client functions as the receiving side and the server functions as the sending side. In this way it is possible for the sending side to offer service for contents information to the receiving side on the on-demand basis, and the relevant business model is provided.

The server as the sending side is so constructed as to provide contents information at a high frequency. This object is achieved by collecting a group of event data and storing them in the form of database. Such event data include, for example, positions (in a certain area) and contents information relating to such positions. In principle, the relevant positions may be any and all points in any and all areas. In practice, the position data to be collected is expanded gradually as the data is accumulated. In this way it is possible to provide information about broader areas.

In addition, making the contents information at each position dependent on the viewing direction permits the system to provide an image (as an example of contents information) when an arbitrary direction at an arbitrary position is specified. In other words, in principle, the system can accumulate contents information in any and all viewing directions and provide and interchange it.

Therefore, according to the present information, the client sends the server at a high frequency requests for position data and/or viewing direction data, and the server sends the client at a high frequency the contents information corresponding to the position data and/or viewing direction data as requested from the client.

If the client is moving, it sequentially sends the server the position data obtained from the GPS, and the server sends the client the contents information corresponding to movement. In this case, if the position data is intermittent and discontinuous, interpolation is performed by arithmetic operation based on the moving data (or velocity data). This interpolation is accomplished by either the client or the server.

Incidentally, in the conventional case where dynamic image data is interchanged between a terminal (client) and a host (server), the host begins to send the dynamic image as soon as it is triggered by request from the terminal and thereafter it continues to send dynamic image data automatically at a default frame rate (or image updating rate). Thus, while dynamic images are being transmitted, the terminal does not need to issue the trigger signal again. By contrast, according to the present invention, the server does not transmit image data as dynamic image at a default frame rate but the client transmits requests repeatedly at a very high frequency. Then, the server sends frame image data sequentially in response to these requests, and the client displays these frame images sequentially, so that dynamic images are formed eventually. Therefore, the frequency of image updating depends on the frequency at which requests for updating are seat repeatedly.

On the other hand, since the frequency at which requests for updating are sent repeatedly can be set up arbitrarily, there would be an instance where the processing by the server cannot follow the frequency which is set up extremely high. In other words, there would be a discrepancy in frequencies.

The second point of the method and system according to the present invention resides in a function to control this discrepancy in frequencies that results from the fact that the server, client, and communication system differ in speed of generating requests and processing and compiling contents information. For example, if the client is capable of updating displays at a high frequency but the server cannot retrieve contents information at such a high frequency or the communication line cannot send so much information even though the server can retrieve contents information at such a high frequency, then processing which has been accomplished previously at a high frequency is wasted. Alternatively, even though the up-stream side of the loop (including generation of requests by the client) is accomplished at a high frequency, the client at the last stage may be able to update images only at a low frequency. In this case, too, all the processing which has been accomplished up-stream is wasted. Moreover, this situation varies depending on the individual combinations of client, server, and communication system and also on the equipment to be used. In addition, for the same combination and equipment construction, it greatly varies depending on the condition of use, especially the state of communication line. The present invention is intended to solve this problem by controlling the frequency. A detailed description will be given in the paragraph of the embodiment which follows.

The third point of the method and system according to the present invention resides in that the client sends the server the requests by position data and/or viewing direction data in addition to time data, so that it receives contents information meeting such request. Addition of time data makes it possible to provide contents information (such as image and voice) meeting requests for information in an arbitrary viewing direction at an arbitrary point (area or position) at an arbitrary time (era and data, from past to future). Thus it is possible to provide images and voices as historical information as well as images and voices as future predictions. So long as the method and system according to the present invention are put to practice in response to requests based on time data, the embodiment of the present invention is not limited to that in which requests are executed repeatedly at a high frequency.

The means of the present invention will be described in the following.

The first aspect of the present invention to solve the above-mentioned problem resides in a method for interchanging information in which a receiving side which receives arbitrary information sends a sending side which keeps said information a request for transmission of said information through a communication system, said sending side, in response to said request, sends said receiving side relevant information through a communication system, and said receiving side receives said information which has been sent and displays said information in the fort of image with or without voice, wherein said method comprises, on the assumption that the generation of said request in said receiving side is the preliminary processing and said displaying at said receiving side is the final processing, there is at least one intermediate processing in at least any of said receiving side, sending side, and communication system, between said preliminary processing and said final processing, the route along which ensuing processing is executed by using the result of preceding processing constitutes a loop, and the number of times for updating for said processing within a unit time is the frequency, (1) repeatedly updating said request information and said loop, and
(2) keeping the frequency of at least one step before the previous step from said last stage processing lower than the permissible frequency for which said final stage processing has been confirmed.

The method for interchanging information according to the first aspect of the present invention offers the following advantage. At least any one of at least any one processing by the receiving side in the stage preceding the final stage, at least any one processing by the sending side, and at least any one processing by the communication system is updated repeatedly at a frequency not exceeding the frequency which has been confirmed to permit the repeated updating of said final stage processing. In this way it is possible to eliminate excess processing in the subsequent processing (including said processing) and hence it is possible to prevent useless processing from occurring in the subsequent processing (including said processing). Thus all of the processing are updated repeatedly.

For example, assume that a receiving side is capable of updating repeatedly the final stage processing at a comparative high frequency, and displaying is usually updated repeatedly at this frequency. If it is desired that the displaying processing be carried out at a lower frequency than said frequency, then control is made so that the frequency at which the receiving side generates request for updating is suppressed, and repeated updating is sent at such a low frequency. Repeated updating of each processing along the loop is carried out at said low frequency, Thus it is possible to prevent useless processing from being executed at such a frequency.

Moreover, even though the frequency at which the final stage processing can be repeatedly updated varies depending on the applicable receiving side or is confirmed to vary depending on the receiving side's performance, repeated updating of said processing corresponding to them is executed. Thus even though the receiving side varies or the receiving side's performance varies, it is possible to exclude wastes in response to these changes as the occasion demands.

The method for interchanging information according to the second aspect of the present invention is one embodiment based on the first aspect, It is characterized in that the frequency at which the final stage processing can be repeatedly updated is confirmed by actual measurement by said receiving side.

The frequency at which the final stage processing can be repeatedly updated is a value inherent in the applicable receiving side. According to the method for interchanging information as defined in the second aspect, said frequency is confirmed by actual measurement in said receiving side, As the result, even though the receiving side is replaced by the one which has different construction or the receiving side changes in performance, it is possible to confirm easily and certainly the individual inherent values and hence it is possible to eliminate said wastes resulting from individual receiving sides.

The third aspect of the present invention resides in a method for interchanging information in which a receiving side which receives arbitrary information sends a sending side which keeps said information a request for transmission of said information through a communication system, said sending side, in response to said request, sends said receiving side the relevant information through a communication system, and said receiving side receives said information which has been sent and displays said information in the form of image with or without voice, wherein said method comprises, on the assumption that the generation of said request in said receiving side is the preliminary processing and said displaying in said receiving side is the final processing, there is at least on intermediate processing in at least any of said receiving side, sending side, and communication system, between said preliminary processing and said final processing, the route along which ensuing processing is executed by using the result of preceding processing constitutes a loop, and the number of times for said entire loop to repeatedly update within a unit time is the frequency, and the maximum permissible times for repeated updating of the said entire loop in a unit time is the maximum frequency, repeating the processing preceding at least one step at an arbitrary frequency not exceeding said maximum frequency when repeatedly updating said request information and repeatedly updating said loop.

The method for interchanging information according to the third aspect of the present invention offers the following advantage. At least one processing in at least any one of the receiving side, sending side, and communication system is repeatedly updated at an arbitrary frequency not exceeding the maximum frequency of the loop as a whole. Thus, excess processing is eliminated in the subsequent process including said process. Hence it is possible to avoid waste in the subsequent processing including said process, and the entire processing is repeatedly updated.

In addition, even though the maximum frequency of the loop as a whole varies from one combination to another of the applicable receiving side, sending side, and communication system or their performance varies in the same combination, said processing is repeatedly updated in response to such variations. Thus it is possible to eliminate wastes even when the combination or performance changes.

The method for interchanging information according to the fourth aspect of the present invention is one embodiment based on the third aspect. It is characterized in that the maximum frequency of the loop as a whole is confirmed by actual measurement of the frequency of the final stage processing in the combination of said receiving side, sending side, and communication system.

The maximum frequency of the loop as a whole is a value inherent in each combination of the applicable receiving side, sending side, and communication system. Even though the combination is the same, it varies as the performance changes. However, according to the method for interchanging information as defined in the fourth aspect, the maximum frequency of the loop as a whole is confirmed by actual measurement of the final stage processing. As the result, the maximum frequency is easily and certainly confirmed even when the combination changes or the performance changes. Thus the occurrence of wastes is avoided.

The method for interchanging information according to the fifth aspect of the present invention is one embodiment based on any of the first to fourth aspects. It is characterized in that said request information has arbitrary position data and said specific information is contents information possessing image with or without voice associated with said specific information, with image being so constructed as to be displayed in frame units, and the frequency at which the final stage processing is repeated is the frequency at which the image of said contents information is updated.

The method for interchanging information as defined in the fifth aspect of the present invention offers the following advantage. When arbitrary position data is generated as request information, the contents information possessing the image with or without voice associated with this position data is transmitted as the specific information and this contents information is displayed and the contents information is displayed as a dynamic image as the position data is updated by said repeated updating. In addition, the frequency at which the image of the contents information is updated is the frequency at which the display is repeated. This facilitates confirmation and actual measurements.

The method for interchanging information according to the sixth aspect of the present invention is one embodiment based on any of the first to fourth aspects. It is characterized in that said request information has arbitrary position data and viewing direction data indicating an arbitrary direction as said arbitrary position and said specific information is contents information possessing image with or without voice associated with said position data and said viewing direction data, with image being so constructed as to be displayed in frame units, and the frequency at which the final stage processing is repeated is the frequency at which the image of said contents information is updated.

The method for interchanging information as defined in the sixth aspect of the present invention offers the following advantage. When arbitrary position data and viewing direction data indicating an arbitrary direction as this position are generated as request information, the contents information possessing the image with or without voice associated with this position data and viewing direction data is transmitted as the specific information and this contents information is displayed and the contents information is displayed as a dynamic image as the position data and viewing direction is updated by said repeated updating. In addition, the frequency at which the image of the contents information is updated is the frequency at which the display is repeated. This facilitates confirmation and actual measurements.

The method for interchanging information according to the seventh aspect of the present invention is one embodiment based on any of the fifth and sixth aspects. It is characterized in that said position data is one which is selected from (1) positioning data which is generated intermittently by satellite or radio positioning or (2) position data obtained by interpolation of the amount of movement (which is calculated from the moving speed and moving time of the receiving side) and said positioning data obtained most recently, said position data being generated while said positioning data is not generated.

The method for interchanging information as defined in the seventh aspect of the present invention offers the following advantage. The positioning data becomes the position data when it is generated, and the interpolated position data becomes the position data while said positioning data is not generated. Thus, even though the positioning data is generated at a low frequency, the interpolated position data make supplement so that the position data is generated at a high frequency.

The eighth aspect of the present invention resides in a method for interchanging information in which a receiving side which receives arbitrary information sends a sending side which keeps said information a request for transmission of said information through a communication system, said sending side, in response to said request, sends said receiving side relevant information through a communication system, and said receiving side receives said information which has been sent and displays said information in the form of image with or without voice, wherein said method is characterized in that said request information is composed of arbitrary position data and time data to specify arbitrary time and said specific information possesses image with or without voice associated with said position data and said time data, with image being so constructed as to be displayed in frame units.

The method for interchanging information as defined in the eighth aspect of the present invention offers the following advantage. When arbitrary position data and arbitrary time data are generated as request information, specific information composed of image with or without voice associated with said time data and position data are transmitted and displayed.

The ninth aspect of the present invention resides in a method for interchanging information in which a receiving side which receives arbitrary information sends a sending side which keeps said information a request for transmission of said information through a communication system, said sending side, in response to said request, sends said receiving side the relevant information through a communication system, and said receiving side receives said information which has been sent and displays said information in the form of image with or without voice, wherein said method is characterized in that said request information is composed of arbitrary position data, viewing direction data indicating an arbitrary direction as said position, and time data to specify arbitrary time, and said specific information possesses image with or without voice associated with said position data, said viewing direction data, and said time data, with image being so constructed as to be displayed in frame units.

The method for interchanging information as defined in the ninth aspect of the present invention offers the following advantage. When arbitrary position data, arbitrary viewing direction data, and arbitrary time data are generated as request information, specific information composed of image with or without voice associated with said time data, viewing direction data, and position data are transmitted and displayed.

The method for interchanging information according to the tenth aspect of the present invention is one embodiment based on any of the first to ninth aspects. It is characterized in that charge is levied based on the mount of request information sent or the amount of specific information transmitted.

The method for interchanging information according to the tenth aspect offers the following advantage. Since the amount of request information sent or the amount of specific information transmitted depends on the frequencies of said each processing, charge is levied in response to how the sending side utilizes the system.

BRIEF DESCRIPTION OF THE DRAWINGS

FIG. 15 is an action flowchart in the service start adjusting stage according to the first embodiment.

FIG. 40 is an action flowchart of the fourth embodiment.

FIG. 44 is a diagram illustrating the moving direction and viewing direction.

FIG. 54 is a block diagram of the server in the seventh embodiment of the contents information interchanging system according to the present invention.

FIG. 56 is an action flowchart that follows FIG. 55.

FIG. 62 is an action flowchart that follows FIG. 61.

FIG. 71 is an action flowchart that follows FIG. 70.

FIG. 72 is an action flowchart that follows FIG. 71.

FIG. 75 in a diagram for discussion of the problem that arises when the principle of the present invention is applied to the conventional construction.

DESCRIPTION OF THE PREFERRED EMBODIMENTS

In what follows, the preferred embodiments of the present invention will be described in more detail with reference to the accompanying drawings. Incidentally, the following embodiments are merely a part of preferred examples to demonstrate the essential construction and function of the present invention, and hence there will be instances in which several restrictions desirable for technical construction are made; however, the scope of the present invention is not limited to these embodiments unless the following mentions to the effect that the embodiments limit the scope of the present invention.

The First Embodiment

Figure 1:
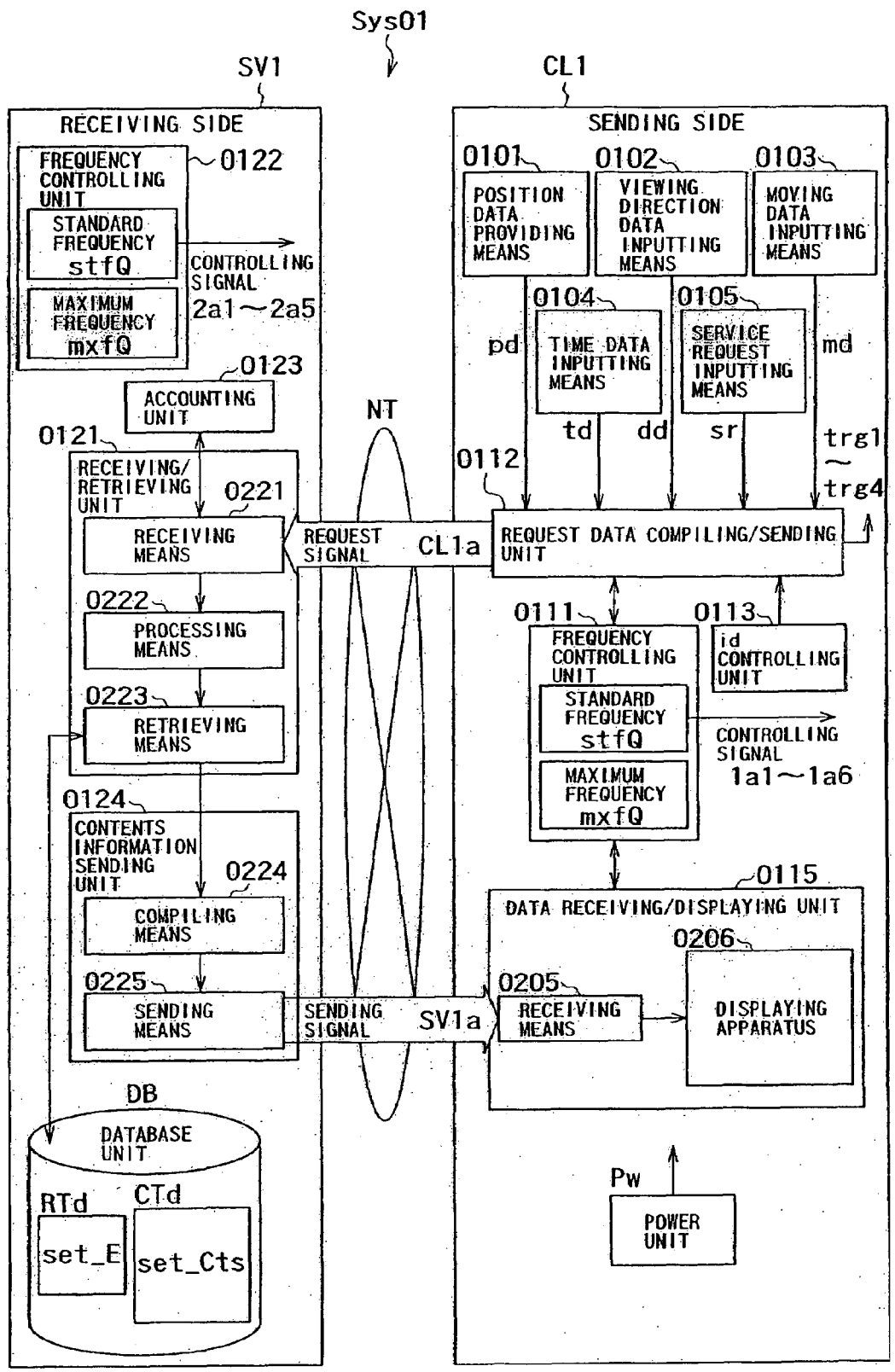
FIG. 1 is a block diagram showing the first embodiment of the contents information interchanging system according to the present invention.
Figure 2:
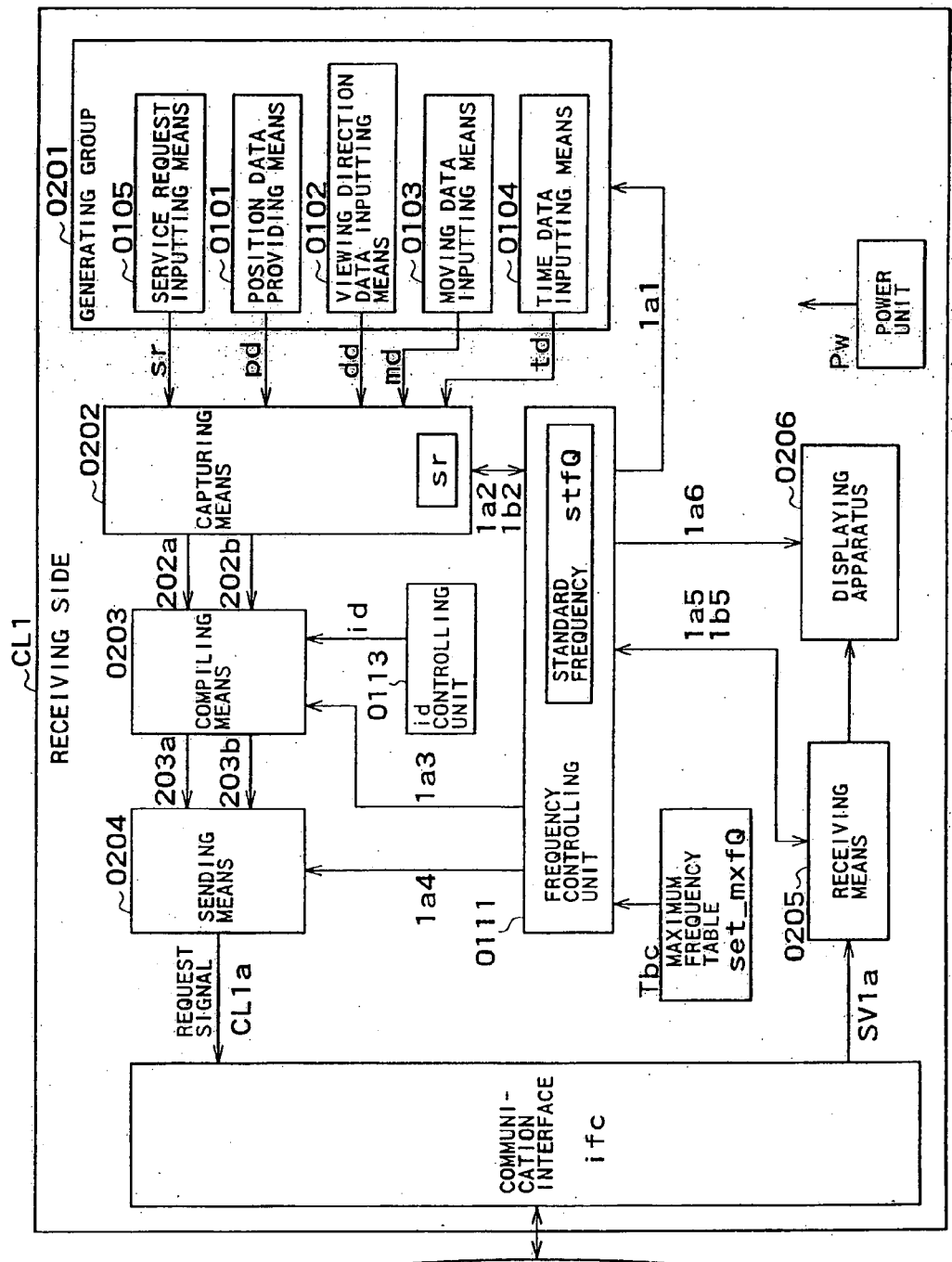
FIG. 2 is a block diagram showing the receiving side which is shown in FIG. 1.
Figure 3:
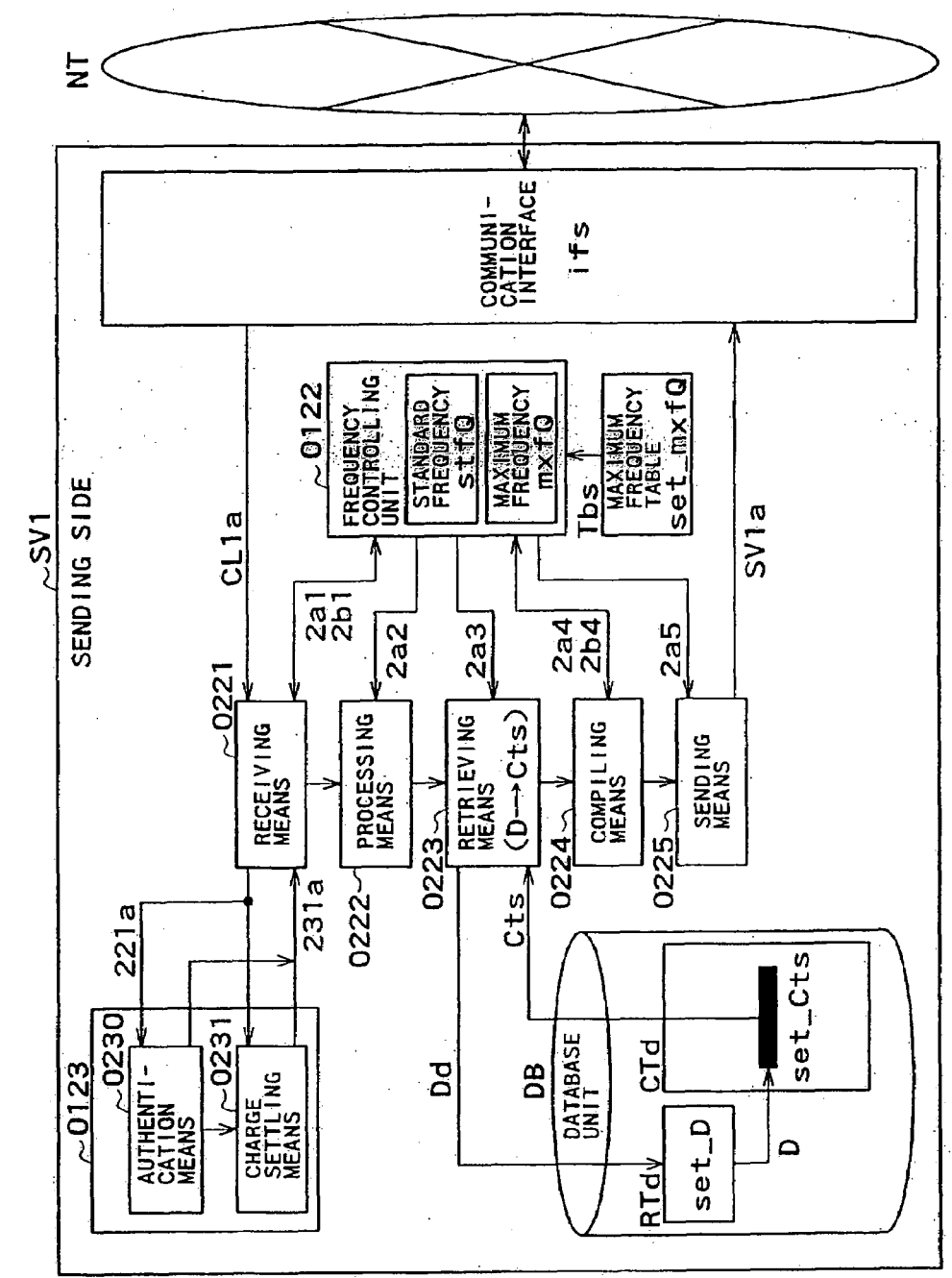
FIG. 3 is a block diagram showing the sending side which is shown in FIG. 1.
Figure 4:
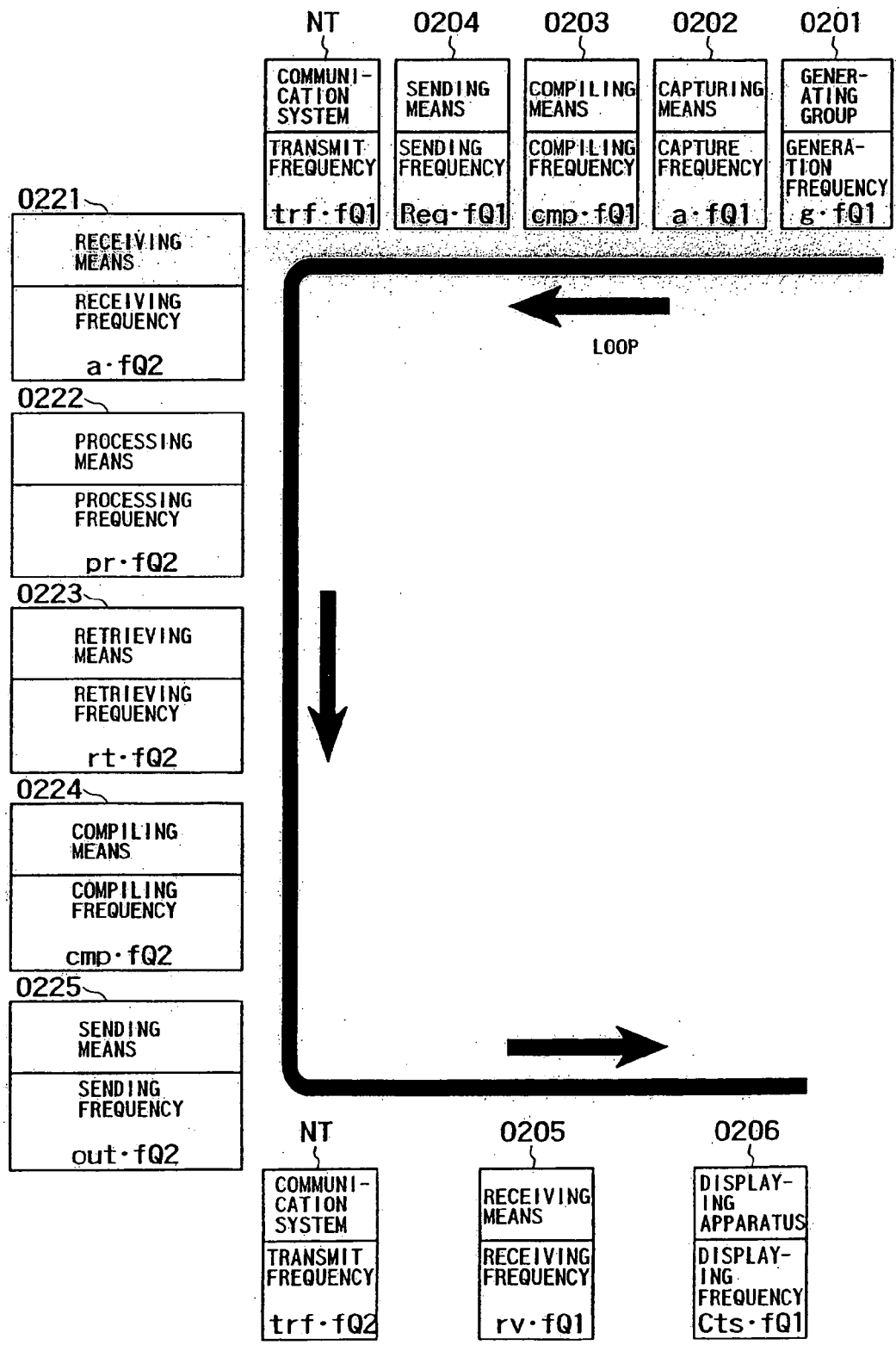
FIG. 4 is a diagram illustrating the frequency at which the contents information interchanging system performs updating repeatedly.

FIG. 1 is a block diagram showing the first embodiment of the contents information interchanging system according to the present invention. FIG. 2 is a block diagram showing the receiving side which is shown in FIG. 1. FIG. 3 is a block diagram showing the sending which is shown in FIG. 1. FIG. 4 is a diagram illustrating the frequency. The structure of the system will be described with reference to FIGS. 1 to 4.

The Outline of the Structure:

The contents information interchanging system Sys01 pertaining to this embodiment is a client/server system. It is made up of a receiving side (client) CL1 and a sending side (server) SV1 and a communication system NT which connects them together, so that it is adaptable to broadband communication.

The receiving side CL1 requests the sending side SV1 to provide at a high updating frequency the contents information Cts which the sending side SV1 keeps as a database.

First, the receiving side compiles request data to specify the contents information Cts which the receiving side wants to be provided. Then, the receiving side sends the request signal CL1a carrying this request data through the communication system NT. On receipt of this request data, the sending side SV1 searches through the database and retrieves the contents information Cts matching the request data. The sending side SV1 sends the transmitting signal SV1a carrying the contents information Cts to the receiving side CL1 through the communication system NT. The receiving side SL1 receives the transmission signal SV1a and restores and displays the contents information Cts. At the same time, the receiving CL1 repeats the above-mentioned interactive operation at a high frequency within a unit time. Therefore, the above-mentioned steps form a loop, and the loop is repeated at a high frequency. Display includes displaying an image on a screen and/or sounding voice (audio) as defined above.

The receiving side CL1 may be a mobile equipment (such as portable telephone, car-mounted telephone, PDA) and/or a stationary personal computer or work station (including game machines) capable of wire or wireless communication. It has a bus to transmit command data and video data, a CPU (Central Processing Unit) for arithmetic operation, a display controller to control the graphic display for video data and GUI on the screen, a communication interface ifc for data interchange with the communication system NT, an input devise interface for the processing of input data from the pointing devise (such as keyboard, mouse, and pen tablet), and an external interface. Moreover, it also has a ROM (Read Only Memory) and/or a data recording unit (such as magnetic hard disk) which stores the operating system and browser and part of application software, and a RAM (Random Access Memory) which temporarily stores up-loaded application software and data generated during execution by the CPU. This is a general computer construction and hence a detailed description is omitted for brevity.

The receiving side CL1 has several means relating to input data generation (referred to as generation group 0201, as shown in FIG. 2). The generation group 0201 includes the position data providing means 0101 to enter position data pd, the viewing direction data input means 0102 to enter viewing direction data dd, the moving data input means 0103 to enter moving data md, the time data input means 0104 to enter time data td, and the service request input means 0105 to enter service request data sr. In addition, the receiving side also has the frequency control unit 0111, the request data compiling and transmitting unit 0112, and id control unit 0113, the data receiving and displaying unit 0115, and the power unit Pw. Moreover, it is so constructed as to accommodate the maximum frequency table composed of sets of maximum frequency data. Incidentally, the maximum frequency data and maximum frequency table will be explained later.

The power unit Pw may be a lamp circuit or a battery. In the case of portable radio set, the main power unit is usually a rechargeable battery such as lithium ion polymer battery and lithium ion battery.

The frequency control unit 0111, the request compiling and transmitting unit 0112, and the id control unit 0113 are realized by computer program (software module) which can be read and executed by the above-mentioned CPU. Such a program is stored in a RON and/or a magnetic hard disk.

As shown in FIG. 2, the request data compiling/transmitting unit 0112 has a capture means 0202, a compiling means 0203, and a sending means 0204, so that it executes its processing sequentially step by step. Therefore, in the relationship between the capture means 0202 and the compiling means 0203, the capture means 0202 is the preceding step and the compiling means 0203 is the following step. The above-mentioned generating group 0201 and its means bear a part of the loop extending the above-mentioned receiving side CL1 and the sending side SV1 and the communication system NT.

The capture means 0202 captures input data from the above-mentioned generating group 0201 and sends it to the compiling means 0203. The compiling means 0203 compiles the request data based on the identifying data obtained by referencing the thus sent data and the id control unit 0113.

The compiling means 0203 sends the request data to the sending means 0204. The sending means 0204 generates the request signal CL1a, and sends the signal through the communication interface ifc to the communication system NT. The communication system NT transmits the signal to the sending side SV1.

Data which can be incorporated in the request signal CL1a at a service execution stage is at least any one of position data pd and/or viewing direction data dd and/or moving data md and/or time data td, and they are generalized and described as "event data". Accordingly, the request signal CL1a can incorporate event data. Note that moving data is described as speed data.

The data receiving/displaying unit 0115 is composed of receiving means 0205 as a software module which functions as means for reception, reproduction and compiling on the sending signal SV1 sent from the sending side SV1, and a displaying apparatus 0206 (for example, a screen-display device with audio reproduction function). The received data is subjected to the processings in this order, and screen display and audio playback and the like are performed.

The receiving means 0205 receives the sending signal SV1a, sent from the sending side SV1 and transmitted by the communication system NT, through the communication interface ifc, reproduces the contents information Cts, and sends it to the displaying apparatus 0206. The displaying apparatus 0206 displays the information on screen and/or with voice.

On the other hand, the frequency controlling unit 0111 can set a standard frequency as a standard for repeated updating of processing in the above-described respective units/means/apparatuses, and can execute frequency control on the repeated updating of processing in the respective units/means/apparatuses.

The sending side SV1 having a database unit DB is constructed as a computer system to function as a host server of the present service. The sending side is realized by application of a computer system having a combination of main frame computer, work station and personal computer, or the like, or constructed with plural computer machines connected by an intranet or LAN or constructed in a physically same computer machine, as a multi-platform system as a whole. Accordingly, the system has elements such as a processor (CPU), memories such as a RAM and a ROM, a broadband (high-speed and large capacity) communication interface ifs, a bus (these elements are not shown) and the like. As these elements are general computer system elements corresponding to broadband communication, explanation of the elements will be omitted so as to eliminate redundancy and complication.

Further, the database unit DB, having a large recording capacity medium, is capable of storage management of a large amount of contents information Cts. Preferably, the database unit DB is constructed with, e.g., a large capacity RAID system composed of plural magnetic disks (disk array). Further, complementary application of a VTR using a removable magnetic tape (or a large recording capacity system using plural VTRs) is possible.

The sending side SV1 has a receiving/retrieving unit 0121 constructed with software modules, a frequency controlling unit 0122, an accounting unit 0123, and a contents information sending unit 0124, and further has a power unit (not shown). The power unit mainly is a lamp light power unit. Further, the sending side can be provided with a maximum frequency table holding a set of maximum frequency data.

The receiving/retrieving unit 0121 has: receiving means 0221 to receive through the communication interface ifc the request signal CL1a, sent from the receiving side CL1 through the communication system NT, reproduce the request data, perform charging processing by the accounting unit 0123 and send the request data to processing means 0222; the processing means 0222 to perform processing based on the sent request data and send the resulted data to retrieving means 0223; and the retrieving means 0223 to search the database unit DB based on the sent data and read appropriate information, and to send the information to compiling means 0224 of the content information sending unit 0124.

The contents information sending unit 0124 has the compiling means 0224 to obtain the contents information Cts based on the information sent from the retrieving means 0223 of the receiving/retrieving unit 0121, to compile the sending data and send it to sending means 0225, and the sending means 0225 to compile the sending signal SV1a based on the sending data and send the signal through the communication interface ifs to the communication system NT. The sending signal SV1a is transmitted to the receiving side CL1 by the communication system NT.

On the other hand, the frequency controlling unit 0122 can set a standard frequency as a standard for repeated updating of processing in the above-described respective units and/or means, and can execute frequency control on the repeated updating of processing in the respective units and/or means. The respective units and/or means also bear a part of the above-described loop.

The communication system NT is a network having bidirectional data transmission line corresponding to broadband communication. The communication system NT bears a part of the above-described loop. An Internet system corresponding to wired or wireless transmission or the like is applied to the system.

Note that the details of the above-described respective units and/or means and the communication system NT will be described later.

Loop Formation:

The service for contents information is executed as described above. Upon establishment and implementation of the service, the above-described loop of processings from the request generation and sending by the receiving side CL1 through the processing by the sending side SV1 to the displaying again by the receiving side CL1, is formed. The generation group 0201 including the position data providing means 0101 and the like of the receiving side CL1 is provided at a loop start end, whereas the displaying apparatus 0206 of the data receiving/displaying unit 0115 of the receiving side CL1 is provided at a loop termination end.

When the request generation is made once, corresponding 1 contents information Cts is provided, thereby 1 loop is formed. As an example, when generation of position data is made once by the position data providing means 0101 of the generation group 0201, the processings are sequentially performed along the loop and data flows, then 1 frame image is displayed on the displaying apparatus 0206, and the loop, ends. The establishment of loop once is referred to as 1 operation.

In the present embodiment, the above-described loop is repeated at a high frequency within unit time. That is, updating and sending of the above-described request is repeated at a high frequency, updating and sending of the contents information Cts corresponding to each respective request is repeated at a high frequency, and updating of displaying is repeated at a high frequency, thereby the above-described loop is operated at a high frequency. As the display screen of the displaying apparatus 0206 is updated at a high frequency within unit time, a dynamic image can be displayed, and further, the respective frame images of the dynamic image are updated individually corresponding to the respective requests constantly updated by the generation group 0201.

In the present embodiment, along the above-described loop, of which updating being repeated at a high frequency, the frequency controlling unit 0111 executes frequency control on the respective processings in the receiving side CL1, or the frequency controlling unit 0122 executes frequency control on the respective processings by the sending side SV1.

Frequency of Processing:

The frequencies of the processings in the respective units in the receiving side CL1 and the sending side SV1 according to the present embodiment will be described with reference to FIG. 2.

As shown in FIG. 2, (1) a generation frequency g·fQ1 of generation of event data such as position measurement value, (2) a capture frequency a·fQ1 of capture of the generated event data on receiving-side, (3) a compiling frequency cmp·fQ1 relating to compiling of request data based on the received event data and other processing, and (4) a sending frequency Req·fQ1 relating to generation of the request signal CL1a for sending based on the compiled request data and sending processing, sequentially relate to the processings from the request generation to the sending in the receiving side CL1, thus performing repetition of service demand.

In the above description, the generation group 0201, having the position data providing means 0101, the viewing direction data inputting means 0102, the moving data inputting means 0103, the time data inputting means 0104, the service request inputting means 0105 and the like, relates to the generation frequency g·fQ1. Accordingly, the generated event data is the position data pd and/or the viewing direction data dd and/or the moving data md and/or the time data td.

The capturing means 0202, the compiling means 0203 and the sending means 0204 of request data compiling/sending unit 0112 relate to the receiving-side capture frequency a·fQ1, the compiling frequency cmp·fQ1 and the sending frequency Req·fQ1.

Generally, as the generation frequency g·fQ1 is often higher than the last stage side of the loop, e.g., the compiling frequency cmp·fQ1 and the sending frequency Req·fQ1, discrepancy occurs in the frequencies.

Further, (5) a transmission frequency trf·fQ1 of the request signal CL1a through the communication line from the receiving side CL1 to the sending side SV1, relates to the processing, and the communication system NT relates to the frequency.

Further, (6) a receiving frequency a·fQ2 in the receiving side relating to repeated reception of the request signals CL1a sequentially sent from the receiving side at the sending frequency Req·fQ1, (7) a processing frequency pr·fQ2 relating to various repeated processings on the received request data, (8) a retrieving frequency rt·fQ2 relating to repeated retrieval of database, (9) a sending-data compiling frequency cmp·fQ2 relating to repeated compiling of sending data based on the result of retrieval, and

(10) a contents-information sending frequency out·fQ2 relating to repeated generation of the sending signal SV1a for sending the compiled sending data and the repeated sending processing, sequentially relate to the processings till the sending of the contents information Cts in the sending side SV1, thus the service is repeatedly offered.

In the above description, the receiving means 0221 relates to the receiving-side receiving frequency a·fQ2.

The accounting unit 0123 and the processing means 0222 relate to the processing frequency pr·fQ2, The retrieving means 0223 and the database unit DB relate to the retrieving frequency rt·fQ2.

The compiling means 0224 relates to the sending-data compiling frequency cmp·fQ2.

The sending means 0225 relates to the contents-information sending frequency opt·fQ2.

Further, the frequency controlling unit 0122 relates to control of the above-described respective frequencies.

Further,

(11) a transmission frequency trf·fQ2 of the sending signal SV1a from the sending side SV1 to the receiving side CL1 through the communication line, relates to the processing, and the communication system NT relates to the frequency.

Further,

(12) a receiving frequency rv·fQ1 relating to reception of the sending signal SV1a from the sending side SV1 through the communication system NT and the data reproduction, and

(13) a content-information displaying frequency Cts·fQ1 relating to displaying of the contents information Cts based on the reproduced data, relate to the processing till the displaying of the contents information Cts in the receiving side CL1, and reception of the service is repeated.

The receiving means 0205 and the displaying apparatus 0206 of the data receiving/displaying unit 0115 relate to the receiving frequency rv·fQ1 and the contents-information displaying frequency Cts·fQ1.

Further, the frequency controlling unit 0111 relates to control of the above-described respective frequencies.

The frequencies (1) to (13) occur along the loop of the data processing in this numerical order.

The above-described respective means and apparatuses respectively use data obtained from a preliminary stage upon execution of processing. The frequencies of repetition of updating within unit time in the respective means and apparatuses are different, since execution time necessary for 1 processing are generally different. Accordingly, there is a discrepancy between the frequency of repeated updating in a preliminary stage and that in a following stage. In the entire loop, means/apparatus having the longest execution time and the lowest frequency of repeated updating determines the performance of repeated updating in the entire loop, i.e., becomes a rate-determining step.

Accordingly, even if the generation group 0201 at the loop start end generates, repeats updating and provides the event data at a high frequency, the execution frequency is lowered at the rate-determining step in the middle of the loop. Further, even if means on the preliminary stage side of the means, along the loop, performs processing at higher frequency, waste occurs unless the following stage can follow the frequency. This problem will be described in comparison with the conventional technique.

Comparison with Conventional Technique:

conventionally, there are precedents of providing of static image relating to current position or transmission of dynamic image from a host server to a mobile communication device such as a cellular phone, however, in these precedents, once the mobile communication device sends a current position or the like, the host server immediately transmits the static image or dynamic image data in the position without changing the position.

Accordingly, there is no precedent of high-frequency interactive loop repetition processing in the present invention, i.e., the cellular phone frequently sends a current position which constantly changes with movement, the hoist server constantly updates image data in synchronization with the sending, thereby a dynamic image formed by images changing, keeping with the movement of position, is displayed on the screen of the cellular phone. The arrangement of the present invention cannot be compared with precedents without difficulty.

Accordingly, the conventional arrangement is again shown in FIG. 75, and the problems which occur upon execution of high-frequency loop repetition processing as in the present invention by a receiving side CL75 and a sending side SV75 in the conventional arrangement will be studied with reference to FIG. 75.

As the receiving side CL75 is an unspecified number of clients, its functions and performance differ depending on client. Further, as the sending side SV75 is a large number of hosts, its functions and performance differ depending on host. Similarly, the transmission capacity of the communication system NT differs. In an actual system, these elements are arbitrarily combined, and respective service sessions are established. When a service session has been established, a loop 7501 is formed between the receiving side CL75 and the sending side SV75. The loop 7501 starts with request generation 7502 by the receiving side CL75 as a Start end, sending 7503 through the communication system NT, processing 7504 such as retrieval by the sending side SV75, sending 7505 through the communication system NT, and ends with displaying 7506 by the receiving side CL75 as a termination end.

Next, the technical problems upon repetition of the loop 7501 at a high frequency will be described in a particular operation example.

As the above-described operation example, in a case where a generation frequency 7502/1 of the request generation by the receiving side CL75 is 60 times/sec, and a frequency 7503/1 of the sending is also 60 times/sec, if a possible frequency 7504/1 of the processing by the sending side SV75 is 15 times/sec (this is defined by the performance of the sending side SV75), a frequency 7505/1 of the subsequent sending is also 15 times/sec, and further, a frequency 7506/1 of the displaying by the receiving side CL75 as the termination end is also 15 times/sec. In this manner, the above-described processing 7504 becomes a rate-determining step. As a result, waste X1 occurs between the request generation 7502 at the frequency of 60 times/sec and the sending 7503 at the frequency of 60 times/sec. That is, in the request generation 7502, the difference of 45 times/sec generation becomes an excess, and consumption of battery occurs in the receiving side CL75 (e.g., cellular phone). Further, similarly in the sending frequency 7503/1, the difference of 45 times/sec sending becomes an excess, and consumption of battery occurs. Further, loads on the communication line is increased due to wasteful data transmission, which annoys other line users, and further, increases communication tariff.

Further, as another operation example, in a case where a generation frequency 7502/2 of the request generation by the receiving side CL75 is 30 times/sec, a sending frequency 7503/2 is also 30 times/sec, a processing frequency 7504/2 in the sending side SV75 is also 30 times/sec, and further, a sending frequency 7505/2 of is also 30 times/sec, if a displaying frequency 7506/2 in the receiving side CL75 as a termination end is limited to 15 times/sec due to limitation of displaying capability, the displaying becomes a rate-determining step.

As a result, waste X2 occurs among the request generation 7502 At the frequency of 30 times/sec, the sending 7503 at the frequency of 30 times/sec, the processing 7504 by the sending side SV75 at the frequency of 30/sec, and sending 7505 at the frequency of 30 times/sec. That is, in the request generation 7502, the difference of 15 times/sec generation becomes an excess, which increases consumption of battery of mobile communication device as the receiving side CL75. Further, in the sending 7503, the difference of 15 times/sec sending becomes an excess, which increases consumption of battery, and increases loads on the communication line due to wasteful data transmission to annoy other line users, and further, increases communication tariff. Further, in the processing 7504 by the sending side SV75, the difference of 15 times/sec processing becomes an excess, which increases costs due to excessive processing, and increases loads on the communication line due to wasteful data transmission to annoy other line users, and further, increases the communication tariff.

In the present embodiment, the above-described problems particularly regarding the device using a battery such as a mobile device as the receiving side CL1, are solved by removing wasteful processing, and consigning complicated processing which consumes battery power to the server as the sending side, thereby improving the efficiency of use of power battery, further reducing wasteful communication by interactive processing thereby reducing loads on communication and communication tariff.

Upon execution of repeated updating of the loop, setting of frequency as a standard is important. Hereinbelow, a maximum frequency and a standard frequency will be described.

Maximum Frequency mxfQ:

In the loop, when the event data is generated once at the loop start end (in the present embodiment, the generation group 0201), one operation is started. Accordingly, in a case where the updating of the loop is repeated, the event data is generated and the updating of the data is repeated by the generation group 0201, and the other processings on the loop are performed following the above processing. However, as described above, the executable frequencies of the respective processings have upper limits. Accordingly, the entire loop has a threshold frequency.

In the present invention, it is "maximum frequency of the entire loop", and described as "maximum frequency mxfQ". At the maximum frequency mxfQ, the updating of the respective processings on the loop can be repeated.

Accordingly, even in a case where the respective means have processing capabilities higher than the maximum frequency mxfQ, waste does not occur if the updating of the respective processings are repeated at the maximum frequency mxfQ, and further, the updating of the entire loop can be repeated at the maximum frequency mxfQ.

The maximum frequency mxfQ depends on the combination of the receiving side CL1, the sending side SV1 and the communication system NT. Further, the maximum frequency depends on the kind of event data (for example, whether or not the service is executed only regarding position data, or whether or not the service is executed regarding the position data and viewing direction data), and further, depends on the line status of the communication system NT. Accordingly, the maximum frequency must be checked by case.

In the present invention, the maximum frequency mxfQ is checked by any one of:

(1) verifying the frequency based on an actual measurement value in loop operation, e.g., actual measurement of the display screen (loop termination end) in the receiving side CL1; or (2) referring to a list, a table or a specification table holding previously-disclosed data.

The checking depending on the measurement value in the above (1) is applied to another embodiment to be described later. In the present embodiment, the checking is made by using the data in the above (2). By this arrangement, the construction of the receiving side CL1 is simplified by omitting the above-described verifying function.

The checking in the above procedure (2) will be further described. In a case where the checking is made by using the data in the above procedure (2), the following methods are available.

(2a): referring to a previously-prepared list or table of maximum frequencies.

(2b): referring to a disclosed specification table and obtaining a maximum frequency by operation.

(2c): using a value specified by input as a maximum frequency.

In the list or table of maximum frequencies in the above procedure (2a), regarding a large number of combinations of the receiving side CL1, the sending side SV1 and the communication system NT, and further regarding the king of event data to which the list or table is applied, respective maximum frequencies mxfQ are referably prepared. Accordingly, on the presumption that the maximum frequencies are prepared in the list or table and referably arranged in advance, the previously-given maximum frequencies are referred to and utilized by each kind of service or each utilizing environmental condition such as combination.

Further, the specification table in the above method (2b) is values in a range of updateable frequency of the respective processing means held by e.g. a cellular phone as the receiving side CL1, obtained from designed values and actually measured values, displayed on the cellular phone. Similarly, in e.g. a site server as the sending side SV1, a range of updateable frequency of the respective processing means held there is disclosed as the performance of the server. Further, similarly, in an Internet system as the communication system NT, a range of transmission frequency (data transmission rate) is disclosed by each form of use.

In the above method (2b), regarding the combination among the respectively arbitrary receiving side CL1, the sending side SV1 and the communication system NT, and regarding the kind of event data to which the specification table is applied, a maximum one within a common range, derived by operation from the respectively-displayed updateable frequency ranges, is used au the maximum frequency mxfQ.

Standard Frequency stfQ:

As described above, as the loop of data processing flow is formed between the receiving side and the sending side, the above-described plural processings are sequentially generated and executed along the loop, and the loop processing ends at the loop termination end. When a "pair" of the request sending from the receiving side and the contents-information sending from the sending side in response to the request sending, is repeated as this loop processing at a high frequency (that is, at short periods), the respective processings on the loop are repeatedly executed. In the present invention, considering the fact that if the frequency of processing on the start end side (i.e., positioned upstream) of the loop exceeds the frequency of processing on the termination end side (i.e., positioned downstream) of the loop, a part of the processings on the upstream side on the loop is wasted, the frequencies are adjusted such that the frequency of the processing on the upstream side on the loop does not exceed the frequency of the processing on the downstream side, above all, that the frequency of the processing on the upstream side on the loop does not exceed the frequency of the processing at the loop termination end.

The frequency adjustment is executed as frequency management in the receiving side and the communication system controllable by the receiving side, and as frequency control in the sending side and the communication system controllable by the sending side.

For example, in a case where the above display frequency (13) in the displaying apparatus 0206 in FIG. 2 as the loop termination end is Cts·fQ1=30 frames/sec, if the generation group 0201 at the loop start end operates at the above generation frequency (1), f·fQ1=120 times/sec, the above respective frequencies (2) to (12) along the loop are 120 times/sec assuming that they can follow the above generation frequency. This frequency is excessive in comparison with the displaying frequency Cts·fQ1=30 frames/sec in the displaying apparatus 0206, accordingly, waste occurs in the above frequencies (1) to (12) of the respective processings on the upstream side from the loop termination end.

Then, the generation frequency of the generation group 0201 as the loop start end is adjusted to g·fQ1=30 times/sec, and the above respective frequencies (1) to (13) become 30 times/sec, thus no waste occurs.

Otherwise, in the above case, the above generation frequency (4) is adjusted such that the sending means 0204 operates at the sending frequency Req·fQ1=30 times/sec. Although there is discrepancy between the above frequency and the above respective 120 times/sec frequencies (1) to (3), no waste occurs in the above respective frequencies (4) to (13).

Further, the discrepancy in frequencies caused as above differs in accordance with combination of the receiving side CL1/the communication system NT/the sending side SV1, as described above, and further differs by kind of service. Accordingly, every time a service starts, the discrepancy must be checked and grasped and the method of frequency adjustment must be determined.

In the present invention, to perform the above-described frequency adjustment effectively and efficiently, a concept "standard frequency" is introduced. The standard frequency is a processing frequency applicable to the above-described respective processings on the loop, and it is set as "standard frequency stfQ" by kind of service.

Regarding a specific combination, the above-described loop can be operated at the maximum frequency mxfQ, and the updating of the respective processings along the loop can be repeated at the maximum frequency mxfQ. Accordingly, the service is established by operating the above-described loop at a frequency not exceeding the maximum frequency mxfQ. On the other hand, a user does not always requires an operation at the maximum frequency mxfQ in accordance with his purpose. Accordingly, a frequency, which satisfies a desired frequency (especially a screen updating frequency) and which does not exceed the maximum frequency mxfQ is set as the standard frequency stfQ.

The respective processings along the loop have performance to repeat updating at a frequency higher than the standard frequency stfQ, however, if the frequency exceeds the standard frequency stfQ, it is excessive and waste occurs. On the other hand, a frequency lower than the standard frequency stfQ is insufficient to establish the service. In particular, if some processing is executed at an insufficient frequency lower than the standard frequency stfQ, the service is not established and further, waste occurs in the respective processings from the above and the subsequent processings. In this manner, whether the frequency is excessive or insufficient, economic rationality is impaired. Accordingly, it is preferable to manage and control the frequencies of repeated updating of the respective processings not to be excessive nor insufficient.

The maximum frequency and the standard frequency will be further studied. Actually, the frequency of repeated updating of the loop can be arbitrarily set, however, if it is set to a very high frequency, the respective processings on the loop cannot follow, and as a result, the updating of the loop is repeated at a realizable maximum frequency. If the updating of any of the processings on the loop is repeated at a frequency higher than the realizable maximum frequency, it becomes an excess and waste occurs. Accordingly, if the updating of all the processings on the loop is repeated at the above-described maximum frequency, the entire loop can be operated at the maximum frequency without causing waste. In this manner, the maximum frequency is an upper limit value upon arbitrary setting of the frequency.

In many cases, an operation at the maximum frequency is not required in terms of utilization. For example, in a case where the updating of the processing at the loop start end is repeated with timing of updating of the screen at the loop termination end, even if the screen updating at a maximum frequency of 30 frames/sec is possible, in actual use, the screen updating at a frequency of 15 frames/sec which is sufficient in practical use, is preferable in consideration of battery consumption, service charge and reduction of loads on the communication line, and this is set as the standard frequency. In this manner, the standard frequency can be arbitrarily set by referring to the maximum frequency.

Service Start Adjusting Stage and Service Execution Stage:

The receiving side CL1 applied in the above description is various types of devices and the communication system NT is also various types of systems. Further, the sending side SV1 is plural devices, and the quality of service (especially the screen updating frequency) differs by service. As a result, there are a variety of combinations and a variety of quality of provided services. It is necessary to check the possible quality of service by the current arbitrarily-combined construction upon start of service session.

Accordingly, in the present invention, upon the above-described establishment and implementation of service, the following 2 stages of processings are sequentially executed.

The first stage is a "service start adjusting stage" at which the above-described standard frequency stfQ is set. The standard frequency stfQ is a frequency which can be used as a standard for repeated updating in a service as a usable frequency by each kind of service or by each utilization environmental condition (device or line which is used in the service). The standard frequency is set prior to start of full-scale service execution, i.e., the repeated updating of the loop at a high frequency including the request data updating and the sending, the updating and sending of corresponding contents information Cts, the updated receiving and the updated displaying.

The standard frequency stfQ is set by any of the following procedures.

(Q1) the maximum frequency mxfQ of the entire loop is checked, and the standard frequency stfQ is arbitrarily set within a range not exceeding the maximum frequency mxfQ.

Note that the checking of the maximum frequency mxfQ is made by any of the following procedures.

(Q1.1) The checking is made by actual measurement. That is, in an adjustment period before the start of service, the updating of the processing at the loop first stage is repeated at a sufficiently high frequency on trial to operate the loop at a high frequency. The screen updating frequency realized at the loop last stage is measured, and the obtained frequency is set as the maximum frequency mxfQ for the entire loop.

(Q1.2) The checking is made by reference to data. That is, a previously-generated list or table showing correspondence between the kind of service or resource application environment (types and performances of combined receiving side, sending side and communication system) and the maximum frequency mxfQ is referred to, and the maximum frequency mxfQ corresponding to the present service is obtained.

(Q2) The screen updating frequency at the loop last stage is checked, and the standard frequency stfQ is set within a range not exceeding the checked frequency.

Note that the checking of the screen updating frequency is made by any of the following procedures.

(Q2.1) The screen updating frequency realized at the loop last stage is measured. Since it has been already realized, it does not exceed the above-described maximum frequency mxfQ. In this manner, if the standard frequency is set depending on an already-realized frequency, it is not necessary to check the maximum frequency mxfQ.

(Q2.2) A specification table of the displaying apparatus 0206 at the loop last stage is referred to, and an realizable screen updating frequency of the apparatus is checked.

(Q3) In a case where a user specify-inputs a desired screen updating frequency, the maximum frequency mxfQ or a measured value of this form of use is referred to, and it is determined whether or not the specified screen updating frequency is valid (it does not exceed the maximum frequency mxfQ or measured value). If it is valid, the standard frequency stfQ is set to be equal to the specified screen updating frequency.

For example, in an arbitrary combination of the receiving side CL1, the sending side SV1 and the communication system NT, in a case where the above-described maximum frequency is 20 frames/sec, and the screen updating frequency at the loop last stage is preferably 15 frames/see in terms of use, if this frequency is inputted from an input device such as push buttons or a jog dial upon use, the standard frequency stfQ of the form of use is set to 15 times/sec through the determination.

In the present embodiment, the above-described procedure (Q1.2) is adopted. Note that the above-described other procedures are adopted in the other embodiments to be described later.

Then, based on the standard frequency stfQ set as described above, the frequencies of the repeated updating of the respective processings are managed or controlled.

In the present embodiment, the maximum frequency mxfQ is checked by the above-described procedure (Q1.2), i.e., a previously-prepared list or table of maximum frequencies is referred to as data. When the list or table is provided in the receiving side CL1, it is managed and referred to by the frequency controlling unit 0111. On the other hand, if the list or table is provided in the sending side SV1, it is managed and referred to by the frequency controlling unit 0122. Further, it may be arranged such that any one of the units consigns the referring to the other and the other sends the result of referring. One of the units to manage and refer to the list or table can be arbitrarily designed depending on the arrangement of the system. Otherwise, it may be arranged such that the frequency controlling unit 0111 or the frequency controlling unit 0122 automatically determines, or a user or administrator arbitrarily sets one of the units.

Further, the setting of the standard stfQ based on the referred maximum frequency mxfQ is executed by the frequency controlling unit 0111 of the receiving side CL1 or the frequency controlling unit 0122 of the sending side SV1. It may be arranged such that any one of the units consigns the referring to the other and the other sends the result of referring. One of the units to manage and refer to the list or table can be arbitrarily designed depending on the arrangement of the system. Otherwise, it may be arranged such that the frequency controlling unit 0111 or the frequency controlling unit 0122 automatically determines, or a user or administrator arbitrarily sets one of the units.

Upon completion of the setting of the standard frequency stfQ, the first stage ends, and automatically moves to the second stage.

The second stage is a "service execution stage" at which full-scale execution of service is made, i.e., the repeated updating and sending of request data at a high frequency, the repeated updating and sending of corresponding contents information Cts at a high frequency, the repeated updating of receiving and the repeated updating of displaying at a high frequency, are executed. The frequencies of the repeated updating of the respective processings are managed and controlled based on the standard frequency stfQ set at the above-described first stage.

In the arrangement where data flows from the preliminary stage side to the subsequent stage side and the processings are sequentially executed on the loop, effective management and control can be performed even in the case of so-called pipeline processing where the frequency of execution of the subsequent stage depends on the frequency of data supply from the preliminary stage, or in the case of so-called additive processing where the frequency of execution of midpoint processing does not coincide with a supply frequency from a preliminary stage and the frequency of execution is increased by generation of plural times of processing for 1 input.

The frequency management by the frequency controlling unit 0111 of the receiving side CL1 or the frequency controlling unit 0122 of the sending side SV1 can be arbitrarily designed depending on the arrangement of the system. Otherwise, one of the controlling units may be arbitrarily set by a user or an administrator.

Frequency Management Method and Frequency Control method:

The above-described frequency adjustment (frequency management by the receiving side or frequency control by the sending side) is performed on at least one of the above-described processings on the preliminary stage side from the above-described loop last stage.

As an example, as the most efficient arrangement, the frequency of repeated updating of all the processings on the loop is adjusted to be equal to the above-described standard frequency stfQ. The frequency of repeated updating of processing at the loop start end is set to be equal to the standard frequency stfQ. Further, as the next most efficient arrangement, the frequency of repeated updating of 1 processing possibly on the preliminary stage side on the loop is adjusted to be equal to the above-described standard frequency stfQ. These arrangements are based on a principle that in a portion where the above-described pipeline processing system is established, if the frequency adjustment has been already made based on the standard frequency stfQ in processing on the preliminary stage side, the frequency of data supply in processings on the subsequent stage side becomes the standard frequency stfQ, and consequently, the processing at the stage becomes the standard frequency stfQ, thereby the frequency adjustment at the subsequent stage can be omitted.

The processing in which the frequency management is performed in the receiving side CL1 or processing in which the frequency control is performed in the sending side SV1 can be arbitrarily designed depending on the arrangement of the system. Otherwise, the processing in which frequency management/control is performed may be automatically set by the frequency controlling unit 0111 or the frequency controlling unit 0122, or arbitrarily set by a user or an administrator.

FIGS. 5 to 10 are explanatory diagrams showing the form of frequency management or frequency control in respective cases. Hereinbelow, the forms of frequency management/control classified to respective cases will be described.

(Case A1): Execution by the receiving side CL1.

(Case A1.1): No desired screen updating frequency is specified by a user.

Figure 5:
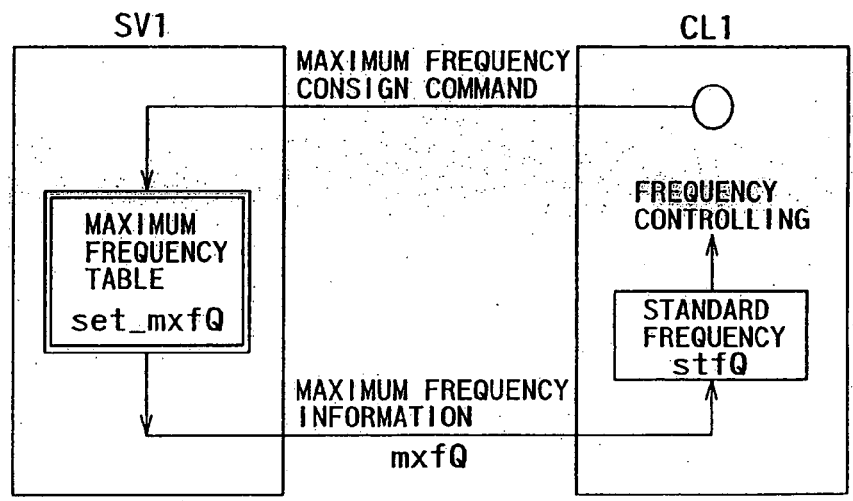
FIG. 5 is a schematic flowchart in the service start adjusting stage pertaining to Case A1.1.1.

(Case 1.1.1): The standard frequency stfQ not exceeding the maximum frequency mxfQ, sent from the sending side SV1 by consignment, is set by utilizing the information on the maximum frequency mxfQ managed by the sending side SV1, and the frequency of at least 1 processing in the receiving side CL1 is managed to be equal to the standard frequency stfQ. As shown in FIG. 5, the receiving side CL1 sends the request signal CL1*a* incorporating a maximum frequency consignment command and the service kind information to the sending side SV1. The sending side SV1 extracts an appropriate frequency from the set of maximum frequency data, set_mxfQ, held in the maximum frequency table managed by the sending side SV1, based on the service kind information. The sending side SV1 attaches a mark to the extracted frequency as information on the maximum frequency mxfQ, and sends the sending signal SV1*a* incorporating the data to the receiving side CL1. The receiving side CL1 receives the signal, sets the standard frequency stfQ, and performs frequency management.

Figure 6:
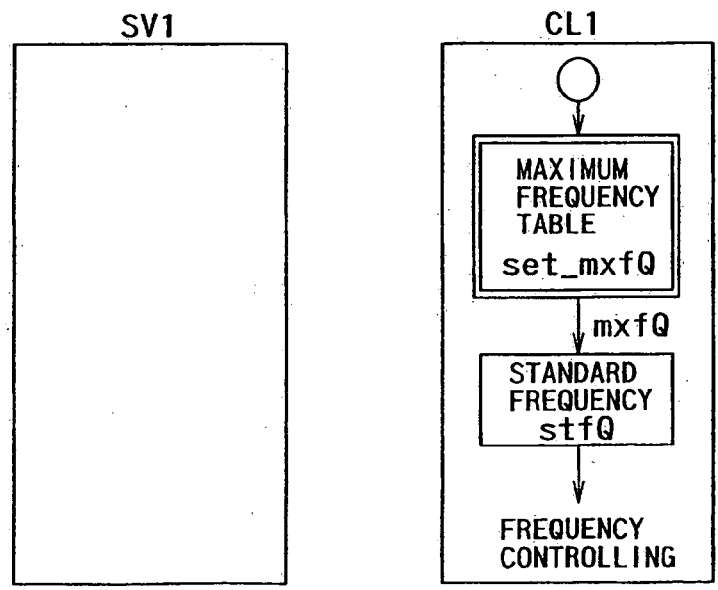
FIG. 6 is a schematic flowchart in the service start adjusting stage pertaining to Case A1.1.2.

(Case A1.1.2): The standard frequency stfQ not exceeding the maximum frequency mxfQ managed by the receiving side CL1 is set, and the frequency of at least 1 processing in the receiving side CL1 is managed to be equal to the standard frequency stfQ. As shown in FIG. 6, the receiving side CL1 extracts an appropriate frequency as the information on the maximum frequency mxfQ from the set of maximum frequency data, set_mxfQ, held in the maximum frequency table managed by the receiving side CL1, based on the service kind information. The receiving side sets the standard frequency stfQ based on the information, and performs frequency management. In this case, the sending side SV1 does not relate to the setting.

(Case A1.2): A desired screen updating frequency is specified by a user.

(Case A1.2.1); The validity of the specified screen updating frequency is checked by comparison with the information on the maximum frequency mxfQ managed by the receiving side CL1, then the standard frequency stfQ is set to be equal to the specified screen updating frequency, and the frequency of at least 1 processing in the receiving side CL1 is managed to be equal to the standard frequency stfQ.

Figure 7:
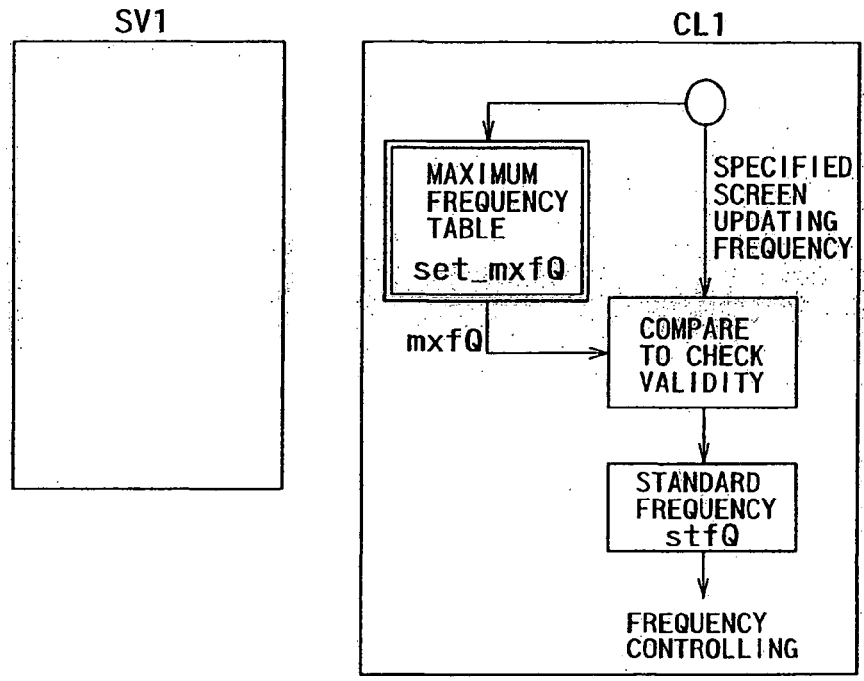
FIG. 7 is a schematic flowchart in the service start adjusting stage pertaining to Case A1.2.1.

As shown in FIG. 7, the receiving side CL1 extracts an appropriate frequency as the information on the maximum frequency mxfQ from the set of maximum frequency data, set_mxfQ, held in the maximum frequency table managed by the receiving side CL1, based on the service kind information. The receiving side CL1 checks the validity of the specified screen updating frequency by comparison with the information, sets the standard frequency stfQ to be equal to the specified screen updating frequency, and performs frequency management, In this case, the sending side SV1 does not relate to the setting.

(Case A1.2.2): The information on the maximum frequency mxfQ is sent by consignment from the sending side SV1 by utilizing the information on the maximum frequency mxfQ managed by the sending side SV1, the validity of the specified screen updating frequency is checked by comparison with the information, then the standard frequency stfQ is set to be equal to the specified screen updating frequency, and the frequency of at least 1 processing in the receiving side CL1 is managed to be equal to the standard frequency stfQ.

Figure 8:
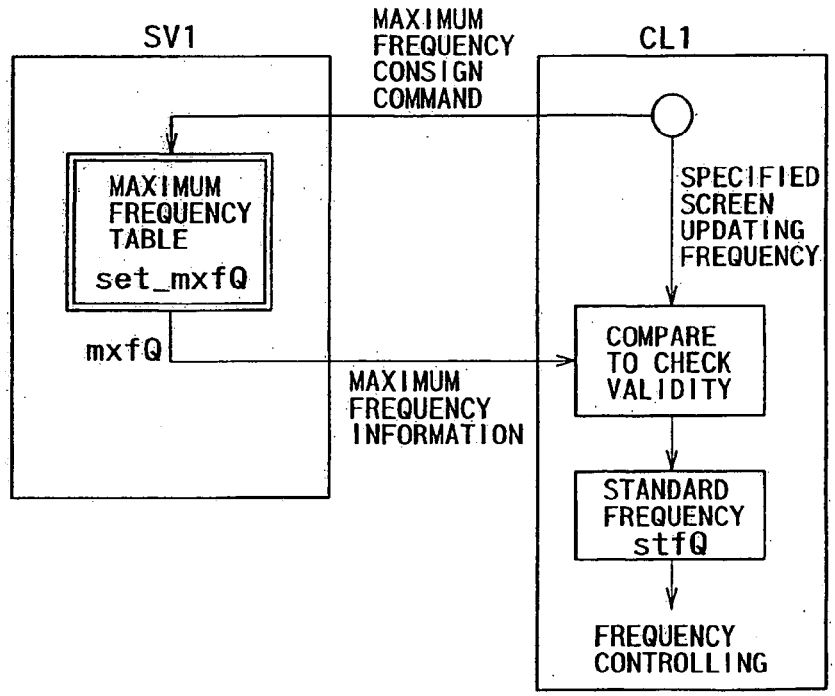
FIG. 8 is a schematic flowchart in the service start adjusting stage pertaining to Case A1.2.2.

As shown in FIG. 8, the receiving side CL1 sends the request signal CL1*a* incorporating the maximum frequency consignment command and the service kind information to the sending side SV1. The sending side SV1 extracts an appropriate frequency from the set of maximum frequency data, set_mxfQ, held in the maximum frequency table managed by the sending side SV1, based on the service kind information. The sending side attaches a mark to the data as the information on the maximum frequency mxfQ, incorporates it into the sending signal SV1*a*, and sends the signal to the receiving side CL1. The receiving side CL1 receives the signal, checks the validity of the specified screen updating frequency by comparison with the signal, sets the standard frequency stfQ to be equal to the specified screen updating frequency, and performs the frequency management.

(Case A2): Execution by the sending side SV1.

(Case A2.1): No desired screen updating frequency is specified by a user.

(Case A2.1.1): The receiving side CL1 sends the service kind information to the sending side SV1. The standard frequency stfQ not exceeding corresponding one information of the maximum frequency mxfQ managed by the sending side SV1 is set, and the frequency of at least 1 processing in the sending side SV1 is controlled to be equal to the standard frequency stfQ.

Figure 9:
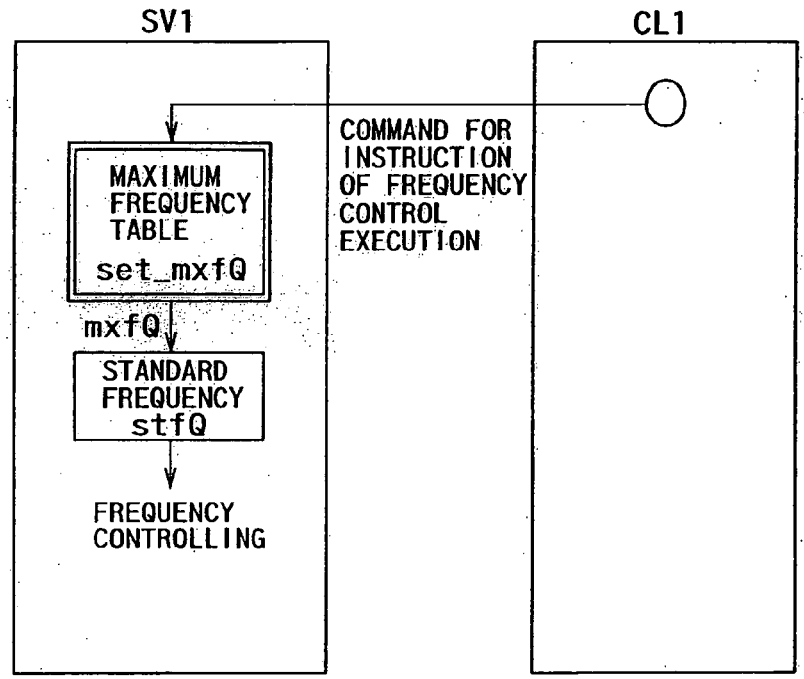
FIG. 9 is a schematic flowchart in the service start adjusting stage pertaining to Case A2.1.1.

As shown in FIG. 9, the receiving side CL1 sends the request signal CL1*a* incorporating a mark indicating the setting by the sending side SV1 and the service kind information to the sending side SV1. The sending side SV1 extracts an appropriate frequency as the information on the maximum frequency mxfQ from the set of maximum frequency data, set_mxfQ, held in the maximum frequency table managed by the sending side SV1, based on the service kind information, in accordance with the mark. The sending side sets the standard frequency stfQ based on the information, and performs the frequency control.

(Case A2.2): A desired screen updating frequency is specified by a user.

(Case A2.2.1): The receiving side CL1 sends the service kind information and information on the specified screen updating frequency to the sending side SV1. The validity of the specified screen updating frequency is checked by comparison with corresponding one of the information of the maximum frequency mxfQ managed by the sending side SV1. The standard frequency stfQ is set to be equal to the specified screen updating frequency, and the frequency of at least 1 processing in the sending side SV1 is controlled to be equal to the standard frequency stfQ.

Figure 10:
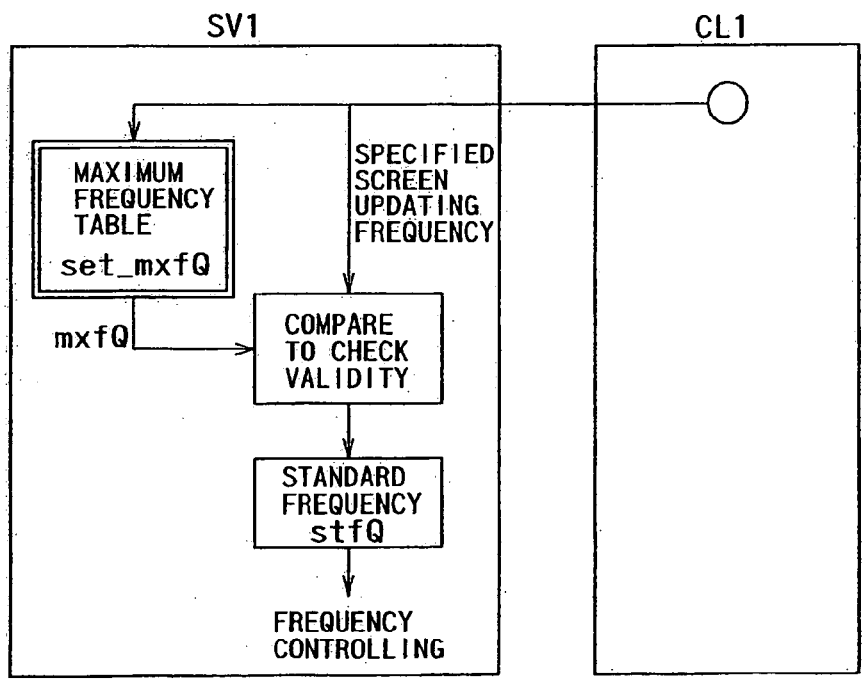
FIG. 10 is a schematic flowchart in the service start adjusting stage pertaining to Case A2.2.1.

As shown in FIG. 10, the receiving side CL1 sends the request signal CL1*a* incorporating a mark indicating the setting by the sending side SV1, the service kind information and the specified screen updating frequency to the sending side SV1. The sending side SV1 extracts an appropriate frequency as the information on the maximum frequency mxfQ from the set of maximum frequency data, set_mxfQ, held in the maximum frequency table managed by the sending side SV1, based on the service kind information, in accordance with the mark. The sending side SV1 checks the validity of the specified screen updating frequency by comparison with the information, sets the standard frequency stfQ to be equal to the specified screen updating frequency, and performs the frequency control.

Note that the standard frequency stfQ is set by kind of service to be performed. Further, it may be arranged such that, upon setting of the standard frequency stfQ, in the receiving side CL1 and/or the sending side SV1, correction or revision in accordance with each utilization environmental condition (device or line which is used in the service) is performed on the information of the maximum frequency mxfQ obtained by referring to the list or table as data before the standard frequency stfQ is set.

The constructions of the respective means will be described in detail with reference to FIGS. 2 and 3 based on the principle of frequency management/control and method, the concept of standard frequency, and the setting operation of the standard frequency.

Position Data Providing Means 0101:

The position data providing means 0101 of the receiving side CL1 is mainly used at the above-described service execution stage, however, in some cases, it is used at the service start adjusting stage (See a third embodiment to be described later).

The position data providing means 0101 is a means which obtains data on a spot where the receiving side CL1 is currently positioned or data on a desired arbitrary spot and provides the data as the position data pd to the subsequent stage. In the case of providing current spot data, the means is realized with a positioning device such as a GPS receiver or DGPS receiver as a global positioning system, a PHS positioning system, a positioning device such as a receiver of a positioning service utilizing a mobile communication system, and a related software module. Positioning data g as a measured value is provided to the subsequent stage. On the other hand, in the case of providing arbitrary spot data which is not limited to the current position, the means is realized with a general manual input device which can be easily operated by a user, such as buttons, keys or a pad, and a related software module.

The position data pd, composed of 2-dimensional coordinate values (latitude and longitude) or 3-dimensional coordinate values (latitude, longitude, and altitude), is provided as one of the event data into the capturing means 0202 of the request data compiling/sending unit 0112. Further, in the present invention, the event data is provided while updating of the event data is repeated at a high frequency in time.

The actuation of the position data providing means 0101 is controllable with a trigger signal trg1 sent at a predetermined frequency from the request data compiling/sending unit 0112, or is controllable with a control signal $1a1$ supplied at a predetermined frequency from the frequency controlling unit 0111. Every time the trigger signal trg1 or the control signal $1a1$ is supplied, the position data pd is provided. The position data pd is not outputted at other timing.

On the other hand, if the position data providing means 0101 is a device capable of autonomous actuation such as a GPS receiver or a positioning service receiver, the position data pd is provided at autonomous timing after the apparatus has been actuated. Note that in the case of the latter device, operation control can be performed on the device by sending an actuation start/stop signal of the device.

Viewing Direction Data Inputting Means 0102:

The viewing direction data inputting means 0102 is mainly used at the above-described service execution stage, however, in some cases, it is used at the service start adjusting stage.

The viewing direction data inputting means 0102 is a means which inputs a user's viewing direction as the viewing direction data dd if the contents information Cts is the landscape or scene in the spot as in the above-described example. The means is constructed with a direction pointer comprising a geomagnetic sensor and a gravitation sensor respectively to detect a geomagnetic direction and gravity for a user's freely setting a desired direction, or a general input device for a user's setting a desired direction by a simple input operation such as buttons, keys and a pad. The viewing direction data dd is inputted as one of the event data into the capturing means 0202 of the request data compiling/sending unit 0112.

Further, a direction inclined from a horizontal direction or vertical direction can be specified by using the viewing direction data. By specifying a desired inclination, the contents information inclined in a desired direction can be displayed on the screen.

Further, in a case where the viewing direction data inputting means 0102 is realized with a direction pointer, it may be arranged such that the means autonomously operates, and further, such that the viewing direction data inputting means 0102 operates based on a trigger signal trg2 sent from the request data compiling/sending unit 0112. Further, the viewing direction data inputting means 0102 is controllable with the control signal $1a1$ supplied from the frequency controlling unit 0111. Note that the direction pointer will be described later.

Moving Data Inputting Means 0103:

The moving data inputting means 0103 is mainly used at the above-described service execution stage, however, in some cases, it is used at the service start adjusting stage.

The moving data inputting means 0103 is a means which mainly inputs the moving data md indicating a moving speed in 2-dimensional directions (latitudinal direction and longitudinal direction) or 3-dimensional directions (latitudinal direction, longitudinal direction and altitudinal direction). The means is constructed with e.g. a speedometer having a 2-dimensional or 3-dimensional speed sensor. The moving data md is inputted as one of the event data into the capturing means 0202 of the request data compiling/sending unit 0112.

Further, it may be arranged such that the moving data inputting means 0103 autonomously operates, and further, such that the means operates based on a trigger signal trg3 sent from the request data compiling/sending unit 0112. Further, the moving data inputting means 0103 is controllable with the control signal $1a1$ supplied from the frequency controlling unit 0111.

Time Data Inputting Means 0104:

The time data inputting means 0104 is mainly used at the above-described service execution stage, however, in some cases, it is used at the service start adjusting stage.

The time data inputting means 0104 is a means which input the time data td for a user to specify desired time i.e. year/month/day, and is constructed with a general user-friendly input device such as buttons, keys or a pad. For example, when the landscape of the Sumida River in Edo Period is desired, it is specified by inputting the year/month/day about that time. The time data td is inputted as one of the event data into the capturing means 0202 of the request data compiling/sending unit 0112. Further, although not shown, it may be arranged such that the time data inputting means 0104 is actuated based on a trigger signal trg4 sent from the request data compiling/sending unit 0112. Further, the time data inputting means 0104 is controllable with the control signal 1*a*1 supplied from the frequency controlling unit 0111.

Further, it may be arranged such that, in a case where the above-described position data providing means 0101 and/or the viewing direction data input means 0102 and/or the moving data input means 0103 and/or the time data inputting means 0104 are actuated based on the control signal 1*a*1 from the above-described frequency controlling unit 0111 or the trigger signals trg1 to trg4 sent from the request data compiling/sending unit 0112, a token to notify the subsequent stage that the frequency adjustment has been already made is incorporated into the event data and the event data is inputted into the capturing means 0202.

Service Request Inputting Means 0105:

The service request inputting means 0105 is a means which inputs the service request data sr when a user makes a request of the sending side SV1 for the start of a service. The means is constructed with a general input device such as buttons, keys and a pad. The above-described service start adjusting stage is started by generation of the service request data sr.

The service request data sr incorporates any of the following data.

(1) The kind of service desired by a user.

(2) specification of the kind of service desired by the user and a desired screen updating frequency.

Figure 11:
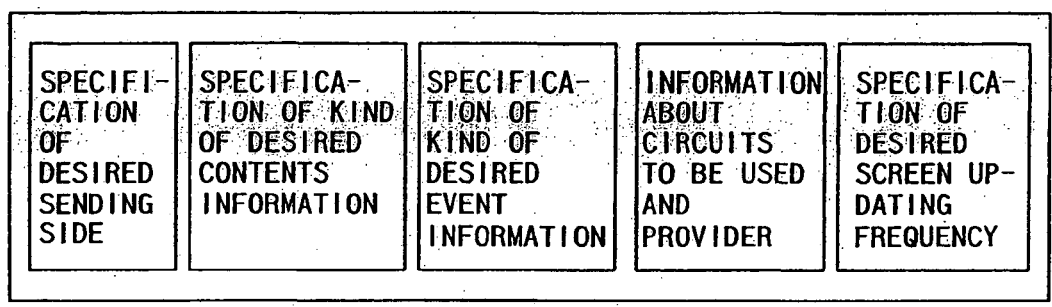
FIG. 11 is a diagram showing one example of the form of service kind information.

Note that the kind of service includes specification of a desired sending side SV1, specification of the kind of event data, the kind of desired contents information, information on the type of communication line, a provider (in use of the Internet) and the like. FIG. 11 shows the construction of the service kind information.

The above-described data (1) corresponds to the above-described respective cases A1.1.1., A1.1.2, A1.1.3, A2.1.1 and A2.1.2.

On the other hand, the above-described data (2) corresponds to the cases A1.2.1, A1.2.2, and A2.2.1.

Further, regarding the charging for a service, a registered user of the receiving side CL1 (user data has been registered in the id controlling unit 0113) is charged, or a temporary user (i.e., an unregistered user) who has inputted identifying information is charged. In the present embodiment, the former user, i.e., the device registered user is charged. In a case where the latter user is charged, the identifying information of the temporary user may be inputted into the service request data sr.

The service request data sr is inputted into the capturing means 0202 of the request data compiling/sending unit 0112 at the service start adjusting stage. Further, when the service request data sr is generated by the user's operation at the service execution stage in progress, the service session by that time ends, and moves to start of new service session.

Note that the above-described respective providing means/inputting means are handled as the generation group 0201 as described above.

Capturing Means 0202:

The capturing means 0202 of the request data compiling/sending unit 0112 can receive the service request data sr or the event data (at least one of pd, dd, md, and td) from the generation group 0201, and receive a control signal 1*a*2 from the frequency controlling unit 0111.

If it is checked that received data is data inputted from the service request inputting means 0105, it is recognized that the service start adjusting stage has been started, and the data is immediately captured as the service request data sr and the content of the data is checked. In particular, the kind of the event data is checked and the data is stored.

Figure 13A:
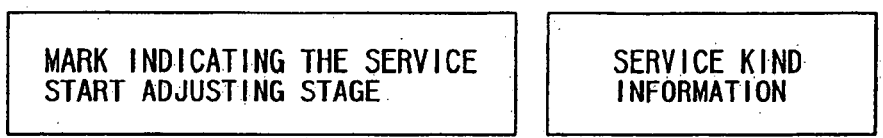
FIG. 13 is a diagram illustrating the structure of data interchanged in the service start adjusting stage.

If a preliminary service is already at the execution stage, the preliminary service is stopped, and an actuation stop signal 1*b*2 is sent to the frequency controlling unit 0111. Then, a new service session is started as the service start adjusting stage, the specified service kind information incorporated in the newly-arrived service request data sr is stored, data 202*a* in which a sign notifying the service start adjusting stage is attached to the service request data sr is generated, and the data is sent to the compiling means 0203. FIG. 13A shows the construction of the data 202*a*. In this manner, the session formation relating to the service is started by the capturing the service request data sr.

Further, during a predetermined period after the capture of the service request data sr, it is determined whether or not the event data is captured from the generation group 0201 depending on each embodiment.

The above-described processing at the service start adjusting stage is common to all the above-described cases (Cases A1.1.1 to A2.2.1).

Further, the service start adjusting stages move to the service execution stage when the event data (pd, dd, md or td) is provided from the generation group 0201 or the control signal 1*a*2 (to be described later) is supplied from the frequency controlling unit 0111. Otherwise, it is determined based on elapse of predetermined time that the service start adjusting stage has been completed, and the service execution stage is automatically started.

Next, at the above-described service start adjusting stage, the capturing means 0202 captures the event data or the token-attached event data sent from the generation group 0201.

Note that in a case where the control signal 1*a*2 is supplied from the frequency controlling unit 0111, it is determined that the frequency management has not been performed in the generation group 0201 at the preliminary stage and the frequency management is to be performed in the capturing means 0202. The event data of the above-described stored kind (e.g., only the position data pd, or the position data pd and the viewing direction data dd, or the like) is sampling-captured with timing of the control signal 1*a*2. At this time, the generation frequency g·fQ1 of the event data is higher than the frequency of the control signal 1*a*2, on the other hand, the capturing frequency a·fQ1 is equal to the frequency of the control signal 1*a*2. Accordingly, g·fQ1>a·fQ1 holds, and the event data sent from the generation group 0201 is thinned by sampling capturing.

On the other hand, in a case where the control signal 1*a*2 is not supplied from the frequency controlling unit 0111, the event data (or the token-attached event data) from the generation group 0201 is captured with timing of the occurrence of the input. In this case, whether the frequency management has been performed or not at the preliminary stage, a·fQ1=g·fQ1 holds. If the above-described token is attached to the event data, it can be checked that the frequency management has been already performed in the generation group 0201.

The event data includes the position data pd provided from the position data providing means 0101, the viewing direction data dd and/or the moving data md and/or the time data td, inputted from the viewing direction data inputting means 0102 and/or the moving data inputting means 0103 and/or the time data inputting means 0104. The capturing means 0202 captures necessary data in accordance with the contents of the stored service request data sr (the kind of event data specified by the service kind information), and sends the data to the compiling means 0203. For example, if the position data pd is specified as necessary event data in the specified service kind information, the capturing means captures only the position data pd, attaches the above-described service kind information to the data and sends the data to the compiling means 0203. Otherwise, if the position data pd and the viewing direction data dd are specified as necessary event data in the specified service kind information, the capturing means captures the position data pd and the viewing direction data dd, attaches the above-described service kind information to the data, and sends the data to the compiling means 0203.

Further, it may be arranged such that the capturing means 0202 supplies the trigger signals trg1, trg2 and trg3 respectively to the position data providing means 0101, the viewing direction data inputting means 0102 and the moving data inputting means 0103 to start them, and further, such that the capturing means 0202 supplies the trigger signal to the time data inputting means 0104 to start it.

Further, it may be arranged such that, regarding data with a different generation frequency among the position data pd, the viewing direction data dd, the moving data md and the timing data td, the capturing means 0202 interpolates the data with the lower generation frequency by duplication, thus adjusts the generation frequency to the same generation frequency.

Figure 14A:
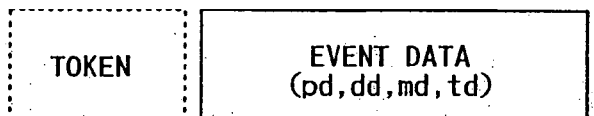
FIG. 14 is a diagram illustrating the structure of data interchanged in the service execution stage.
Figure 14B:
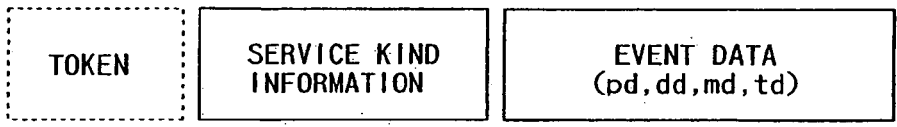

The capturing means 0202 generates data 202b incorporating the captured event data and the stored service kind information described above, and sends the data to the compiling means 0203. In a case where the above-described token has been received from the preliminary stage or the capturing means 0202 has executed the frequency management, the above-described token may be attached to the data 202b. FIGS. 14A and C show the constructions of the data captured by the capturing means 0202 and the data 202b to be outputted, respectively.

Compiling Means 0203:

Next, if the compiling means 0203 detects the above-described sign notifying the service start adjusting stage in the data sent from the capturing means 0202, it determines that the received data is the data 202a and the service start adjusting stage has been started. Then the compiling means 0203 determines the form of frequency adjustment, i.e., the frequency management or the frequency control to be performed, then determines processing to be subjected to the frequency adjustment, further, issues an instruction of standard frequency setting, and generates the request data relating to start adjustment.

First, the form of frequency adjustment is determined. That is, the compiling means 0203 determines (a) to perform the frequency management in the respective processings in the receiving side CL1, or (b) to perform the frequency control in the respective processings in the sending side SV1.

The above processings include the processing in the communication system NT. Regarding the processing in the communication system NT upon sending from the receiving side CL1, the receiving side CL1 indirectly executes the frequency management. Regarding the processing in the communication system NT upon sending from the sending side SV1, the sending side SV1 indirectly executes the frequency control.

Next, the processing to be subjected to the frequency management/control is determined. The results of these determinations are transferred to the frequency controlling unit 0111, and transmitted to the frequency controlling unit 0122 of the sending side SV1 in accordance with necessity.

The above-described determinations are made based on default settings of the receiving side CL1 made at a shipping stage, previously-made specification by a user or an administrator by a switch operation (not shown) at a system constructing stage or use start stage of the system, or made by own automatic determination by the compiling means 0203, or made in accordance with an instruction from other means than the compiling means 0203, other means (not shown) or external device, or in accordance with the result of determination by the sending side SV1 supplied to the compiling means 0203.

The form of frequency adjustment is determined as above, then the compiling means 0203 checks presence/absence of data specifying the screen updating frequency desired by the user in the data 202a sent from the capturing means 0202. The compiling means executes any one of the following above-described cases, based on the result of checking.

Figure 13B:

<Case A1.1.1>: The receiving side CL1 performs the frequency management. In a case where the receiving side CL1 does not manage the list of maximum frequencies necessary upon setting of the standard frequency, in order to receive the information on the maximum frequency managed by the sending side SV1 by consignment, the request data 203a incorporating the above-described sign, the identifying data id (including resource information such as a device type), the maximum frequency consignment command and the service kind information is compiled and sent to the sending means 0204. FIG. 13B shows the construction of the request data 203a.

The above description will be explained in more detail. The receiving side CL1 performs the frequency management, however, the receiving side CL1 does not manage the maximum frequency information. Accordingly, the standard frequency is set by utilizing the maximum frequency information previously-determined by kind of service managed by the sending side SV1, and the frequency management is performed by using the standard frequency. At this time, it is necessary to cause the sending side SV1 to perform the retrieval of maximum frequency information and send the result of retrieval by consignment.

For this purpose, the compiling means 0203 sends the identifying data, the above-described maximum frequency consignment command, the service kind information and the resource information to the sending means 0204, to send the data via the sending means 0204 to the sending side SV1. The sending side SV1 retrieves the above-described maximum frequency and send the result of retrieval to the receiving side CL1 by consignment. The frequency controlling unit 0111 sets the standard frequency stfQ based on the result of retrieval.

Then, the above-described service start adjusting stage is terminated upon elapse of predetermined period or acquisition of setting completion notification of the standard frequency stfQ from the frequency controlling unit 0111, and the next service execution stage is started.

At the service execution stage, in a case where a control signal 1a3 is supplied from the frequency controlling unit

0111, it is determined that the frequency management has not been performed on the preliminary stage side i.e., in any of the generation group 0201 and the capturing means 0202 and the frequency management is to be executed in the compiling means 0203. The data 202*b* from the capturing means 0202 is sampling-captured with timing of the control signal 1*a*3, and compile-processing is performed. At this time, if the capturing frequency a·fQ1 at the preliminary stage is higher than the frequency of the control signal 1*a*3, the compiling frequency cmp·fQ1 is equal to the frequency of the control signal 1*a*3. Accordingly, a·fQ1>cmp·fQ1 holds. The data 202*b* sent from the capturing means 0202 is thinned by sampling capturing.

On the other hand, in a case where the control signal 1*a*3 is not supplied from the frequency controlling unit 0111, the data 202*b* from the capturing means 0202 is captured with timing of the occurrence of the input. That is, whether the frequency management has been wade or not on the preliminary stage side, cmp·fQ1=a·fQ1 holds. Note that if the above-described token is attached to the data 202*b*, it can be checked that the frequency management has been already performed in the capturing means 0202 or its preliminary stage.

The compiling means 0203 that received the data 202*b* compiles the request data 203*b* incorporating the above-described identifying data, the service kind information and the event data (necessarily including the position data pd, and including the viewing direction data dd and/or the moving data md and/of the time data td in accordance with necessity), and sends the data to the sending means 0204, Further, in the request data 203*b*, updating of the event data is repeated in time, and the request data 203*b* is repeatedly sent to the sending means 0204.

Further, as the above-described position data pd, (1) positioning data as a measured value by a positioning system such as GPS is used, (2) an input value by simulation is used, or (3) a position obtained by operation using the moving data md and the above-described positioning data. The above case (3) will be described in detail in a sixth embodiment to be described later.

Figure 14C:
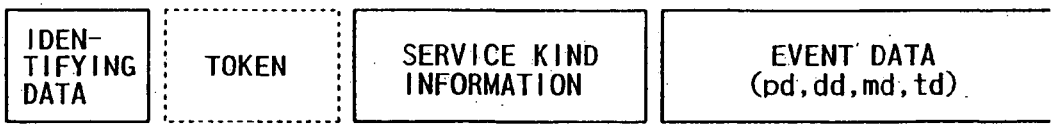

It may be arranged such that if the above-described token has been received from the capturing means 0202 or the frequency management has been executed in the compiling means 0203, the compiling means 0203 attaches the above-described token to the request data 203*b* to be sent to the sending means 0204. FIG. 14C shows the construction of the request data 203*b*.

<Case A1.1.2>: The receiving side CL1 performs the frequency management, and further, to set the standard frequency by using the maximum frequency (previously determined by the above-described combination and kind of service) held in the receiving side CL1, the receiving side CL1 sends the service kind information and the resource information such as device type extracted from the identifying data id to the frequency controlling unit 0111. The frequency controlling unit 0111 retrieves the above-described information on the maximum frequency and sets the standard frequency stfQ. At the service start adjusting stage of this case, data is not sent to the sending means 0204 and the subsequent means.

Then, the above-described service start adjusting stage is terminated upon elapse of predetermined period or acquisition of setting completion notification of the standard frequency stfQ from the frequency controlling unit 0111, and the next service execution stage is started. The processing at the service execution stage is similar to that of the above-described case A1.1.1.

<Case A1.2.1>: The receiving side CL1 performs the frequency management. The maximum frequency information held in the receiving side CL1 is referred to based on the kind of service desired by the user and the resource information, and the validity of specified desired screen updating frequency (incorporated in the service request data sr) is determined. If the specified frequency is valid, in order to set the standard frequency by using the desired screen updating frequency, the service kind information, the resource information and the specified desired screen updating frequency information are sent to the frequency controlling unit 0111. Then the frequency controlling unit 0111 determines the validity by comparison between the retrieved maximum frequency information and the desired screen updating frequency, and sets the standard frequency stfQ. At the service start adjusting stage of this case, data is not sent to the sending means 0204 and the subsequent means.

Then, the above-described service start adjusting stage is terminated upon elapse of predetermined period or acquisition of setting completion notification of the standard frequency stfQ from the frequency controlling unit 0111, and the next service execution stage is started. The processing at the service execution stage is similar to that of the above-described case A1.1.1.

<Case A1.2.2.>: The receiving side CL1 performs the frequency management. To utilize the maximum frequency information managed by the sending side SV1, the above-described sign, the identifying data id (including the resource information such as a device type), the service kind information and the maximum frequency consignment command are sent to the sending side SV1, to cause the sending side to refer to the maximum frequency information and return the result by consignment. Further, the validity of the specified desired screen updating frequency (incorporated in the service request data sr) is determined based on the maximum frequency information returned to the frequency controlling unit 0111. If the specified frequency is valid, to set the standard frequency by using the desired screen updating frequency, information on the specified desired screen updating frequency is sent to the frequency controlling unit 0111. The frequency controlling unit 0111 determines the validity by comparison between the above-described maximum frequency and the desired screen updating frequency, and sets the standard frequency stfQ.

Then, the above-described service start adjusting stage is terminated upon elapse of predetermined period or acquisition of setting completion notification of the standard frequency stfQ from the frequency controlling unit 0111, and the next service execution stage is started. The processing at the service execution stage is similar to that of the above-described case A1.1.1.

Figure 13C:

<Case A2.1.1>: The sending side SV1 is caused to perform frequency control, and set the standard frequency stfQ based on the above-described maximum frequency. The request data 203*a* incorporating the mark, the identifying data id (including the resource information such as device type) and the service kind information is sent through the sending means 0204 to the sending side SV1. The mark is a sign which instructs the sending side SV1 to perform the frequency control, and further, notifies that the service kind information for retrieving the maximum frequency by the sending side SV1 is supplied. FIG. 13C shows the construction of the request data 203*a*.

Then, the above-described service start adjusting stage is terminated upon elapse of predetermined period or acquisition of setting completion notification of the standard frequency stfQ from the sending side SV1, and the next service execution stage is started. The processing at the service execution stage is similar to that of the above-described case A1.1.1.

<Case A2.2.1>: The sending side SV1 is caused to perform the frequency control, and set the standard frequency stfQ by checking the validity of the screen updating frequency specified by the user by comparison with the above-described maximum frequency. The request data 203$a$ incorporating the mark (1 kind of sign), the identifying data id (including the resource information such as a device type), the service kind information and the screen updating frequency specified by the user is sent through the sending means 0204 to the sending SV1.

Figure 13D:
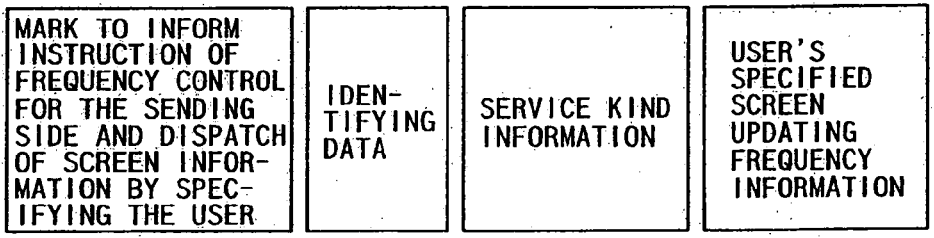

The mark is a sign which instructs the sending side SV1 to perform the frequency control, and further, notifies that the service kind information for retrieving the maximum frequency by the sending side SV1 and the screen updating frequency specified by the user are supplied. FIG. 13D shows the construction of the request data 203$a$.

Then, the above-described service start adjusting stage is terminated upon elapse of predetermined period or acquisition of setting completion notification of the standard frequency stfQ from the sending side SV1, and the next service execution stage is started. The processing at the service execution stage is similar to that of the above-described case A1.1.1.

Figure 12:
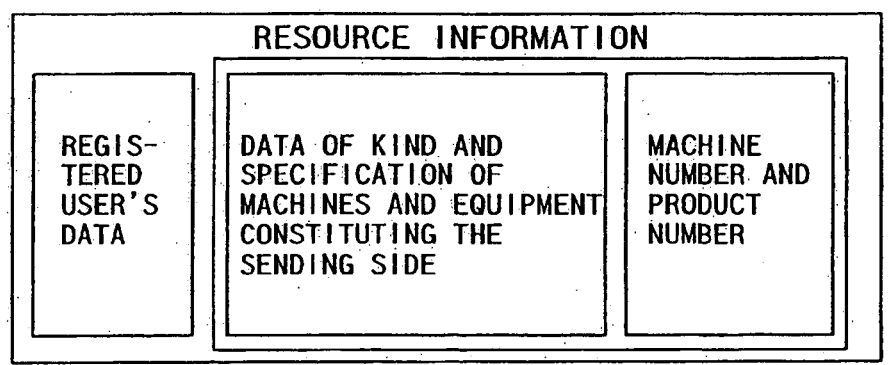
FIG. 12 is a diagram showing one example of the form of identification data.

The id controlling unit 0113 manages the identifying data id of the user side, and inputs the identifying data id into the compiling means 0203 based on an instruction from the compiling means 0203 of the request data compiling/sending unit 0112. The identifying data id includes user data on a registered user, type/specification data of device forming the receiving side CL1, the resource information such as a device type or a model number. FIG. 12 shows the construction of the identifying data id.

Sending Means 0204:

The sending means 0204 receives the request data 203$a$. or 203$b$ sent from the compiling means 0203, at the above-described service start adjusting stage and service execution stage or in the above-described respective cases, and performs data compression (e.g., processing in conformity with MPEG4), encryption (security), protocol adjustment (e.g., WAP adjustment utilizing cellular-phone Internet communication) and the like. The sending means 0204 compiles the request signal CL1$a$ destined for the corresponding sending side SV1, sends the signal to the communication system NT, and transmits the signal through the communication system NT to the sending side SV1.

In a case where the control signal 1$a$4 is supplied from the frequency controlling unit 0111 at the above-described service execution stage, it is determined that the frequency management has not been performed on the preliminary stage side, i.e., in any of the generation group 0201, the capturing means 0202 and the compiling means 0203, and that the frequency management is to be performed in the sending means 0204. The request data 203$b$ is sampling-captured with timing of the control signal 1$a$4 and is processed, and the data is sent at the sending frequency Req·fQ1. At this time, if the compiling frequency comp·fQ1 at the preliminary stage is higher than the frequency of the control signal 1$a$4, the sending frequency Req·fQ1 is equal to the frequency of the control signal 1$a$4. Accordingly, cmp·fQ1>Req·fQ1 holds. The request data 203$b$ sent from the compiling means 0203 is thinned by sampling capturing.

On the other hand, in a case where the control signal 1$a$4 is not supplied from the frequency controlling unit 0111, the request data 203$b$ from the compiling means 0203 is captured with timing of the occurrence of the input. That is, whether the frequency management has been performed or not on the preliminary stage side, Req·fQ1=cmp·fQ1 holds. If the above-described token is attached to the request data, it can be checked that the frequency management has been already in the compiling means 0203 or its preliminary stage.

It may be arranged such that, in a case where the above-described token has been received from the compiling means 0203, or the sending means 0204 has performed the frequency management, the sending means 0204 compiles the request signal CL1$a$ in which the token is attached to the request data 203$b$, and sends the signal to the communication system NT, or attaches the above-described token to the request signal CL1$a$ and sends the signal to the communication system NT, thereby sends the signal to the sending side SV1.

Note that the token is widely interpreted. A specialized signal accompanying the request signal CL1$a$ for the above-described notification or the like is included in the token. The above-described token is similarly interpreted.

Further, it may be arranged such that the sending means 0204 sends a control command to a constituent element of the communication system NT such as a WAP gateway server with timing of the above-described control signal 1$a$4 or other timing, to perform the frequency management on the transmission frequency trf·fQ1 of transmission from the receiving side CL1 to the sending side SV1 in the communication system NT. In this case, the above-described token may be attached in the communication system NT. On the other hand, in a case where the frequency management is not performed in the communication system NT, $trf·fQ1=Req·fQ1$ holds.

Receiving Means 0205:

The receiving means 0205 of the data receiving/displaying unit 0115 performs the following operations in the above-described cases.

Figure 13E:
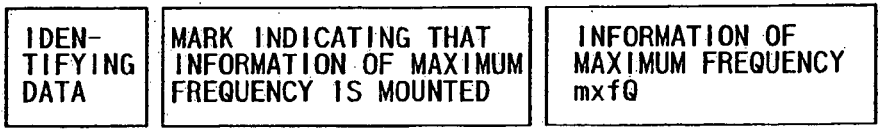

<Case A1.1.1>: When the sending signal SV1$a$ sent from the sending side SV1 has arrived, the protocol processing is performed then the signal is compared with the identifying data id and the signal is received, and decoding (if necessary) and data expansion are performed. If a mark indicating that the information on the maximum frequency is incorporated is detected, it is recognized that the service start adjusting stage has been started, and the information on the maximum frequency mxfQ is sent as data 1$b$5 to the frequency controlling unit 0111, FIG. 13E shows the construction of the sending signal SV1$a$ at the service start adjusting stage.

Figure 14D:

On the other hand, it the contents information Cts is detected, it is recognized that the service execution stage has been started, then receiving data is formed based on the information and supplied to the displaying apparatus 0206. FIG. 14D shows the construction of the sending signal SV1$a$ at the service execution stage, In a case where the token is not detected from the sending signal SV1$a$ or the control signal 1$a$5 is supplied from the frequency controlling unit 0111, it is determined that the frequency management has not been performed in any of the preliminary stage side (generation group 0201/capturing means 0202/compiling means 0203/sending means 0204/sending side SV1/communication system NT) and the frequency management is to be performed in the receiving means 0205. The sending signal SV1a is sampling-received with timing of the control signal 1a5 and processed. At this time, if the transmission frequency trf·fQ2 at the preliminary stage is higher than the frequency of the control signal 1a5, the receiving frequency rv·fQ1 is equal to the frequency of the control signal 1a5. Accordingly, trf·fQ2>rv·fQ1 holds. The sending signal SV1a transmitted through the communication system NT from the sending side SV1 is thinned by sampling capturing.

On the other hand, in a case where the control signal 1a5 is not supplied from the frequency controlling unit 0111, the sending signal SV1a is captured with timing of the occurrence of the input. That is, whether the frequency management has been performed or not on the preliminary stage side, $rv·fQ1=trf·fQ2$ holds.

Further, it may be arranged such that in a case where the token is detected from the received sending signal SV1a or the above-described frequency management has been performed in the receiving means 0205, the token is attached to the received data and sent to the displaying apparatus 0206.

<Case A1.1.2>: The sending signal SV1a sent from the sending side SV1 is received. Accordingly, processing is not performed at the service start adjusting stage where the sending signal SV1a is not sent, and a similar operation to that in the case A1.1.1 is performed at the service execution stage.

<Case A1.2.1>: When the sending signal SV1a sent from the sending side SV1 is received, the following operation is similar to that in the case A1.1.1. On the other hand, it display data is sent from the frequency controlling unit 0111, it is supplied to the displaying apparatus 0206.

<Case A1.2.2>: The sending signal SV1a sent from the sending side SV1 is received, and subjected to the protocol processing, the decoding and the data expansion. If the mark indicating that the information on the maximum frequency is incorporated is detected, it is recognized that the service start adjusting stage has been started, and the Information on the maximum frequency mxfQ is sent to the frequency controlling unit 0111. Further, if the display data is sent from the frequency controlling unit 0111, it is supplied to the displaying apparatus 0206. On the other hand, if the contents information Cts is detected, it is recognized that the service execution stage has been started, and a similar operation to that in the case A1.1.1. is performed, <Case A2.1.1>: A similar operation to that of the case A1.1.2 is performed.

<Case A2.2.1>: The sending signal SV1a sent from the sending side SV1 is received and subjected to the protocol processing, the decoding and the data expansion. If screen data instructing re-inputting is detected, it is recognized that the service start adjusting stage has been started, and the data is supplied to the displaying apparatus 0206. On the other hand, if the contents information Cts is detected, it is recognized that the service execution stage has been started, and a similar operation to that of the case A1.1.1. is performed.

Note that it is preferable that the receiving means 0205 has a WAP browsing function for a case where the service is performed by utilizing the Internet system and in conformity with WAP. In this case, the sending signal SV1a is received as a WSP response (incorporating WML contents).

Displaying Apparatus 0206:

The displaying apparatus 0206 of the data receiving/displaying unit 0115 has a function of receiving the received data supplied from the receiving means 0205 or the screen data instructing re-inputting and displaying the data on the screen with/without audio.

In a case where a control signal 1a6 is supplied from the frequency controlling unit 0111 to the displaying apparatus 0206, the received data is sampled with timing of the control signal 1a6, and the contents information Cts is displayed on the screen with/without audio. The screen displays the contents information Cts at the screen updating frequency (displaying frequency) Cts·fQ1. On the other hand, in a case where the control signal 1a6 is not supplied, screen displaying/voice sounding is performed with timing of the supply of the contents information Cts from the receiving means 0205. Further, in a case where the token is attached in the latter case, as the supplied contents information Cts has been already frequency-adjusted at the preliminary stage, the contents information Cts is displayed on the screen at the screen updating frequency Cts·fQ1 without frequency management by the displaying apparatus 0206.

Frequency Controlling Unit 0111:

Next, the functions of the frequency controlling unit 0101 will be described.

At the service execution stage (contents information Cts receiving process), to remove excessive or insufficient generation/processing/transmission of data as described above to attain lean and rational generation/processing/transmission, the frequency controlling unit 0111 sets the standard frequency stfQ at the service start adjusting stage, and at the service execution stage, issues the control signals 1a1 to 1a6 based on the standard frequency stfQ for frequency management. Hereinbelow, the functions of the frequency controlling unit 0111 at the service start adjusting stage will be described in the above-described cases, and the functions at the service execution stage will be described.

Functions of Frequency Controlling Unit 0111 at Service Start Adjusting Stage:

The frequency controlling unit 0111 receives the result of determination of the form of frequency adjustment, transmitted from the compiling means 0203, then temporarily stores it, and performs operations as follows in the above-described cases.

(Case A1.1.1.>: If the maximum frequency mxfQ information is received from the receiving means 0205, it is recognized that the information has been sent from the sending side SV1 and the service start adjusting stage is in progress. The standard frequency stfQ is set based on the maximum frequency mxfQ. Then the service execution stage is started.

(Case A1.1.2>: If the service kind information and the resource information are received from the compiling means 0203, it is recognized that the service start adjusting stage is in progress. A maximum frequency table Tbc holding "service kinds & resource information" versus "corresponding maximum frequencies" in the form of table, previously stored in a memory (not shown) of the receiving side CL1, is referred to based on the received information, and information on appropriate maximum frequency mxfQ is extracted. An arbitrary standard frequency stfQ not exceeding the maximum frequency is set. Then the service execution stage is started. For example, if the maximum frequency of the contents information Cts relating to the specified kind of service is mxfQ=30 frames/sec, the standard frequency is set as stfQ=30 times/sec.

Further, the above-described resource information may include communication line information on the communication line used in this system checked by the frequency controlling unit 0111.

The maximum frequency table is provided as a maximum frequency table Tbc in the receiving side CL1, or as a maximum frequency table Tbs in the sending side VS1, in accordance with case. The maximum frequency table Tbc or Tbs is previously stored in storage means such as a magnetic-disk recording device, a removable memory, or preferably, a memory stick (trademark) (they are not shown). The table holds the maximum frequencies mxfQ corresponding to combinations of receiving side CL1/sending side SV1/communication system NT, resource information, kinds of contents information, kinds of event data, and the like, in the form of table. For example, on the presumption that values obtained by previous actual measurement, results of evaluation from empirical rule, results obtained by calculations, or the like, are prepared in advance as the set of maximum frequency data, set_mxfQ, the system of the present embodiment uses it as data.

Further, it may be arranged such that the maximum frequency table is captured by the receiving side CL1/sending side SV1 from a provider side Web page on the Internet.

<Case A1.2.1>: If the screen updating frequency data, the service kind information and the resource information, specified by the user, are supplied from the compiling means 0203, it is recognized that the service start adjusting stage is in progress. The above-described list or table is referred to based on the service kind information and the resource information, to find corresponding maximum frequency mxfQ. The validity of the specified screen updating frequency is checked by comparison between the maximum frequency mxfQ and the specified screen updating frequency. If the specified screen updating frequency is valid, the specified frequency is set as the standard frequency stfQ. Then the service execution stage is started. If the specified frequency is not valid, a command (not shown) is sent to the data receiving/displaying unit 0115, to notify the user that the specified screen updating frequency is inappropriate and urge the user's re-inputting.

For example, if 20 frames/sec screen updating frequency is specified from the user, it is checked that the frequency does not exceed the maximum frequency of contents information Cts or the service, defined in the above-described list or table, mxfQ=30 frames/sec. Further, the standard frequency of the service is set as stfQ=20 times/sec based on the specified frequency of 20 frames/sec.

<Case A1.2.2>: It the screen updating frequency data specified by the user is received from the compiling means 0203 and the information on the maximum frequency mxfQ is received from the receiving means 0205, it is recognized that the service start adjusting stage is in progress. The validity of the specified screen updating frequency is checked by comparison between these frequencies. If the specified screen updating frequency is valid, the frequency is set as the standard frequency stfQ. Then the service execution stage is started. If the specified frequency is not valid, a command (not shown) is sent to the data receiving/displaying unit 0115, to notify the user that the specified screen updating frequency is inappropriate and urge the user's re-inputting.

<Case A2.1.1.> and <Case A2.2.1>: At the service start adjusting stage, the frequency controlling unit 0111 is not actuated.

Functions of Frequency Controlling Unit 0111 at Service Execution Stage:

Next, at the service execution stage, in a case where the receiving side CL1 performs the frequency management, at the process from the service generating to the sending of the request signal CL1a to the sending side SV1, the frequency controlling unit 0111 performs at least one of (1) management to eliminate an excess in the generation frequency g·fQ1 of the position data pd, the viewing direction data dd and the moving data md to obtain an appropriate frequency, (2) management to eliminate an excess in the capturing frequency a·fQ1 of the position data pd, the viewing direction data dd and the moving data md to obtain an appropriate frequency, (3) management to eliminate an excess in the compiling frequency cmp·fQ1 of the request data to obtain an appropriate frequency, (4) management to eliminate an excess in the sending frequency Req·fQ1 of the request signal CL1a to obtain an appropriate frequency, and (5) indirect management to eliminate an excess in the transmission frequency trf·fQ1 of the request signal CL1a to obtain an appropriate frequency. The management operations are performed by sending the control signals 1a1 to 1a4 to the corresponding means/apparatuses after the setting of the above-described standard frequency stfQ. The frequencies of supplying the control signals 1a1 to 1a4 are the standard frequency stfQ.

The above numbers are along the above-described loop. When any of the above-described management operations is performed, the frequency management on the loop termination end side thereafter (subsequent state) and the frequency control in the sending side SV1 can be omitted.

On the other hand, in a case where the frequency management is not performed at the process from the service generating to the sending of the request signal CL1a, the frequency controlling unit 0111 does not perform the above-described management operations (1) to (5).

Further, at the process from the receiving of the sending signal SV1a to the displaying of the contents information Cts, the frequency controlling unit 0111 performs at least one of (6) management to eliminate an excess in the receiving frequency rv·fQ1 of the contents information Cts to obtain an appropriate frequency, and (7) management to eliminate an excess in the displaying frequency Cts·fQ1 of the contents information Cts to obtain an appropriate frequency. The management operations are performed by sending the control signals 1a5 and 1a6 to the corresponding means/apparatuses after the setting of the above-described standard frequency stfQ. The frequencies of supplying the control signals 1a5 and 1a6 are the standard frequency stfQ. The above numbers are along the above-described loop. When the above-described management (6) is performed, the frequency management (7) can be omitted.

Note that in a case where the frequency management or frequency control has been already performed, in any of the processings at the preliminary stage of the receiving of the sending signal SV1a, the above-described frequency management operations (6) and (7) can be omitted.

Note that one of the frequency management operations (1) to (7) to be executed is previously set at the shipping stage of the apparatus, or arbitrarily selected by operating a switch (not shown) upon use. The frequency management is performed in accordance with the processing to be subjected to the frequency management, determined and transmitted in the compiling means 0203 as described above.

In a case where the execution of the above-described frequency management (1) is set, the frequency controlling unit 0111 supplies the control signal 1a1 issued at the standard frequency stfQ to the request data compiling/sending unit 0112. The request data compiling/sending unit 0112 sends the trigger signal trg1 to e.g. the position data providing means 0101 based on the control signal 1a1, so as to perform frequency management by the position data providing means 0101 on the generation frequency g·fQ1 of the position data pd to be equal to the standard frequency stfQ. Similarly, regarding the moving data md, the viewing direction data dd and the time data td, the frequency management is performed on the generation frequency g·fQ1.

For example, in accordance with type of the position data providing means 0101 or the moving data inputting means 0103, the position data pd or the moving data (moving speed) md is generated at a very high frequency. If the frequency exceeds the standard frequency stfQ, an excess is not used and wasted, accordingly, the increment of electric consumption by the high-frequency actuation is wasted. However, the frequency management as described above can eliminate the waste. Further, the above frequency management can also eliminate the waste due to excessive high frequency in subsequent data processing of the position data pd or the moving data md generated at a high frequency exceeding the standard frequency stfQ and captured at the same frequency.

Note that generally, the generation frequency of the viewing direction data dd and the time data td is lower than that of the position data pd and the moving data md, accordingly, if it is lower than the standard frequency stfQ, the frequency is adjusted to the standard frequency stfQ while duplicating the most recent respective data.

Further, it may be arranged such that the frequency controlling unit 0111 directly sends the control signal 1a1 to the generation group 0201 such as the position data providing means 0101.

In a case where the execution of the above-described frequency management (2) is set, the frequency controlling unit 0111 supplies the control signal 1a2 issued at the standard frequency stfQ to the capturing means 0202 of the request data compiling/sending unit 0112. The capturing means 0202 captures the above-described specified event data from the generation group 0201 at the standard frequency stfQ based on the control signal 1a2. Thus the frequency management is performed to adjust the capturing frequency a·fQ1 to be equal to the standard frequency stfQ. That is, the event data generated excessively is thinned when it is captured.

In a case where the generation of the event data from the generation group 0201 is already at the standard frequency stfQ, the present frequency management can be omitted. Thus the capturing frequency a·fQ1 is adjusted and the occurrence of waste of increment of power consumption due to excessive high-frequency capturing is eliminated. Further, as the result of capturing at the capturing frequency a·fQ1 adjusted to the standard frequency stfQ is supplied to the subsequent stage at the standard frequency stfQ, the frequency of the data processing at the subsequent stage is not excessive.

In a case where the execution of the above-described frequency management (3) is set, the frequency controlling unit 0111 supplies the control signal 1a3 issued at the standard frequency stfQ to the compiling means 0203 of the request data compiling/sending unit 0112. The compiling means 0203 compiles the request data at the standard frequency stfQ based on the control signal 1a3. Thus the frequency management is performed to adjust the compiling frequency cmp·fQ1 of the request data to be equal to the standard frequency stfQ. The compiling frequency cmp·fQ1 of the request data is adjusted, and the occurrence of waste of increment of power consumption due to excessive high-frequency compiling is eliminated.

In a case where the processing at the preliminary stage (generation group 0201 or capturing means 0202) has been already performed at the standard frequency stfQ, the present frequency management can be omitted.

On the other hand, in a case where the frequency management has not been performed at the preliminary stage, as the frequency management is performed in the compiling, the occurrence of waste in the subsequent processing can be avoided. That is, since the request data compiled at the compiling frequency cmp·fQ1 adjusted to be equal to the standard frequency stfQ is supplied to the subsequent stage at the standard frequency stfQ, the frequency of the data processing at the subsequent stage is not excessive.

In a case where the execution of the above-described frequency management (4) is set, the frequency controlling unit 0111 supplies the control signal 1a4 issued at the standard frequency stfQ to the sending means 0204 of the request data compiling/sending unit 0112. The sending means 0204 sends the request signal CL1a at the standard frequency stfQ based on the control signal 1a4. Thus the frequency management is performed to adjust the sending frequency Re1·fQ1 of the request signal CL1a to be equal to the standard frequency stfQ. The sending frequency Req·fQ1 of the request signal CL1a is adjusted, and the occurrence of waste of increment of power consumption due to excessive high-frequency sending is eliminated.

In a case where the processing at the preliminary stage has been already performed at the standard frequency stfQ, the present frequency management can be omitted.

On the other hand, in a case where the frequency management has not been performed at the preliminary stage, as the frequency management is performed in the sending, the occurrence of waste in the subsequent processing can be avoided. That is, since the request data processed at the sending frequency Req·fQ1 adjusted to be equal to the standard frequency stfQ is sent to the sending side SV1 at the standard frequency stfQ, the frequency of the data processing in the sending side SV1 and the subsequent processing in the receiving side CL1 is not excessive.

Further, as excessive sending through the communication line is avoided, loads on the communication line can be reduced, and at the same time, the communication tariff can be reduced.

In a case where the execution of the above-described frequency management (5) is set, the frequency controlling unit 0111 indirectly manages the communication system NT through the sending means 0204. The frequency controlling unit 0111 supplies the control signal 1a4 issued at the standard frequency stfQ to the sending means 0204 of the request data compiling/sending unit 0112. The sending means 0204 sends a control command to the gateway or the like of the communication system NT based on the control signal 1a4. Thus the frequency management is performed to adjust the transmission frequency trf·fQ1 of transmission from the receiving side CL1 to the sending side SV1 to be equal to the standard frequency stfQ in the communication system NT. The transmission frequency trf·fQ1 is adjusted, and the occurrence of waste of increment of communication amount due to excessive high-frequency transmission is eliminated.

In a case where the processing at the preliminary stage has been already performed at the standard frequency stfQ, the present frequency management can be omitted.

On the other hand, in a case where the frequency management has not been performed at the preliminary stage, as the frequency management is performed in the transmission, the occurrence of waste in the subsequent processing can be avoided, That is, since the request signal CL1a is sent to the receiving side CL1 at the transmission frequency trf·fQ1 adjusted to be equal to the standard frequency stfQ, the frequency of the data processing in the sending side SV1 and the subsequent processing in the receiving side CL1 is not excessive.

In a case where the execution of the above-described frequency management (6) is set, the frequency controlling unit 0111 supplies the control signal 1a5 issued at the standard frequency stfQ to the receiving means 0205 of the data receiving/displaying unit 0115. The receiving means 0205 receives the sending signal SV1a, sent from the sending side SV1, at the standard frequency stfQ, based on the control signal 1a5. Thus, the frequency management is performed to adjust the receiving frequency rv·fQ1 of the contents information Cts to be equal to the standard frequency stfQ. Note that in a case where the sending signal SV1a arrives from the sending side SV1 at the standard frequency stfQ, the frequency management can be omitted.

Thus the receiving frequency rv·fQ1 of the contents information Cts is adjusted, and the occurrence of waste of increment of electric consumption due to excessive high-frequency sending is eliminated.

Further, in a case where the frequency management has not been performed at the preliminary stage such as the sending side SV1, as the frequency management is performed in the receiving, the occurrence of waste in the subsequent processing can be avoided. That is, since the contents information Cts processed at the receiving frequency rv·fQ1 adjusted to be equal to the standard frequency stfQ is supplied to the subsequent stage at the standard frequency stfQ, the frequency of the processing at the subsequent stage is not excessive.

In a case where the execution of the above-described frequency management (7) is set, the frequency controlling unit 0111 supplies the control signal 1a6 issued at the standard frequency stfQ to the displaying apparatus 0206 of the data receiving/displaying unit 0115. The displaying apparatus 0206 displays the contents information Cts at the standard frequency stfQ based on the control signal 1a6. Thus the frequency management is performed to adjust the displaying frequency Cts·fQ1 of the contents information Cts to be equal to the standard frequency stfQ. The displaying frequency Cts·fQ1 of the contents information Cts is adjusted, and the occurrence of waste of increment of power consumption due to excessive high-frequency displaying is eliminated.

In a case where the processing at the preliminary stage has been already performed at the standard frequency stfQ, the present frequency management can be omitted.

In the receiving side CL1, as the processing to be subjected to the frequency management is positioned on the loop start end side, the frequency management (receiving side CL1) or the frequency control (sending side SV1) in the respective subsequently-positioned processings can be omitted. Thus electric-consumption saving effect and cost reduction effect, and further communication-load reduction effect can be increased.

Further, when the actuation stop signal 1b2 arrives from the capturing means 0202, the frequency controlling unit 0111 resets the currently-executed processing.

Note that in a case where the frequency management is not performed in the receiving side CL1 in the above-described respective cases, at least a part of the above-described functions of the frequency controlling unit 0111 can be omitted.

Next, the construction of the sending side SV1 will be described in detail.

Receiving Means 0221:

The receiving means 0221 of the sending side SV1 receives the request signal CL1a sent through the communication system NT from the receiving side CL1, performs the protocol adjustment, the decoding and the data expansion, to reproduce the request data.

Then the identifying data id of the user side is extracted from the reproduced request data, and the service kind information is extracted in accordance with necessity. If it is checked that the data corresponds to the currently-registered service session, it is determined that the service in progress is continued. Then the presence/absence of sign is checked, and the following operations in the cases are performed.

On the other hand, if there is no currently-registered service session or no corresponding session, a new registration procedure is performed. The identifying data id is sent to the accounting unit 0123 for consignment of authentication of authorized user side. A command 221a incorporating a mark indicating the consignment of authentication and the identifying data id is sent to the accounting unit 0123.

Then, authentication result notification 231a from the accounting unit 0123 is received. If it is an authorized user side, newly service session is registered. If it is not an authorized user tide, the request signal CL1a is abandoned. The service session registration is made by temporarily storing the identifying data id, and the service kind information in accordance with necessity, on a temporary memory (not shown).

The receiving means 0221 executes the following operations in the respective cases.

(Case A.1.1>: When the above-described service session has been checked, if the sign and the maximum frequency consignment command are detected from the request signal CL1a, it is recognized that the service start adjusting stage has been started. The maximum frequency consignment command, the extracted service kind information and the resource information such as a device type (incorporated in the identifying data id) are sent as data 2b1 to the frequency controlling unit 0122.

On the other hand, in a case where the sign and the maximum frequency consignment command are not detected, if it is immediately after the registration of a new service session as described above, as the selection of maximum frequency thereafter cannot be executed, error processing is performed. Further, upon the above-described registration, if the sign and the maximum frequency consignment command are not detected, the receiving means 0221 recognizes that the service execution stage has been started, and moves to the processing.

In a case where a control signal 2a1 is supplied from the frequency controlling unit 0122 to the receiving means 0221, it is determined that the frequency management has not been performed in any of the preliminary side (receiving side CL1/communication system NT) and the frequency control is to be executed in the receiving means 0221. The request signal CL1a is sampling-received with timing of the control signal 0122a and processed. At this time, if the transmission frequency trf·fQ1 at the preliminary stage is higher than the frequency of the control signal 2a1, the receiving frequency a·fQ2 is equal to the frequency of the control signal 2a1. Accordingly, trf·fQ1>a·fQ2 holds. The request signal CL1a transmitted through the communication system NT from the receiving side CL1 is thinned by sampling capturing.

On the other hand, in a case where the control signal 2a1 is not supplied from the frequency controlling unit 0122, the request signal CL1a is captured with timing of the occurrence of the input. That is, whether the frequency management has been performed or not on the preliminary stage side, a·fQ2=trf·fQ1 holds.

Then, the command 221a incorporating a mark indicating charging consignment and the identifying data id of the user is sent to the accounting unit 0123 to cause the accounting unit 0123 to perform charging/settling, and a returned notification 231a is received. If the result of processing is normal termination, data incorporating the service kind information extracted from the request signal CL1a and the event data is sent to the processing means 0222. At this time, it may be arranged such that in a case where the token is detected from the received request signal CL1a or the frequency control has been performed in the receiving means 0221, the token is attached to the data sent to the processing means 0222 at the subsequent stage. Thus issuance/succession of token is performed.

Further, the identifying data id of the user may be directly supplied to the compiling means 0224.

Next, the token will be described. In the present embodiment, the receiving side CL1 or the communication system NT can notify whether or not the request signal CL1a arrived at the sending side SV1 has been already subjected to the frequency management. Accordingly, in a case where the token is attached to the request signal CL1a arrived at the sending side SV1 as described above, as the frequency management has been already performed at the preliminary stage, it is not necessary to perform the frequency control or frequency management at the subsequent stage including the sending side SV1. Then, the token may be succeeded by the subsequent stage. On the other hand, in a case where the token is not attached to the signal, it is necessary to perform the frequency control or frequency management in at least any of the subsequent stage including the sending side SV1.

In a case where the token is not attached but the above-described mark (instructing the sanding side SV1 to perform the frequency control) is attached to the signal, it is recognized that the frequency management has not been performed in the receiving side CL1 nor the communication system NT before the arrival of the signal to the sending side SV1 and that the frequency control is to be performed in the sending side SV1. Further, in a case where the token is not attached and further the above-described mark (instructing the sending side SV1 to perform the frequency control) is not attached to the signal, it is recognized that the frequency management has not been performed in the receiving side CL1 nor the communication system NT before the arrival of the signal at the sending side SV1 and that the frequency control is not to be performed in the sending side SV1, accordingly, the frequency management is to be performed in the processing at the subsequent stage of the communication system NT or the receiving side CL1 after the sending of the contents information from the sending side SV1.

Returning to the description of the construction of the receiving means 0221, if the authentication and the result of the charging/settling are unsuccessful, the request signal CL1a is abandoned.

Further, it may be arranged such that the charging/settling is performed upon every reception of the request signal CL1a, or the number of received request signals CL1a is accumulated in a counter by the receiving means 0221 and measured-rate charging is performed when a count value reaches a predetermined value. Further, it may be arranged such that the measured-rate charging is performed based on the amount or the number of sending of the contents information sent to the receiving side CL1.

<Case A1.1.2>: After the checking of the service session, if the above-described sign (notifying the service start adjusting stage) and the mark have not been detected in the request signal CL1a, the receiving means 0221 recognizes that the service execution stage has been started. The processing thereafter is similar to that of the case A1.1.1.

<Case A1.2.1>: The processing of this case is similar to that of the case A1.1.2.

<Case A1.2.2>: The processing of this case is similar to that of the case A1.1.1.

<Case A2.1.1>: After the checking of the service session, if the above-described mark (a sign instructing the sending side SV1 to perform the frequency control and notifying that the standard frequency stfQ is to be set by using the maximum frequency mxfQ) is detected in the request signal CL1a, the service kind information and the resource information (incorporated in the identifying data) extracted from the request signal CL1a are sent to the frequency controlling unit 0122.

Further, if the above-described sign and the mark are not incorporated in the request signal CL1a, it is recognized that the service execution stage has been started, and processing at the service execution stage is performed. The processing at the service execution stage is similar to that of the above-described case A1.1.1.

<Case A2.2.1>: After the checking of the service session, if the above-described mark (instructing the sending side SV1 to perform the frequency control and notifying that the standard frequency stfQ is to be set by comparison between the maximum frequency mxfQ and the specified screen updating frequency) and the information on the specified screen updating frequency are detected in the request signal CL1a, the service kind information and the resource information (incorporated in the identifying data) and the information on the specified screen updating frequency extracted from the request signal CL1a are sent to the frequency controlling unit 0122.

Further, if the above-described sign and mark are not incorporated in the request signal CL1a, it is recognized that the service execution stage has been started, and processing at the service execution stage is performed. The processing at the service execution stage is similar to that of the above-described case A1.1.1.

Frequency Controlling Unit 0122:

Next, the functions of the frequency controlling unit 0122 will be described.

At the service start adjusting stage, the frequency controlling unit 0122 refers to the maximum frequency mxfQ autonomously or in correspondence with consignment from the receiving side CL1. Further, at the service execution stage (the sending/receiving process of the contents information Cts), to eliminate excessive or insufficient data generation/processing/transmission to attain lean and rational data generation/processing/transmission, issues the control signals $2a1$ to $2a5$ based on the standard frequency stfQ to perform frequency control on corresponding means, as described above, Hereinbelow, the functions of the frequency controlling unit 0122 at the service start adjusting stage will be described in the above-described respective cases, and the functions at the service execution stage will be described.

Functions of Frequency Controlling Unit 0122 at Service Start Adjusting Stage:

The frequency controlling unit 0122 performs the following operations in the above-described cases.

<Case A1.1.1>: When data $2b1$ is received from the receiving means 0221, and if the maximum frequency consignment command, the service kind information and the resource information are detected, it is recognized that the service start adjusting stage is in progress. Then the maximum frequency table Tbs holding "service kinds & resource information" versus "corresponding maximum frequencies" in the form of table, previously stored in storage means (not shown) provided in the sending side SV1, is referred to based on the received information. Information on appropriate maximum frequency mxfQ is extracted and sent to the compiling means 0224. As the contents of the maximum frequency table Tbs, on the presumption that values obtained by previous actual measurement, results of evaluation from empirical rule, results obtained by calculations, or the like, are previously prepared as the set of maximum frequency data, set_mxfQ, in the sending side SV1, the system of the present embodiment uses it as data.

Further, the maximum frequency table Tbs is provided in the sending side SV1 or the receiving side CL1 (as the maximum frequency table Tbc) in accordance with case.

<Case A1.1.2 or Case A1.2.1>: At the service start adjusting stage, the frequency controlling unit 0122 is not actuated.

<Case A1.2.2>: A similar operation to that of the case A1.1.1 is performed.

<Case A2.1.1>: When only the service kind information is sent from the receiving means 0221, it is recognized that the service start adjusting stage is in progress. Then the list or table holding the "service kinds & resource information" versus "corresponding maximum frequencies" in the form of table provided in the sending side SV1 is referred to in accordance with the information. Appropriate maximum frequency mxfQ is extracted, and an arbitrary standard frequency stfQ is to be set so as not to exceed the maximum frequency.

<Case A2.2.1>: When the service kind information and the resource information in addition to the specified screen updating frequency are sent from the receiving means 0221, it is recognized that the service start adjusting stage is in progress. The above-described list or table is referred to based on the service kind information and the resource information, and appropriate maximum frequency mxfQ is checked. The validity of the specified screen updating frequency is checked by comparison between this maximum frequency and the specified screen updating frequency. If the specified screen updating frequency is valid, the specified screen updating frequency is set as the standard frequency stfQ. For example, if a desired screen updating frequency of 20 frames/sec is specified from the user, it is checked that the specified screen updating frequency does not exceed the maximum frequency mxfQ=30 frames/sec of the contents information Cts of the service defined in the above-described list or table, and the standard frequency is set as stfQ=20 times/sec based on the specified frequency of 20 frames/sec.

On the other hand, if the specified screen updating frequency is not valid, a command (not shown) is sent to the compiling means 0224. The command is sent to the data receiving/displaying unit 0115 of the receiving side CL1, so as to notify the user that the specified screen updating frequency is inappropriate and urge the user's re-inputting, via the screen.

Functions of Frequency Controlling Unit 0122 at Service Execution Stage:

Next, at the service execution stage, in a case where the frequency control is performed in the sending side SV1, after the setting of the above-described standard frequency stfQ, the frequency controlling unit 0122 issues any of the control signals $2a1$ to $2a5$ to corresponding means based on the standard frequency so as to perform the frequency control. The frequencies of issuance of these control signals $2a1$ to $2a5$ are the standard frequency stfQ.

In the progress from the receiving of the request signal CL1$a$ to the sending of the sending signal SV1$a$ to the receiving side CL1, the frequency control is executed as any of (1) control to eliminate an excess in the receiving frequency a·fQ2 of request signal CL1$a$ to adjust it to an appropriate frequency, (2) control to eliminate an excess in the data processing frequency pr·fQ2 in the middle of progress from the receiving to the retrieving to adjust it to an appropriate frequency, (3) control to eliminate an excess in the retrieving frequency rt·fQ2 to adjust it to an appropriate frequency, (4) control to eliminate an excess in the compiling frequency cmp·fQ2 of the sending data to adjust it to an appropriate frequency, (5) control to eliminate an excess in the sending frequency opt·fQ2 of the contents information to adjust it to an appropriate frequency, and (6) control to eliminate an excess in the transmission frequency trf·fQ2 to adjust it to an appropriate frequency. The above numbers are along the above-described loop. When any of the above-described controls is performed as the frequency control on the loop, the frequency control on the loop termination end side thereafter and the frequency control in the receiving side thereafter can be omitted.

On the other hand, in a case where the frequency management has been already performed in the receiving side CL1 or the frequency control is not to be performed in the sending side SV1, it is not necessary to actuate the frequency controlling unit 0122. Accordingly, none of the controls (1) to (6) is performed.

Note that one of the frequency controls (1) to (6) is executed in accordance with processing to be subjected to the frequency control determined and transmitted as described in the compiling means 0203 of the receiving side CL1. Further, the frequency control to be executed is previously set on the system side, or arbitrarily selected by the administrator by using a switch (not shown) upon use.

In a case where the above-described frequency control (1) is set to be described, the frequency controlling unit 0122 supplies the control signal $2a1$ at the standard frequency stfQ to the receiving means 0221. The receiving means 0221 receives the request signal CL1$a$ sent from the receiving side CL1 at the standard frequency stfQ based on the control signal $2a1$. As a result, the frequency control is performed to adjust the receiving frequency a·fQ2 to be equal to the standard frequency stfQ. Thus the receiving frequency a·fQ2 is adjusted so as to eliminate the occurrence of waste of increment of electric consumption due to excessive high-frequency receiving.

Note that in a case where the request signal CL1a has been already subjected to the frequency control to be equal to the standard frequency stfQ in the receiving side CL1 or the communication system NT, the CL1a arrives with the above-described token. Accordingly, if the token is detected, the frequency control can be omitted.

On the other hand, even if the frequency control has not been performed in the receiving side CL1, as the frequency control is performed in the receiving, the occurrence of waste in the subsequent processing can be avoided. That is, as the request data received at the receiving frequency a·fQ2 adjusted to be equal to the standard frequency stfQ is supplied to the subsequent stage at the standard frequency stfQ, the frequency of data processing at the subsequent stage is not excessive.

In a case where execution of the above-described frequency control (2) is set, the frequency controlling unit 0122 supplies the control signal 2a2 to the processing means 0222 at the standard frequency stfQ, and the processing means 0222 executes the data processing in the progress from the receiving to the retrieving based on the control signal 2a2. As a result, the frequency control is performed so as to adjust the processing frequency pr·fQ2 to be equal to the standard frequency stfQ. Thus the processing frequency pr·fQ2 is adjusted, and the occurrence of waste of increment of electric consumption due to excessive high-frequency processing can be eliminated.

In a case where the processing at the preliminary stage has been already performed at the standard frequency stfQ, the present frequency control can be omitted.

On the other hand, in a case where the frequency control has not been performed at the preliminary stage, the frequency control is performed in this data processing, thereby the occurrence of waste in the subsequent processing can be avoided. That is, as the data processed at the processing frequency pr·fQ2 adjusted to be equal to the standard frequency stfQ is supplied to the subsequent stage at the standard frequency stfQ, the frequency of data processing at the subsequent stage is not excessive.

In a case where execution of the above-described frequency control (3) is set, the frequency controlling unit 0122 supplies the control signal 2a3 to the retrieving means 0223 at the standard frequency stfQ. The retrieving means 0223 performs retrieving on the database unit DB at the standard frequency stfQ based on the control signal 2a3. As a result, the frequency control is performed so as to adjust the retrieving processing frequency rt·fQ2 to be equal to the standard frequency stfQ. Thus, the retrieving processing rt·fQ2 is adjusted, and the occurrence of waste of increment of electric consumption due to excessive high-frequency retrieving can be eliminated.

In a case where the processing at the preliminary stage has been already performed at the standard frequency stfQ, the present frequency control can be omitted.

On the other hand, in a case where the frequency control has not been performed at the preliminary stage, the frequency control is performed in this retrieving, thereby the occurrence of waste in the subsequent processing can be avoided. That is, as data retrieved at the processing frequency rt·fQ2 adjusted to be equal to the standard frequency stfQ is supplied to the subsequent stage at the standard frequency stfQ, the frequency of data processing at the subsequent stage is not excessive.

In a case where execution of the above-described frequency control (4) is set, the frequency controlling unit 0122 supplies the control signal 2a4 to the compiling means 0224 at the standard frequency stfQ, and the compiling means 0224 compiles the contents information Cts at the standard frequency stfQ based on the control signal 2a4. As a result, the frequency control is performed so as to adjust the compiling frequency cmp·fQ2 of the contents information Cts to be equal to the standard frequency stfQ. Thus the compiling frequency cmp·fQ2 of sending data is adjusted, and the occurrence of waste of increment of electric consumption due to excessive high-frequency compiling can be eliminated.

In a case where the processing at the preliminary stage has been already performed at the standard frequency stfQ, the present frequency control can be omitted.

On the other hand, in a case where the frequency control has not been performed at the preliminary stage, the frequency control is performed in this compiling, thereby the occurrence of waste in the subsequent processing can be avoided. That is, as the data compiled at the compiling frequency cmp·fQ2 adjusted to be equal to the standard frequency stfQ is supplied to the subsequent stage at the standard frequency stfQ, the frequency of data processing at the subsequent stage is not excessive.

In a case where execution of the above-described frequency control (5) is set, the frequency controlling unit 0122 supplies the control signal 2a5 to the sending means 0225 at the standard frequency stfQ. The sending means 0225 sends the contents information Cts at the standard frequency stfQ based on the control signal 2a5. As a result, the frequency control is performed so as to adjust the sending frequency opt·fQ2 of the contents information Cts to be equal to the standard frequency stfQ. Thus the sending frequency opt·fQ2 of sending data is adjusted, and the occurrence of waste of increment of electric consumption due to excessive high-frequency sending can be eliminated Further, as excessive sending through communication line can be avoided, loads on the communication line can be reduced and the communication tariff can be reduced.

In a case where the processing at the preliminary stage has been already performed at the standard frequency stfQ, the present frequency control can be omitted.

On the other hand, in a case where the frequency control has not been performed at the preliminary stage, the frequency control is performed in this sending, thereby the occurrence of waste in the subsequent processing can be avoided. That is, as the sending signal SV1a is sent to the receiving side CL1 at the sending frequency opt·fQ2 adjusted to be equal to the standard frequency stfQ, the frequency of data processing in the receiving side CL1 is not excessive.

In a case where execution of the above-described frequency control (6) is set, the frequency controlling unit 0122 indirectly controls the communication system NT through the sending means 0225. The frequency controlling unit 0122 supplies the control signal 2a5 to the sending means 0225 at the standard frequency stfQ. The sending means 0225 sends a control command to the gateway or the like of the communication system NT based on the control signal 2a5. As a result, the frequency control is performed so as to adjust the transmission frequency trf·fQ2 of transmission from the sending side SV1 to the receiving side CL1 in the communication system NT to be equal to the standard frequency stfQ. Thus the transmission frequency trf·fQ2 is adjusted, and increment of communication amount due to excessive high-frequency transmission can be eliminated.

In a case where the processing at the preliminary stage has been already performed at the standard frequency stfQ, the present frequency control can be omitted.

On the other hand, in a case where the frequency control has not been performed at the preliminary stage, the frequency control is performed in this transmission, thereby the occurrence of waste in the subsequent processing can be avoided. That is, as the sending signal SV1$a$ is sent to the receiving side CL1 at the transmission frequency trf·fQ2 adjusted to be equal to the standard frequency stfQ, the frequency of processing in the receiving side CL1 thereafter is not excessive.

In the sending side SV1, as the processing to be subjected to the frequency control is positioned on the loop start end side, the frequency control (sending side SV1) or the frequency management (receiving side CL1) in the respective subsequently-positioned processings can be omitted. Thus electric-consumption saving effect and cost reduction effect, and further communication-load reduction effect can be increased.

Note that in a case where the frequency control is not performed in the above-described respective cases, at least a part of the above-described functions of the frequency controlling unit 0122 can be omitted.

The accounting unit 0123 has authenticating means 0230 and charge settling means 0231. Upon reception of the command 221$a$ sent from the receiving means 0221, if a mark indicating charging consignment is detected, the authenticating means 0230 passes the command 221$a$ to the charge settling means 0231. On the other hand, if a mark indicating authentication consignment, the authenticating means performs authentication by referring to a list (not shown) based on the identifying data id incorporated in the command, and returns the result notification 231$a$ to the receiving means 0221.

The charge settling means 0231 checks that the mark indicating the charging consignment is included in the command 221$a$, then performs charge settling by referring to a list of charges (not shown) based on the identifying data id of the user, and returns the result notification 231$a$ to the receiving means 0221. In the charge settling, calculation of charge amount and settlement such as direct debit are performed. The charge amount is calculated in proportion to the kind or quality of Bent data and/or data amount in principle. It may be arranged such that information on the kind or quality of data is obtained from the retrieving means 0223 or the compiling means 0224, or information on the amount of data sent from the sending means 0225 is obtained.

When the authentication or charge settling has been normally performed based on the result notification 231$a$, normal completion is notified. On the other hand, in a case where the authentication or charge settling has not been normally performed, notification of unsuccessful authentication/charge settling is made.

Further, it maybe arranged such that the charge settling means 0231 performs the charging by signal interchanging with other means than the receiving means 0221 such as the sending means. This arrangement will be described in another embodiment later.

Processing Means 0222:

The processing means 0222 receives the service kind information and the event data (e.g., position data pd) supplied from the receiving means 0221, executes data processing such as storing the data into a temporary memory (not shown) in accordance with necessity, and sends the data to the retrieving means 0223. If the token is incorporated in the data supplied from the receiving means 0221, as the frequency control has been already performed at the preliminary stage, the frequency control in the processing means 0222 can be omitted regardless of the presence/absence of the control signal 2$a$2 supplied from the frequency controlling unit 0122. Then data processing is performed with timing of reception of the data from the receiving means 0221 receiving frequency a·fQ2).

On the other hand, in a case where the token is not incorporated in the data supplied from the receiving means 0221 and the control signal 2$a$2 is supplied from the frequency controlling unit 0122 to the processing means 0222, it is determined that the frequency control has not been performed in any of the preliminary stage side and the frequency control is to be executed in the processing means 0222. The data is sampling-captured from the receiving means 0221 with timing of the control signal 2$a$2 (standard frequency stfQ), and the data processing is performed at this timing. Accordingly, the processing frequency pr·fQ2 is equal to the frequency of the control signal 2$a$2.

If the receiving-frequency a·fQ2 at the preliminary stage is higher than the frequency of the control signal 2$a$2, a·fQ2>pr·fQ2 holds. The data sent from the receiving means 0221 is thinned by sampling capturing.

On the other hand, in a case where the control signal 2$a$2 is not supplied from the frequency controlling unit 0122 to the receiving means 0221, the data is received and processed with timing of reception of the data from the receiving means 0221. That is, pr·fQ2=a·fQ2 holds.

Then, in a case where the above-described token has been received from the receiving means 0221 or the data processing has been subjected to the frequency control in the processing means 0222, the processing means attaches the token to the result of processing and sends the data to the retrieving means 0223. In this manner, the token is issued/succeeded.

Retrieving Means 0223:

The retrieving means 0223 executes retrieving of the database unit DB utilizing a DBMS function. If the token is incorporated in the data supplied from the processing means 0222, as the frequency adjustment has been already performed at the preliminary stage, the frequency control in the retrieving means 0223 can be omitted regardless of presence/absence of the control signal 2$a$3 supplied from the frequency controlling unit 0122. The retrieving is performed with timing of reception of the data from the processing means 0222 (processing frequency pr·fQ2).

On the other hand, if the token is not incorporated in the data supplied from the processing means 0222 and the control signal 2$a$3 is supplied from the frequency controlling unit 0122 to the retrieving means 0233, it is determined that the frequency adjustment has not been performed in any of the preliminary stage side and the frequency control is to be executed in the retrieving means 0223. The data is sampling-captured from the processing means 0222 with timing of the control signal 2$a$3 (standard frequency stfQ), and the retrieving is performed at this timing. Accordingly, the retrieving frequency rt·fQ2 is equal to the frequency of the control signal 2$a$3.

At this time, if the processing frequency pr·fQ2 at the preliminary stage is higher than the frequency of the control signal 2$a$3, pr·fQ2>rt·fQ2 holds. The data sent from the processing means 0222 is thinned by sampling capturing.

On the other hand, in a case where the token is not incorporated in the data supplied from the processing means 0222 and the control signal 2*a*3 is not supplied from the frequency controlling unit 0122, the data is received and the retrieving is performed with timing of reception of the data from the processing means 0222. That is, $$rt\cdot fQ2 = pr\cdot fQ2 \text{ holds.}$$

In the retrieving processing, the retrieving is performed on the database unit DB based on the service kind information and the event data, and corresponding contents information Cts is extracted as follows.

For example, in the case of the position data pd, the retrieving is performed on a retrieving standard information unit RTd based on the position data pd. Then position information p, for example, is determined from a set of retrieving standard information (set of event information, set_E) as corresponding retrieving standard information. Then retrieving is performed on a contents unit CTd based on the position information p. Then corresponding contents information Cts in determined and read as retrieving result information. The above retrieving is executed by the DBMS function of the retrieving means 0223.

Further, it may be arranged such that, in a case where the above-described token has been received from the processing means 0222 or the frequency control has been performed on the retrieving in the retrieving means 0223, the retrieving means 0223 attaches the token to the retrieving result information and sends the information to the compiling means 0224, and in this manner, the token is issued/succeeded.

Compiling Means 0224:

When information on the maximum frequency mxfQ is sent from the frequency controlling unit 0122, the compiling means 0224 recognizes that the service start adjusting stage has been started. The compiling means 0224 compiles data incorporating data on the maximum frequency mxfQ, the identifying data id currently stored in the above-described temporary memory (not shown) (service-session registered), and sends the data to the sending means 0225. This processing corresponds to the above-described cases A1.1.1. and A1.2.2.

Further, when the command (notifying the user that the specified screen updating frequency is inappropriate and urging the user's re-inputting) to be sent to the data receiving means 0115 of the receiving side CL1 is received from the frequency controlling unit 0122, the compiling means recognizes that the service start adjusting stage has been started. The compiling means compiles displaying data to urge re-inputting of the specified screen updating frequency, and sends the data with the currently-stored above-described identifying data id (service-session registered) to the sending means 0225. This processing corresponds to the above-described case A2.2.1.

On the other hand, when the retrieving result information is sent from the retrieving means 0223, it is recognized that the service execution stage has been started, Then the compiling of the sending data incorporating the contents information Cts and the currently-stored above-described identifying data id (service-session registered) is executed. Note that the compressing of the contents information Cts is performed by an algorithm in conformity with MPEG-4, or the compressing is performed on a stream of contents information Cts by using a general moving image compression method as encoding algorithm depending on interframe coding.

Further, in the case of a service through the Internet system, the sending data is compiled as HTML contents, or in the case of service corresponding to WAP, the sending data is compiled as WML contents or XHTML contents.

In the above description, in a case where the token is incorporated in the data supplied from the retrieving means 0223, as the frequency adjustment has been already performed at the preliminary stage, the frequency control in the compiling means 0224 can be omitted regardless of the presence/absence of the control signal 2*a*4 supplied from the frequency controlling unit 0122. The compiling is performed with timing of reception of the data from the retrieving means 0223 (retrieving frequency rt·fQ2).

On the other hand, in a case where the token is not incorporated in the data supplied from the retrieving means 0223 or the control signal 2*a*4 is supplied from the frequency controlling unit 0122 to the compiling means 0224, it is determined that the frequency adjustment has not been performed in any of the preliminary stage side and the frequency control is to be executed in the compiling means 0224. The data is sampling-captured from the retrieving means 0223 with timing of the control signal 2*a*4 (standard frequency stfQ), and the compiling is performed at this timing. Accordingly, the compiling frequency cmp·fQ2 is equal to the frequency of the control signal 2*a*4.

At this time, if the retrieving frequency rt·fQ2 at the preliminary stage is higher than the frequency of the control signal 2*a*4, rt·fQ2>cmp·fQ2 holds. The data sent from the retrieving means 0223 is thinned by sampling capturing.

On the other hand, in a case where the token is not incorporated in the data supplied from the retrieving means 0223, or the control signal 2*a*4 is not supplied from the frequency controlling unit 0122, the data is received and compiling of the sending data is performed with timing of the reception of the data from the retrieving means 0223. That is, $$cmp\cdot fQ2 = rt\cdot fQ2 \text{ holds.}$$

Next, in a case where the above-described token has been received from the retrieving means 0223 or the frequency control has been performed on the compiling of the sending data in the compiling means 0224, the compiling means 0224 attaches the token to the sending data and sends the data to the sending means 0225. In this manner, the token is issued/succeeded.

Sending Means 0225:

When the data on the maximum frequency mxfQ is sent from the compiling means 0224, the sending means 0225 recognizes that the service start adjusting stage has been started. The sending means 0225 generates the sending signal SV1*a* incorporating the above-described identifying data id, the data on the maximum frequency mxfQ and a mark indicating the sending of the data, and sends the signal to the communication system NT. This processing corresponds to the above-described cases A1.1.1. and A1.2.2.

Further, when the displaying data urging re-inputting of the specified screen updating frequency is received from the compiling means 0224, it is recognized that the service start adjusting stage has been started. The sending means 0225 generates the sending signal SV1*a* incorporating the above-described identifying data id, and the displaying data urging re-inputting of the specified screen updating frequency, and sends the signal to the communication system NT. This processing corresponds to the above-described case A2.2.1.

On the other hand, when the sending data is sent from the compiling means 0224, the sending means 0225 recognizes that the serve execution stage has been started. The sending means 0225 generates the sending signal SV1$a$ by processing such as security processing and protocol adjustment based on the sending data, and sends the signal to the communication system NT.

In the protocol adjustment, if the sending data is HTML contents, it is recognized that transmission through the internet system is to be performed and the protocol is adjusted to HTTP response. Further, if the sending data is WML contents or XHTML contents, it is recognized that transmission in correspondence with WAP is to be performed and the protocol is adjusted to WSP response.

In the above description, if the token is incorporated in the data supplied from the compiling means 0224, as the frequency adjustment has been already performed at the preliminary stage, the frequency control in the sending means 0225 can be omitted regardless of the presence/absence of the control signal 2$a$5 supplied from the frequency controlling unit 0122. The sending is performed with timing of the reception of the sending data from the compiling means 0224 (compiling frequency cmp·fQ2).

On the other hand, if the token is not incorporated in the data supplied from the compiling means 0224 and the control signal 2$a$5 is supplied from the frequency controlling unit 0122 to the sending means 0225, it is determined that the frequency adjustment has not been performed in any of the preliminary stage side and the frequency control is to be executed in the sending means 0225. The data is sampling-captured from the compiling means 0224 with timing of the control signal 2$a$5 (standard frequency stfQ), and the sending signal SV1$a$ is sent at this timing. Accordingly, the sending frequency out·fQ2 is equal to the frequency of the control signal 2$a$5.

At this time, if the compiling frequency cmp·fQ2 is higher than the frequency of the control signal 2$a$5, cmp·fQ2>out·fQ2 holds. The data sent from the compiling means 0224 is thinned by sampling capturing.

On the other hand, if the token is not incorporated in the data supplied from the compiling means 0224 or the control signal 2$a$5 is not supplied from the frequency controlling unit 0122, the data is received and sending of the sending signal SV1$a$ is performed with timing of the reception of the data from the compiling means 0224. That is, out·fQ2=cmp·fQ2 holds.

Then, it may be arranged such that, in a case where the above-described token has been received from the compiling means 0224 or the frequency control has been performed on the sending of the sending signal SV1$a$ in the sending means 0225, the sending means 0225 attaches the token to the sending signal SV1$a$ and sends the signal to the communication system NT, and in this manner, the token is issued/succeeded.

Further, the sending means 0225 sends the above-described control signal 2$a$5, or sends a control command at other timing, to a constituent element of the communication system NT such as a WAP gateway server with timing of the above-described control signal 2$a$5, to perform the frequency management on the transmission frequency trf·fQ2 of transmission from the sending side SV1 to the receiving side CL1 in the communication system NT. In this case, the above-described token may be attached in the communication system NT. On the other hand, in a case where the frequency management is not performed in the communication system NT, trf·fQ2=out·fQ2 holds.

The database unit DB, having the retrieving standard information unit RTd as a set of retrieving standard information, set_E, and the contents unit CTd as a set of contents information, set_Cts, is accessible by the retrieving means 0223. In particular, as the amount of the contents information Cts is large, the database unit DB is constructed as the above-described large capacity RAID system.

Further, regarding the construction of the sending side SV1, it is preferable that in a case where the sending side are plural servers, the efficiency of processing is improved by using SAN (Storage Area Network).

A Storage Area Network is a form of operation of a network where plural servers share a storage device. In a LAN having plural servers, hard disks of the respective servers are detached from the servers and united to an RAID system, and the respective servers and the RAID system are connected with another high-speed network line using a fiber channel or the like such that data is shared among the servers. In this arrangement, a large amount of data can be shared, the efficiency of associated processing by plural servers can be improved, network loads between server and client can be reduced by data interchanging between servers separately made from the LAN.

In addition, it is preferable to construct the network as a wide-area load distribution type network to reduce data processing loads and loads on the line concentrated on a particular portion. Further, as request data arrives from an unspecified number of clients on the on-demand basis, it is preferable that an accounting proxy server is provided in the accounting unit 0123.

Further, it may be arranged such that the sending side SV1 is provided with a DGPS data center function of generating DGPS correction data to be described later.

Communication System NT:

The communication system NT relates to the loop in transmission from the receiving side CL1 to the sending side SV1 and in transmission from the sending side SV1 to the receiving side CL1.

In the transmission from the receiving side CL1 to the sending side SV1, if the control signal 1$a$4 or the control command is not sent from the sending means 0204 of the receiving side CL1, the frequency management is not performed in the communication system NT, and transmission to the sending side SV1 is performed at the transmission frequency trf·fQ1=Req·fQ1.

On the other hand, if the control signal 1$a$4 or the control command is sent, the frequency management is executed in the communication system NT. In this case, the above-described token may be attached to the transmission signal.

Further, in the transmission from the sending side SV1 to the receiving side CL1, if the control signal 2$a$5 or the control command is not sent from the sending means 0225 of the sending side SV1, the frequency management is not performed in the communication system NT, and transmission to the receiving side CL1 is performed at the transmission frequency trf·fQ2=out·fQ2.

On the other hand, if the control signal 2$a$5 or the control command is sent, the frequency management is executed in the communication system NT. In this case, the above-described token may be attached to the transmission signal.

Note that in the above description, it may be arranged such that in a case where the sending side SV1 checks the maximum frequency mxfQ determined for the service by referring to the list or table previously prepared in the sending side SV1 based on the service kind information and the resource information sent from the receiving side CL1 and the maximum frequency is set as the standard frequency stfQ, the sending side SV1 actually validates the kind of communication line and a transmission rate and the like.

Further, the above-described list or table is stored in recording means in the receiving side CL1 or the sending side SV1, however, it may be specified by the user's inputting into the receiving side CL1, or it may be captured from a Web page on the Internet by the receiving side CL1 and/or the sending side SV1.

Explanation of Operation:

Next, the operation of the contents information interchanging system Sys01 will be described. Note that for the sake of convenience of explanation, only the position data is specified as the event data by the user. As the above-described symbol indication, the operation of this case is represented as Pd→Cts. Further, among the above-described plural cases, the operation of the above-described case A1.1.1. in the following construction will be described.

The receiving side CL1 is a cellular phone corresponding to broadband communication. When the user is walking or moving on a moving body such as an automobile, the receiving side CL1 requests immediate (realtime) providing service for the contents information Cts corresponding to different positions from the sending side SV1. On the other hand, the sending side SV1 is a service site which manages the contents information Cts (landscape data) corresponding to the respective positions (spots) in a database and provides the information. The both sides perform information interchanging through the Internet system corresponding to wireless broadband communication as an example of the communication system NT.

In this system, the receiving side CL1 (hereinbelow, cellular phone CL1) refers to the maximum frequency table as data, thereby checks the maximum frequency mxfQ for the combination of the cellular phone, the sending side SV1 (hereinbelow, site SV1) and the communication system NT (hereinbelow, Internet system NT) and sets the standard frequency stfQ. Note that the maximum frequency table Tbs is provided in the site SV1, and for the sake of simplicity, the maximum frequency table Tbc is not provided on the cellular phone CL1 side.

Further, the frequency management is performed in the cellular phone CL1. The subject of the frequency management is the position data providing means 0101 as the first stage of the above-described loop.

Note that the position data providing means 0101 is a GPS receiver incorporated in the cellular phone CL1. The position data providing means 0101 supplies current position data pd obtained based on the distances from plural GPS satellites to the capturing means 0202. Further, the viewing direction data inputting means 0102, the moving data inputting means 0103 and the time data inputting means 0104 are omitted.

In the site SV1, the contents information Cts (landscape/audio data) corresponding to the respective positions (or spots) are managed in a database DB.

The following action flow is constructed with the service start adjusting stage and the service execution stage.

Figure 16:
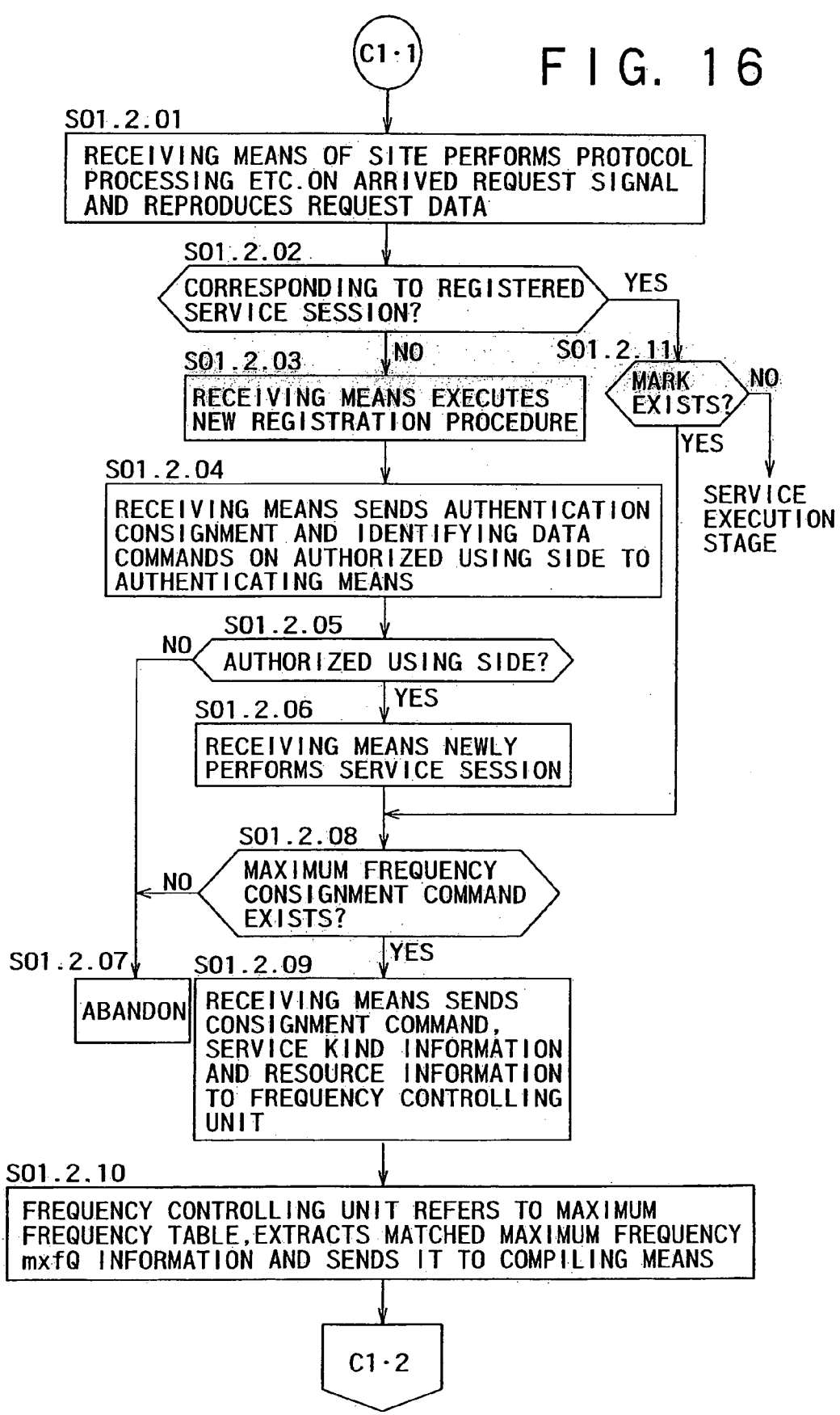
FIG. 16 is an action flowchart that follows FIG. 15.
Figure 17:
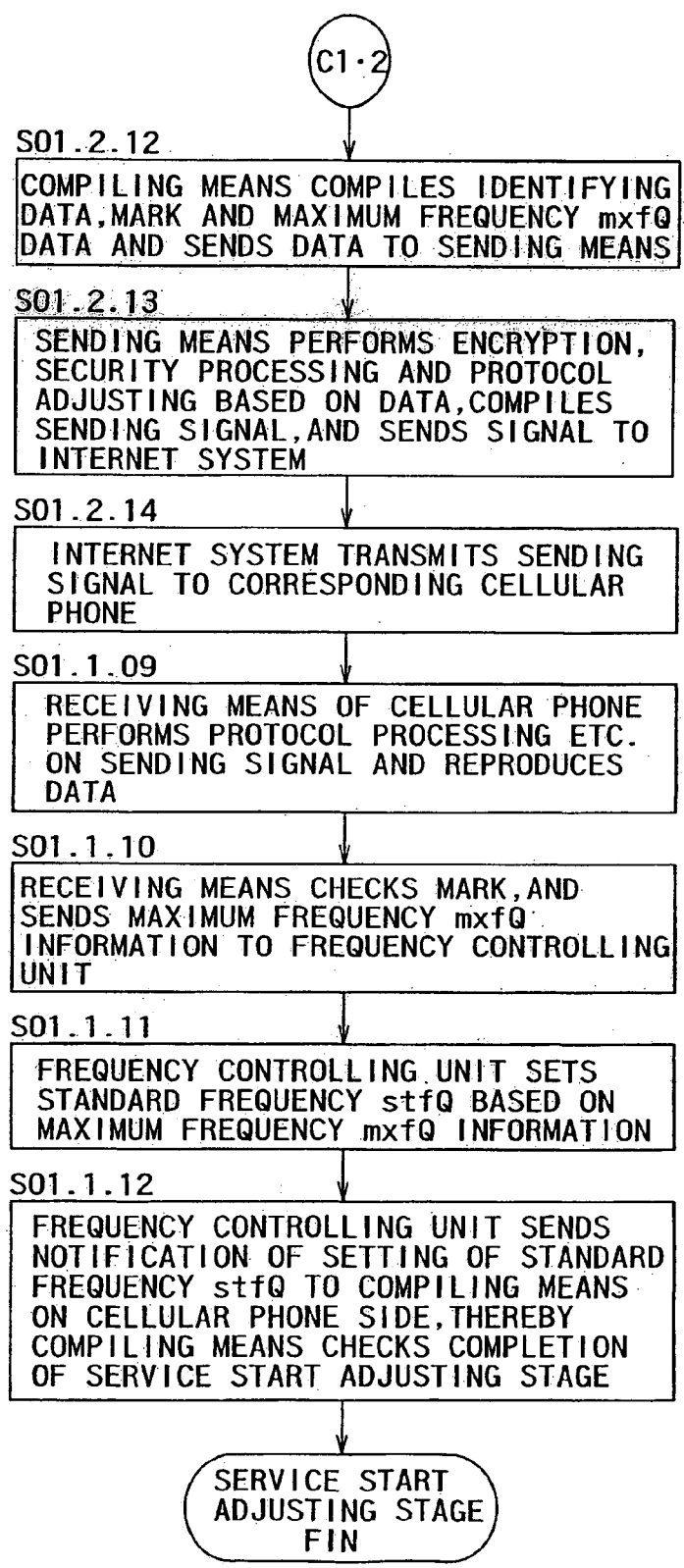
FIG. 17 is an action flowchart that follows FIG. 16.

Operation at Service Start Adjusting Stage in First Embodiment:

FIGS. 15 to 17 are action flowcharts at the service start adjusting stage.

In FIG. 15, when the user requests for start of service, the service request inputting means 0105 of the cellular phone CL1 is operated, and desired service kind information (desired site, the kind of contents information, specification of position data as the kind of event data, the type of communication line and provider information) is manually inputted (step S01.1.01). The service request inputting means 0105 generates the service request data sr incorporating the service kind information and sends the data to the capturing means 0202 (step S01.1.02).

The capturing means 0202 of the cellular phone CL1 detects that the data is the service request data sr indicating a trigger of the service start adjusting stage, by checking that the received signal has been generated by the service request inputting means 0105, and captures the data immediately. The capturing means 0202 checks the contents of the data and stores the specified service kind information incorporated in the service request data sr. (step S01.1.03), Since there are various providers (Internet-access service providers) and plural sites, and further, since the quality of service (screen updating frequency) differs site by site, it is necessary for the cellular phone CL1 to check the quality of service obtainable by the current combination (of kind of contents information, position data as the kind of event data, type of communication line), prior to the execution of service. The capturing means 0202 attaches a sign indicating the service start adjusting stage to the contents of the received service request data sr, and sends the data as data 202a to the compiling means 0203 (step S01.1.04).

If the compiling means 0203 detects the sign indicating the service start adjusting stage in the data 202a sent from the capturing means 0202, the compiling means determines that the service start adjusting stage has been started, and sets the standard frequency. In this construction, as the maximum frequency list necessary for setting of the standard frequency is not managed in the cellular phone CL1, in order to receive information on the maximum frequency management in the site SV1 by consignment, the compiling means 0203 compiles the request data 203a incorporating the sign, the service kind information, the maximum frequency consignment command and the identifying data id of the user side obtained from the id controlling unit 0113 (user data, type/specification data of the cellular phone, device/model number and the like) and sends the data to the sending means 0204 (step S01.1.05).

Further, the form of frequency management is determined. In this case, the form is determined as described above. That is, the frequency management is performed on the position data providing means 0101 in the cellular phone CL1. The result of determination, the consignment of information on the maximum frequency from the sending side and instruction for setting of the standard frequency are transmitted to the frequency controlling means 0111 (step S01.1.06).

Then, the sending means 0204 performs the encryption security processing, the protocol adjustment (e.g., WAP request adjustment by utilizing a mobile Internet) and the like in accordance with the request data 203a sent from the compiling means 0203, compiles the request signal CL1a to the site SV1 and sends the signal through the communication interface ifc to the internet system NT (step S01.1.07). The Internet system NT transmits the signal to the specified site SV1 (step S01.1.08).

Then in FIG. 16, the receiving means 0221 of the site SV1 receives the request signal CL1*a* through the internet system NT and the communication interface ifs from the cellular phone CL1, performs the protocol processing, the decoding and the data expansion to reproduce the request data, and extracts the identifying data id of the user side, and the service kind information in accordance with necessity, from the request data (step S01.2.01). Then it is determined based on the extracted data that the data corresponds to the currently-registered service session (step 01.2.02). If it is checked that the data corresponds to the currently-registered service session, it is determined that the service in progress is continued, and the presence/absence of the sign is checked at step S01.2.11. If the sign does not exist, as the service execution stage has been started, the process moves to the corresponding step, while if the sign exists, proceeds to step S01.2.08.

On the other hand, if there is no currently-registered service session or there in no corresponding service session at step S01.2.02, a new registration procedure is performed (step S01.2.03). Then, for consignment of authentication that the cellular phone CL1 is an authorized user side, the command 221*a* incorporating the mark indicating consignment of authentication and the identifying data id is sent to the authenticating means 0230 of the accounting unit 0123 (step S01.2.04).

Then, the result notification 231*a* from the authenticating means 0230 is received and determination is made (step S01.2.05). If it is an authorized user side, a new service session is registered and is established (step S01.2.06), If it is not an authorized user side, the request signal CL1*a* is abandoned (step S01.2.07).

Then, after the establishment of the above-described service session, the receiving means 0221 examines the presence/absence of the maximum frequency consignment command in the request signal CL1*a* (step S01.2.08). If the maximum frequency consignment command is detected, it is recognized that the service start adjusting stage has been started. The means sends the maximum frequency consignment command, the extracted service kind information and the resource information such as device type included in the identifying data id, as the data 2*b*1, to the frequency controlling unit 0122 (step S01.2.09). On the other hand, if the maximum frequency consignment command is not detected, the processing for the maximum frequency is not performed although the new service has been started, it is determined that an error has occurred. At step S01.2.07, the request signal CL1*a* is abandoned.

The frequency controlling unit 0122 receives the data 2*b*1 from the receiving means 0221, and if it detects the maximum frequency consignment command, the service kind information and the resource information, recognizes that the service start adjusting stage is in progress. Then the unit refers to the list of "service kind information, position data & resource information" versus "corresponding maximum frequencies" previously recorded in the maximum frequency table Tbs in the site SV1 based on the information. The unit extracts information on appropriate maximum frequency mxfQ and sends it as data 2*b*4 to the compiling means 0224 (step S01.2.10).

Next, in FIG. 17, when the information on the maximum frequency mxfQ is sent as the data 2*b*4 from the frequency controlling unit 0122, the compiling means 0224 recognizes that the service start adjusting stage has been started, and it compiles data incorporating the mark indicating the maximum frequency mxfQ, the identifying data id and the maximum frequency mxfQ and sends the data to the sending means 0225 (step S01.2.12). As the identifying data id, the data stored in the above-described temporary memory is read.

When the data of the above-described mark and the maximum frequency mxfQ is sent from the compiling means 0224, the sending means 0225 recognizes that the service start adjusting stage has been started. The means generates the sending signal SV1*a* incorporating the identifying data id, the data on the maximum frequency mxfQ and the mark, and sends the signal through the communication interface ifs to the Internet system NT (step S01.2.13). The Internet system NT transmits the sending signal SV1*a* to the cellular phone CL1 (step S01.2.14).

When the sending signal SV1*a* is sent from the site SV1, the receiving means 0205 of the cellular phone CL1 performs the protocol processing and checking of the identifying data id, then receives the sending signal SV1*a*. The means performs the decoding and the data expansion to reproduce the data (step S01.1.09). If the mark indicating that the information on the maximum frequency is incorporated is detected, the means recognizes that the service start adjusting stage has been started. The means sends the reproduced information on the maximum frequency mxfQ as the data 1*b*5 to the frequency controlling unit 0111 (step S01.1.10). The maximum frequency mxfQ is a maximum frequency corresponding to the current combination of the cellular phone CL1, the Internet system NT and the site SV1, the kind of the contents information, the position data as the kind of the event data, the type of communication line, and the like.

When the information on the maximum frequency mxfQ is received as the data 1*b*5 from the receiving means 0205, the frequency controlling unit 0111 sets the standard frequency stfQ base on the data (step S01.1.11). The standard frequency stfQ may be set to an arbitrary value not exceeding the maximum frequency mxfQ. In this example, the standard frequency stfQ is set to be equal to the maximum frequency mxfQ. Then, the unit sends notification of setting completion of the standard frequency stfQ to the compiling means 0224 or the like (step S01.1.12). By this setting, the service start adjusting stage ends, and the process moves to the service execution stage.

As described above, in a case where there are a very large number of kinds of services, it is not desirable in consideration of memory capacity/process step/device size/weight and especially battery consumption, to incorporate the maximum frequency table in a minor data processing resource device such as the cellular phone CL1 and perform retrieval there. Accordingly, when the service request data sr is generated from the user, the cellular phone CL1 recognizes that the service start adjusting stage has been started, and sends the specified service kind information, the resource information and the consignment instruction to the site, thereby causes the site SV1 in a rich data processing source environment to perform retrieving on the maximum frequency table Tbs based on the performance of the cellular phone CL1, the position data as the kind of the event data, the type of the communication line and the like, then to read the maximum frequency mxfQ for the contents information previously determined for the combination and send the maximum frequency to the cellular phone CL1.

By this consignment, the cellular phone CL1, which does not hold the maximum frequency table, can utilize the resource on the site SV1 side to obtain the maximum frequency mxfQ and can set the standard frequency stfQ based on the maximum frequency.

Figure 18:
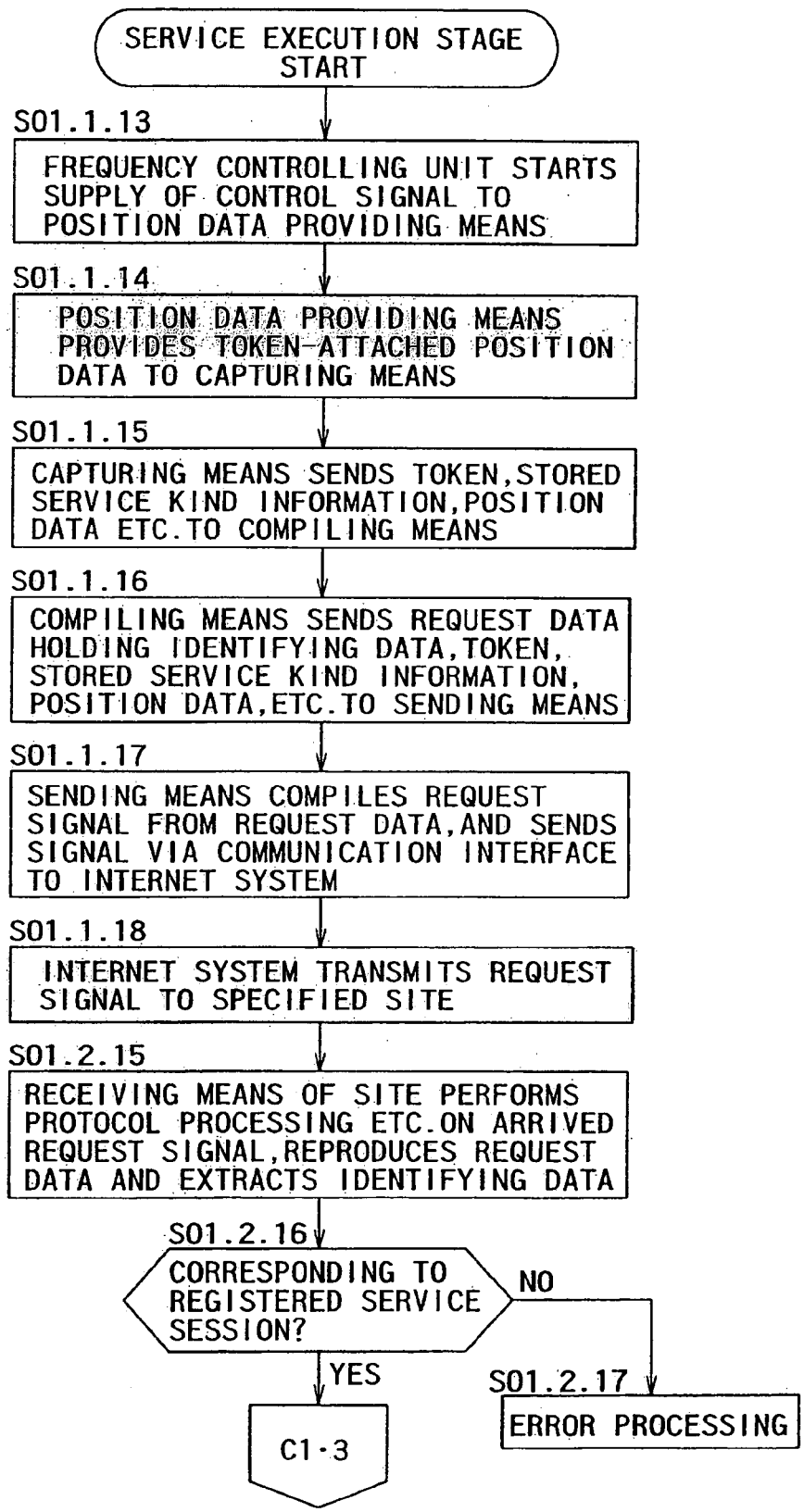
FIG. 18 is an action flowchart in the service execution stage according to the first embodiment.
Figure 19:
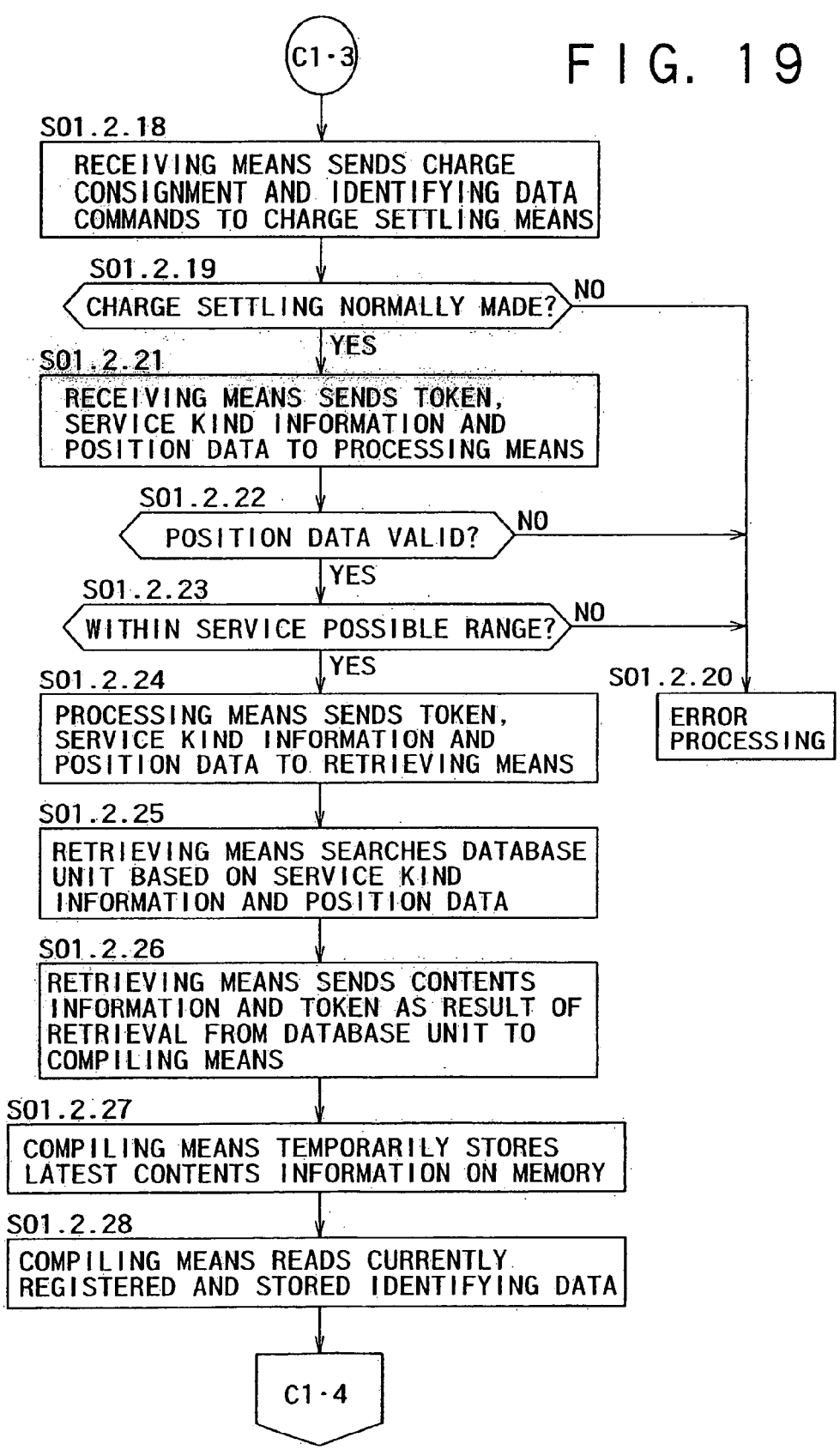
FIG. 19 is an action flowchart that follows FIG. 18.
Figure 20:
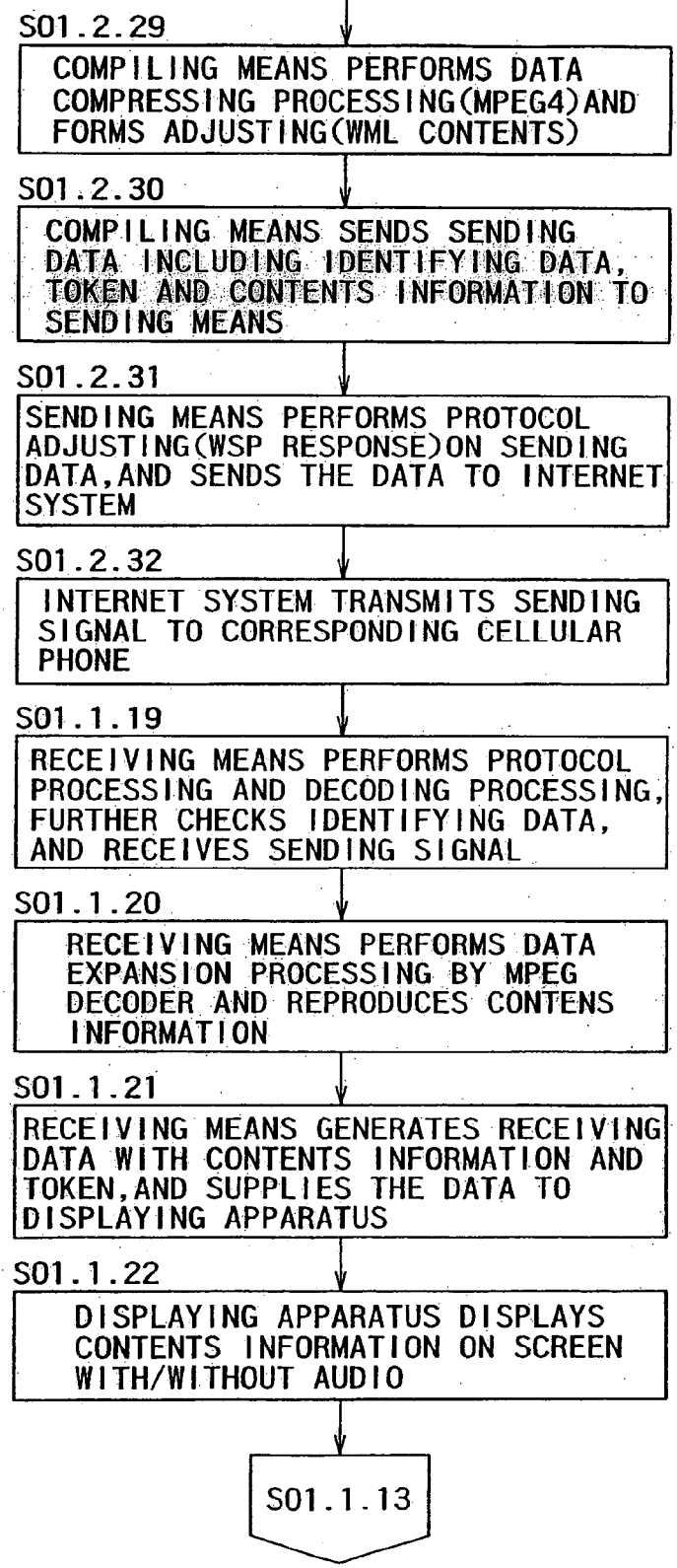
FIG. 20 is an action flowchart that follows FIG. 19.

Operation At Service Execution Stage in First Embodiment:

FIGS. 18 to 20 are action flowcharts of the service execution stage in the first embodiment.

In FIG. 18, the frequency controlling unit 0111 starts repetitive supplying of the control signal 1a1 at a frequency equal to the standard frequency stfQ to the position data providing means 0101 (step S01.1.13). By the start of supplying of the control signal 1a1, the service execution stage is started.

The position data providing means 0101 is actuated by the control signal 1a1 supplied from the frequency controlling unit 0111, then executes GPS positioning, and provides the result of positioning as the position data pd to the capturing means 0202 (step S01.1.14). Thus the generation frequency g·fQ1 of the position data pd is managed to be equal to the standard frequency stfQ, and excessive generation can be eliminated.

When the data is provided from the position data providing means 0101, the capturing means 0202 recognizes that the service execution stage has been started and captures the data. Further, if the token is detected, as the frequency management has been already performed on the preliminary stage side, the frequency management in the capturing means 0202 is omitted and processing is performed at the frequency of the received data.

Then, the service kind information stored at the above-described service start adjusting stage is read. Then, the data 202b incorporating the token, the service kind information and the position data pd is sent to the compiling means 02023 (step S01.1.15). Since the processing is performed at the timing following the generation frequency g·fQ1 of the position data pd, the capturing frequency a·fQ1 and the sending frequency of the data 202b are managed to be equal to the standard frequency stfQ. Thus processing execution and sending are not performed at an excessive/insufficient frequency in the capturing means 0202. Further, the token is succeeded at the subsequent stage as descried above.

The compiling means 0203 receives the data sent from the capturing means 0202. At this time, as the control signal 1a3 is not supplied from the frequency controlling unit 0111, the data is received with timing of the arrival of the data. As the above-described sign does not exist, the means recognizes that the received data is the data 202b sent at the service execution stage. Further, as the token is detected, it is determined that the frequency management has been already performed on the preliminary stage side. Accordingly, the frequency management in the compiling means 0203 is omitted, and processing is performed at the timing following the received frequency.

Then, the request data 203b incorporating the identifying data id obtained from the id controlling unit 0113 at the head, the token, the service kind information and the position data pd is sent to the sending means 0204 (step S01.1.16). As the processing is performed at the timing following the sending frequency of the data 202b from the preliminary stage, the compiling frequency cmp·fQ1 and the sending frequency of the request data 203b are managed to be equal to the standard frequency srfQ. Thus processing execution and sending are not performed at an excessive/insufficient frequency in the compiling means 0203. Further, the token is succeeded at the subsequent stage as descried above.

Then the sending means 0204 receives the request data 203b sent from the compiling means 0203. At this time, as the control signal 1a4 is not supplied from the frequency controlling unit 0111, the data is received with timing of arrival of the data. The means performs the encryption security processing, the protocol adjustment and the like at the timing, compiles the request signal CL1a to the site SV1 and sends the signal through the communication interface ifc to the Internet system NT (step S01.1.17). Since the processing is performed at the timing following the sending frequency of the request data 203b from the preliminary stage, the sending frequency Req·fQ1 of the request signal CL1a is managed to be equal to the standard frequency stfQ. Thus processing execution and sending are not performed at an excessive/insufficient frequency in the sending means 0204. Further, the token is succeeded at the subsequent stage as descried above.

Then the Internet system NT transmits the data to the specified site SV1 (step S01.1.18). Further, in the present embodiment, the control command is not supplied from the sending means 0204.

Note that since the transmission is performed at the timing following the sending frequency of the request signal CL1a from the preliminary stage, the transmission frequency trf·fQ1 of the request signal CL1a is managed to be equal to the standard frequency stfQ. Thus processing execution and sending are not performed at an excessive/insufficient frequency in the Internet system NT. Further, the token is succeeded at the subsequent stage as descried above.

The receiving means 0221 of the site SV1 receives the request signal CL1a, sent through the Internet system NT from the cellular phone CL1, through the communication interface ifs. The means performs the protocol processing, the decoding and the data expansion, to reproduce the request data, and extracts the identifying data id of the user side from the request data (step S01.2.15). Further, in the present embodiment, the control signal 2a1 is not supplied from the frequency controlling unit 0122.

Then, it is determined whether or not the data corresponds to the currently-registered service session by referring to the temporary memory (step S01.2.16). If it is checked that the data corresponds to the currently-registered service session, it is determined that the currently-registered service is continued, and the following charge settling is performed. On the other hand, if the data does not correspond to the currently-registered service session, error processing is performed (step S01.2.17).

Then, the command 221a incorporating the mark indicating charging consignment and the identifying data id of the user is sent to the accounting unit 0123 so as to perform the charge settling by the charge settling means 0231 (step S01.2.19). The result of processing is determined based on the returned notification 231a (step S01.2.19). Note that if the charge settling has been unsuccessful, the process moves to step S01.2.20, at which the request signal CL1a is abandoned. On the other hand, if the processing has been normally completed, the process proceeds to step S01.2.21 to perform the subsequent processings.

Further, in the present embodiment, the charging is performed every time the request signal CL1a is received, then the charging amount is accumulated, and the settling is performed when the accumulated value reaches a predetermined number of charges (deferred measured-rate charging), however, prepaid charging may be performed.

Further, if the token is detected in the request data, as the frequency management has been already performed on the preliminary stage side, the frequency control in the receiving means 0221 is omitted. The processing is performed at the timing following the transmission frequency trf·fQ1.

Then, the data incorporating the token, the service kind information and the position data pd is sent to the processing means 0222 (step S01.2.21). Since the processing is performed at the timing following the transmission frequency of the request signal CL1*a* from the preliminary stage, the receiving frequency a·fQ2 and the sending frequency of the data to the processing means 0222 are managed to be equal to the standard frequency stfQ. Thus processing execution and sending are not performed at an excessive/insufficient frequency in the receiving means 0221. Further, the token is succeeded at the subsequent stage as descried above.

If the token is detected from the data sent from the receiving means 0221 to the processing means 0222, as the frequency management or the frequency control has been already performed on the preliminary stage side, the frequency control in the processing means 0222 is omitted. The processing is performed with timing of the reception of the data from the receiving means 0221 (receiving frequency a·fQ2). First, the validity of the format of the position data pd as the event data is checked (step S01.2.22), and it is examined whether or not the site is within a service possible area (step S1.2.23).

If the result of examination is not valid, it is determined that the service is impossible, then the process proceeds to step S01.2.20, at which the request is abandoned. On the other hand, if the result of examination is valid, the data incorporating the token, the service kind information and the position data pd is sent to the retrieving means 0223 (step S01.2.24). Further, in the present embodiment, the control signal 2*a*2 is not supplied from the frequency controlling unit 0122.

Since the processing is performed at the timing following the frequency of the data sent from the receiving means 0221 (receiving frequency a·fQ2), the processing frequency pr·fQ2 and the sending frequency of the data to the retrieving means 0223 are managed to be equal to the standard frequency stfQ. Thus processing execution and sending are not performed at an excessive/insufficient frequency in the processing means 0222. Further, the token is succeeded at the subsequent stage as descried above.

If the token is detected from the data sent from the processing means 0222 to the retrieving means 0223, as the frequency management or the frequency control has been already performed on the preliminary stage side, the frequency control in the retrieving means 0223 is omitted. The processing is performed with timing of the reception of the data from the processing means 0222 (processing frequency pr·fQ2). In the present embodiment, the control signal 2*a*3 is not supplied from the frequency controlling unit 0122.

The process proceeds in 2 stages. First, the retrieving is performed on the database unit DB based on the service kind information and the position data pd (step S01.2.25). By this processing, the contents information Cts corresponding to the service kind information and the position data pd is obtained from the database unit DB. Then, the contents information Cts resulted from the retrieval is sent, with the token, to the compiling means 0224 (step S01.2.26).

Since the above-described processing is performed at the timing following the frequency of the data sent from the processing means 0222 (processing frequency pr·fQ2), the retrieving frequency rt·fQ2 and the sending frequency of the data to the compiling means 0224 are managed to be equal to the standard frequency stfQ. Thus processing execution and sending are not performed at an excessive/insufficient frequency in the retrieving means 0223. Further, the token is succeeded at the subsequent stage as descried above.

If the token is detected from the data sent from the retrieving means 0223 to the compiling means 0224, as the frequency management or the frequency control has been already performed on the preliminary stage side, the frequency control in the compiling means 0224 is omitted. The processing is performed with timing of the reception of the data from the retrieving means 0223 (retrieving frequency rt·fQ2). In the present embodiment, the control signal 2*a*4 is not supplied from the frequency controlling unit 0122.

Then, for the next compression on the contents information, the most recent contents information Cts is temporarily stored in a memory (step S01.2.27). Then, the registration of the current service session stored and managed in the receiving means 0221 is referred to, and the identifying data id is obtained (step S01.2.28). Then sending data, incorporating the identifying data id, the token and the contents information Cts based on information on the result of retrieval, is compiled. The compression is performed on the contents Cts by e.g. an MPEG-4 based algorithm, and the format (HTML contents, WML contents, XHTML contents or the like) is adjusted (step S01.2.29). The compression may be performed based on another algorithm. Then, the sending data compiled as described above is sent to the sending means 0225 (step S01.2.30).

Since the above-described processing is performed at the timing following the frequency of the data sent from the retrieving means 0223 (retrieving frequency rt·fQ2), the compiling frequency cmp·fQ2 and the sending frequency of the data to the sending means 0225 are managed to be equal to the standard frequency stfQ. Thus processing execution and sending are not performed at an excessive/insufficient frequency in the compiling means 0224. Further, the token is succeeded at the subsequent stage as descried above.

If the token is detected from the sending data sent from the compiling means 0224 to the sending means 0225, as the frequency management or the frequency control has been already performed on the preliminary stage side, the frequency control in the sending means 0225 is omitted. The processing is performed with timing of the reception of the data from the compiling means 0224 (compiling frequency cmp·fQ2). In the present embodiment, the control signal 2*a*5 is not supplied from the frequency controlling unit 0122.

Then, the security processing, the protocol processing and the like are performed based on the token-attached sending data, thereby the sending signal SV1*a* is generated and sent to the Internet system NT (step S01.2.31). The protocol is adjusted to the HTTP response or WSP response based on the format of the sending data.

Since the above-described processing is performed at the timing following the frequency of the data sent from the compiling means 0224 (compiling frequency cmp·fQ2), the sending frequency out·fQ2 of the sending signal SV1*a* to the Internet system NT is managed to be equal to the standard frequency stfQ. Thus processing execution and sending are not performed at an excessive/insufficient frequency in the sending means 0225. Further, the token is succeeded at the subsequent stage as descried above.

The Internet system NT transmits the sending signal SV1*a* to the corresponding cellular phone CL1 (step S01.2.32). In the present embodiment, the control command is not supplied from the sending means 0225.

Since the transmission is performed at the timing following the sending frequency of the sending signal SV1*a*, the transmission frequency trf·fQ2 of the sending signal SV1*a* is managed to be equal to the standard frequency stfQ. Thus processing execution and sending are not performed at an excessive/insufficient frequency in the Internet system NT.

Further, the sending signal SV1a allows the token to be succeeded at the subsequent stage as descried above.

Then, in the cellular phone CL1, the receiving means 0205 performs the protocol processing and the decoding on the sending signal SV1a sent from the site SV1, then checks the identifying data id incorporated in the reproduced sending data, and receives the data (step S01.1.19). Then, the means performs the data expansion by an MPEG4 decoder or the like to reproduce the contents information Cts (step S01.1.20). If the token is detected from the reproduced sending data, as the frequency management or the frequency control has been already performed on the preliminary stage side, the frequency management in the receiving means 0205 is omitted. The processing is performed with timing of the reception of the sending signal SV1a from the Internet system NT (transmission frequency trf·fQ2). In the present embodiment, the control signal 1a5 is not supplied from the frequency controlling unit 0111.

Then, the receiving data based on the contents information Cts and the token is generated and supplied to the displaying apparatus 0206 (step S01.1.21).

Since the above-described processing is performed at the timing following the frequency of the sending signal SV1a transmitted from the Internet system NT (transmission frequency trf·fQ2), the receiving frequency rv·fQ1 and the sending frequency of the data to the displaying apparatus 0206 are managed to be equal to the standard frequency stfQ. Thus processing execution and sending are not performed at an excessive/insufficient frequency in the receiving means 0205. Further, the token is succeeded at the subsequent stage as descried above.

Then, in the displaying apparatus 0206, if the token is detected from the receiving data sent from the receiving means 0205, as the frequency management or the frequency control has been already performed on the preliminary stage side, the frequency control in the displaying apparatus 0206 is omitted. The receiving data received from the receiving means 0205 is displayed on the screen and/or with voice (step S01.1.22).

In the present embodiment, the control signal 1a6 is not supplied from the frequency controlling unit 0111. Thus the desired screen is updated at the displaying frequency Cts·fQ1 equal to the standard frequency stfQ.

Thereafter, the process returns to step S01.1.13 (FIG. 18), at which the updating of the above-described loop is repeated. The frequency is managed/controlled to the standard frequency stfQ.

As described above, at the service execution stage, the cellular phone CL1 requests immediate (realtime) offering of service for contents information Cts corresponding to different positions, by repeating the updating of sending the request signal CL1a, in which the identifying data id and the service kind information are attached to the continuously changing position data pd, to the site SV1 at the standard frequency stfQ.

On the other hand, in the site SV1, every time the request signal CL1a, updated and sent at the standard frequency stfQ from the cellular phone CL1 is received, and updating of the contents information Cts corresponding to the incorporated position data pd (including data for 1 screen indicating the landscape in the position) is repeated at the standard frequency stfQ, then the information is incorporated in the sending signal SV1a and the signal is repeatedly updated and sent to the cellular phone CL1 at the standard frequency stfQ.

The cellular phone CL1 receives the sending signal SV1a, updated and sent at the standard frequency stfQ, and the updating of displaying of the contents information Cts corresponding to the different positions is repeated in realtime at the standard frequency stfQ. In this manner, the updating of the above-described loop by bidirectional data interchanging, including the repeated updating of the sending of the request signal CL1a and repeated updating of the receiving and displaying of the corresponding contents information Cts (each including landscape data for 1 screen) is repeated at the standard frequency stfQ, thereby the cellular phone CL1 can display an updated image in realtime.

As a result, as the cellular phone CL1 moves, an image changing in correspondence with the movement of position (the recorded contents information Cts) displayed on the screen of the cellular phone CL1 is updated in realtime and a sound is played, which is observed by the user as a dynamic image.

The example of the operation of the contents information interchanging system Sys01 is as described above. Next, applications and utilities will be described below.

The contents information interchanging system Sys01 is originally available for business of various services i.e., requests and offers of services, and applicable to a variety of uses. Above all, the system is advantageous in use of network navigation. That is, the content of the service is contents information interchanging for network navigation, and convenient functions for the service are provided.

The network navigation is performed as actual navigation or simulation navigation.

Example of actual network navigation: In a case where a user is actually moving on a vehicle or the like in a specified desired area, as the receiving side CL1, a cellular phone or automobile communication unit with high-frequency screen-updating display function for broadband communication is prepared, and as the positioning system connected to the receiving side, a handy-type quasi-zenith positioning satellite-wave receiver is prepared. In the cellular phone, most recent current position data pd from positions sequentially measured while the user has been moved is sequentially sent, as time-series of position data srs_pd, through an IMT-2000 (corresponding to W-CDMA or cdma2000 system: as the communication system NT) to the sending side SV1 as a site at a high standard frequency stfQ. The site sequentially extracts the corresponding contents information Cts from the stored video image contents by searching the database unit DB at the high standard frequency stfQ, and sequentially sends the information in realtime through the IMT-2000 to the cellular phone at the high standard frequency stfQ, to sequentially update display of previously-obtained frame images, as a viewed landscape, on the screen of the moving cellular phone. This enables comparison between the displayed landscape and the actually viewed landscape, and enables network navigation.

As an example, in a case where the cellular phone can send the request data CL1a including current position data once a ¹⁄₆₀ sec (60 times/sec), if the possible maximum frequency mxfQ in the combination of the cellular phone, a desired site and a desired communication system is 30 times/sec according to the result of reference to the maximum frequency table, it is wasteful to operate the cellular phone at processing rate of 60 times/sec. Accordingly, the respective processings in the cellular phone/the site/the communication system are set to the maximum frequency mxfQ of 30 times/sec, and the system of this combination can be operated to the maximum limit and with maximum efficiency.

Further, in a case where it is determined by the user's specification or by the cellular phone itself that screen updating of 15 frames per 1 sec (the screen updating frequency of contents information is 15 frames/sec) is sufficient in consideration of battery consumption and amenity of use, it is checked that the rate does not exceed the maximum frequency mxfQ, 60 times/sec, then the actual standard frequency is set to 15 times/sec, and the frequency management and the frequency control are performed to set the updating frequencies of the respective processings to 15 times/sec in correspondence with the standard frequency stfQ.

In a case where the cellular phone is mounted on an automobile running at 60 km/hour, the current position moves 1000/60 meters per 1 sec, accordingly, 10/9=about 1.1 meters per $1/15$ sec. If the request data CL1a including the current position data is sequentially sent to the sending side SV1 as a site at a frequency of 1 time per $1/15$ sec, every time the site receives the request data CL1a, the site sequentially sends the contents information Cts (for 1 screen frame) corresponding to the current position to the cellular phone, repeatedly. In this manner, the contents information Cts of a video image advancing by about 1.1 meters, updated by 15 frames/sec, is sequentially sent, and sequentially displayed on a small liquid crystal display screen of the cellular phone (or a middle-sized liquid crystal display screen of the GPS receiver connected to the cellular phone), thus an image updated at a rate of 15 frames/sec is displayed. Further, the image interchanged in realtime is an image previously obtained by image sensing the actual landscape currently viewed from the moving body in the respective positions. This enables realtime car navigation. Although the details of the landscape are somewhat different from the current landscape since the displayed landscape was obtained past, the picture composition of the displayed landscape is approximately the same as the current landscape, and the displayed landscape has a high utility value as navigation information. Further, as the landscape is displayed at a high screen updating frequency, the image is observed as a dynamic image. The user can compare the displayed landscape with the actually viewed landscape very easily, thus note-worthy useful navigation can be realized.

As the advantages of the above-described system, as the frequency management and the frequency control of the respective processings along the loop are executed based on the standard frequency stfQ in the cellular phone/the site/the Internet system, the frequencies of repeated updating of the respective processings can be rationalized (excessive repeated updating and insufficient repeated updating can be eliminated). As a result, the amount of data processing increased by excessive frequency of processing can be reduced, thereby excessive electric consumption can be prevented and battery life can be prolonged, further, wasteful data sending onto the network can be avoided, thereby communication loads can be reduced. Further, the communication tariff can be reduced. In particular, the elimination of waste of retrieving, sending and transmission of the contents information Cts as large amount data is noticeable.

Further, at insufficient processing frequency which occurs in any of the processings can be eliminated, information can be provided in a stable manner satisfying a desired level.

In addition, in the conventional car navigation, images of existing big roads and streets are provided in correspondence with only movement along a predetermined route, whereas in the present invention, image display is not limited to movement along an existing route and further not limited to the routes, Even if a user sets an arbitrary course, the contents information Cts relating to the positions of the course can be provided. Accordingly, the range of use of the system can be further increased, and the freedom of use can be increased.

In the above example, the receiving side CL1 is a mobile device represented by a cellular phone which is generally used when a user is moving. On the other hand, in a case where the receiving side CL1 is a fixed device such as a desk top personal computer or a non-portable game machine, in travel simulation or driving simulation, an arbitrary position and an arbitrary running speed can be sent to the site side by key-inputting. Further, in such simulation, unreal video image can be provided with CG or animation image.

For example, in the case of network navigation by simulation, in a case where a user virtually moves in a specified desired area, as the receiving side CL1, a personal computer or game machine for broadband communication with a tablet or pad as a virtual-position data input device connected thereto is prepared. Most recent virtual position data, sequentially update-inputted at a high standard frequency stfQ from the receiving side CL1 by using the virtual-position data input device, is sequentially sent, as the time-series of position data srs_pd, through the broadband Internet, to the sending side SV1 at the standard frequency stfQ. The sending side SV1 sequentially extracts the corresponding contents information Cts from the stored image contents by searching the database unit DB at the high standard frequency stfQ, and sequentially sends the information in realtime through the broadband Internet to the receiving side CL1 at the high standard frequency stfQ, to update display of previously-obtained images, as a corresponding landscape, on the screen of the receiving side CL1 at a high freuquency. Thus the image is observed as a dynamic image, and navigation relating to virtual movement is realized.

In the fixed device as described above, the necessity of battery is not so high as that in the above-described mobile device, and electric-light line power is generally used. Accordingly, the limitation on the electric consumption is lower, however, the reduction of communication loads on the communication line is important as in the above-described case. Accordingly, the reduction of communication loads, the effective communication and the reduction of communication tariff by the frequency management are great advantages.

Further, the present invention realizes a business model where the sending side SV1 of the contents information Cts provides the contents information Cts at a high screen updating frequency, through the communication networks to the receiving side CL1, chargeably, on an interactive and on-demand basis, and receives the charge by the charging processing. The form of charging may be measured-rate charging or flat-rate charging.

In this manner, the Present invention enables interactive interchanging of contents information, obtained/generated and stored with respect to every position, every viewing direction and every time in actual space and imaginary space (e.g., on the earth or in aero-space) in principle. Note that an actual business model offers a service for providing contents information within a limited range (positions or the like) in consideration of the difficulty level of acquisition and cost effectiveness. In this case, as the freedom of expansion of target range is high, the enlargement of scale and depth of information for satisfactory service are determined depending on time and profitability.

Further, the present invention provides a business model for various business scenes including as a part the first and the subsequent embodiments.

Next, the main constituent elements will be supplementarily described.

Figure 21:
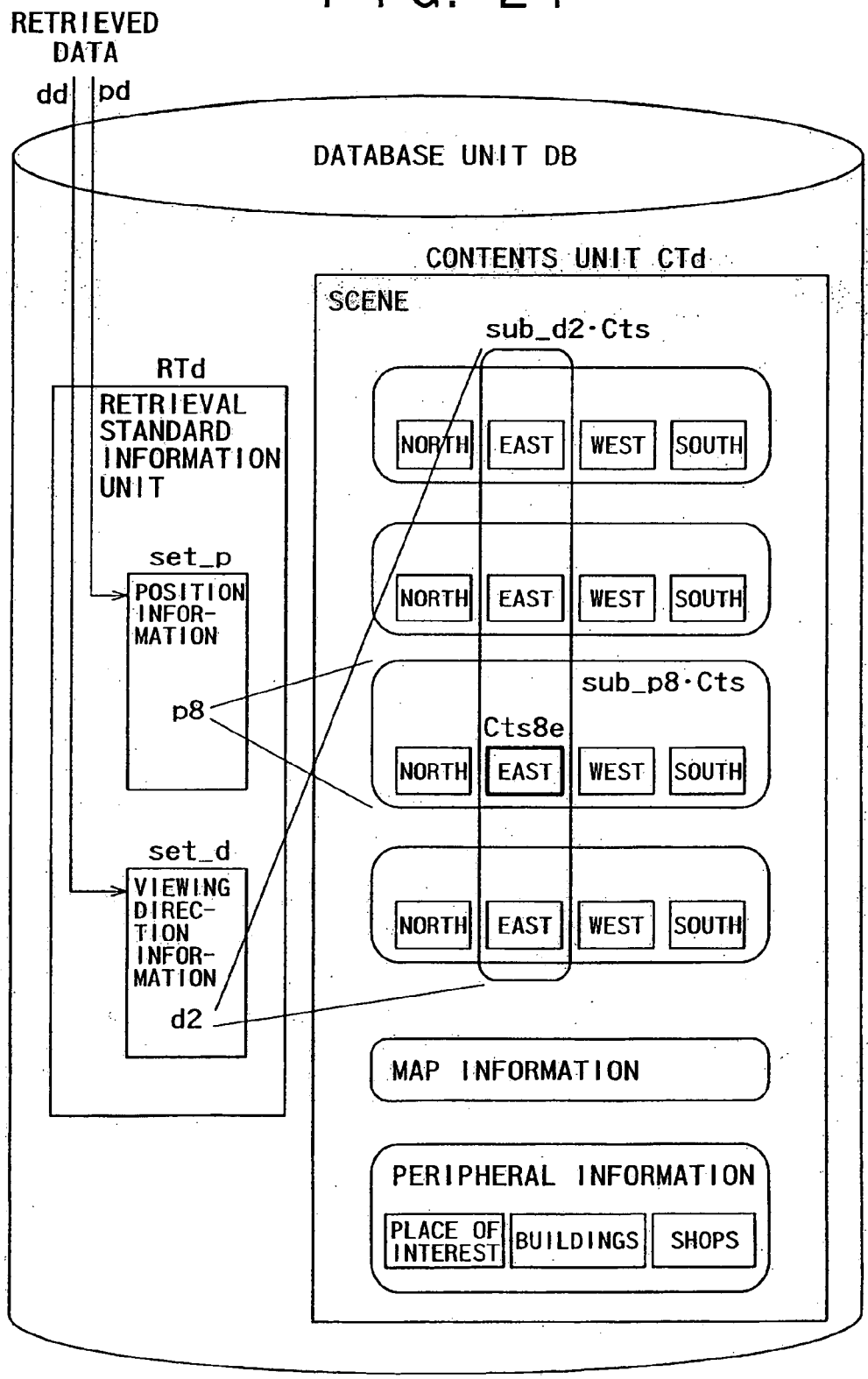
FIG. 21 is a schematic diagram showing the structure of the database unit.

Database Unit DB:

FIG. 21 is a schematic diagram showing the structure of the database unit DB. The position data pd, as an example of data inputted into the database unit DB of the server SV1 is data specifying a current spot or current position or desired stop or position by the client CL1. The data is inputted as "retrieving data" into the database unit DB. The retrieving data (in this case, the position data pd) is linked to "retrieving standard information" (in this case, the position information p) in the database retrieving. The retrieving standard information (including the position information p) is previously recorded in the retrieving standard information unit RTd of the database unit DB as a set of retrieving standard information (in this case, a set of position information, set_p).

On the other hand, the viewing direction data dd inputted into the database unit DB is data specifying a user's desired viewing direction by the client CL1. The data is inputted as "retrieving data" into the database unit DB. The retrieving data (in this case, the viewing direction data dd) is linked to "retrieving standard information" (in this case, the viewing direction information d) in the database retrieving. The retrieving standard information (including the viewing direction information d) is previously recorded in the retrieving standard information unit RTd of the database unit DB, in this case, as a set of viewing direction information, set_d.

Further, in the database Unit DB, target information as the "retrieving target" in previously recorded in the contents unit CTd for each kind of service, as a set of target information (in this case, a set of contents information, set_Cts). At least 1 retrieving standard information (in this case, the position information p or the viewing direction information d) corresponds to each target information of the set of target information (in this case, the contents information Cts).

Generally, database retrieving is performed as a process of searching for target information corresponding to selected "retrieving standard information" and extracts the target information as "result of retrieving" from a set of plural target information as "retrieving target", or a stage structure of the process. For example, in database retrieving for retrieving the contents information Cts corresponding to some specified position data pd and viewing direction data dd, 2 stages are sequentially performed in the process.

At the first stage, the retrieving standard information is selected based on the given retrieving data. Information which matches or corresponds to the retrieving data is selected and extracted from the retrieving standard information recorded in the retrieving standard information unit RTd, as selected retrieving standard information. In the above-described case, the given retrieving data is the position data pd, and the corresponding position information p is selected from the set of position information set_p as the retrieving standard information, based on the position data pd.

Similarly, based on the viewing direction data dd as the given retrieving data, information which matches or corresponds to the viewing direction data dd is selected and extracted from the set of viewing direction information set_d recorded in the retrieving standard information unit RTd, as selected viewing direction information d.

At the second stage following the above stage, the contents unit CTd is searched based on the selected position information p and the viewing direction information d. The contents unit CTd is the set of contents information Cts, set_Cts, and the position information p and the viewing direction information d are linked to each contents information Cts. Further, generally, plural contents information Cts correspond to the position information p as a subset sub_p·Cts. Similarly, generally, plural contents information Cts correspond to the viewing direction information d as a subset sub_d·Cts.

At this stage, the contents information Cts, corresponding to the intersection i.e. the product set between the subset sub_p·Cts of contents information Cts corresponding to the selected position information p and the subset sub_d·Cts of contents information Cts corresponding to the selected viewing direction information d, is uniquely determined by retrieving, as the result of retrieving.

In FIG. 21, if position information p8 corresponding to the desired position data pd and viewing direction information d2 corresponding to the desired viewing direction data dd are selected as the retrieving standard information contents information Cts8e corresponding to the intersection between a subset sub_p8·Cts of contents information Cts corresponding to the position information p8 and a subset sub_d2·Cts of contents information Cts corresponding to the viewing direction information d2 is determined as the result of retrieving. The contents information Cts8e is outputted as information corresponding to the desired position data pd and viewing direction data dd from the database unit DB.

Further, although not shown, the retrieving is similarly made in the relation between the time data td, time information t, and the contents information Cts.

The contents information Cts is prepared for each kind of service, and mainly formed as video data and/or sound/audio data.

The video data is formed in frame units, in the following 2 forms.

(1) Form where no association or correlation exists among respective frame images There is no previously-determined rule among a series of plural frame images selected upon high-frequency retrieving, accordingly, the time-series of content of frame images as a result of retrieving differs in each required service. Further, the event data as request data is frequently updated in many cases. As an example, time-series of plural contents information Cts, updated at a high frequency in correspondence with a series of position data pd updated at a high frequency, belongs to this form.

(2) Form where a predetermined rule exists in the order of frame images

The time-series of content of frame images as a result of retrieving is not changed and the same in different required services. A photodrama belongs to this form. That is, the time-series of arrangement of the respective frame images is previously determined, and the same content is provided to different users.

Further, in this form, the event data as request data is not frequently updated in many cases. For example, the contents information Cts relating to a guide video image of historic sites, buildings, shops and the like belongs to this form. For example, if some spot is given as the event data, a guide video image of e.g., a play park existing in the spot is provided as a previously-prepared dynamic image. As this dynamic image changes as determined previously, it is not necessary to frequently update the event data.

In the present invention, the contents information Cts of this form is referred to as "peripheral information".

In a case where the contents information Cts of the above-described form (1) is compressed and stored in the database, as there is no previously-determined context in the order of the respective contents information Cts and the order differs in each case, a data compression method corresponding to this form is preferably a method in which a compression algorithm is completed in frame image units. In this form, a JPEG (Joint Photographic Expert Group) method, an intra-frame coding algorithm (MPEG-1 of the like) can be used. On the other hand, regarding compression and recording of the contents information Cts of the above-described form (2), as the order of the plural frame images is previously determined and the same in every case, interframe coding algorithms of various general moving image compression methods such as MPEG-2 can be used.

Further, in the present system, it may be arranged such that the recording of the contents information Cts in the database unit DB is performed in a non-compression method, and data compression is performed in the compiling means 0224 as the subsequent stage. Further, in the compiling means 0224, even plural contents information Cts in the above-described form (1) are inputted, since they are sequentially inputted in already-determined order, moving image compression by an interframe coding algorithm can be performed.

Further, regarding a position in which image sensing is possible, the contents information Cts obtained by image sensing can be prepared. Regarding a position in which image sensing is impossible, the contents information Cts can be prepared as a composite picture such as an imaginary picture, a computer graphic image or an animation image.

As the contents information Cts, in addition to the above-described video data and/or voice/audio data, data of still image or graph represented by map information can be stored. The contents information of this category is arbitrarily read as sub information of the contents information Cts of the above-described form (1) or (2) and used in embedding or hyper-link reference format.

Figure 22:
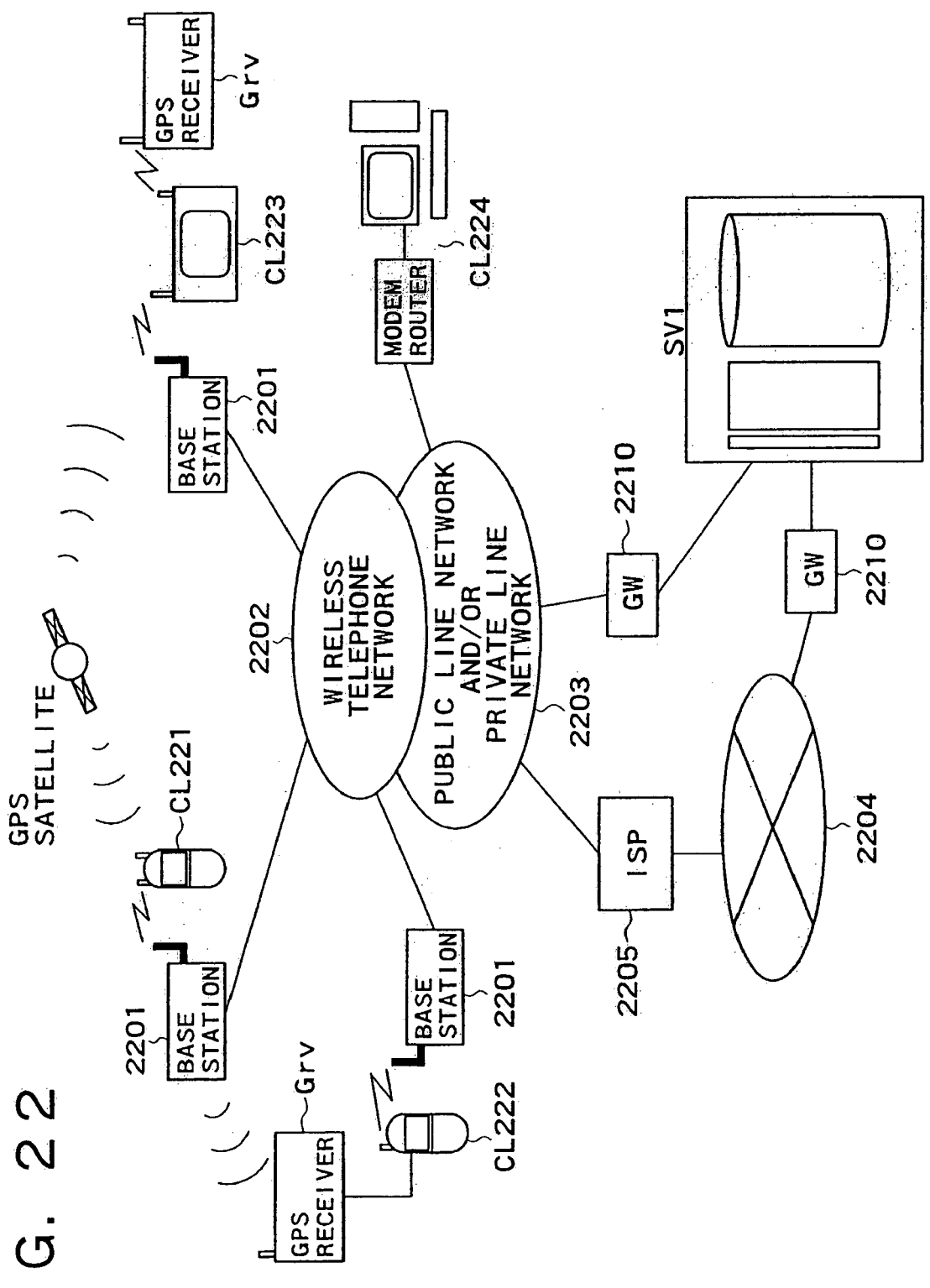
FIG. 22 is a diagram illustrating the communication system.

Communication System NT:

FIG. 22 is a diagram illustrating the communication system NT.

The communication system NT applied to the present invention forms a communication environment with a cable communication network and/or wireless communication network including a broadband wireless communication network 2202 such as a cellular phone network and/or a PHS (Personal Handy phone System) network and/or a satellite communication network and/or an automobile telephone network, a public line network and/or specialized line network 2203, and an Internet network (Internet backbone) 2204. In the broadband wireless communication network 2202, a spread spectrum method, for example, is used, and the Internet system includes the internet network 2204, a provider 2205, and the public line network and/or specialized line network 2203.

The cellular phone network which enables PDC (Personal Digital Cellular), for example, has a base station 2201 for wireless connection to the cellular phone, a packet switch (not shown) for routing of packet data passing within the network, a home memory station for registration of position of the cellular phone and the like. Further, the network has a packet processing module (PPM) and a packet gateway (PGW) for packet communication. Further, the public line network includes a subscriber telephone network and a PHS carrier network.

In a case where transmitted contents information Cts is mainly video image and voice data, it is a large amount data. Further, in a case where such information is formed at a high screen updating frequency based on high-frequency bidirectional information interchanging, a transmission system for a large data transmission amount must be ensured. Accordingly, the conventional PDC or PHS can be applied to the system, and further, as a more preferable communication system NT, an IMT-2000 (International Mobile Telecommunication-2000) system, an MMAC (Multimedia Mobile Access communication) system, a high-speed FWA (Fixed Wireless Access (subscriber wireless system)) system utilizing 22 GHz/26 GHz/38 GHz band, and a prospective wideband mobile communication system for 5 GHz band wireless access or 60 GHz band wireless access may be used. Thus broadband, high-quality and high screen updating frequency interchanging of the contents information Cts can be realized in a mobile communication environment.

As the receiving side connected to the communication system NT, a cellular phone CL221 having a GPS receiving unit to wireless-communicate with the base station (access point) 2201 and to receive a navigation message from a GPS satellite and perform positioning calculation, a cellular phone CL222 connected to a GPS receiver Grv as independent positioning means by cable connection or Bluetooth (short-range wireless communication standard) connection, a wireless portable terminal CL223 such as a PDA (Personal Digital Assistant) Bluetooth-connected to the GPS receiver Grv, and a personal computer CL224 connected to the public line network 2203 by a cable and/or wireless LAN can be used.

On the other hand, the sending side SV1 is connected to the Internet system or the specialized line network 2203 through the gateway server 2210, and functions as a service site. In a case where the sending side is connected to the Internet system, the sending side functions as a Web server.

WAP:

In the present invention, WAP (Wireless Application Protocol) is preferably employed as a protocol corresponding to mobile communication using a cellular phone.

WAP defines contents description language and communication protocol specifications for the mobile communication unit CL1 such as a cellular phone to browse Web contents from the site SV1 on the Internet with high efficiency. As the contents language corresponding to WAP, WML (Wireless Markup Language) is used. Further, the protocol stack structure for WAP consists of layers, from the top, WSP (Wireless session Protocol), WTP (Wireless Transaction Protocol), WDP (Wireless Datagram Protocol) or UDP (User Datagram Protocol), IP (Internet Protocol), and PPP (Peer-to-Peer Protocol).

When the site SV1 is connected to the Internet system, it provides contents information in various data formats as a Web server. The site SV1 provides contents information HTML·Cts in conformity with HTML (Hyper Text Markup Language) generated for existing Internet browsers, and contents information WML·Cts in conformity with WML generated for cellular phones under an WAE (Wireless Application Environment) environment as the content information. Further, it may be arranged such that the site SV1 provides XHTML contents information.

The contents information HTML·Cts is sent as an HTTP response in conformity with HTTP (Hyper Text Transfer Protocol) protocol from the site SV1, and the contents information WML·Cts is sent as a WSP response in conformity with the WSP protocol.

The contents information WML·Cts in conformity with WML as the above-described WSP response can be browsed by the mobile communication unit CL1 such as a cellular phone having a browser corresponding to WAP with a Web access function. Regarding the contents information HTML·Cts in conformity with HTML as the above-described HTTP response, as it must be converted in the middle of communication, a WAP gateway exists in the Internet system for this purpose.

The WAP gateway corresponds to the gateway server 2210 in FIG. 22. The WAP gateway exists in a relay point between the site SV1 to provide various information and the mobile communication unit CL1 corresponding to WAP to receive the information provided from the site, and performs conversion between different data and between different protocols. In the above case, the WAP gateway functions as a contents filter to convert the contents information HTML·Cts in conformity with HTML prepared in the site SV1 to the contents information WML·Cts in conformity with WML, and performs conversion from the HTTP response to the WSP response, and supplies the information to the mobile communication unit CL1.

MPEG4:

In the present invention, MPEG4 is preferably employed as a standard for data compression of the contents information Cts. MPEG4 corresponds to high-level moving image format as well as coding technology for low-speed line for cellular phone. The coding algorithm is a hybrid method as a combination of motion-compensated interframe prediction coding (MC) and discrete cosine transform (DCT), where the MC removes redundancy in time-axial direction between image frames and the DCT removes redundancy in spatial direction on 2-dimensional screen.

MPEG4 is a moving image compression method using plural types of VOPs (Video object Planes) and arrangement information (information on arrangement of each VOP in unit image data), to encode data to MPEG4 format data.

In the sending side SV1, upon encoding of the contents information Cts, if 1 frame image data is given, the data is divided into VOPs as plural types of images, and arrangement information indicating an area (segment) of each VOP in the frame is generated. Then, compression processing (encoding) is performed on the respective VOPs, and the results of encoding of the respective VOPs and the arrangement information are combined into compressed image data.

On the other hand, in the receiving side CL1, upon decoding, if compressed image data corresponding to plural types of VOPs is given, the respective VOPs and the arrangement information of the respective VOPs in unit image data are extracted, then decoding for each VOP is performed. The decoded image data is combined based on the arrangement information, thereby an original image corresponding to an MPEG4 bit stream is reproduced.

Positioning System:

Next, the positioning system will be described as an example of implementation of the position data providing means 0101, As described above, the position data providing means 0101, which provides the position data pd, generates a current position or virtual position of the receiving side CL1. The positioning system obtains data on the current position. Preferably, GPS (Global Positioning System) is applied to the positioning system.

The Global Positioning System (hereinafter GPS) receiver functions as a pocket-notebook size cellular type or vehicle-mounted type GPS receiver. The GPS measures delay time of radio waves come from plural GPS satellites in a current spot at desired time, and based on calculated distances between the positions of the respective satellites in orbit and the spot, calculates coordinate position of the current spot by trigonometry.

To obtain current position information (longitude, latitude and altitude) by the above-described satellite positioning, it is necessary to directly receive radio waves from at least 4 GPS satellites. Further, to calculate position information by measuring the distances from the respective GPS satellites, it is necessary to obtain accurate orbits of the respective GPS satellites and accurate time measurement information. For this purpose, the GPS receiver receives navigation messages from the respective GPS satellites to calculate the orbits of the satellites.

The navigation message for positioning supplied from the GPS satellite includes satellite time correction information, satellite orbit information (ephemeris), satellite information of GPS satellite group (almanac), ionospheric correction data and the like. The GPS receiver receives GPS radio wave of e.g. 1.5 GHz sent from the GPS satellite by a GPS reception antenna and obtains the navigation message, and performs satellite positioning based on the time, ephemeris data, almanac data and the like.

As a procedure of satellite positioning, the GPS receiver sequentially generates code patterns of all the GPS satellites to search for radiowave-receivable satellites and try to acquire them. When the GPS receiver acquires a GPS satellite, the receiver receives at least 1 cycle of navigation message from the GPS satellite to obtain the almanac data. 1 cycle of navigation message (master frame) comprises 25 main frames each having 5 subframes.

When the almanac data is obtained by acquiring any of the GPS satellites as described above, as a brief current position and time of the GPS receiver can be obtained, another GPS satellite in acquisition position is selected based on the almanac data and the brief current position and time. Then, with the tentative current position and time as initial values, comparison of the tentative current position is repeated with a pseudo distance obtained from the satellite position obtained from the ephemeris data and the position information obtained from the signal from the satellite, thereby the current position is measured as longitude data, latitude data and altitude data. The ephemeris data is information for calculation of the orbit of GPS satellite.

The GPS receiving system is a multi-channel system such as a 2 or 3 channel low-speed sequencing reception system, high-speed sequencing (multiplex) reception system, continuous tracking (multi channel) reception system or the like for the purpose of simultaneously receiving the navigation data from the plural satellites to reduce time before start of positioning calculation.

Figure 23:
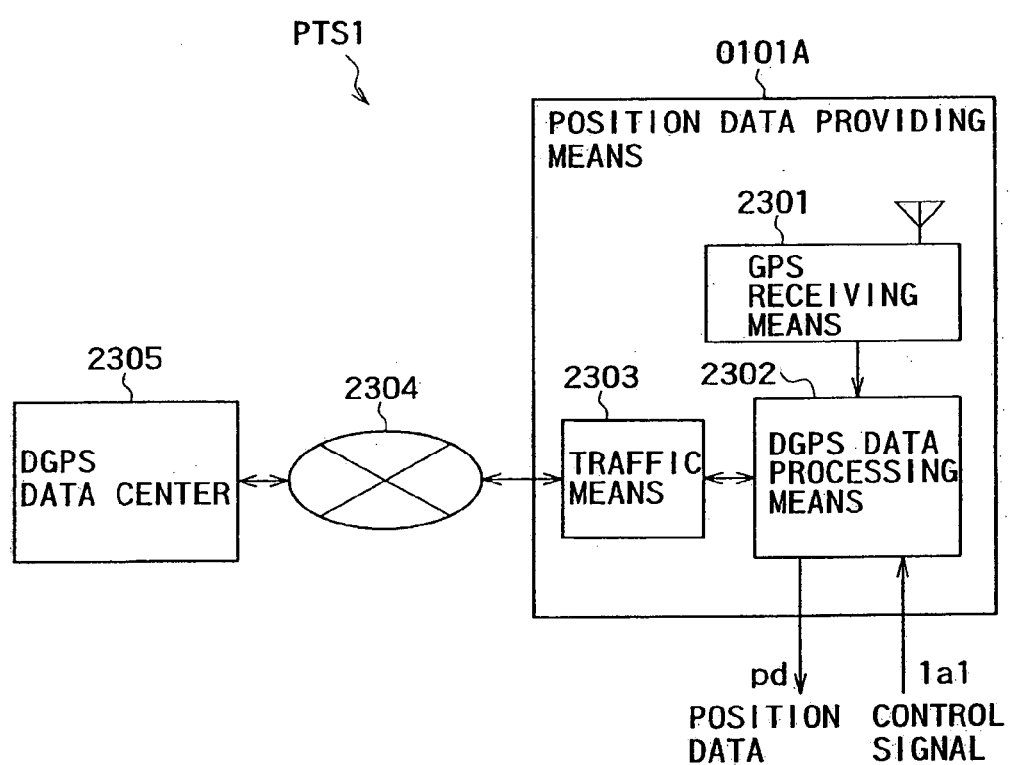
FIG. 23 is a diagram illustrating one example of the positioning system with a differential GPS.

Since the current position (latitude, longitude and altitude) obtained as above is calculated based on the information of the navigation messages received from the GPS satellites, if the status of radio wave propagation at that time changes, differences occur in time measurement values, and differences occur in the calculated distances. Accordingly, differential GPS (Differential Global Positioning System: DGPS) is introduced for improvement in positioning accuracy by relative positioning using difference information. FIG. 23 is a diagram illustrating one example of the positioning system with the differential GPS.

The differential GPS improves positioning accuracy by correcting differences in the above-described calculated distances. A DGPS positioning system PST1 has positioning data providing means 0101A, transmission means (Internet, FM broadcast or the like) 2304, and a DGPS data center 2305. Further, the position data providing means 0101A has GPS receiving means 2301, DGPS data processing means 2302 and communication means 2303.

The GPS receiving means 2301 receives the radio wave sent from the GPS satellite by a reception antenna and forwards the radio wave to the DGPS data processing means 2302. The DGPS data processing means 2302 extracts the time, the almanac data, the ephemeris data and the like from the obtained navigation message, calculates a distance based on the extracted data, and calculates a current position (uncorrected). Further, the DGPS data processing means 2302 sends a request command incorporating information specifying the GPS satellite and the brief current position of the position data providing means 0101A, through the communication means 2303 as a communication interface and through the transmission means 2304, to the DGPS data center 2305.

On the other hand, plural reference stations (not shown) in plural spots with accurately-known coordinate positions on the earth, always send delay time data, obtained from radio waves received at the current time from the GPS satellites, to the DGPS data center 2305. When the DGPS data center 2305 receives the request command from the position data providing means 0101A, selects an appropriate reference station based on the brief current position of the position data providing means 0101A, then specifies the corresponding GPS satellite based on the information specifying the GPS satellite, then obtains a coordinate position (uncorrected) of the reference station based on a distance calculated from delay time at the current time (measured between the selected reference station and the specified GPS satellite), compares the position with the already-known accurate coordinate position to determine an error correction coefficient at the current time. The DGPS data center 2305 transmits the error correction coefficient as DGPS correction data, through the transmission means 2304, to the DGPS data processing means 2302 of the position data providing means 0101A. In this manner, the DGPS data center 2305 generates and supplies the DGPS correction data relating to the GPS satellite in the position at the time, When the DGPS correction data is returned, the DGPS data processing means 2302 corrects the uncorrected position based on the correction data, and outputs the corrected position, as accurate position data pd, to the above-described capturing means 0202.

In this manner, the DGPS attains positioning accuracy to within 1 meter by providing an error correction coefficient, obtained by using a reference station installed in an already-known place, as correction data, to the OPS receiver in the same place.

Note that the DGPS data processing means 2302 has a differential calculation algorithm in addition to a positioning algorithm. In a case where position correction is performed with correction data by differential calculation, correction of pseudo distance is performed in RTCM as a standard differential correction format or the like. Further, it may be arranged such that the DGPS data processing means 2302 captures the control signal 1a1 or the like from the above-described frequency controlling unit 0111 or the like, performs the above-described processing at the standard frequency stfQ, and outputs the position data pd at the standard frequency stfQ.

Further, as a global positioning system, in addition to the GPS and differential GPS, a quasi-zenith positioning system using a quasi-zenith satellite as a next-generation communication satellite may be employed. In the quasi-zenith positioning system, plural satellites are moved around in 8-shaped orbit such that any of the satellites is always positioned at the zenith of the heavens. As this system obtains position data by positioning with higher accuracy than that of the DGPS and reduces TAT upon measurement, it can be preferably applied to the present invention.

Further, it goes without saying that the positioning means is not limited to the above-described GPS, DGPS and quasi-zenith positioning system, but any other positioning means such as a radio wave positioning system based on PHS base station information can be applied to the invention.

In what follows, the second to ninth embodiments will be described in due order.

The Second Embodiment

The first embodiment mentioned above is characterized in that it confirms the maximum frequency information in the service start adjusting stage by referencing the previously given table.

By contrast, the second embodiment (as the contents information interchanging system) sequentially carries out the service start adjusting stage and the service executing stage as in the case of the preceding embodiment. However, it issues test data in the service start adjusting stage at a high frequency. Then, it measures the screen realized for each combination of the receiving side (client) CL2, the sending side (server) SV2, and the communication system NT which are used, and it confirms the maximum quality of service which this combination can offer. This shall be the maximum frequency mxfQ. This called "verification" by actual measurements, it conforms to (Q1.1) give above.

The second embodiment is a combination the receiving side (client) CL2, the sending side (server) SV2, and the communication system NT connected thereto. It is based on the principle of pd→Cst, denoted according to the above-mentioned definition, where pd stands for position data as request data in the service execution stage. Moreover, it is assumed that frequency control is carried out in the client CL2, and frequency control is performed on the capturing means 0202.

Figure 24:
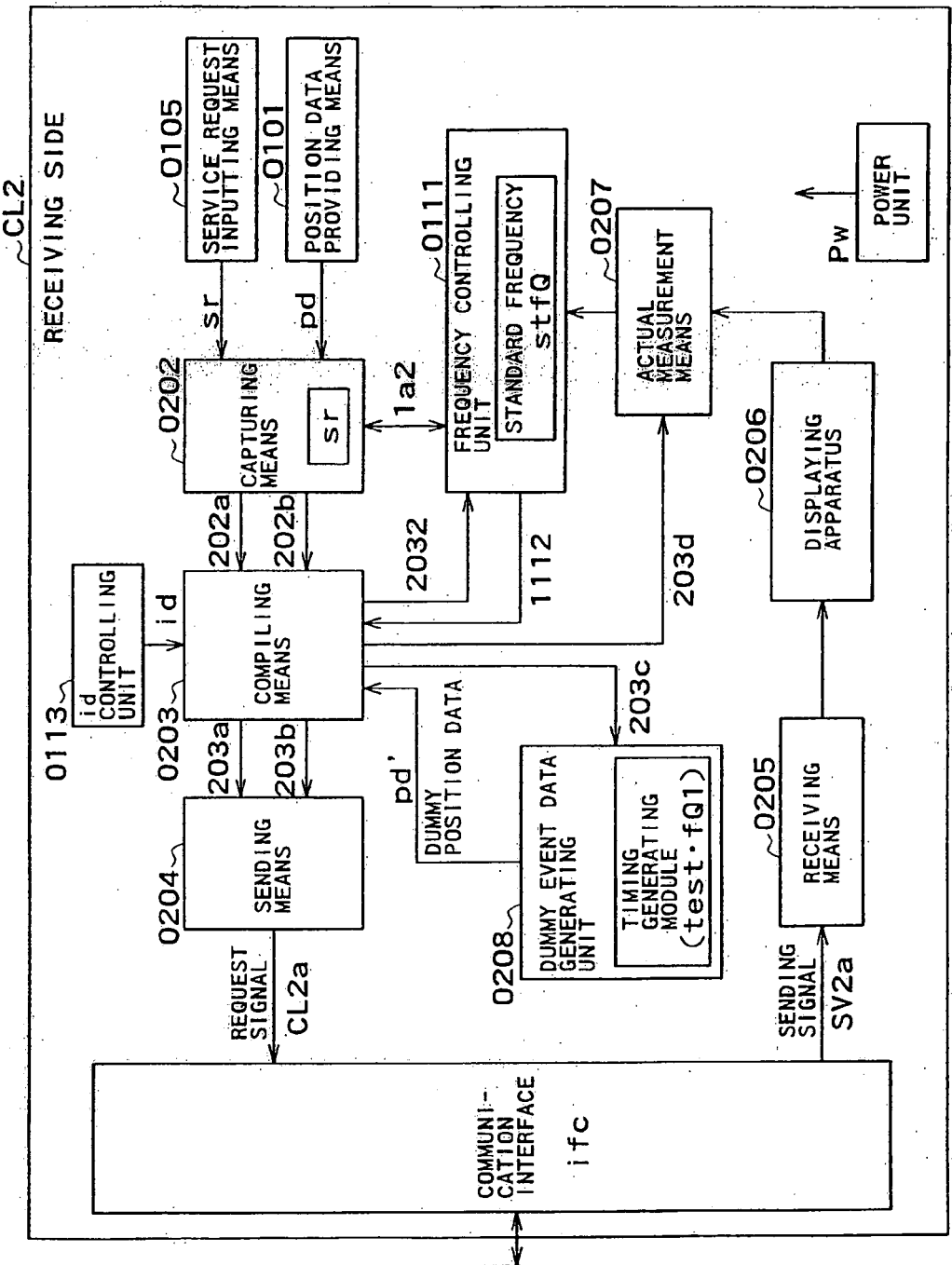
FIG. 24 is a block diagram showing the receiving side in the second embodiment of the contents information interchanging system according to the present invention.
Figure 25:
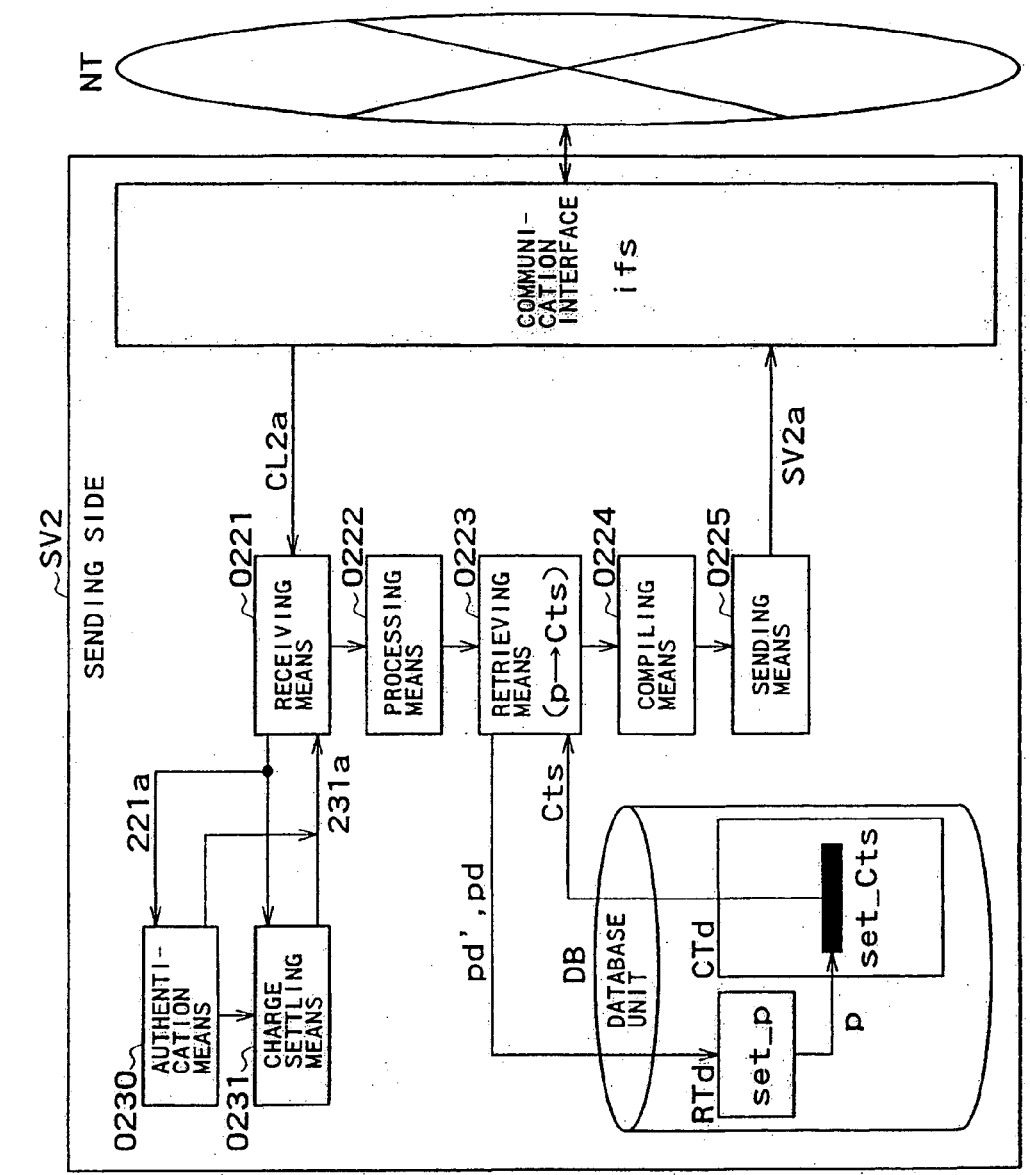
FIG. 25 is a block diagram showing the sending side in the second embodiment of the contents information interchanging system according to the present invention.
Figure 26:
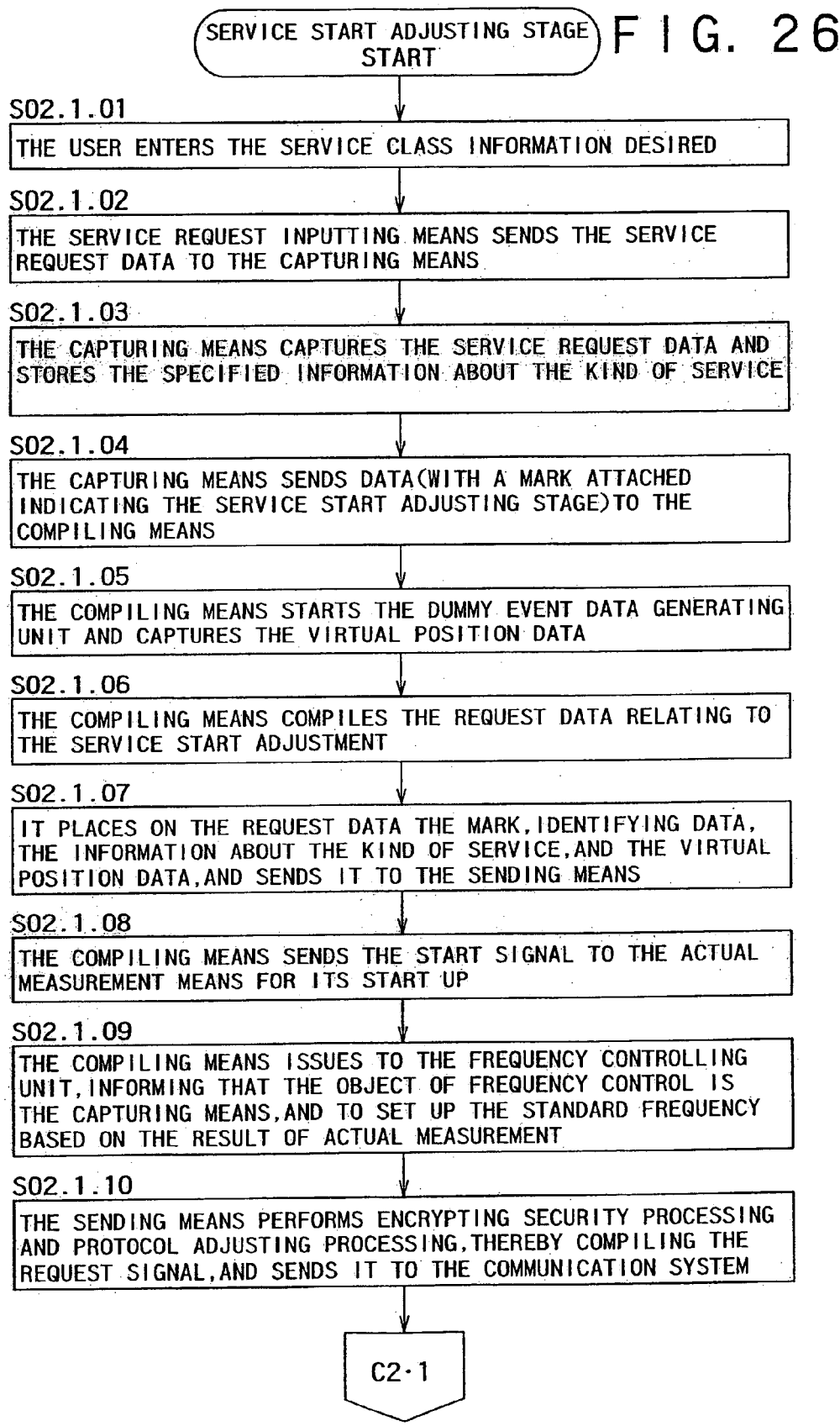
FIG. 26 is an action flowchart in the service start adjusting stage according to the second embodiment.
Figure 27:
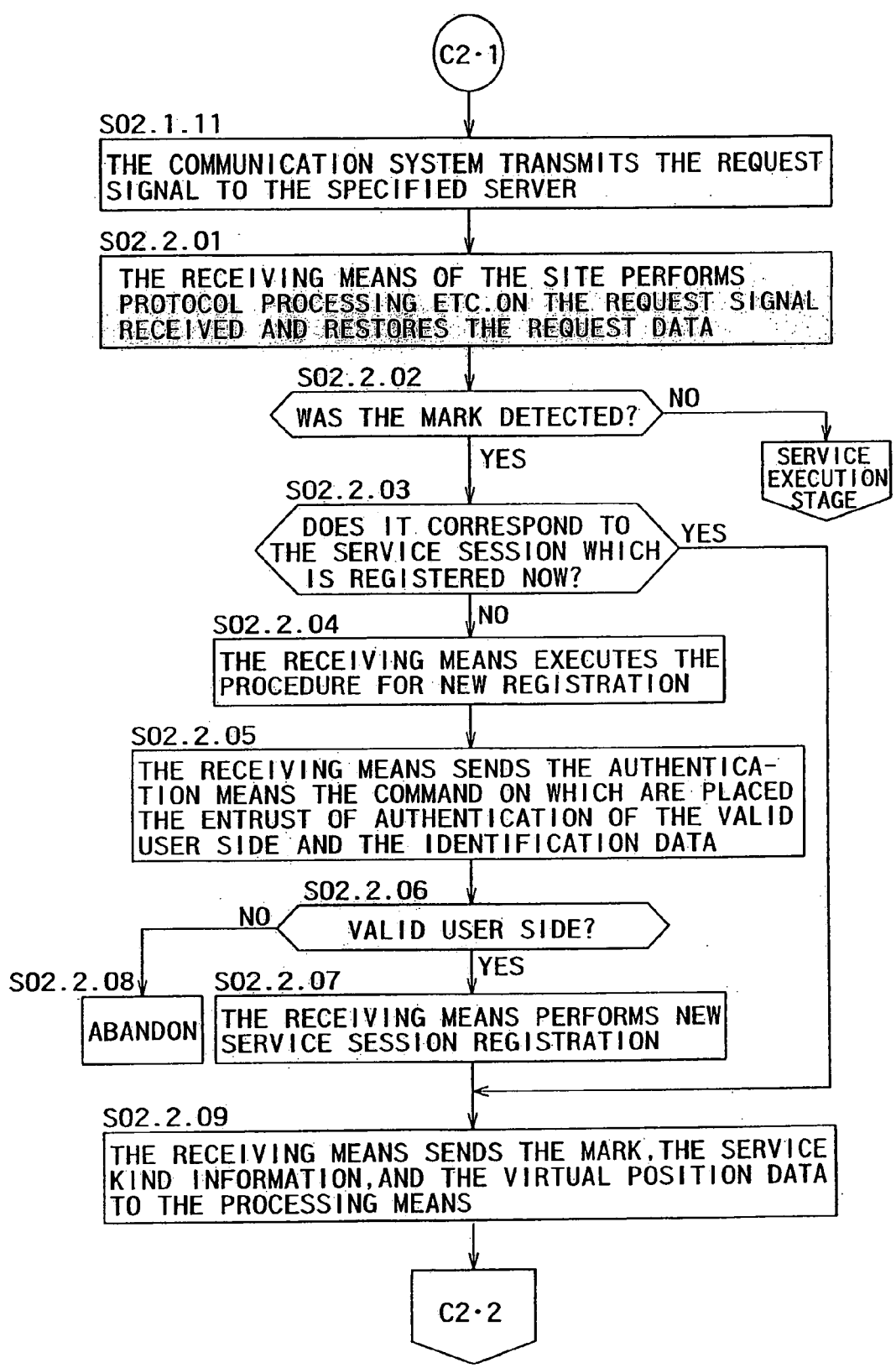
FIG. 27 is an action flowchart that follows FIG. 26.
Figure 28:
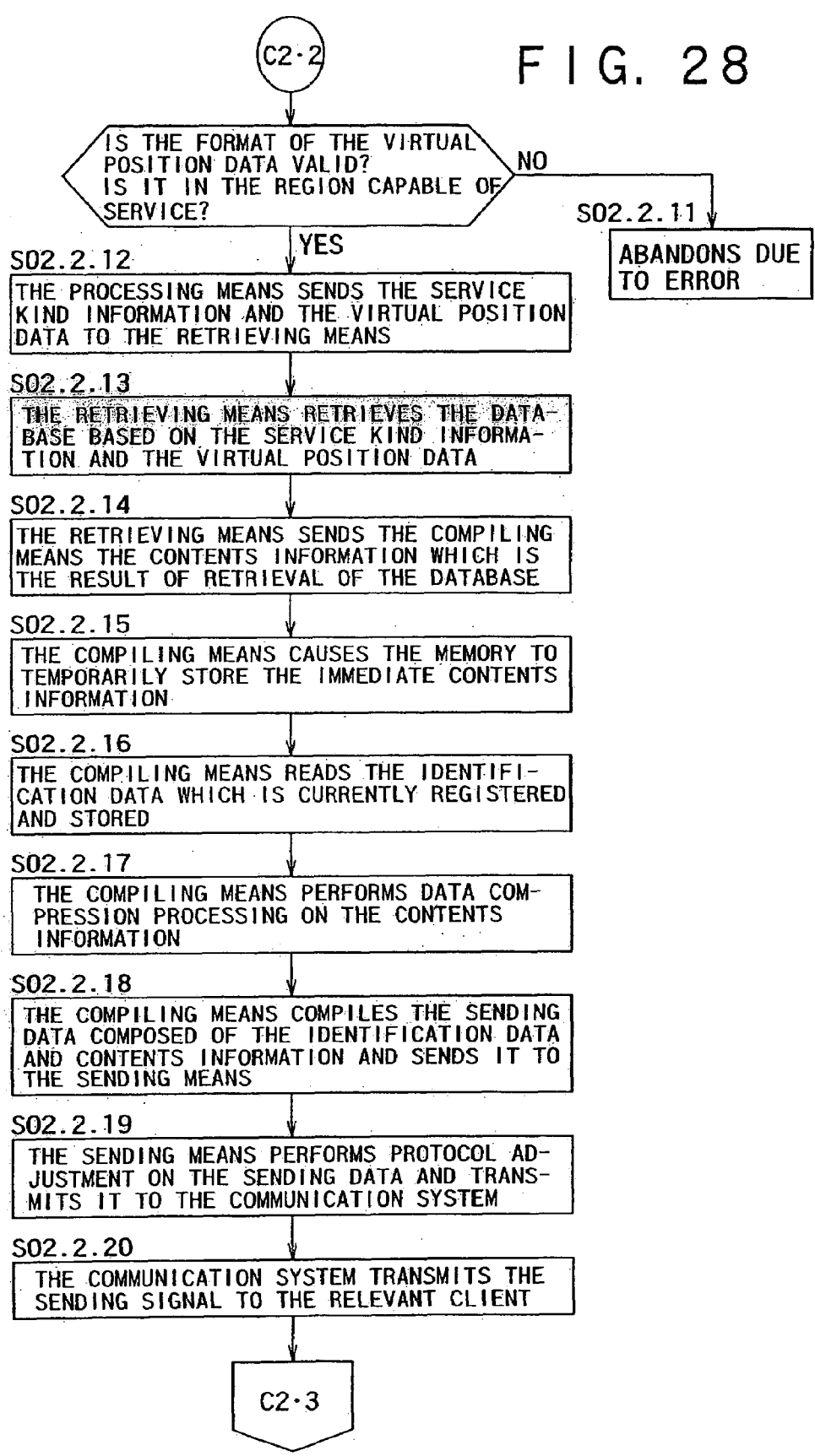
FIG. 28 is an action flowchart that follows FIG. 27.
Figure 29:
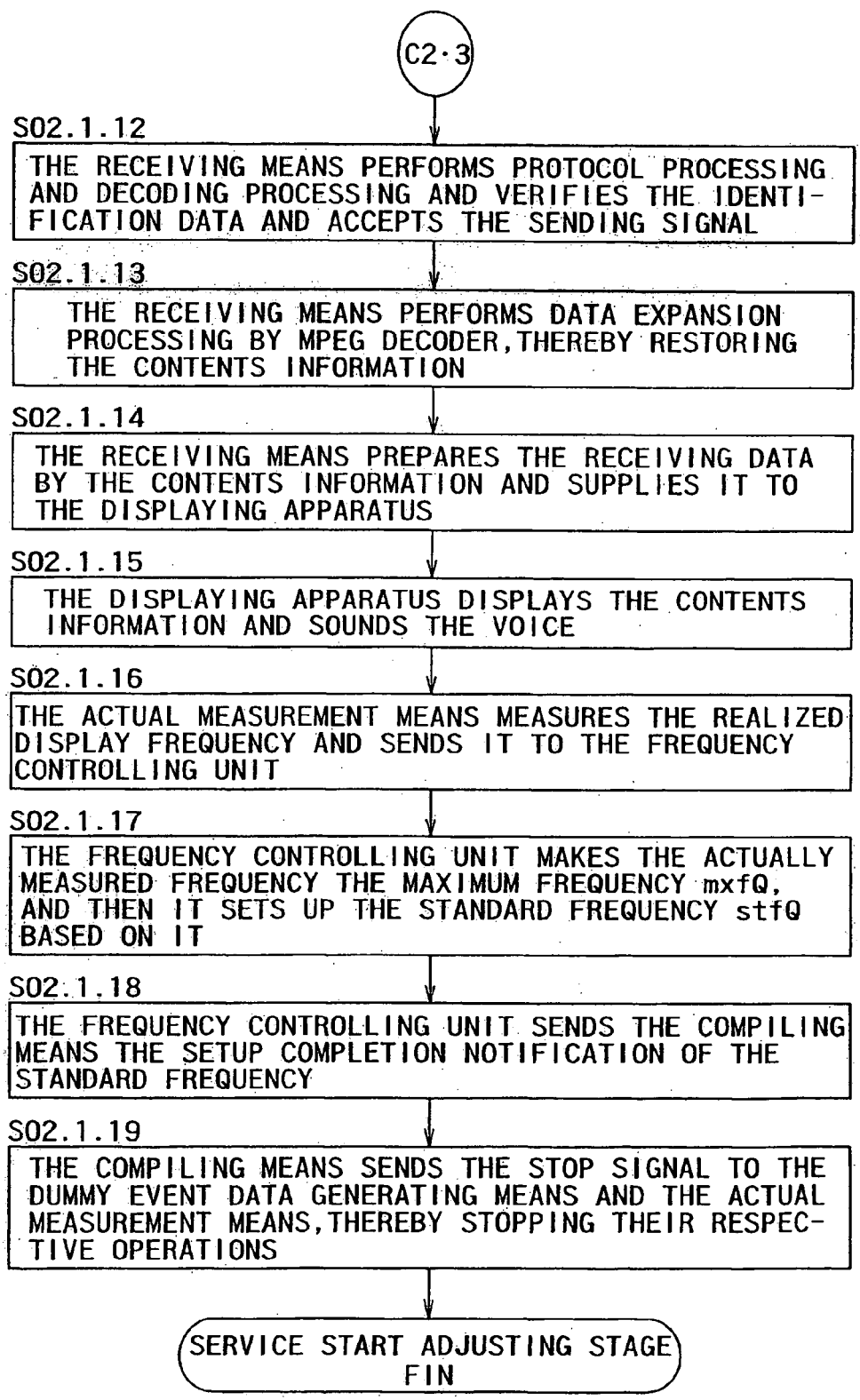
FIG. 29 is an action flowchart that follows FIG. 28.

FIG. 24 is a block diagram showing the client CL2, and FIG. 25 is a block diagram showing the server SV2. Incidentally, the description in the preceding embodiment will be applied to this embodiment for the same parts.

Figure 30:
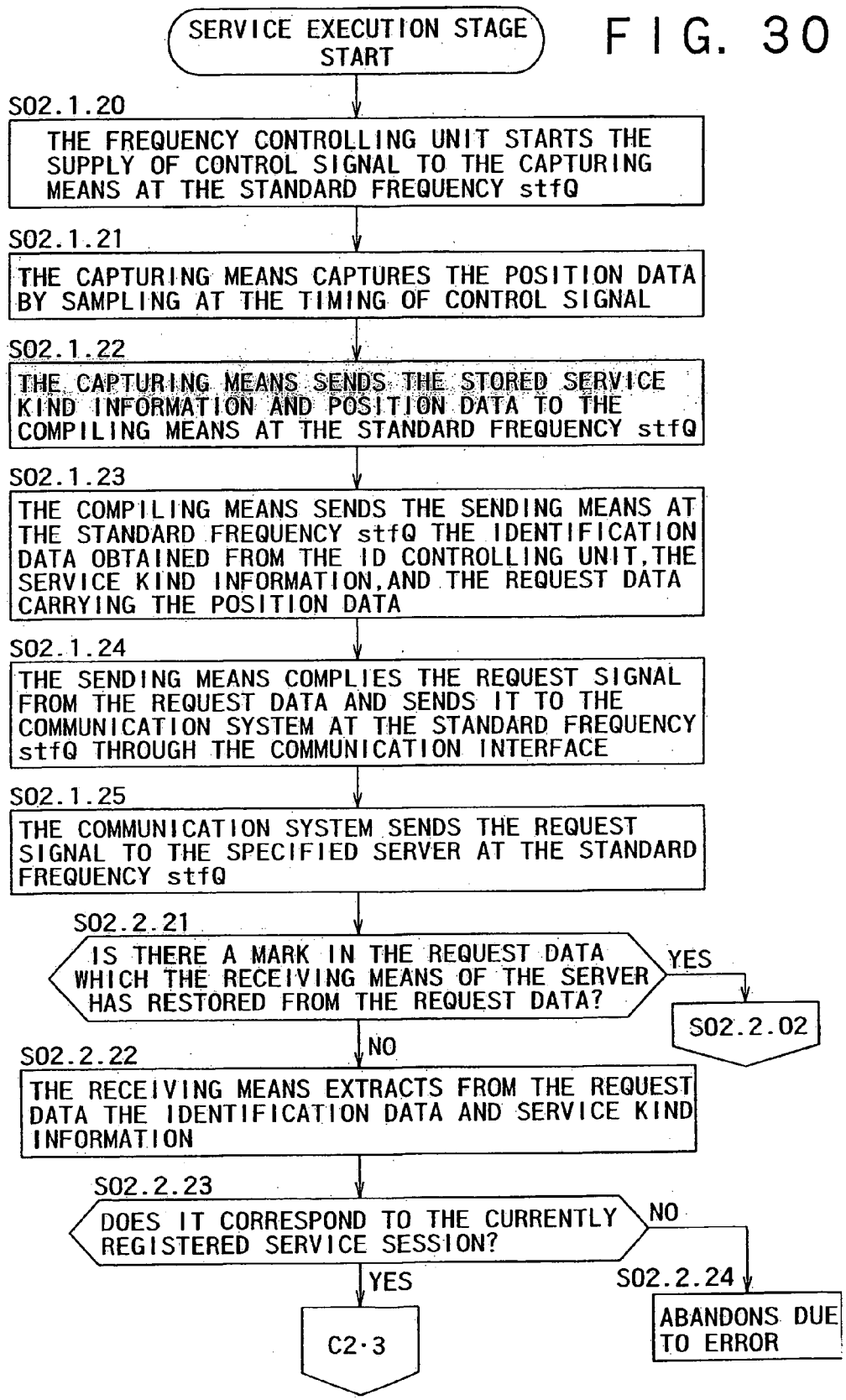
FIG. 30 is an action flowchart in the service execution stage according to the second embodiment.
Figure 31:
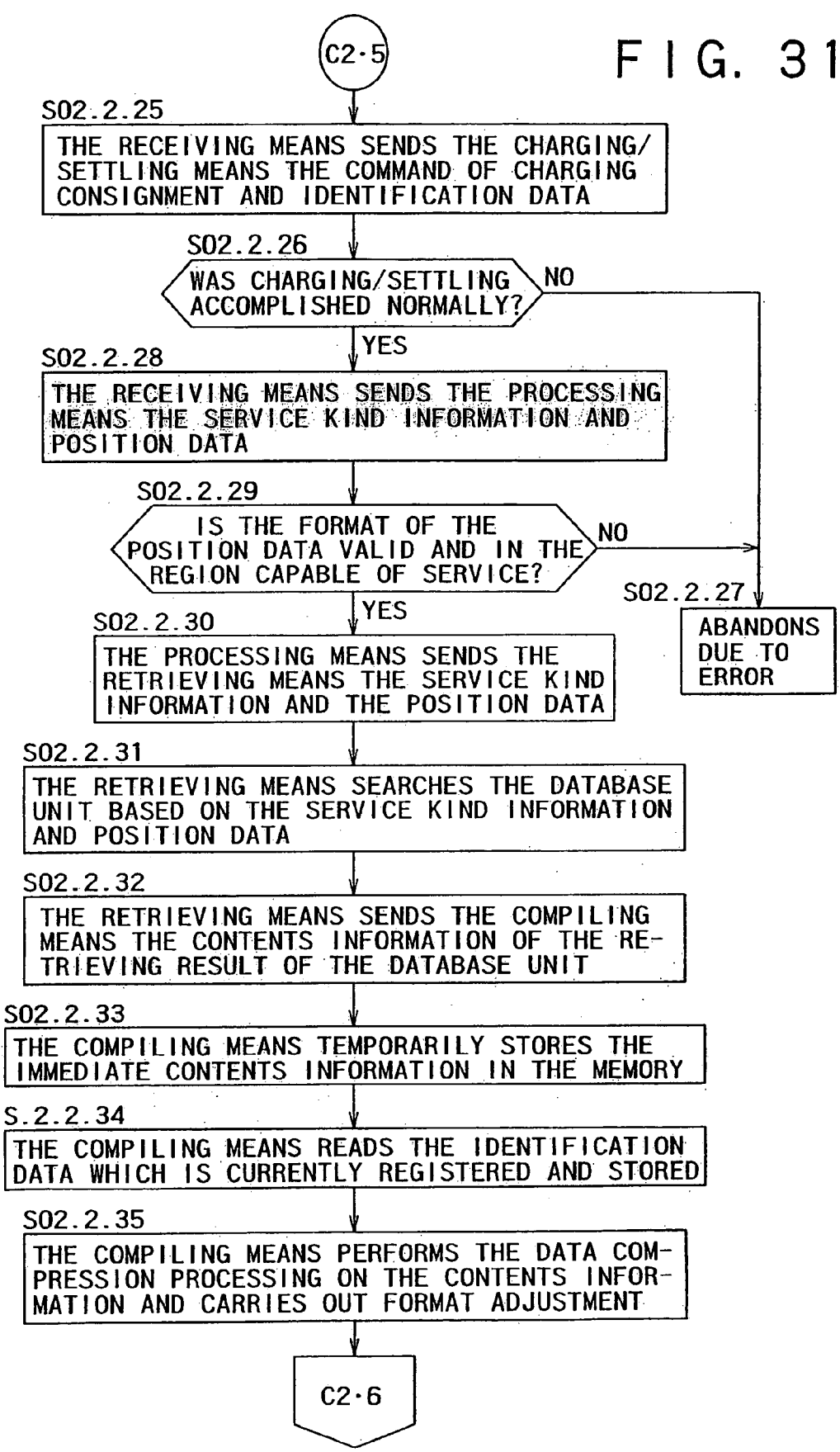
FIG. 31 is an action flowchart that follows FIG. 30.
Figure 32:
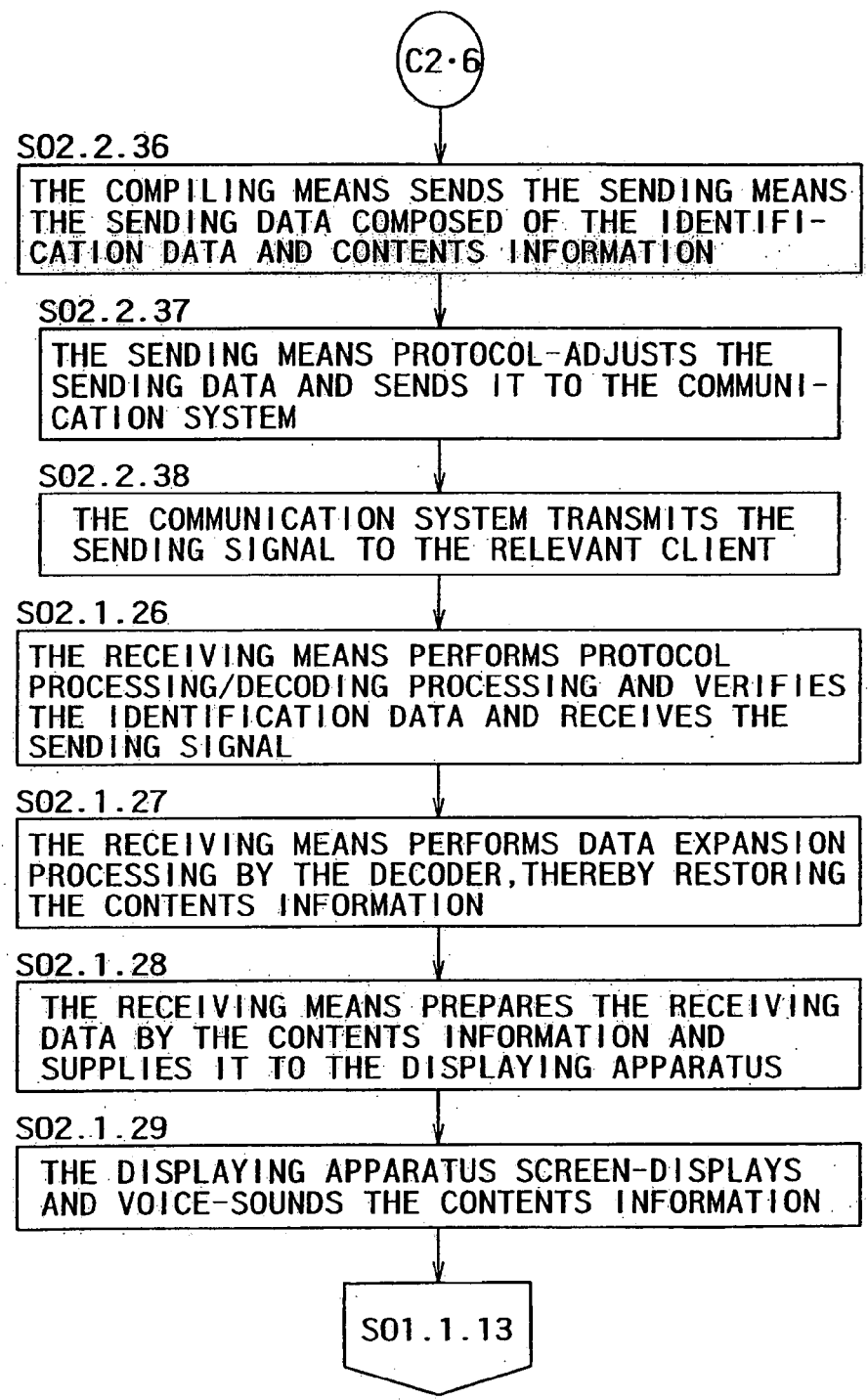
FIG. 32 is an action flowchart that follows FIG. 31.

FIGS. 26 to 29 are flow charts showing how the service start adjusting stage works in the second embodiment. FIGS. 30 to 32 are flow charts showing how the service execution stage works.

The client CL2 is a computer-based machine having the wireless/wire communication function. As with the above-mentioned receiving side CL1, it should preferably be mobile communication equipment such as portable telephone, car telephone, and PDA. It may also be a stationary personal computer, work station, or game machine.

The client CL2 consists of the position data providing means 0101 (used to enter position data pd), the service request inputting means 0105 (used to enter service request data sr), the capturing means 0202, the dummy event data generating unit 0208, the compiling means 0203, the sending means 0204, the communication interface ifc, the frequency controlling unit 0111, the id controlling unit 0113, the receiving means 0205, the displaying apparatus 0206, the actual measurement means 0207, and the power unit Pw.

The capturing means 0202 works in almost the same way as that in the preceding embodiment, except that it performs capture at the standard frequency stfQ on receipt of the control signal 1*a*2 from the frequency controlling unit 0111.

The dummy event data generating unit 0208 generates and updates repeatedly the virtual position data pd' for test (as the dummy event data) at a high test frequency test·fQ1 and then provides it to the compiling means 0203. It is started and stopped by the signal 203 received from the compiling means 0203. The dummy event data is designed to test the limit of the frequency that can be achieved by the system. Therefore, it should preferably be able to generate the test frequency test·fG1 at as high a frequency as possible. However, the frequency should not exceed the maximum possible processing frequency (predetermined and indicated, or specified and entered) of the generating group 0201 and the capturing means 0202 in the preceding stage.

The timing of the test frequency test·fQ1 is controlled by the timing generating module possessed by the dummy event data generating unit 0208. The timing generating module works based on the timer. The timing generated by the timing generating module is variable, and it can be set and changed as desired by external input.

The compiling means 0203 receives data carrying the above-mentioned mark from the capturing means 0202. Then, if it judges as the start of the service start adjusting stage, it sends the dummy event generating unit 0208 the signal 203*c* for start-up, thereby starting it. Then, it captures the virtual position data pd, from the dummy event data generating unit 0208, and it compiles the request data 203*a* for start adjustment.

The request data 203*a* being sent to the sending means 0204 carries the above-mentioned mark, the identification data id (including the resource information such as the kind of equipment), the information of class of service, and the virtual position data pd'.

Then, it sends the actual measurement means 0207 the start signal 203*d* for its start-up. It further issues to the frequency controlling unit 0111 the instruction 2032 to set up the standard frequency based on the measured results from the actual measurement means 0207.

On receipt of the notification 1112 (informing that the standard frequency has been set up) from the frequency controlling unit 0111, it sends the dummy event data generating unit 0208 the stopping signal 203*c*, thereby stopping it. Thus, the service start adjusting stage is terminated.

As with the preceding embodiment, the service execution stage compiles the request data 203*b* carrying identification data, service class information, and position data pd, and sends it to the sending means 0204. In addition, the request data 203*b* is sent repeatedly to the sending means 0204, with position data pd (as event data) updated repeatedly with the lapse of time.

Incidentally, the compiling means 0203 may be so constructed as to be able to control the action of the actual measurement means 0207 and the frequency controlling means 0111 so that the above-mentioned actual measurement and verification can be performed appropriately even in the service execution stage. This gives the function to cope with fluctuation in the circuit which might occur while the service execution stage is proceeding.

The actual measurement means 0207 starts in response to the start signal 203*d* received from the compiling means 0203 in the service start adjusting stage and actually measures the frequency at which the screen of the displaying means 0206 is updated. The result of actual measurements (or the information of screen updating frequency) is sent to the frequency controlling unit 0111. Actual measurements are accomplished by detecting the VRAM updating signal (for entire or partial screen) from the drive circuit of the liquid crystal display possessed by the displaying means 0206, or by detecting the frequency of generation of the image data supplied from the receiving means 0205 to the displaying means 0206. On receipt of the stop signal 203*d* from the compiling manes 0203, it stops its operation. The start-stop control mentioned above causes the machine to operate only at the time of need, thereby saving battery consumption.

In the foregoing, operation for actual measurements takes place in the service start adjusting stage; however, it is also possible that operation for actual measurements takes place in the service execution stage according to control from the compiling means 0203 and other means.

In the service start adjusting stage, the frequency controlling unit 0111 receives from the compiling means 0203 the instruction 2032 to set up the standard frequency based on the results of actual measurements by the actual measurement means 0207. Then, it receives the information about the actually measured screen updating frequency which has been sent from the actual measurement means 0207. According such information, it sets up the standard frequency stfQ. The standard frequency stfQ may be equal to the actually measured screen updating frequency, for example. Subsequently, it sends the compiling means 0203 the notification 1112 informing that the set up of the standard frequency stfQ is completed. In the service executing stage, it issues the control signal 1*a*2 at the standard frequency stfQ and sends it to the capturing means 0202.

In the foregoing, the frequency controlling unit 0111 operates in the service start adjusting stage. However, it may also work in the service execution stage such that it captures the information about actually measured screen updating frequency from the actual measurement unit 0207 according to control from the compiling means 0203 and other means, and it updates the standard frequency stfQ based on it.

Other means and parts operate and function in almost the same way as those in the preceding embodiment. The description given above is applicable to them.

The server SV2 consists of the communication interface ifs, the receiving means 0221, the authenticating means 0230, the charge settling means 0231, the processing means 0222, the retrieving means 0223, the database unit DB, the compiling means 0224, the sending means 0225, and a power unit (not shown).

The receiving means 0221 detects the above-mentioned mark and the virtual position data pd' in the request signal CL2*a* received. Upon detection, it recognizes that it is in the service start adjusting stage and the dummy event data has been attached. It performs the authenticating processing (mentioned above) and sends the virtual position data pd' to the processing means 0222. After processing by the downstream means, the appropriate contents information Cts is sent to the client CL2 in the service start adjusting stage.

Incidentally, the receiving means 0221 and other means operate and function in the same way as in the preceding embodiment. The description given therein is applicable to them.

The following is concerned with operation. The flow of operation given below is composed of two stages—the service start adjusting stage and the service execution stage.

Operation in the Service Start Adjusting Stage in the Second Embodiment:

A mention is made below with reference to FIGS. 26 to 29. The user demanding the start of service operates the service request inputting means 0105 of the client CL2 and manually enters the information about the kind of service desired (information including at least the desired server, the kind of contents information, and the specified position data as the event data) (Step S02.1.01). As a result, the service request inputting means 0105 generates the service request data sr carrying the information about the kind of service and sends it to the capturing means 0202 (Step S02.1.02).

The capturing means 0202 confirms that the received signal has originated from the service request inputting means 0105 and thereby detects that it is the service request demand data sr indicating the trigger in the service start adjusting stage. Immediately thereafter, the capturing means 0202 confirms the content and stores the information about the kind of service which is carried by the service request data sr (Step S02.1.03).

There are several kinds of servers to offer contents information. Moreover, the quality of service (such as frequency of screen updating) differs from one server to another. Therefore, the client CL2 is required to confirm, before execution of service, the quality of service that can be realized by the current combination of equipment. Consequently, the capturing means 0202 attaches a mark to the received service request data sr, notifying of the service start adjusting stage, and sends it as the data 202a to the compiling means 0203 (Step S02.1.04).

The compiling means 0203 detects the mark notifying of the service start adjusting stage in the data 202a sent from the capturing means 0202 and then judges that the service start adjusting stage has started. Then, it sets up the standard frequency. In this constitution, in order to verify by actual measurement the maximum frequency necessary to set up the standard frequency, it sends the dummy event data (as the test data) to the server SV2.

Then, it sends the start signal 203c to the dummy event data generating unit 0208. It captures the virtual position data pd' which the dummy event data generating unit 0208 generates at the high test frequency test·fQ1 (Step S02.1.05). It compiles the request data 203a relating to the start adjustment (step S02.1.05). It places on this request data 203a the mark, identifying data id, the information about the kind of service, and the virtual position data pd', and sends to the sending means 0204 (Step S02.1.07). Then it sends the actual measurement means 0207 the start signal 203d, thereby starting it (Step S02.1.08). It issues to the frequency controlling unit 0111 instructing to set up the standard frequency based on the result of actual measurement from the actual measurement means 02007 and it also issues the notification 2032 informing that the object of frequency control is the capturing means 0202 (Step S02.1.09).

Then, the sending means receives the request data 203a sent from the compiling means 0203, performs encrypting security processing and protocol adjusting processing on it, compiles the request signal CL2a addressed to the server SV2, and sends it to the communication system NT through the communication interface ifc (Step 502.1.10). Here, if the processing cannot follow the test frequency test~fQ1, operation is to proceed at the frequency Req·fQ1 sent which is lower than this.

The communication system NT transmits it to the specified server SV2 (Step 02.1.11). Here, if the processing cannot follow the frequency Req·fQ1 sent, transmission is to proceed at the transmission frequency trf·fQ1 which is lower than this.

Then, the receiving means 0221 of the server SV2 receives, through the communication interface ifs, the request signal CL2a which has been sent to itself from the client CL2 through the communication system NT. It carries out protocol processing and decoding processing, thereby expanding data and restoring the request data (Step S02.2.01) and inspects whether or not there is the mark in the request signal CL2a (Step S02.2.02). Here, if the mark is not detected, being the service execution step, operation proceeds to Step S02.2.22 mentioned later. On the other hand, if the mark is detected, it recognizes that the stage is the service start adjustment stage, and it extracts the user's identification data id from the request data and the information about the kind of service desired. Based on this it judges whether or not it is the service session which is currently registered (Step S02.2.03). If it is confirmed to the currently registered service session, it judges that it is the continuation of the service which is going on now, and operation proceeds to Step S02.2.09.

On the other hand, if there is no service session which is currently registered or if there is no relevant one, a procedure for new registration is carried out (Step S02.2.04). Then, in order to entrust authentication that this client CL2 is the valid user side, it sends the authenticating means 0230 the command 211a on which are placed the mark to indicate the entrust of authentication and the identification data id (Step S02.2.05).

And, it receives from the authenticating means 0230 the result notification 231a (Step S02.2.06); if the user side is the valid one, it newly registers service session and fixes (Step S02.2.07); and if the user is not the valid one, it abandons this request signal CL2a (Step S02.2.08).

After the receiving means 0221 has fixed the above-mentioned service session, it sends the mark, the service kind information, and the virtual position data pd' to the processing means 0222 (Step S02.2.09). Here, if it does not follow the transmission frequency trf·fQ1, it sends at the receiving frequency a·fQ2 which is lower than this.

The processing means 0222 receives data from the receiving means 0221 and inspects the validity of format of the virtual position data pd' and whether it is stored in the database DB and in the region capable of service (Step S02.2.10).

If the inspection result is not valid, it judges as service incapable and abandons the said request (Step S01.2.11). On the other hand, if the inspection result is valid, it sends the service kind information and the virtual position data pd' to the retrieving means 0223 (Step S02.2.12). Here, if the processing does not follow the receiving frequency a·fQ2, it sends at the processing frequency pr·fQ2 which is lower than this.

The retrieving means 0223 retrieves the database DB based on the service kind information and the virtual position data pd' (Step S02.2.13). Thus, it obtains from the database DB the contents information Cts matching the said service kind information and virtual position data pd', and sends it to the compiling means 0224 (Step S02.2.14). Here, if the retrieving processing does not follow the above-mentioned processing frequency pr·fQ2, it sends to the compiling means 0224 at the retrieving frequency rt·fQ2 which is lower than this.

The compiling means 0224 causes the memory to temporarily store the immediate contents information Cts for the compression processing of the next contents information (Step S02.2.15). Then, it references the present service session registration which is stored and controlled by the receiving means 0221, thereby obtaining the identification data id (Step S02.2.16), and compiles the sending data on which are placed this identification data id and the contents information Cts based on the retrieval result information. Here, the compression processing of the contents information Cts is performed by the algorithm based on, for example, MPEG-4 and adjusts the format (step S02.2.17). Incidentally, the compression processing may be one which is based on another algorithm. Then, it sends the sending data compiled as mentioned above to the sending means 0225 (Step S02.2.18). Here, if this processing does not follow the above-mentioned retrieving frequency rt·fQ2, it sends to the sending means 0225 at the compiling frequency cmp·fQ2 which is lower than this.

The sending means 0225 makes the sending signal SV2a by working (such as securing processing and protocol adjustment) based on the sending data sent from the compiling means 0224, and transmits it to the communication system NT through the communication interface ifs (Step S02.2.19). Here, if this processing does not follow the above-mentioned compiling frequency cmp·fQ2, it sends to the communication system NT at the sending frequency out·fQ2 which is lower than this.

Then, the communication system NT sends the sending signal SC2a to the client CL2 (Step S02.2.20). Here, if this processing does not follow the above-mentioned sending frequency out·fQ2, it sends to the client CL2 at the transmitting frequency trf·fQ2 which is lower than this.

The receiving means 0205 of the client CL2 performs protocol processing and decoding processing on the sending signal SC2a received from the server SC2, and verifies the identification data id placed on the restored sending data and accepts it (Step S02.1.12), and performs data expansion processing by MPEG4 decoder or the like, thereby restoring the contents information Cts (Step S02.1.13). This contents information Cts is one which corresponds to the virtual position data pd'.

Then, it forms the accept data by the contents information Cts and supplies to the displaying apparatus 0206 (Step S02.1.14). Here, if this processing does not follow the above-mentioned transmission frequency trf·fQ2, it supplies to the displaying apparatus 0206 at the receiving frequency rv·fQ1 which is lower than this.

Then, the displaying apparatus 0206 receives the receive data from the receiving means 0205 and displays it on the screen and sounds its voice (Step S02.1.15) After that, it returns to Step S02.1.05, and the loop of processing mentioned above is updated repeatedly, and the screen corresponding to the dummy event data (the virtual position data pd' in this case) is updated and displayed on the displaying apparatus 0206. Here, if this displaying processing does not follow the above-mentioned receiving frequency rv·fQ1, it displays at the displaying frequency Cts·fQ1 which is lower than this.

As mentioned above, since the following performance of each processing along the loop is involved, it is usual that the displaying frequency Cts·fQ1 realized in the displaying apparatus 0206 is lower than the high test frequency test·fQ1 of the dummy event data. Therefore, the realized displaying frequency Cts·fQ1 shows the limit processing capacity of the said loop as a whole when the dummy event data is thrown into this loop at a high frequency. Thus, the displaying frequency Sts·fQ1 which has been actually measured becomes the maximum frequency capable of realizing this service by the system with a combination of the currently applied client CL2, communication system NT, and server SV2.

The actual measurement means 0207 measures the receive data from the screen display circuit of the displaying apparatus 0206 or the receiving means 0205 as mentioned above, thereby actually measuring the realized displaying frequency Cts·fQ1, and sends the result of actual measurement to the frequency control unit 0111 (Step S02.1.16).

Upon receipt of the result of actual measurement, the frequency controlling unit 0111 makes it the maximum frequency mx·fQ, and then it sets up the standard frequency st·fQ based on the maximum frequency mx·fQ (Step S02.1.17). It is possible to set up the standard frequency sf·fQ at any value not exceeding the maximum frequency mx·fQ. When the setting up of the standard frequency st·fQ is complete, the frequency controlling unit sends the compiling means 0224 the completion notification 1112 (Step 02.1.18). At the time when this completion notification has been received, the compiling means 0224 sends the dummy event data generating means 0208 the stop signal 203c and issues the stop signal 203d to the actual measurement means 0207, thereby stopping the operation of the dummy even data generating unit 0208 and the actual measurement apparatus 0207 (Step S02.1.19). The start adjusting stage ends by this setting and notification, and it moves to the service execution stage.

As mentioned above, the verification of the realized maximum screen updating frequency, in the service start adjusting stage in the client CL2, sends the sending side SV2 repeatedly the request data carrying the test data which is updated repeatedly at a high frequency, causes the sending side SV2 to update and retrieve the contents information and send it, receives it with the client CL2, thereby updating and displaying repeatedly, operates the loop even in such a service start adjusting stage, and performs by actually measuring the screen updating frequency. That is, it is done by measuring the displaying frequency Cts·fQ1 of the screen in which the contents information is displayed at the displaying apparatus 0206 which is the terminal step of the flow stream.

By this, it is possible to verify the data transmission capacity of the currently applied communication system NT, the data retrieval and transmission capacity of the sending side SV2, and the comprehensive capacity of the relevant system including the displaying capacity of the client CL2.

Incidentally, although apparent, the currently realized screen updating frequency mentioned above is not the one which is limited to the screen updating capacity possessed by the terminal displaying apparatus 0206, but is the screen updating frequency which is realized by the relevant system as a whole which reflects the intermediate processing of the entire system which is formed by the above-mentioned combination.

As an example, the portable telephone (client CL2) sends the site (server SV2) the test data repeatedly at a high frequency for updating in the service start adjusting stage, the site sends the contents information repeatedly for updating, the portable telephone receives this and displays repeatedly for updating, and actually measuring the screen updating frequency with the portable telephone, thereby verifying it, and confirms the realizable maximum screen updating frequency in the portable telephone for the currently applied combination of the portable telephone, the communication system NT, and the site.

For example, even though the retrieval of the site and the screen data compiling capacity is 120 frames/sec, if the displaying apparatus 0206 of the portable telephone is limited to the screen updating capacity of 15 frames/sec at maximum, the screen updating frequency which the relevant loop can realize under the said use environment condition becomes 15 frames/sec. Conversely, even though the displaying apparatus 0206 has the screen updating capacity of 120 frames/sec at maximum, if the request compiling frequency cmp·1Q1 of the compiling means 0203 (for example) at the loop upstream side is 15 times/sec, and data reaches at this low frequency, the displaying apparatus 0206 displays suppressing the screen updating to 15 frames/sec. Using this characteristic properties, as mentioned above, in the service start adjusting stage, the test data is thrown in at a sufficiently high frequency from the loop start end or the loop upstream side, it measures the screen updating frequency Cts·fQ1 realized at the loop last end, thereby verifying the performance of the entire system formed by arbitrary combination.

As mentioned above, the action in the service start adjusting stage of the this embodiment obtains the maximum frequency mx·fQ by actual measurement. This, by the separate idea and construction different from the construction to reference the given maximum frequency table, as in the above-mentioned first embodiment, can confirm the maximum frequency mx·fQ of the relevant combination, particularly can certainly cope with a new combination or a large variety of combination which is not yet included in the maximum frequency table.

Action in the service execution stage of the second embodiment:

An explanation will be made with reference to FIGS. 30 to 32.

The frequency controlling unit 0111 of the client CL2 starts the repetitive supply into the capturing means 0202 of the control signal 1a2 having the same frequency as the standard frequency stfQ (Step S02.1.20). By the supply start of the control signal 1a2, the service execution stage starts.

The position data providing means 0101 which is applied to this embodiment is a GPS receiver of autonomous action without external control, and it executes GPS positioning continuously at all times, and it provides the results as the position data pd to the capturing means continuously.

Here, when there is a supply of the control signal 1a2 from the frequency controlling unit 0111, the capturing means 0202 recognizes it to be the service execution stage, and it captures the position data pd by sampling at this timing (Step S02.1.21). Thus the capturing frequency a·fQ1 of the capturing means 0202 is controlled equal to the standard frequency stfQ, and excess capturing is eliminated.

Then, it takes out the service kind information which has been stored and held in the above-mentioned service start adjusting stage, and it sends the data 020a carrying the service kind information and position data to the compiling means 0203 at the frequency (or the standard frequency stfQ) equal to the capturing frequency a·fQ1 (Step S02.1.22).

The compiling means 0203 receives the data which has been sent from the capturing means 0202, but since at this time the control signal is not supplied form the frequency controlling unit 0111, it captures the timing of data reaching, since the above-mentioned mark is absent, it recognizes that this data is the data 202a which has been sent in the server execute stage.

Then, with the identification data id obtained from the id controlling unit 0113 at the head, it sends the sending means 0204 the request data 203b carrying the service kind information and position data pd (Step S02.1.23). Here, since the relevant processing is executed following the sending frequency of the data 202b from the previous stage, the compiling frequency cmp·fQ1 and the sending frequency of the request data 203b are controlled equal to the standard frequency stfQ accordingly, and hence the processing execution and sending at an excesss or too small frequency do not occur in the said compiling means 0203.

Then, the sending means 0204 captures with the reached timing the request data 203b sent from the compiling means 0203, performs encrypting securing processing at the said timing, performing protocol adjusting processing, etc., compiles the request signal SC2a addressed to this server SV2, and sends to the communication system NT through the communication interface ifc (Step S02.1.24). Here, since the said processing is executed following the sending frequency of the request data 203b from the previous stage, the sending frequency Req·fQ1 of the request signal CL2a is controlled equal to the standard frequency stfQ accordingly, and hence the processing execution and sending at an excess or too small frequency do not occur in the said sending means 0204.

Then, the communication system NT sends it to the specified server SV2 (Step S02.1.25). Also, in this embodiment, there is no supply of the control command from the sending means 0204.

Here, since the sending processing is executed following the sending frequency of the request signal CL2a, the transmission frequency trf·fQ1 of the request signal CL2a is controlled equal to the standard frequency stfQ, and hence the processing execution and sending at an excesss or too small frequency do not occur in the said communication system NT.

The receiving means 0221 of the server SV2 receives the request signal CL2a sent to itself from the client CL2 through the communication system NT through the communication interface ifs, and performs protocol processing and decoding processing for data expansion, thereby restoring the request data, and inspect whether or not there is mark in the request data (Step S02.2.21).

If a mark is detected here, it moves to the above-mentioned step S02.2.02, and if no detection, it extracts the user side's identification data id from the request data and the information of the service kind desired (Step S02.2.22).

Then, it judges whether it corresponds to the currently registered service session (Step S02.2.23). By referencing the record, if it is recognized as the currently registered service session, it judges to be a continuation of the currently proceeding service, and it proceeds to Step S02.2.25 and performs accounting/settling processing. If it does not corresponds here, it treats as an error (Step S02.2.24).

Then it sends the charging/settling means 0231 the command 221a carrying the mark indicating charge consignment and the user's identification data id, thereby causing it to perform charging/settling processing (Step S02.2.25), and it judges its results (Step S02.2.26). If the processing is normal completion by the return notice 231a, it proceeds to step S02.2.28 and continues the subsequent processing. On the other hand, if the charging/settling processing result is anomalous completion, it moves to Step S02.2.27 and abandons this request signal SC2a.

Also, in this embodiment, it performs charging computation each time it receives the request signal Cl2a and accumulates it and performs setting processing (future payment, usage fee) when a certain number of times is reached; however, the charging processing for advance payment may be permissible. Also, it is permissible to consign the charging/settling processing to the outside.

After the charging/settling processing, the receiving means 0221 sends the processing means 0221 the data carrying the service kind information and the position data pd (Step S02.2.28). Here, since the said processing is executed following the sending frequency of the request signal CL2a from the previous stage, the receiving frequency a·fQ2 and the sending frequency of the processing means 0222 are controlled equal to the standard frequency stfQ, and hence the processing execution and sending at an excess or too small frequency do not occur in the said receiving means 0221.

The processing means 0222 carries out processing with the timing (receiving frequency a·fQ2) at which it has received data from the receiving means 0221. In this processing, it inspects the event data and checks the validity of the format of the position data and to see if the it is accumulated in the database DB and in the region capable of service (Step 02.2.29).

If the inspection result is not valid, it judges to be unserviceable and moves to Step S02.2.27 and abandons the said request. On the other hand, if the inspection result is valid, it sends the retrieving means 0223 the data carrying the service kind information and the position data pd (Step S02.2.30).

Since the said processing is executed following the frequency (receiving frequency a·fQ2) of the data sent from the receiving means 0221, as the result, the processing frequency pr·fQ2 and the sending frequency of data to the retrieving means 0223 are controlled equal to the standard frequency stfQ, and hence the processing execution and sending at an excess or too small frequency do not occur in the said processing means 0222.

The processing in the retrieving means 0223 proceeds in two stages; it searches first the database unit DB based on the service kind information and the position data pd (Step S02.2.31). By this, it acquires from the database unit DB the contents information Cts conforming to the said service kind information and position data pd. Then it sends the compiling means 0224 the contents information Cts of the retrieving result (Step S02.2.32).

Since the said processing is executed following the frequency (processing frequency pr·fQ2) of the data sent from the processing means 0222, the retrieving frequency rt·fQ2 and the sending frequency of data to the compiling means 0224 are controlled equal to the standard frequency stfQ, and hence the processing execution and sending at an excess or too small frequency do not occur in the said retrieving means 0223.

As the processing in the compiling means 0224, the immediate contents information Cts is temporarily stored in the memory for compression processing of the subsequent contents information (Step S02.2.33). Then it obtains the identification data id by referencing the current service session registration which is stored and controlled by the receiving means 0221 (Step S02.2.34); it compiles the sending data carrying the contents information Sts based on this identification data id and the retrieving result information; here it performs the compression processing of the contents information Cts by, for example, the algorithm conforming to MPEG-4, or adjusts the format (Step S02.2.35). Incidentally, the compression processing may be based on other algorithm. Then, it sends the sending means 0225 the sending data which has been compiled as mentioned above (Step S02.2.36).

Since the above-mentioned processing is executed following the frequency (retrieving frequency rt·fQ2) of the data sent from the retrieving means 0223, the compiling frequency cmp·fQ2 and the sending frequency of data to the sending means 0225 are controlled equal to the standard frequency stfQ and hence the processing execution and sending at an excess or too small frequency do not occur in the said compiling means 0224.

The sending means 0225 prepares the sending signal SV2a by working of the securing processing and protocol adjustment based on the sending data sent from the compiling means 0224 and sends it to the communication system NT (Step S02.2.37).

Since the above-mentioned processing is executed following the frequency (compiling frequency cmp·fQ2) of the sending data sent from the compiling means 0224, the sending frequency out·fQ2 of the sending signal SV2a to the communication system NT is controlled equal to the standard frequency stfQ, and hence the processing execution and sending at an excess or too small frequency do not occur in the said sending means 0225.

The communication system NT transmits the sending signal SV2a to the relevant client CL2 (Step S02.2.38). In this embodiment, there is no supply of the control command from the sending means 0225.

Here, since the transmission processing is executed following the sending frequency of the sending signal SV2a from the previous stage, the transmitting frequency trf·fQ2 of the sending signal SV2a is controlled equal to the standard frequency stfQ, and hence the processing execution and sending at an excess or too small frequency do not occur in the said communication system NT.

Then, in client CL2, the receiving means 0205 performs protocol processing and decoding processing on the sending signal SV2a reached from the server SV2, and then it verifies the identification data id carried by the decoded sending data and receives its (Step S02.1.26), and it performs data expansion processing by MPEG4 decoder or the like, thereby restoring the contents information Cts (Step S02.1.27). Then, it forms the received data by the contents information Cts and supplies it to the displaying apparatus 0206 (Step S02.1.28).

Since the above-mentioned processing is executed following the frequency (transmission frequency trf·fQ2) of the sending signal SV2a sent from the communication system NT, the receiving frequency rv·fQ1 and the sending frequency of data to the displaying apparatus 0206 are controlled equal to the standard frequency stfQ, and hence the processing execution and sending at an excess or too small frequency do not occur in the said receiving means 0205.

Then the displaying apparatus 0206 screen-displays and voice-sounds the received data received from the receiving means 0205 (Step S02.1.29). Also, in this embodiment, the control signal from the frequency controlling unit 0111 is not supplied. By this, the desired screen is updated at the displaying frequency Sts·fQ1 equal to the standard frequency stfQ.

After that it returns to Step S02.1.20 and the loop of the above-mentioned processing is updated and repeated, however, its frequency is controlled and regulated at the standard frequency stfQ.

As mentioned above, the client Cl2 in the service execution stage repeats the processing of updating and sending the server SV2 momentarily at the standard frequency stfQ the request signal CL2a in which the identification data id and the service kind information are attached to the position data pd which changes momentarily, thereby asking for the real time service of the contents information Cts corresponding to the momentary position.

On the other hand, each time when the server SV2 receives the request signal CL2a which is updated and sent momentarily at the standard frequency stfQ from the client CL2, it updates and compiles repeatedly at the standard frequency the contents information Cts (containing the data of one screen showing the scene at the relevant position) corresponding to the position data pd which is carried thereon, and mounts it on the sending signal SV2a and updates and sends repeatedly real-time momentarily to the client CL2 at the standard frequency stfQ.

The client Cl2 receives the sending signal SV2a which is sent momentarily at the standard frequency stfQ, and it updates and displays repeatedly at the standard frequency stfQ real-time the contents information Cts corresponding to the momentary position. In this way, by repeating updating at the standard frequency the above-mentioned loop by bidirectional data interchange, that is, repeated updating and sending of the request signal CL2 and the repeated updating of the sending, receiving, and displaying of the corresponding contents information Cts (each including the scene data of one screen), the client C12 can display the updated image real time.

As the result, with the movement of the client CL2, the image (the recorded and stored contents information Cts) which changes in response to the position movement is updated and displayed real time on the screen of the client CL2, or voice is sounded, and this is watched as the moving picture by the user.

As mentioned above, this embodiment controls the frequency of each processing at the standard frequency based on the maximum frequency obtained by actual measurement, thereby eliminates processing at an excess frequency by each means and avoids the occurrence of waste, and hence can achieve the following.

1. Reduction of data processing load at the receiving side and the apparatus cost reduction through simplifying the apparatus construction.
2. Reduction of electric power consumption at the receiving side.
3. Reduction of data processing load at the receiving side.
4. Reduction of communication load between the sending side and the receiving side.
5. Reduction of communication charge.
6. Avoidance of decrease in quality of service by elimination of excessive small frequency.

Also, in the foregoing, instead of sending test data in the service start adjusting stage, immediately after session formation between the client CL2 and the server SV2, by sending the actually occurring event data at a high frequency, it is also possible to confirm by actual measurement the maximum frequency of the loop. In this case, an initial part of the service execution stage takes over the function of the service start adjusting stage. Here, the sending frequency of the event data to be sent should preferably be such that it sends at the maximum frequency which the said client CL2 can execute. Until the maximum frequency is confirmed by actual measurement, waste occurs for several shots; however, it is possible to omit the apparatus part concerning the occurrence of the dummy event data. The contents information Cts which has been interchanged after actual measurement-confirmation and the setting of the standard frequency stfQ is controlled at an adequate frequency, and waste is eliminated.

The Third Embodiment

The above-mentioned second embodiment was characterized by issuing at a high frequency the test data in the service start adjusting stage and confirming the maximum frequency information by actual measurement of the realized screen.

By contrast, the third embodiment of the contents information interchanging system, as in the above-mentioned embodiment, performs the service start adjusting stage and the service executing stage sequentially, but in the service start adjusting stage, it issues the event data at the desired screen updating frequency rqfQ which the user specifies with input and at the relevant frequency rqfQ based on the event data of the desired kind, measures the updating frequency of the screen realized by going round the loop, verifies whether or not the system of combination of the relevant receiving side (client) CL3/the sending side (server) SV3/the communication system NT, in the case where the desired screen updating frequency rqfQ was realized, it sets the standard frequency stfQ at the desired screen updating frequency rqfQ, on the other hand, in the case where the desired screen updating frequency rqfQ was not realized, it sets the actually measured screen updating frequency as the standard frequency stfQ, and it executes the service executing stage based on the standard frequency stfQ.

The third embodiment is formed by combination of the receiving side (client) CL3 and the sending side (server) SV3 and the communication system NT connected thereto; it is based on the principle of pd→Cst, expressed according to the above-mentioned definition, where pd is the position data which is the request data in the service executing stage. In addition, assuming that the frequency control is carried out in the client CL3 side, it is so constructed that the object of frequency control is the position data providing means 0101.

Figure 33:
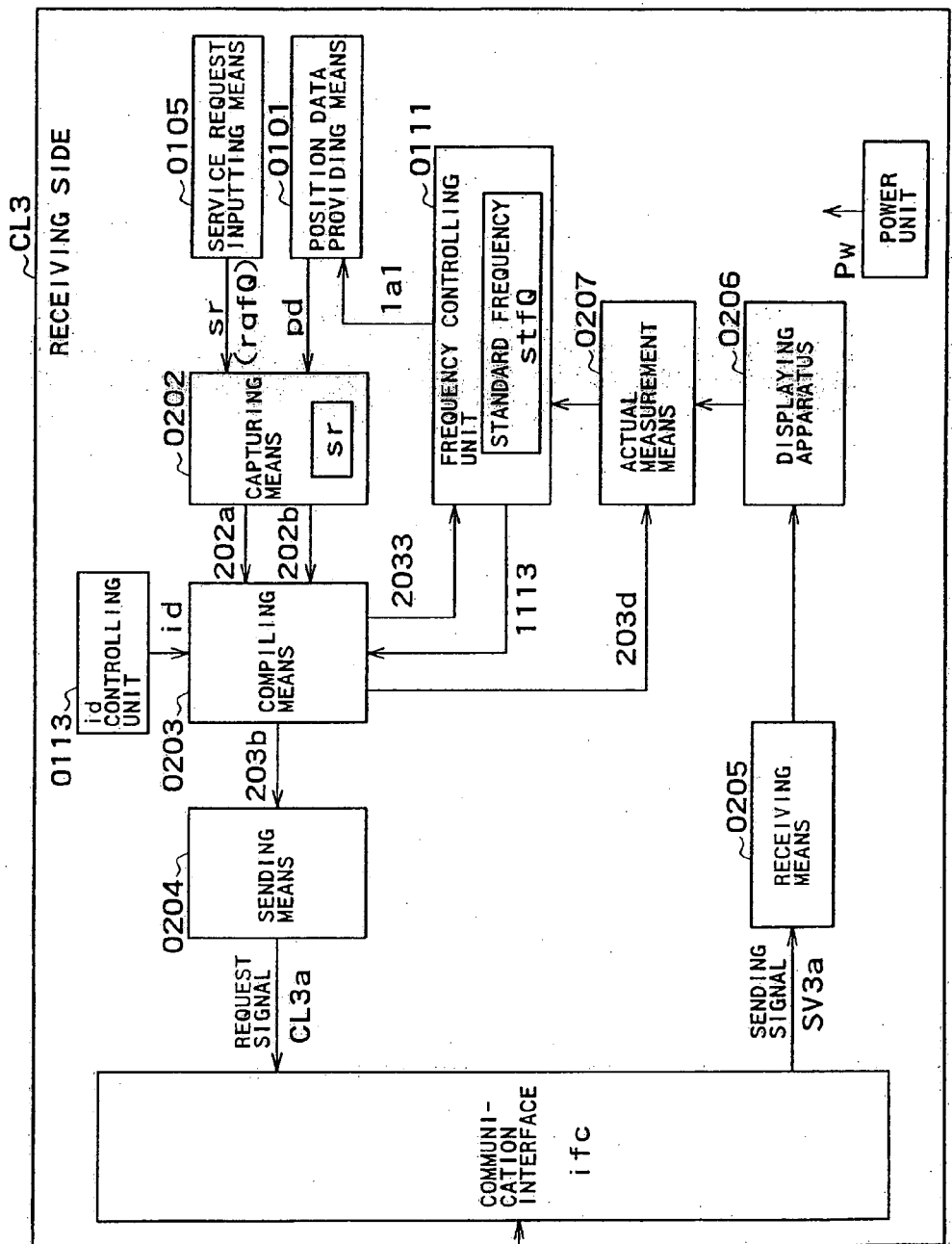
FIG. 33 is a block diagram showing the receiving side in the third embodiment of the contents information interchanging system according to the present invention.

FIG. 33 is a block diagram of the client CL3. Incidentally, the description in the preceding embodiment will be applied to this embodiment for the same parts.

The server SV3 is approximately the same as the above-mentioned server SV2 except that it does not handle the virtual position data pd'. The diagram cited above is used for its block diagram.

FIGS. 34 to 38 are action flow charts in the service start adjusting stage of the client CL3 and the server SV3.

Incidentally, the action flowchart in the service executing stage of the client CL3 and the server SV3 is approximately the same as that in the above-mentioned second embodiment, and the diagrams cited above. (FIGS. 30 to 32) are used.

The client CL3, like the above-mentioned client CL2, is composed of machines and equipment of computer construction having the wireless/wire communication capability; it has the position data providing means 0101 to enter the position data pd, the service request inputting means 0105 to enter the service request data sr, the capturing means 0202, the compiling means 0203, the sending means 0204, the communication interface ifc, the frequency controlling means 0111, the id controlling means 0113, the receiving means 0205, the displaying means 0206, the actual measurement means, and the power unit Pw.

The service request means 0105 issues to the capturing means 0202 the desired service kind information (containing at least the desired server, the kind of contents information, and the kind of event data) and the service request data sr carrying information such as the desired screen updating frequency rqfQ specified by the user. And, the capturing means 0202 issues a mark indicating the service start adjusting stage as soon as it captures the service request data sr. This is the same as the description given above.

The position data providing means 0101, as soon as it receives the control signal 1a1 from the frequency controlling unit 0111, performs almost the same action as in the above-mentioned embodiment except that it generates the position data pd at its timing. Here, the control signal 1a1 is issued at the desired screen updating frequency rqfQ or the standard frequency stfQ, but the position data providing means 0101 is controlled for its work based on any one of them.

The compiling means 0203 receives from the capturing means 0202 data carrying information such as the above-mentioned mark and the desired screen updating frequency rqfQ specified by the user, and if it judges as the start of the service start adjusting stage, it sends to the frequency controlling unit 0111 the information of the desired screen updating frequency rqfQ specified by the user, and the notice 2033 that the control object is the position data providing means 0101, then it receives through the capturing means 0202 the position data pd which was generated by the position data providing means 0101, and compiles the request data 203a relating to the start adjusting based on this.

It sends the sending means 0204 the request data 203a on which are placed the above-mentioned mark, the identification data id (including the resource information for individual machines), the service kind information, and the position data pd. Then, the compiling means 0203 sends the actual measurement means 0207 the signal 203d to start, On receipt of the notice 1113 of setting completion of the standard frequency from the frequency controlling unit 0111, it sends the signal 103d to the actual measurement means 0207 to stop the action and finish the service start adjusting stage. Then, in the service executing stage, as in the above-mentioned embodiment, it compiles the request data 203b carrying the identification data, service kind information, and position data pd and sends it to the sending means 0204. In addition, the request data 203b is sent to the sending means 0204 repeatedly, with the position data pd, which the event data, updated repeatedly with the lapse of time.

Also, the compiling means 0203 can control the action of the actual measurement means 0207 and the frequency control unit 0111 so that it properly executes the above-mentioned actual measurement and verification also in the service executing stage. This is to impart the function to cope with the fluctuation in circuit conditions which would occur while the service executing stage is proceeding.

The actual measurement means 0207 starts, in the service start adjusting stage, according to the start control signal 203d from the compiling means 0203, actually measures the updating frequency of the screen of the displaying unit 0206, and sends the frequency controlling unit 0111 the information of screen updating frequency which is the actual measurement result. Incidentally, the method of actual measurement is as explained in the above-mentioned first embodiment.

Also, the actual measurement means 0207 has its action suspended by the stop control signal 203d from the compiling means 0203. The start-stop control mentioned above causes the machine to operate only at the time of need, thereby saving battery consumption.

The frequency controlling unit 0111 receives from the compiling means 0203 the information of the desired screen updating frequency specified by the user and the notice 2033 that the control object is the position data providing means 0101, then it is in the service start adjusting stage at the present time and executes the following processing sequentially.

(1) It issues the control signal 1a1 at the above-mentioned desired screen updating frequency rqfQ and supplies repeatedly to the position data providing means 0101.

(2) When the sending of information of the screen updating frequency of actual measurement from the actual measurement means 0207 occurs. It sets up the standard frequency stfQ based on the screen updating frequency of actual measurement.

(3) It notifies the compiling means 0203 of the completion of setting of the standard frequency stfQ.

(4) Then, it moves to the service executing stage, issues the control signal 1a1 at the standard frequency stfQ, and starts the repeated supply to the position data providing means 0101.

In the case where the system of combination of the third embodiment has realized the desired screen updating frequency rqfQ, the standard frequency stfQ is set at the desired screen updating frequency rqfQ by the above-mentioned processing, the service at the desired screen updating frequency rqfQ is executed, on the other hand, if the system of this combination has not realized the desired screen updating frequency rqfQ, the standard frequency stfQ is set at the actually realized screen updating frequency of actual measurement, hence it is possible to prevent the processing in the middle of loop from being executed at the desired screen updating frequency rqfQ in the subsequent operation, and it follows that the service by the realizable screen updating frequency is executed.

Also, the functions and actions of the other means and parts are almost the same as in the above-mentioned embodiment, and hence the forgoing description is used.

The server SV3 is the same block construction as the above-mentioned server SV2; however, when the receiving means 0221 of the server SV3 detects the above-mentioned mark and position data pd in the received request signal CL3, it recognizes that it is in the service start adjusting stage and the sending of contents information is necessary even in the said stage, it performs the verifying processing explained above, and it sends the position data pd etc. to the processing means 0222. By this, through the processing by each means in the subsequent stage, the corresponding contents information Cts is sent to the client CL3 during the service start adjusting stage. The other functions and actions of the receiving means 0221 are almost the same as in the above-mentioned embodiment, and hence the forgoing description is used.

The following is concerned with operation of the third embodiment. The flow of operation given below is composed of two stages—the service start adjusting stage and the service execution stage.

Figure 34:
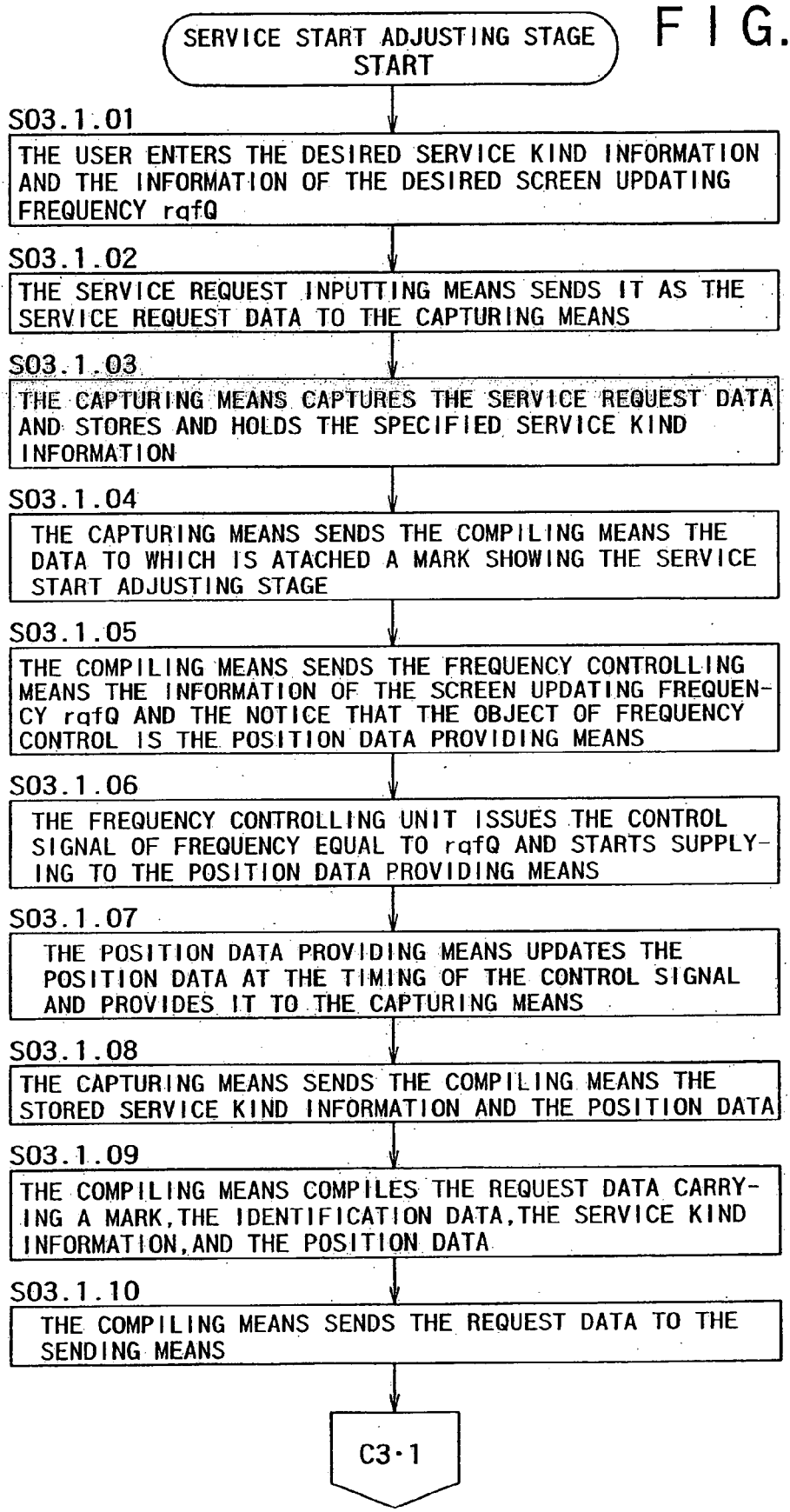
FIG. 34 is a block diagram showing the sending side in the third embodiment of the contents information interchanging system according to the present invention.
Figure 35:
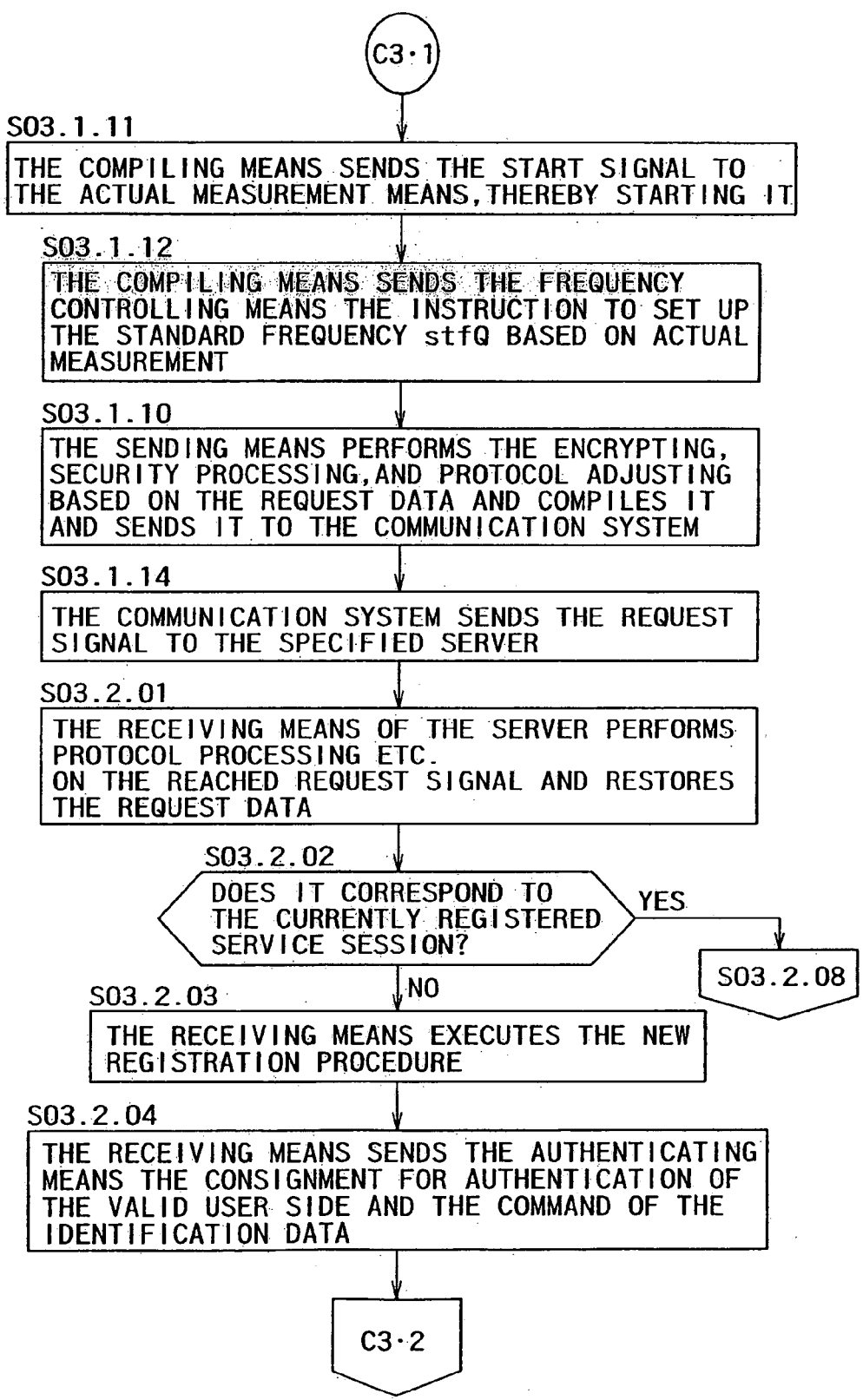
FIG. 35 is an action flowchart that follows FIG. 34.
Figure 36:
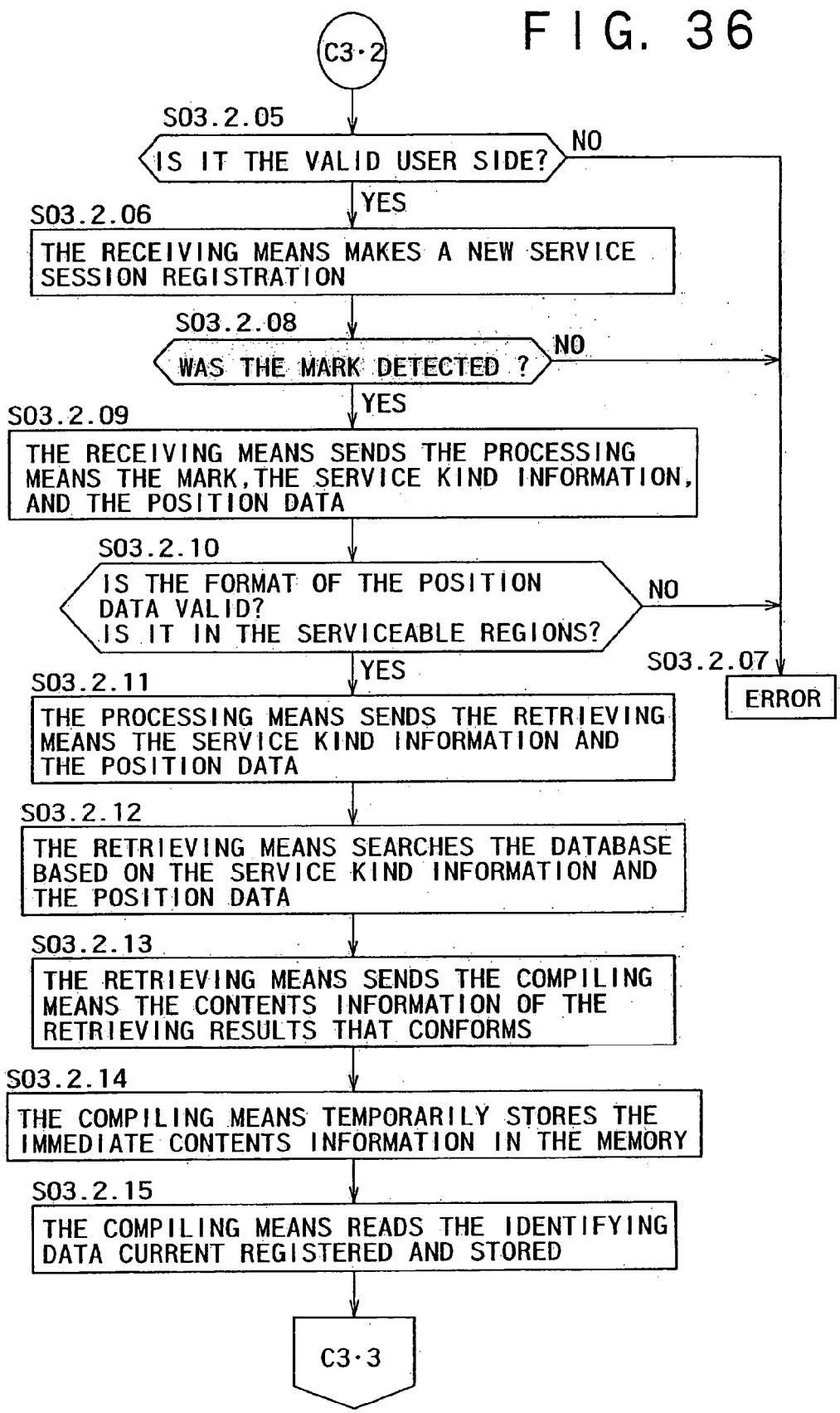
FIG. 36 is an action flowchart that follows FIG. 35.
Figure 37:
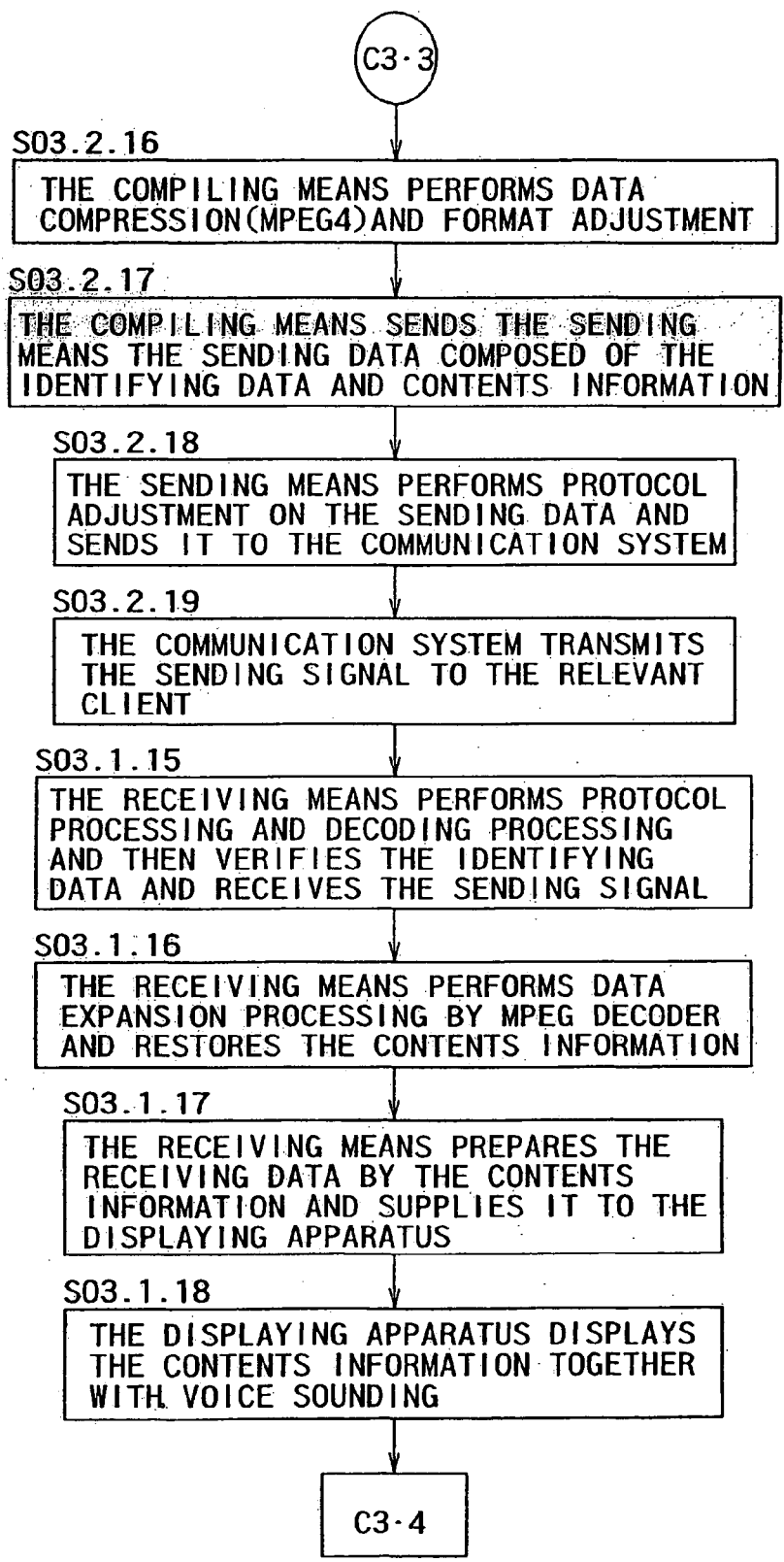
FIG. 37 is an action flowchart that follows FIG. 36.
Figure 38:
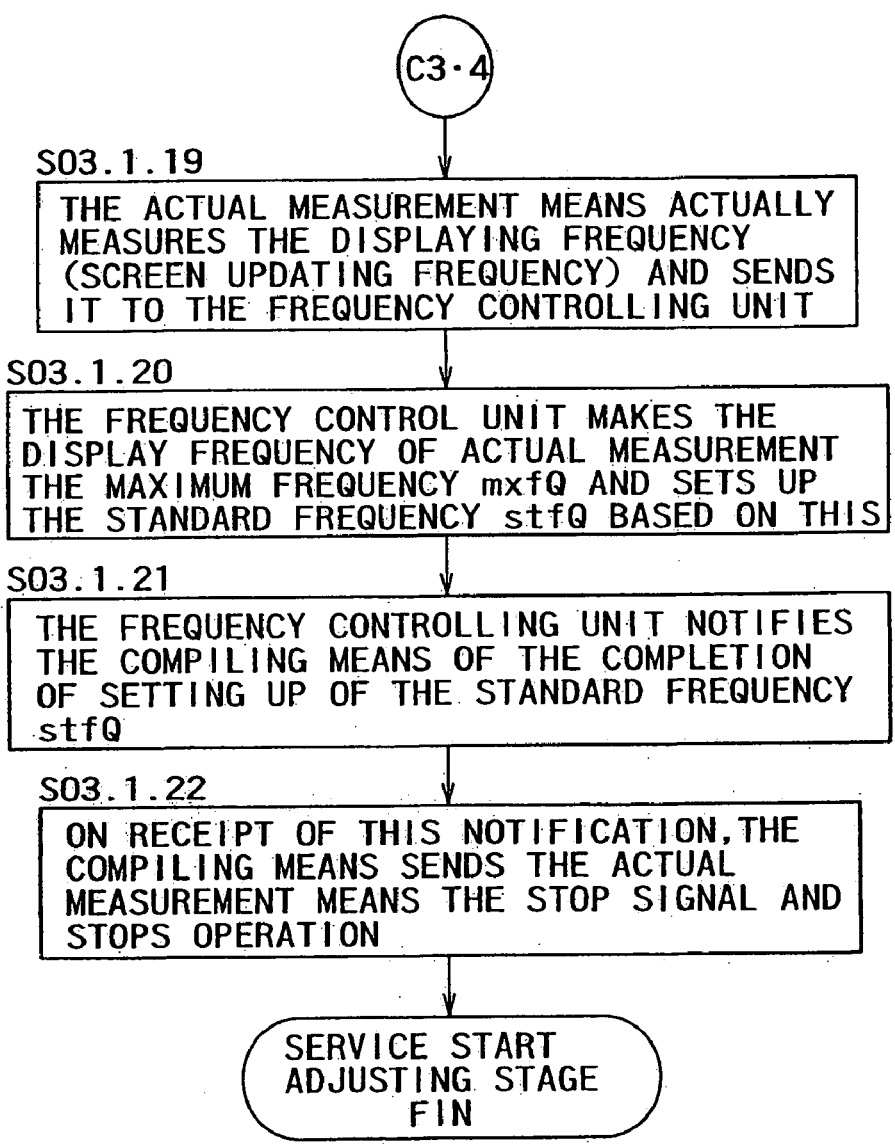
FIG. 38 is an action flowchart that follows FIG. 38.

Operation in the Service Start Adjusting Stage in the Third Embodiment:

In FIG. 34, when the user asks for the service start, it operates the service request inputting means 0105 of the client CL3 to manually enter the desired service kind information (including at least information of the desired server, the kind of contents information, and the specification of position data as the kind of event data) and the information of the desired screen updating frequency rqfQ (Step S03.1.01). The service request inputting means 0105, according to this operation, issues the service request data sr carrying the service kind information and the desired screen updating frequency rqfQ and sends it to the capturing means 0202 (Step S03.1.02).

The capturing means 0202 of the client CL3 confirms that the reached signal is the one which has been generated from the service request inputting means 0105, thereby detecting that it is the service request data sr indicating the trigger of the service start adjusting stage and captures it immediately, after confirming the content, it stores and holds the specified service kind information carried by this service request data sr (Step S03.1.03).

The client CL3 is required to confirm before service execution that the desired screen updating frequency rqfQ is realizable by the current combination construction. So, the capturing means 0202 attaches to the content of the received service request data sr a mark notifying that it is the service start adjusting stage, and it sends as the data 202a to the compiling means 0203 (Step S03.1.04).

As soon as the compiling means 0203 detects the mark notifying of the service start adjusting stage in the data 202a sent from the capturing means 0202, it judges that the service start adjusting stage has been started. Then it sends the frequency controlling unit 0111 the information of the desired screen updating frequency rqfQ and the information that the control object is the position data providing means 0101, as the notification 2033 (Step S03.1.05).

By this, the frequency controlling unit 0111 operates and issues the control signal 1a1 at a frequency equal to the desired screen updating frequency rqfQ and supplies it to the position data providing means 0101 (Step S03.1.06).

The position data providing means 0101 starts by the control signal 1a1 and starts the repeated updating of the position data pd and offers to the capturing means 0202 (Step S3.1.07). Here, if the processing cannot follow the above-mentioned desired screen updating frequency rqfQ, it operates at the occurrence frequency g·fQ1 lower than the desired screen updating frequency rqfQ.

The capturing means 0202 captures the offered position data pd, and sends it to the compiling means 0203 after the above-mentioned processing (Step S03.1.08); here if the processing cannot follow the above-mentioned occurrence frequency g·fQ1, it operates the capturing frequency a·fQ1 lower than this.

The compiling means 0203 captures the position data pd and the service kind information from the capturing means 0202, and then it compiles the request data 203a relating t the start adjustment (Step S03.1.09). It places on the request data 203a a mark, the identification data id obtained from the id controlling unit 0113, the service kind information, and the position data pd, and sends it to the sending means 0204 (Step S03.1.10). Here, if the above-mentioned processing cannot follow the above-mentioned capturing frequency a·fQ1, it sends at the compiling frequency cmp·fQ1 lower than this.

Then, it sends the actual measurement means 0207 the signal 203d and starts the actual measurement means 0207 (Step S03.1.11), and issues to the frequency controlling unit 0111 the instruction 2033 to set up the standard frequency based on the actual measurement result from the actual measurement means 0207 (Step S03.1.12).

Then, as soon as the sending means 0204 receives the request data 203a sent from the compiling means 0203, it performs the encrypting security processing and protocol adjusting processing at the actually received frequency, and compiles the request signal CL3a addressed to this server SV3 and sends it to the communication system NT through the communication interface ifc (Step S03.1.13). Here, if the above-mentioned processing cannot follow the above-mentioned compiling frequency cmp·fQ1, it sends it to the communication system NT at the sending frequency Req·fQ1 lower than this.

The communication system NT sends it to the specified server SV3 at the actually received frequency (Step S03.1.14). Here, if the sending cannot follow the above-mentioned sending frequency Req·fQ1, it sends at the transmitting frequency trf·fQ1 lower than this.

The receiving means 0221 of the server SV3 receives through the communication interface ifs the request signal CL3a sent to itself from the client CL3 through the communication system NT; it performs protocol processing and decoding processing for data expansion and restoration of request data; and then it extracts from the request data the user side's identification data id and the information of the desired service kind (Step S03.2.01). Then, it judges whether or not it corresponds to the service session which is currently registered based on them (Step S03.2.02).

If it confirms to be the currently registered service session, it judges to be the continuation of the currently proceeding service and proceeds to Step S03.2.08.

On the other hand, if there is not currently Registered service session or there is nothing corresponding to it, it carries out the new registration procedure (Step S03.2.03). In order to consign the authentication that this client CL3 is the valid user, it sends the authenticating means 0230 the command 221a carrying the mark (indicating consignment for authentication) and the identification data id (Step S03.2.04).

And, on receipt of the result notice 231a from the authenticating means 0230, it makes judgment (Step S03.2.05); if this is the valid user side, it newly registers the service session and fixes it (Step S03.2.06); if this is not the valid user side, it abandons this request signal CL3a (Step S03.2.07).

Then, the receiving means 0221, after determination of the above-mentioned service session, checks for the presence or absence of the mark of the request signal CL3a (Step S03.2.08); if the mark is detected, it recognizes as the service start adjusting stage, and it sends the processing means 0222 this mark, the service kind information, and the position data pd (Step S03.2.09). Here, if the above-mentioned processing cannot follow the above-mentioned transmission frequency trf·fQ1, it transmits to the processing means 0222 at the receiving frequency a·fQ2 lower than this.

On the other hand, in the case where the mark is not detected, as apparent from the series of processing mentioned above, it means that the request signal which is not the service start adjusting stage has reached despite immediately after the registration of the service session, it is an error, and hence it proceeds to Step S03.2.07 and it abandons this request signal CL3a.

The receiving means 0222 receives data from the receiving means 0221, and it checks for the validity of format of the position data pd and also checks for if it is in the stored in the database DB and is in the serviceable region (Step S03.2.10).

If the inspection result is not valid, it judges as unserviceable and moves to Step S03.2.07 and abandons the said request. On the other hand, if the inspection result is valid, it sends the retrieving means 0223 the data carrying the service kind information and the position data pd (Step S03.2.11). Here, if the above-mentioned processing cannot follow the above-mentioned receiving frequency a·fQ2, it sends it to the retrieving means 0223 at the processing frequency pr·fQ2 lower than this.

The retrieving means searches the database DB based on the service kind information and the position data pd (Step S03.2.12). By this, it obtains from the database DB the contents information Cts conforming to the said service kind information and the position data pd and sends it to the compiling means 0224 (Step S03.2.13). Here, if the above-mentioned retrieving processing cannot follow the above-mentioned processing frequency pr·fQ2, it sends it to the compiling means 0224 at the retrieving frequency rt·fQ2 lower than this.

The compiling means 0224 temporarily stores the immediate contents information Cts in the memory for compression processing of the subsequent contents information (Step S03.2.14). Then, it references the current service session registration which is stored and controlled by the receiving means 0221 and thereby obtains the identifying data id (Step S03.2.15), and it compiles the sending data carrying this identifying data and the contents information Cts based on the retrieving result information; here, it performs the compression processing of the contents information Cts by the algorithm conforming to, for example MPEG-4, and adjusts the format (Step S03.2.16). Also, the compression processing may be one which is based on the other algorithm. Then, it sends the sending means 0225 the sending data compiled as mentioned above (Step S03.2.17). Here, if the above-mentioned compiling means cannot follow the above-mentioned retrieving frequency rt·fQ2, it sends to the sending means 0225 at the compiling frequency cmp·fQ2 lower than this.

The sending means 0225 performs the security processing and protocol adjusting processing based on the sending data sent from the compiling means 0224, thereby prepares the sending signal SV3a and sends it to the communication system NT through the communication interface ifs (Step S03.2.18). Here, if the above-mentioned sending processing cannot follow the above-mentioned compiling frequency cmp·fQ2, it sends it to the communication system NT at the sending frequency out·fQ2 lower than this.

The communication system NT sends the sending signal SV3a to the client CL3 (Step S03.2.19); here, if the above-mentioned sending processing cannot follow the above-mentioned sending frequency out·fQ2, it sends to the client CL3 at the transmission frequency trf·fQ2 lower than this.

The receiving means 0205 of the client CL3 performs protocol processing and decoding processing on the sending signal SV3a reached from the server SV3, and verifies and receives the identifying data id carried by the restored sending data (Step S03.1.15), and performs data expansion processing by MPED4 or the like to restore the contents information Cts (Step S03.1.16). Then, it prepares the receiving data by the contents information Cts, and supplies it to the displaying apparatus 0206 (Step S03.1.17). Here, if the above-mentioned processing cannot follow the above-mentioned transmission frequency trf·fQ2, it supplies to the displaying apparatus 0206 at the receiving frequency rv·fQ1 lower than this.

Then, the displaying apparatus 0206 displays, with/without audio, the receiving data received from the receiving means 0205 (Step S03.1.18). After that, the loop of the above-mentioned processing is updated repeatedly, and the screen corresponding to the displaying apparatus 0206 is updated and displayed. Here, if the above-mentioned displaying processing cannot follow the above-mentioned receiving frequency rv·fQ1, it is displayed by the displaying frequency Cts·fQ1 lower than this.

Here, the actual measurement apparatus 0207 actually measures the realized displaying frequency Cts·fQ1 by measurement of the screen display circuit of the displaying apparatus 0206 or the receiving data from the receiving means 0205, and it sends the actual measurement result to the frequency control unit 0111 (Step S03.1.19).

On receipt of the actual measurement result from the actual measurement means 0207, the frequency controlling unit 0111 makes it the maximum frequency mxfQ and sets up the standard frequency stfQ based on the maximum frequency mxfQ (Step S03.1.20). The standard frequency stfQ can be set at an arbitrary value not exceeding the maximum frequency mxfQ. As soon as the setting up of the standard frequency stfQ is completed, the frequency controlling unit 0111 sends the completion notice 1113 to the compiling means 0224 (Step S03.1.21). On receipt of the notice 1113 of the completion of the setting up of the standard frequency from the frequency controlling unit 0111, the compiling means 0203 sends the signal 203d to the actual measurement means 0207 and stops operation (Step S03.1.22). By this, the service start adjusting stage is finished.

If the display frequency Cts·fQ1 which has been realized on the displaying apparatus 0206 is equal to the desired screen updating frequency rqfQ as mentioned above, it is judged to be serviceable with the current setting, the standard frequency stfQ is set at the frequency equal to the desired screen updating frequency rqfQ and it moves to the subsequent service executing stage; however, if the displaying frequency Cts·fQ1 is lower than the desired screen updating frequency rqfQ, it judges that the processing along the loop could not be followed, the standard frequency stfQ is set at the frequency equal to the realized display frequency Cts·fQ1 and it moves to the next service executing stage.

The operation of the client CL3, the server SV3, and the communication system NT in the service executing stage is the same as that in the above-mentioned embodiment, and hence the above-mentioned description is cited.

As mentioned above, in the third embodiment, it generates first the event data according to the desired screen updating frequency rqfQ specified by the input of the user in the service start adjusting stage, it verifies whether or not the system of combination of the relevant client CL3/server SV3/communication system NT can realize the desired screen updating frequency rqfQ, it determines the standard frequency stfQ based on this, hence in the case where the actually realized screen updating frequency cannot follow the desired screen updating frequency rqfQ specified, it is possible to avoid waste of generating and processing excess event data at the desired screen updating frequency rqfQ continuously; therefore, it is possible to reduce the data processing amount of the receiving side CL3, and it is possible to reduce the communication load between the sending side SV3 and the receiving side CL3, and moreover it is possible to reduce communication cost.

In addition, by the above,-mentioned verification, for the system of any combination, it is possible to confirm with certainty the quality of the actually capable service of the said system. Moreover, by performing re-verification at the arbitrary time during service continuation, for example, it is possible to take measures suited to the occasion for the transmission state of the communication circuit which changes during service.

The Fourth Embodiment

The above-mentioned embodiments were intended to operate the loop by confirming/verifying the maximum frequency or the realized frequency and setting up the standard frequency for the above-mentioned loop as a whole which is formed for each system of combination of the receiving side/sending side/communication system. That is, in the first embodiment, it confirms the maximum frequency by referencing the given loop; in the second embodiment, it verifies the maximum frequency of this combination by actual measurement by throwing test data, further in the third embodiment, it verifies by actual measurement of the screen updating frequency realizable of this combination by initially operating the desired screen updating frequency.

In the meantime, in general, the frequency of the screen display at the receiving side which is the final stage of the loop which the system of combination of the receiving side/sending side/communication system forms usually becomes the rate-determining step. For example, in the case where the receiving side is a portable telephone, the after-image characteristics of the built-in liquid crystal display apparatus give a limitation to the screen updating frequency, and the peripheral circuits are so designed as to correspond to this limitation. On the other hand, there are many instances in which the capable processing frequency of the sending side/communication system has the performance exceeding this.

Therefore, if it is so constructed as to confirm the realizable screen updating frequency, which is indicated in the performance specification list of the displaying apparatus of the applicable receiving side, and to control the occurrence frequency of the event data of the position data etc. based on this, it is possible to control the executing frequency of each processing on the loop becoming excessive, and in addition, it is possible to control the executing frequency becoming too small. The fourth embodiment is based on this principle.

The fourth embodiment is formed by combination of the receiving side (client) CL4 and the sending side (server) SV4 and the communication system NT connected thereto; it is based on the principle of pd→Cst, expressed according to the above-mentioned definition, where pd is the position data which is the request data in the service executing stage. In addition, assuming that the frequency control is carried out in the client CL4 side, it is so constructed that the object of frequency control is the position data providing means 0101.

Especially it is suitable that the client CL4 is a portable telephone, the server SV4 is a Web site, and the communication system NY is the Internet system.

Figure 39:
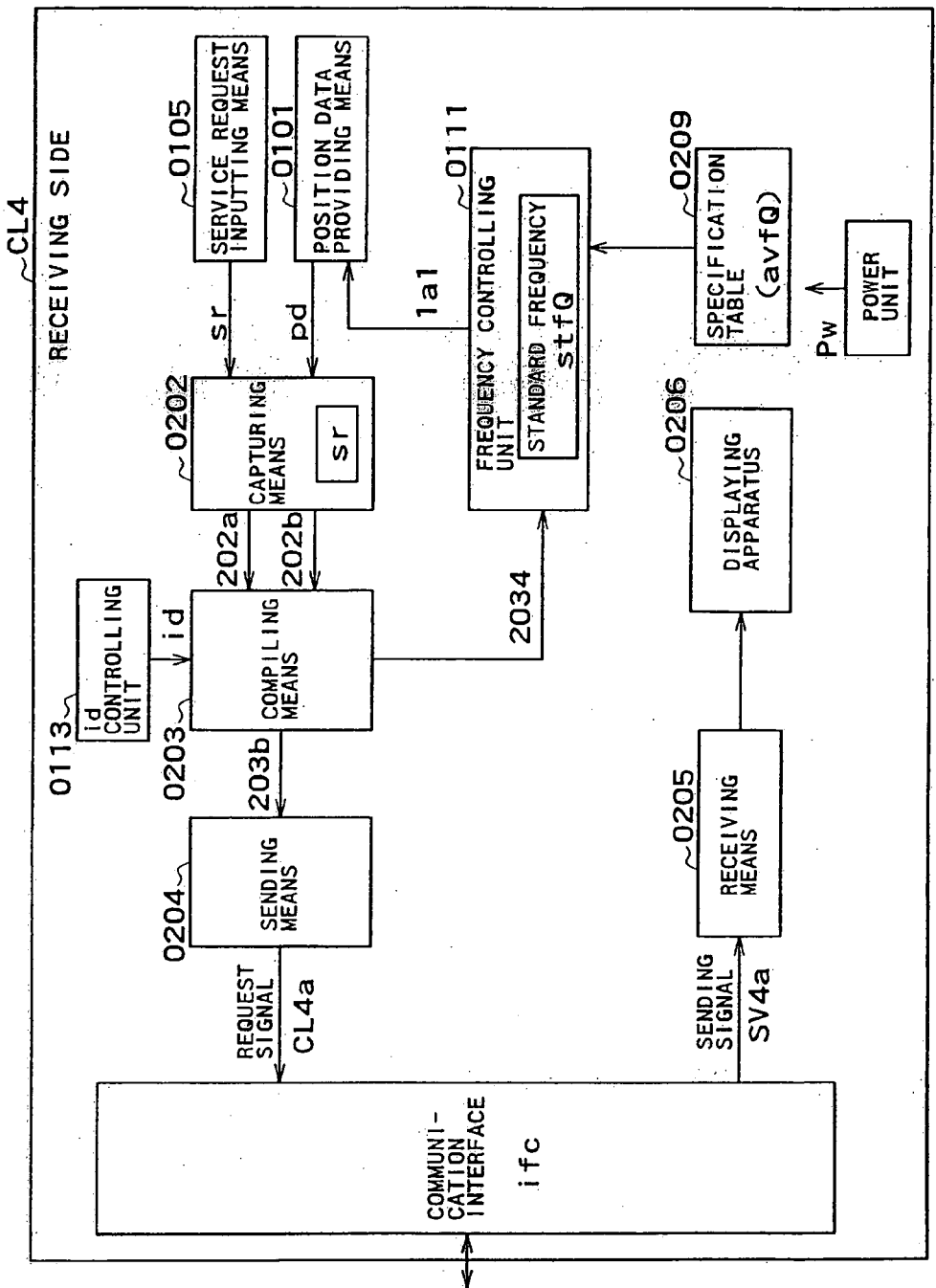
FIG. 39 is a block diagram showing the receiving side in the fourth embodiment of the contents information interchanging system according to the present invention.

FIG. 39 is a block diagram of the client CL4. Incidentally, the description in the preceding embodiment will be applied to this embodiment for the same parts.

The server SV4 is the same as the above-mentioned server SV2, the diagram cited above is used for its block diagram.

Figure 41:
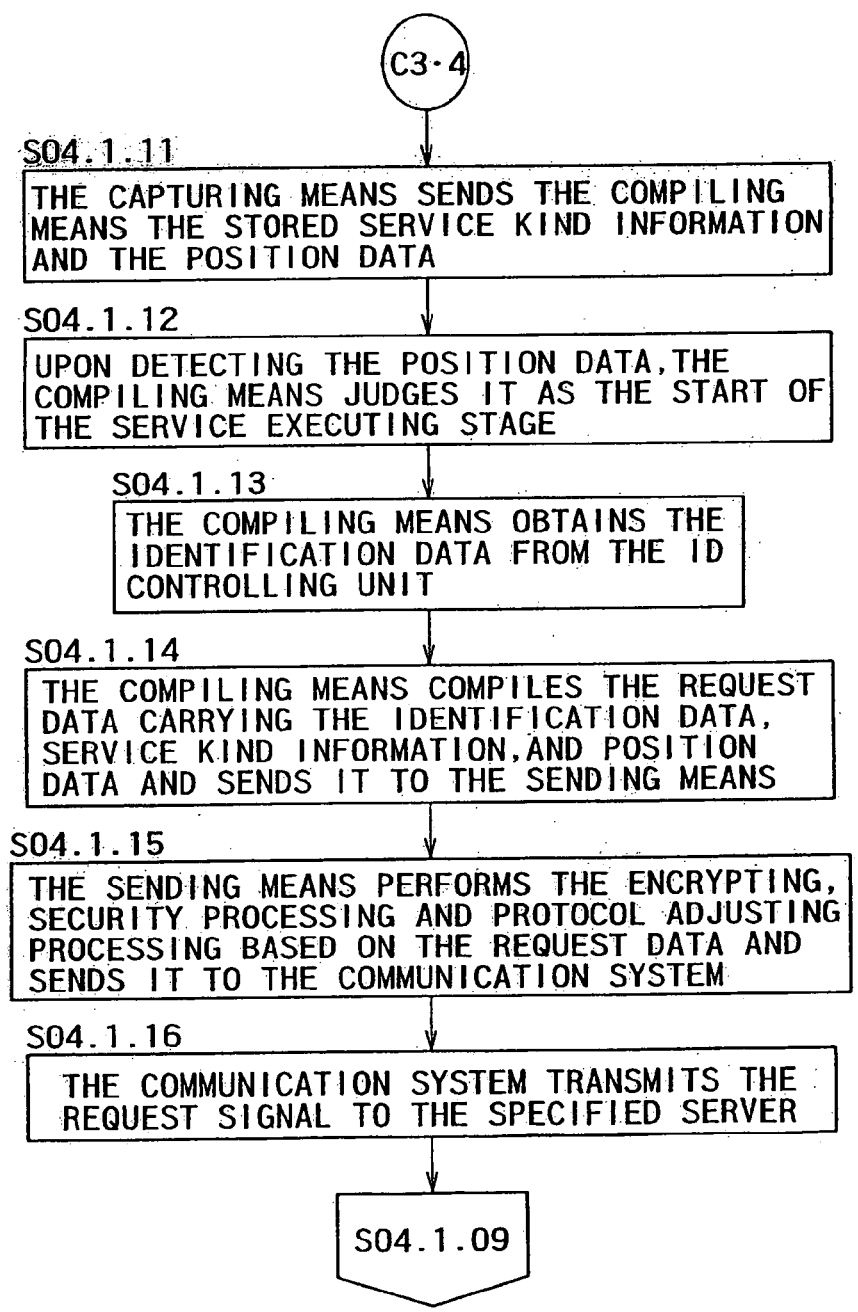
FIG. 41 is an action flowchart that follows FIG. 40.

FIGS. 40 and 41 are action flow charts of the client CL4 and the server SV4.

The client CL4 is a piece of computer-based equipment having the wireless/wire communication function; like the above-mentioned client CL1, it should preferably be a mobile communication equipment as a mobile machine, such as portable telephone, car-mounted telephone, and PDA. It ma also be a stationary personal computer, work station, and game machine.

The client CL4 has the position data providing means 0101 (which has the GPS receiving function) to enter the position data pd, the service request inputting means 0105 to enter the service request data sr, the capturing means 0202, the compiling means 0203, the sending means 0204, the communication interface ifc, the frequency controlling means 0111, the id controlling means 0113, the receiving means 0205, the displaying means 0206, the specification table 0209 in which the screen updating capability of the this client CL4 is recorded as the realizable screen updating frequency avfQ, and the power unit Pw.

The service request means 0105 issues to the capturing means 0202 the service request data sr carrying the desired service kind information (the desired server, the kind of contents information, the kind of event data, the information of the communication circuit/provider to be used. And, the capturing means 0202, upon capturing the service request data sr, issues a mark indicating the service start adjusting stage. This is identical to the description given above.

The position data providing means 0101, upon receiving the control signal 1a1 from the frequency controlling unit 0111, generates the position data pd at its timing. Since the control signal 1a1 is issued at the standard frequency stfQ as mentioned later, the position data providing means 0101 operates at the standard frequency stfQ so that the generation frequency g·fQ1 is equal to the standard frequency stfQ. Except for the foregoing, it operates in almost the same way as in the above-mentioned embodiment.

The compiling means 0203, upon receiving from the capturing means 0202 data carrying the above-mentioned mark, judges as the start of the service start adjusting stage and sends the frequency controlling unit 0111 an instruction to set up the standard frequency srfQ by referencing the realizable screen updating frequency avfQ shown in the specification table 0209 and a notice mentioning that the control object is the position data providing means 0101, then upon receiving through the capturing means 0202 the position data pd generated by the position data proving means 0101 under the control of the frequency controlling unit 0111, it judges as the completion of the service start adjusting stage and the start of the service executing stage, and it compiles the request data 203b.

It sends the sending means 0204 the request data 203a on which are placed the identification data id (including the resource information for individual machines), the service kind information, and the position data pd. Then, the request data 203b is sent repeatedly to the sending means 0204, with the position data pd (as the event data) updated repeatedly with the lapse of time.

The frequency controlling unit 0111, upon receiving from the compiling means 0203 an instruction to set up the standard frequency stfQ by referencing the realizable screen updating frequency avfQ shown in the specification table 0209 and a notice 2034 mentioning that the control object is the position data providing means 0101, judges the present time as the service start adjusting stage and performs the following processing sequentially.

(1) It references the specification table 0209 and reads the realizable screen updating frequency avfQ.

(2) it sets up the standard frequency svfQ within a range not exceeding the realizable screen updating frequency avfQ.

(3) It finishes the service start adjusting stage and moves to the service executing stage, and issues the control signal 1a1 at the standard frequency stfQ, thereby starting the repeated supply to the position data providing means 0101.

The specification table 0209 is the performance specification table in the receiving side; it is constructed such that the data of the realizable screen updating frequency avfQ of the displaying apparatus 2060 is written in the ROM so that it can be read out easily.

The sending means 0204 and each means and unit in the latter stage operate in the service executing stage; in the same way the server SV4 also operates in the service executing stage. The functions and actions of the latter stage are almost identical to the above-mentioned embodiment, and hence the drawing and description of the above-mentioned embodiment are cited.

Description of Action:

The action of the fourth embodiment is explained in the following.

In FIG. 40, when the user asks for the service start, it operates the service request inputting means 0105 of the client CL4 to manually enter the desired service kind information (including information of the desired server, the kind of contents information, the specification of position data as the kind of event data, and the communication circuit/provide to be used) (Step S04.1.01). The service request inputting means 0105, according to this operation, issues the service request data sr carrying the service kind information and sends it to the capturing means 0202 (Step S04.1.02).

The capturing means 0202 of the client CL4 confirms that the reached signal is the one which has been generated from the service request inputting means 0105, thereby detecting that it is the service request data sr indicating the trigger of the service start adjusting stage and captures it immediately, after confirming the content, it stores and holds the specified service kind information carried by this service request data sr (Step S04.1.03).

In order to confirm before service execution the capable screen updating frequency of the said client CL4, the capturing means 0202 attaches to the content of the received service request data sr a mark notifying that it is the service start adjusting stage, and it sends as the data 202a to the compiling means 0203 (Step S04.1.04).

Upon receiving the above-mentioned data carrying a mark from the capturing means 0202, the compiling means 0203 judges it as the start of the service start adjusting stage (Step S04.1.05), and it sends the frequency controlling unit 0111 an instruction to set up the standard frequency stfQ by the reference of the realizable screen updating frequency shown in the specification table 0209 and a notice 2034 that the control object is the position data providing means 0101 (Step S04.1.06).

Upon receiving from the compiling means 0203 the instruction to set up the standard frequency stfQ by the reference of the realizable screen updating frequency shown in the specification table 0209 and the notice 2034 that the control object is the position data providing means 0101, the frequency controlling unit 0111 judges the present time is the service start adjusting stage and references the specification table in the ROM and reads the data of the realizable screen updating frequency avfQ (Step S04.1.07). Then it sets up the standard frequency stfQ within the range not exceeding the realizable screen updating frequency avfQ (Step S04.1.08).

By this, it finishes the service start adjusting stage and moves to the service executing stage, and issues the control signal 1a1 at the standard frequency stfQ and starts the repeated supply to the position data providing means 0101 (Step S04.1.09).

The position data providing means 0101 repeats the updating of the position data pd on receipt of the control signal 1a1 and provides to the capturing means 0202 (Step S04.1.10), and the capturing means 0202 captures the position data pd and sends the compiling means 0203 the data 202b to which is attached the stored service kind information (Step S04.1.11).

As soon as the compiling means 0203 detects the position data pd in the data 202b received from the capturing means 0202, it judges it as the completion of the service start adjusting stage and the start of the service executing stage (Step S04.1.12); it obtains from the id controlling unit 0113 the identifying data id (including the resource information of individual machines and equipment) (Step S04.1.13) and compiles the above-mentioned service kind information and the request data 203b on which the position data pd is placed and sends it to the sending means 0204 (Step S04.1.14).

Then, upon receiving the request data 203a sent from the compiling means 0203, the sending means 0204 performs the encrypting security processing and protocol adjusting processing (for example, the WAP request adjusting processing by the portable Internet use), and compiles the request signal CL4a addressed to this server SV4 and sends it to the communication system NT through the communication interface ifc (Step S04.1.15). The communication system NT sends it to the specified server SV4 (Step S04.1.16). Those after the above-mentioned step S04.1.09 are updated repeatedly during the service executing stage.

Each processing of the server SV4, which is processing of the loop that follows, and each processing (receiving and displaying) in the subsequent stage in client CL4, are the same as those in the above-mentioned embodiment, and hence the description of the above-mentioned embodiment is cited.

As mentioned above, in the fourth embodiment, the client CL4 in the service start adjusting stage determines the standard frequency stfQ based on the realizable screen updating frequency avfQ of the relevant displaying apparatus 0206 by referencing the built-in specification table 0209, and hence it is possible to easily set up the standard frequency stfQ conforming to the this client CL4. In addition, by controlling the frequency of repeated updating of the position data providing means 0101 in the forefront stage of the above-mentioned loop at this standard frequency stfQ, even in the case where the capable processing frequency of the position data providing means 0101, the server SV4, and the communication system NT is higher than the screen updating frequency avfQ, it is possible to avoid waste of generating and processing excess event data; therefore, it is possible to reduce the data processing amount of the receiving side CL4, and it is further possible to reduce the communication load of the communication system NT, and it is also possible to reduce communication cost.

In addition, as another construction of the fourth embodiment, the client CL4 has the Web accessing function and the browser corresponding to the WAP, and it receives the WSP response and is capable of reading the contents information HTML·Cts conforming to WML, and the server SV4 arranges the Web contents information HTML·Cts conforming to HTML, at the relay point of the wireless communication network and the Internet to which this client CL4 belongs, it has the WAP proxy and WAP gateway which function as the contents filter to convert the contents information HTML·Cts conforming to HTML into the contents information WML·Cts conforming to the WML, and it also performs conversion from the HTTP response into the WSP response, it interchange information interactively between the client CL4 and the server SV4, and it is possible to construct a system to offer the contents information Cts at a high frequency.

The Fifth Embodiment

Then, the fifth embodiment is one in which both the position pd and the viewing direction data dd are specified simultaneously, and it is based on the principle of pd and dd→Cst, denoted according to the above-mentioned definition. It is composed of in combination the receiving side CL5, the sending side SV5, and the communication system NT connected thereto. Moreover, it is assumed that frequency control is carried out by the receiving side CL5, and the objects of frequency control are the position data providing means 0101 and the viewing direction data inputting means 0102.

Figure 42:
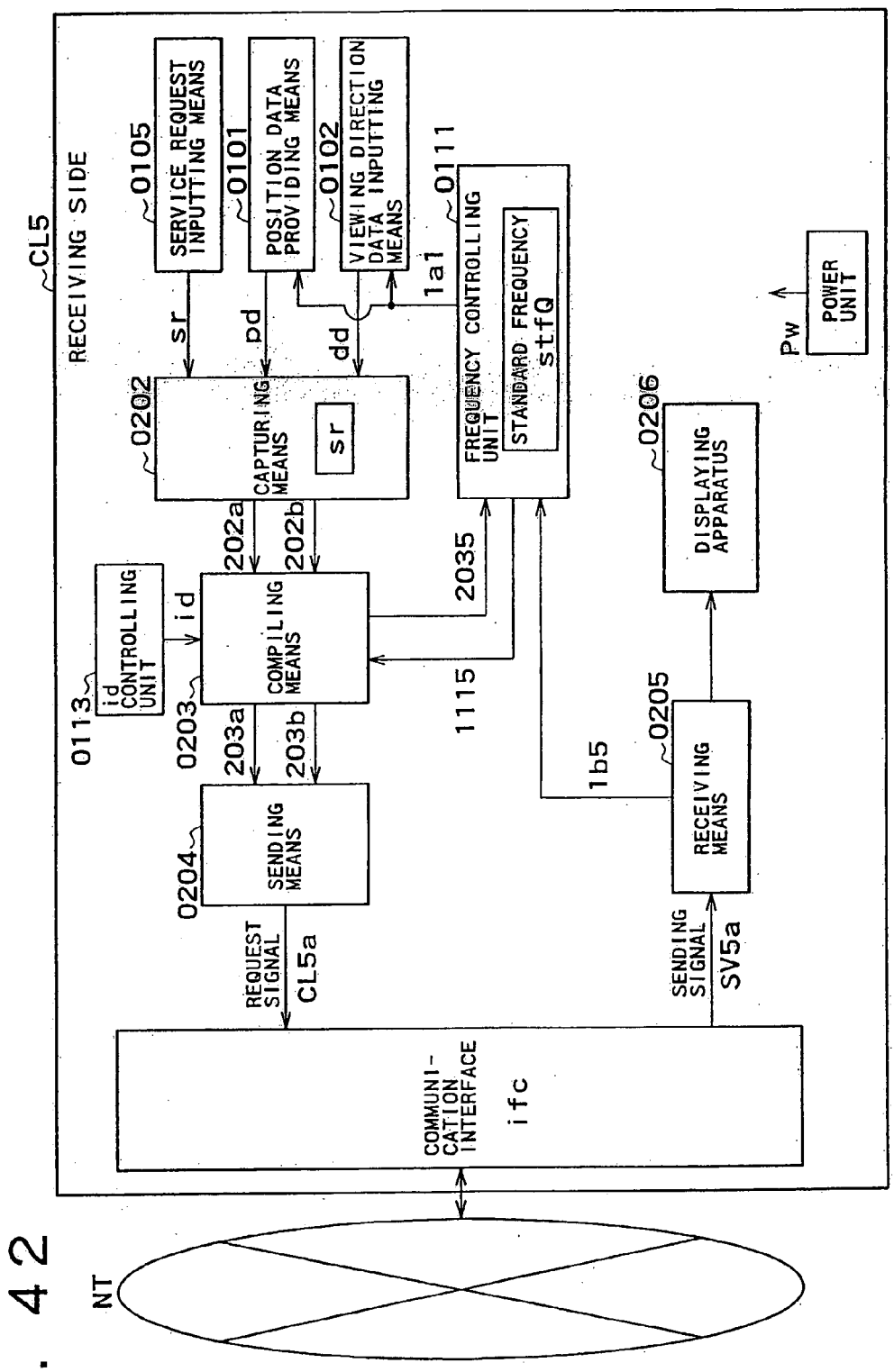
FIG. 42 is a block diagram showing the receiving side in the fifth embodiment of the contents information interchanging system according to the present invention.
Figure 43:
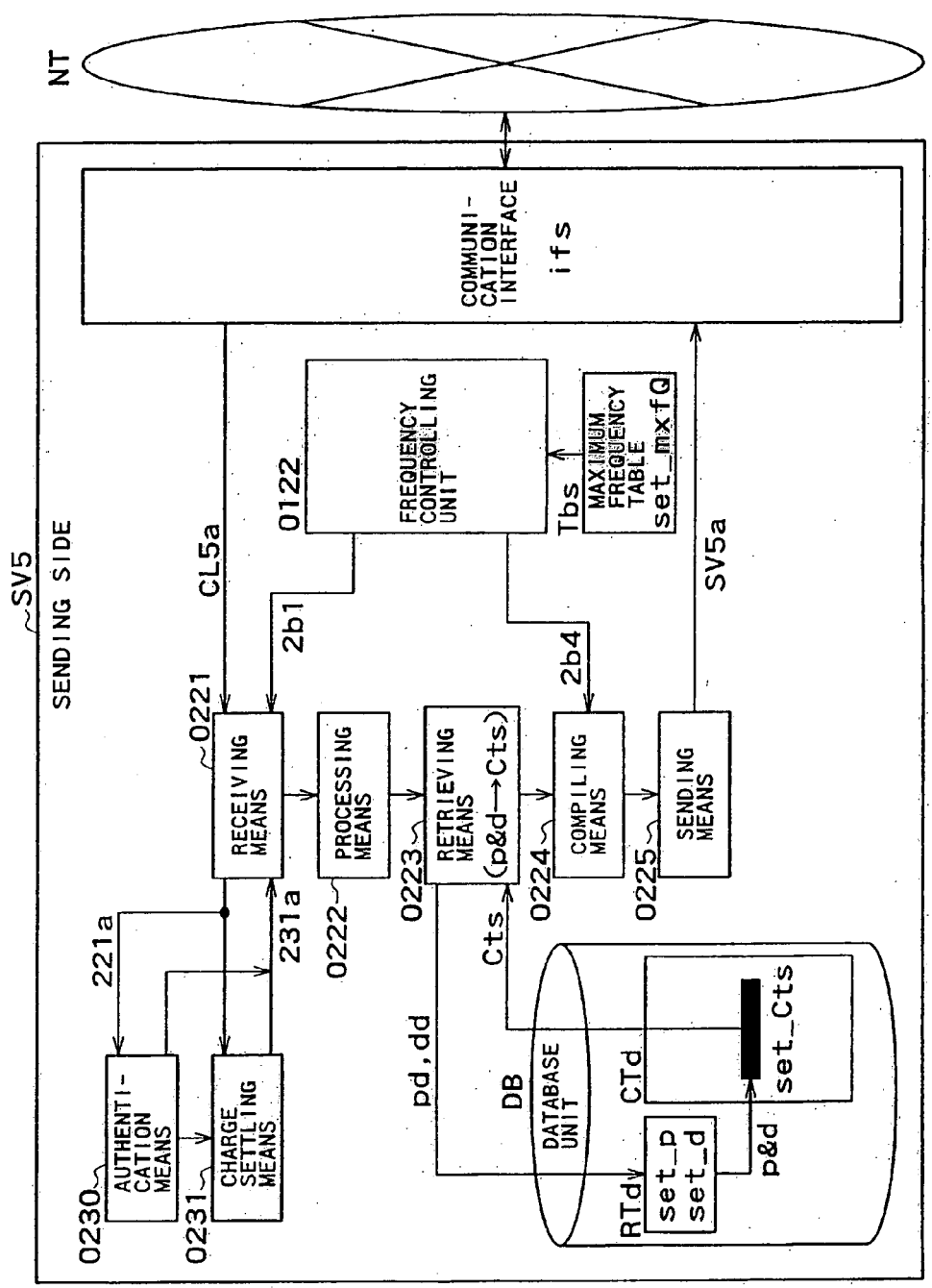
FIG. 43 is a block diagram showing the sending side in the fifth embodiment of the contents information interchanging system according to the present invention.

FIG. 42 is a block diagram showing the receiving side CL5, and FIG. 43 is a block diagram showing the sending side SV5. Incidentally, the description in the preceding embodiment will be applied to this embodiment for the same parts.

Figure 45:
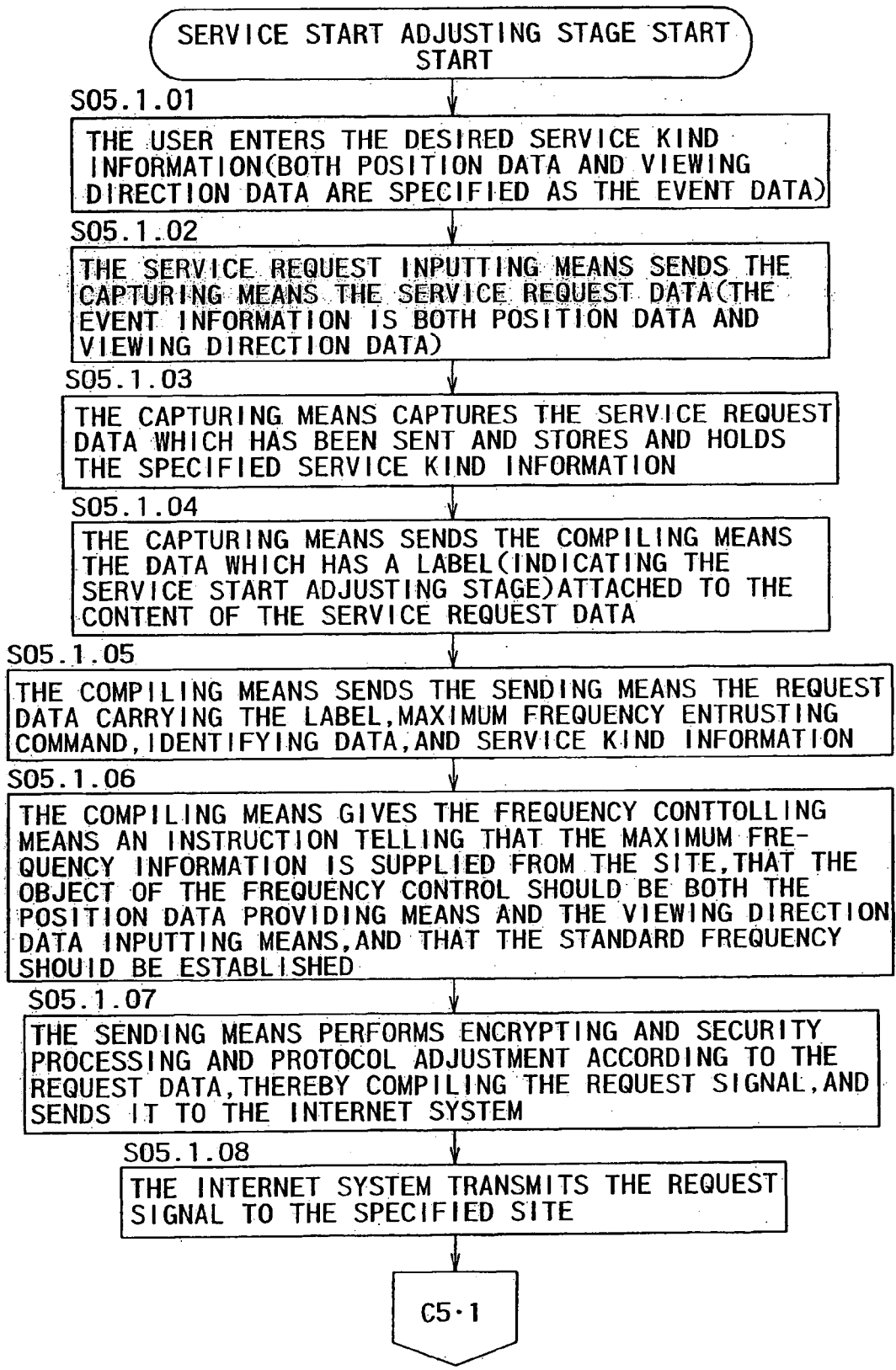
FIG. 45 is an action flowchart in the service start adjusting stage according to the fifth embodiment.
Figure 46:
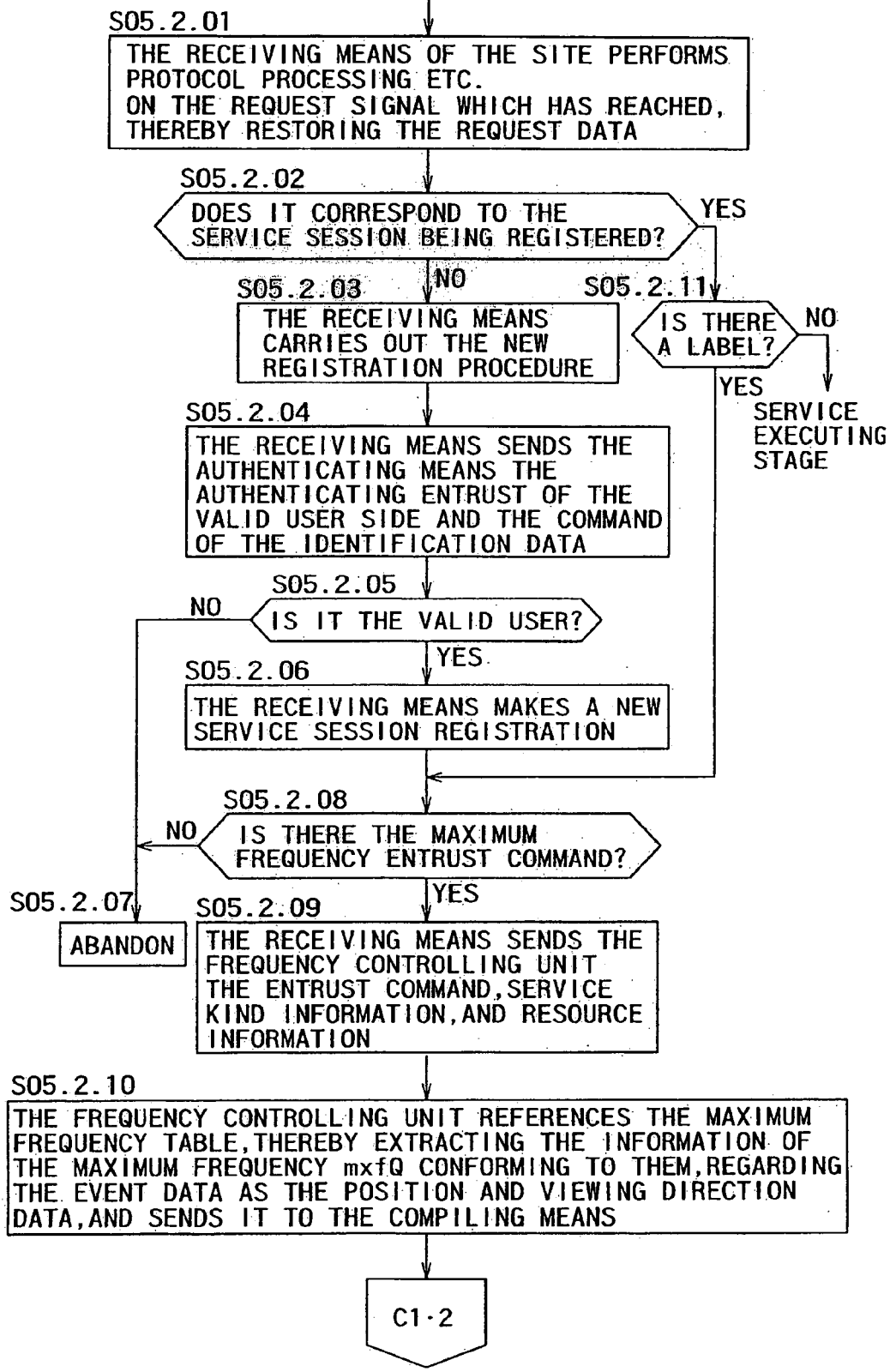
FIG. 46 is an action flowchart that follows FIG. 45.
Figure 47:
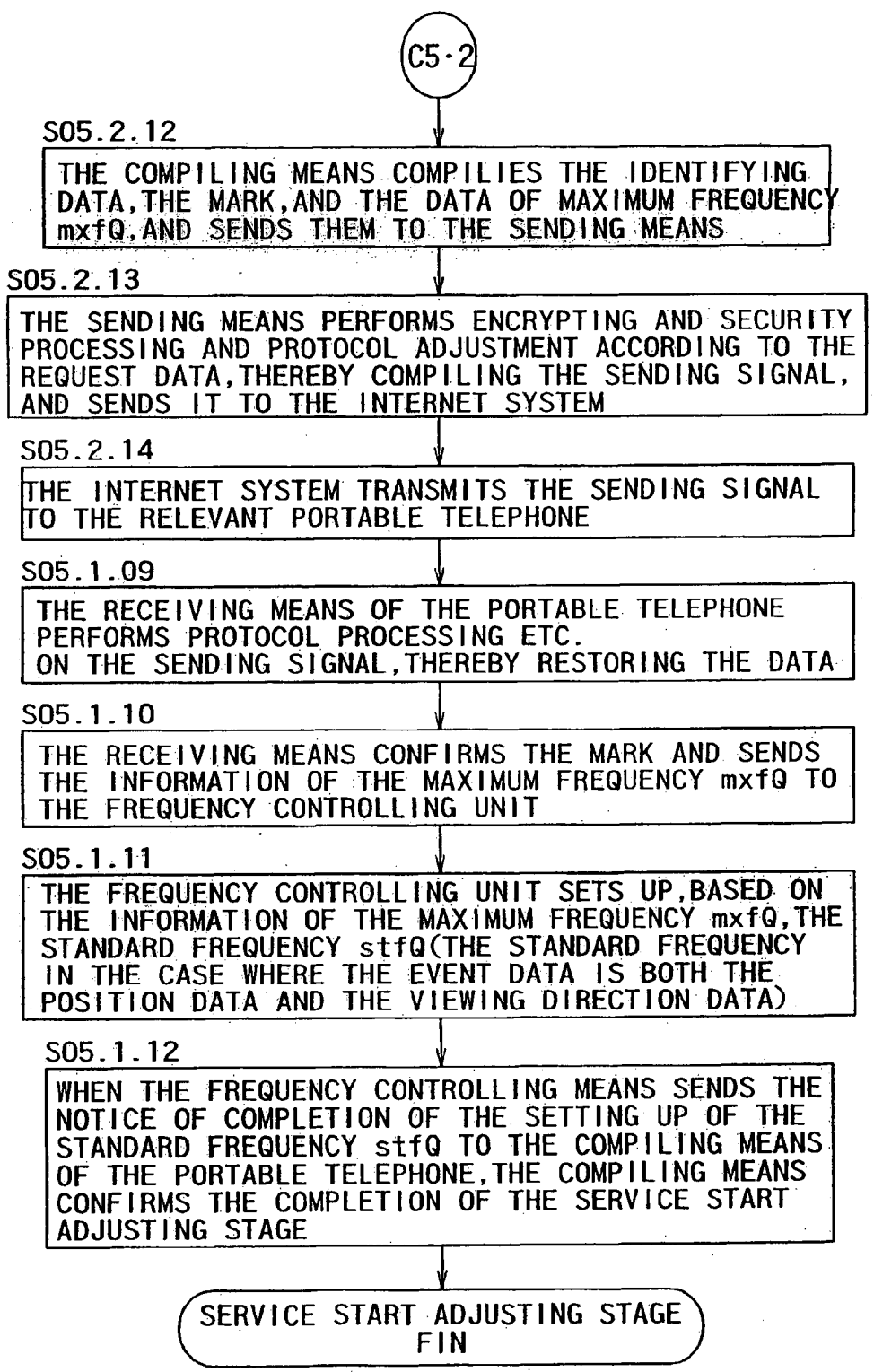
FIG. 47 is an action flowchart that follows FIG. 46.

FIGS. 45 to 47 are flow charts showing the action of the receiving side CL5 and the sending side SV5 in the service start adjusting stage.

Figure 48:
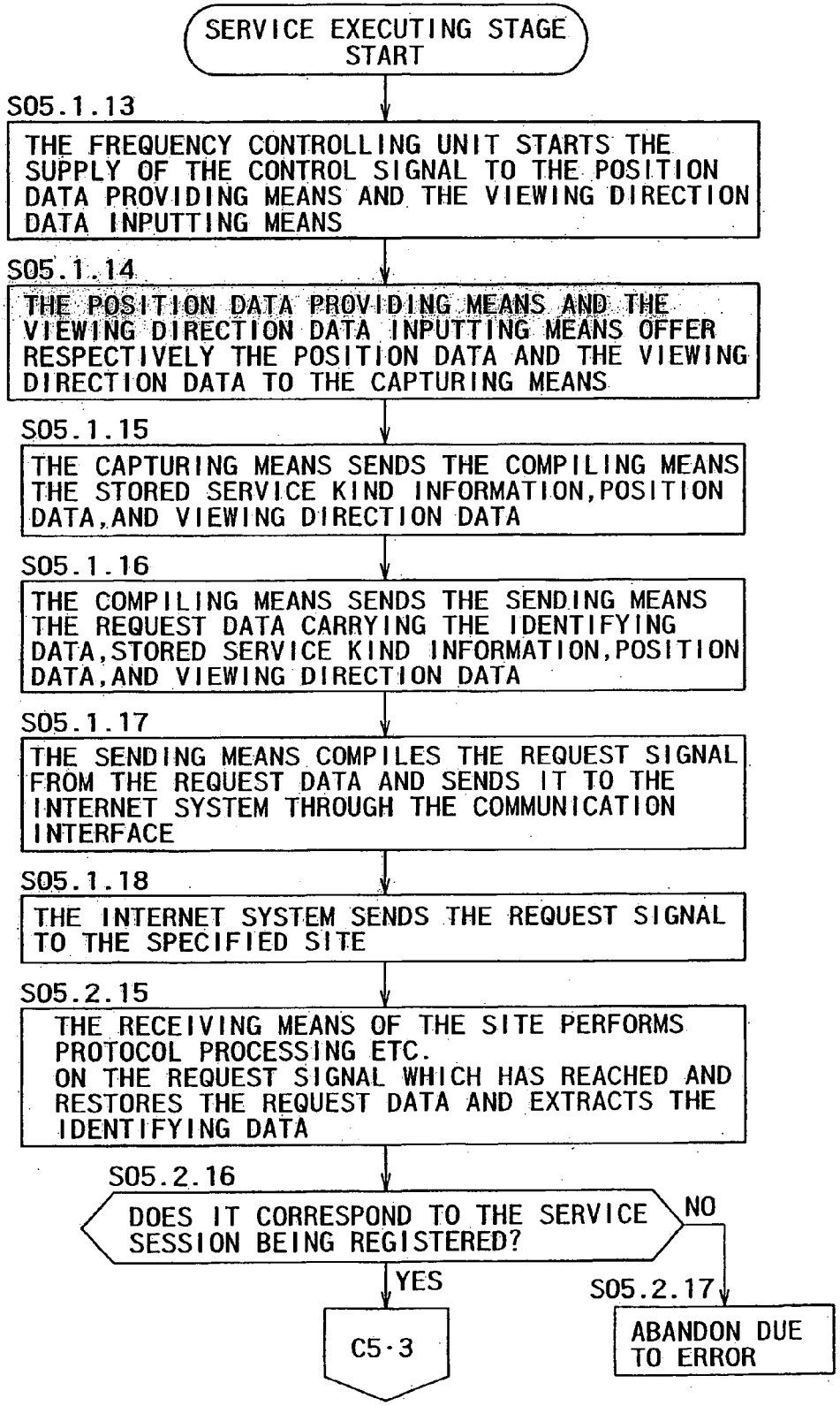
FIG. 48 is an action flowchart in the service execution stage according to the fifth embodiment.
Figure 49:
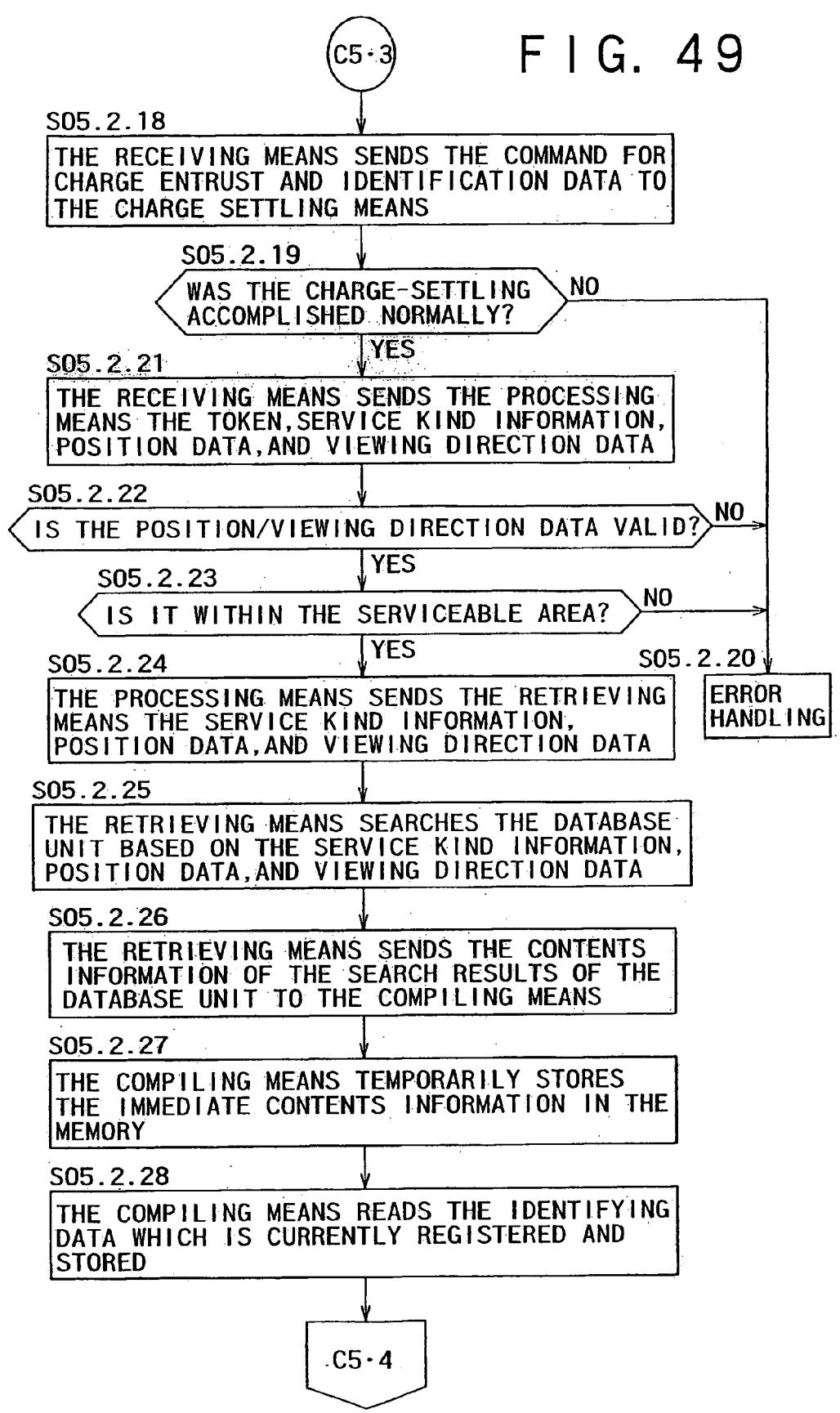
FIG. 49 is an action flowchart that follows FIG. 48.
Figure 50:
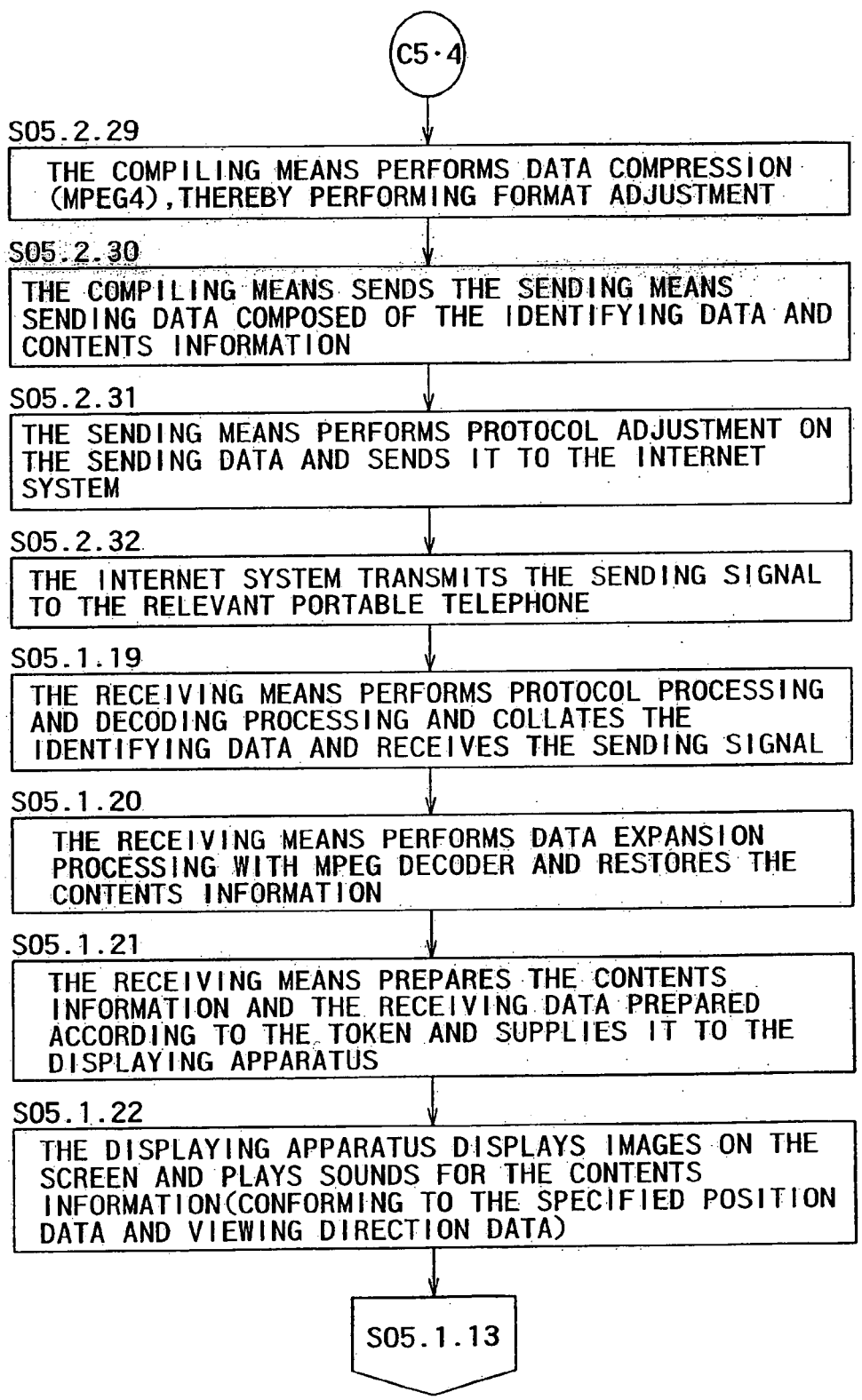
FIG. 50 is an action flowchart that follows FIG. 49.

FIGS. 48 to 50 are flow charts showing the action of the receiving side CL5 and the sending side SV5 in the service executing stage.

The system based on a combination of the receiving side CL5, the sending side SV5, and the communication system NT, performs the service start adjusting stage and the service executing stage sequentially as in the above-mentioned embodiment; in the service start adjusting stage, it references the maximum frequency table relating to the said system previously established in the sending side SV5 based on the condition which the user specifies by his input and sets up the standard frequency stfQ based on the thus obtained relevant maximum frequency mxfQ and executes the service executing stage based on the standard frequency stfQ.

As in the above-mentioned receiving side CL1, the receiving side CL5 is a piece of computer-based equipment having the wireless/wire communication function; it has the position data providing means 0101 to enter position data pd, the viewing direction data inputting means 0102 to enter viewing direction data dd, the service request inputting means 0105 to enter service request data sr, the capturing means 0202, the compiling means 0203, the sending means 0204, the communication interface ifc, the frequency controlling unit 0111, the id controlling unit 0113, the receiving means 0205, the displaying apparatus 0206, and the power unit Pw.

The service request means 0105 issues to the capturing means 0202 the desired server and the kind of contents information as the desired service kind information, and the specification of the position data and viewing direction data as the kind of event data, and the service request data sr carrying the kind of communication circuits to be used and the information about the provider. And, the capturing means 0202 issues a mark indicating the service start adjusting stage as soon as it captures the service request data sr. This is the same as the description given above.

The position data providing means 0101 is a GPS receiver built into the receiving side CL5, and it supplies the capturing means 0202 with the current position data pd based on the distances from a plurality of GPS satellites. Upon receiving the control signal 1a1 from the frequency controlling unit 0111, it generates the position data pd at its timing.

In what follows, we will explain the direction pointer Drp as an example of embodying the viewing direction data inputting means 0102.

FIG. 44 is a diagram illustrating the moving direction and the viewing direction which the moving user specifies. While a moving object MO (such as automobile, electric car, and aircraft) is moving in the moving direction dm, the user riding in the moving object MO can specify any desired viewing direction. As shown in the figure, when the desired viewing direction is the same direction vd1 as the moving direction dm, the viewed image is an image in which the viewed scene approaches from the front; on the other hand, when the viewed image is the opposite direction vd2 to the moving direction dm, the viewed image is an image in which the viewed scene goes away backward. In addition, the image which is viewed on the right of the moving direction dm is an image which flows from left to right. On the other hand, the image which is viewed on the left of the moving direction dm is an image which flows from right to left.

The direction pointer Drp has a sensor unit composed of a geomagnetism sensor and a gravity sensor which respectively detects the direction of geomagnetism and the direction of gravity. The sensor unit is supported on the frame of the moving object or on the pedestal mounted on the moving object, through a three-dimensional universal joint (such as swivel joint). The sensor unit can be turned freely by the user; it can be directed to any viewing direction specified by three variables, yaw (rotation angle between the horizontal direction and the viewing direction), pitch (rotation angle between the vertical direction and the viewing direction), and roll (rotation angle about the axis specified by yaw and pitch). The roll can incline the viewing direction from the horizontal direction or vertical direction.

The sensor unit outputs as the viewing direction data dd the direction established by its rotation. Moreover, the action of the sensor can be controlled by the control signal 1a1 from the frequency control unit 0111 or by the trigger signal from the capturing means 0202.

The compiling means 0203 detects the above-mentioned label in the data received from the capturing means 0202m thereby judging the start of the service start adjusting stage, then it sends the frequency controlling unit 0111 the fact that it has entrusted the sending side SV1 with the supply of information at the maximum frequency, the fact that the object of frequency control is the position data providing means 0101 and the viewing direction data inputting means 0102, and the instruction 2035 for establishment of the standard frequency, and then it compiles the request data 203a associated with the start adjustment.

The request data 203a is sent to the sending means 0204 together with the above-mentioned label, the identifying data id (including the resource information of each kind of machines), and service kind information.

Upon receiving from the frequency controlling unit 0111 the notice 1115 informing the completion of setting of the standard frequency, it finishes the service start adjusting stage.

Then, in the service executing stage, it compiles the request data 203b carrying the identifying data id, the service kind information, the position data pd, and the viewing direction data dd, and sends it to the sending means 0204. In addition, the request data 203b is sent repeatedly to the sending means 0204, with the position data (as the event data) and the viewing direction data dd updated repeatedly with the lapse of time.

Upon receiving from the compiling means 0203 the fact that it has entrusted the sending side SV1 with the supply of information at the maximum frequency, the fact that the object of frequency control is the position data providing means 0101 and the viewing direction data inputting means 0102, and the instruction 2035 for establishment of the standard frequency, the frequency controlling means 0111 recognizes that the present time is the service start adjusting stage, and it carries out the following processing sequentially.

(1) it waits until the information of maximum frequency mxfQ offered by the sending side SV5 is sent through the receiving means 0205 as the data 1b5.

(2) When the information of maximum frequency mxfQ is sent, it sets up the standard frequency stfQ based on this.

(3) It sends the compiling means 0203 the notice 1115 of completion of the setting up of the standard frequency stfQ.

(4) Then, it moves to the service executing stage and issues the control signal 1a1 at the standard frequency stfQ, thereby starting the repeated supply to the position data providing means 0101 and the viewing direction data inputting means 0102.

Incidentally, as to the other functions and actions of the frequency controlling means 0111, the description of the above-mentioned embodiments is cited.

As soon as the sending signal SV5a sent from the sending side SV5 reaches, the receiving means 0205 performs protocol processing and collates it with the identifying data id and receives it, and performs decoding processing (as needed) and data expansion processing. If, as the result, it detects the mark indicating that the information of the maximum frequency mxfQ is mounted, it recognizes as the service start adjusting stage and sends the frequency controlling unit 0111 the information of the maximum frequency mxfQ as the data 1b5. On the other hand, if it detects the contents information Cts, it recognizes as the service executing stage, and it forms the receiving data based on this and supplies it to the displaying apparatus 0206.

And, other means work in almost the same way as in the above-mentioned embodiments.

The sending side SV5 consists of the communication interface ifs, the frequency controlling means 0122, the maximum frequency table Tbs, the authenticating means 0230, the charge settling means 0231, the processing means 0222, the retrieving means 0223, the database unit DB, the compiling means 0224, the sending means 0225, and a power unit (not shown).

The frequency-controlling unit 0122, in the service start adjusting stage, references the maximum frequency table. Tbs based on the signal 2b1 on which are mounted the combination information of the receiving side CL5/the sending side SV5/the communication system NT, the resource information, the kind of contents information, and kind of event data (the position data and viewing direction data), which have been sent from the receiving means 0221, thereby sending the data of the relevant maximum frequency mxfQ as the signal 1b4 to the compiling means 0224.

Also, in this embodiment, the frequency controlling means 0122 works only in the service start adjusting stage and does not work in the service executing stage. In other words, the frequency control in the sending side SV5 is not executed in the service executing stage.

The maximum frequency table Tbs is intended to prepare in table form the maximum frequency mxfQ corresponding to the combination of the receiving side CL5/the sending side SV5/the communication system NT, the resource information, the kind of contents information, and the kind of event data (position data and viewing direction data); as with the above-mentioned first embodiment, it is previously stored in the recording means (not shown) such as magnetic disk recording unit and detachable memory unit.

And, according to the foregoing, the maximum frequency table Tbs is stored in the recording means in the sending side SV5 and its content is controlled by the sending side SV5; however, it may be so constructed as to reference the one installed in other server or proxy.

In addition, it may also be so constructed as to capture and collect in the receiving side CL5 and/or the sending side SV5 from the Web page of the supply side on the Internet.

The database unit DB controls the contents information Cts (scene and voice data) corresponding to each position data p and each viewing direction information d.

Also, the functions and operation of the other means and units are almost the same as in the first embodiment, and hence the above-mentioned description is cited here.

Description of Action:

The action of the fifth embodiment is explained in the following.

Here, it is assumed that the receiving side is a portable telephone adaptive to broadband and that the user asks the sending side SV5 the real time service of the contents information Cts corresponding to the momentary position and the desired viewing direction while the user is walking or traveling by an automobile or any other moving object. The above-mentioned direction pointer Drp is constructed such that it can be removed from the case of the portable telephone (in the connected state) and moved in any direction.

The position data pd and the viewing direction data dd (as the event data) are specified by the user. On the other hand, it is also assumed that the sending side SV5 is the service side which database-controls the contents information Cts (scene data) corresponding to each position (place) and each viewing direction, and both of them interchange information through the Internet system adaptive to the wireless broadband, which is an example of the communication system NT.

In the following, the receiving side CL5 is referred to as the portable telephone CL5, the sending side SV5 is referred to as the site SV5, and the communication system NT is referred to as the Internet system NT.

In this system, the portable telephone CL5 references the maximum frequency table Tbs as a given condition, thereby confirming the maximum frequency mxfQ corresponding to the combination of the portable telephone CL5/the site SV5/the Internet system NT, the resource information, the kind of contents information, and the kind of event data (position data and the viewing direction data), and setting up the standard frequency stfQ; however, the maximum frequency table Tbs is placed in the site SV5 but is not placed in the portable telephone CL5 for simplicity.

It is also assumed that the frequency control is carried out by the portable telephone CL5 and that the object of the frequency control is the position data providing means 0101 and the viewing direction data inputting means 0102, which are the foremost stage of the above-mentioned loop.

The operation flow that is shown below consists of two stages—the service start adjusting stage and the service executing stage.

Actions in the Service Start Adjusting Stage in the Fifth Embodiment.

FIGS. 45 to 47 show the flow of actions in the service start adjusting stage.

In FIG. 45, when the user requests the service start, he operates the service request inputting means 0105 of the portable telephone CL5, thereby to manually enter the desired service kind information (the desired site, the kind of contents information, the specification of the position data and viewing direction data as the kind of event data, the kind of the communication circuit to be used, and the provider information) (Step S05.1.01). By this operation, the service request inputting means 0105 generates the service request data sr carrying the service kind information and sends it to the capturing means 0202 (Step S05.1.02).

The capturing means 0202 of the portable telephone CL5 confirms that the signal which has reached is generated from the service request inputting means 0105, detects that it is the service request data sr indicating the trigger of the service start adjusting stage and captures it immediately, confirms the content, and stores and holds the specified service kind information which is carried on this service request data sr (Step S05.1.03).

The portable telephone CL5 is required to confirm before service execution the quality of service for the kind of the specified contents information and the kind of event data (the position data and viewing direction data) which is possible with the current combination construction. So, the capturing means 0202 attaches a label to the content of the received service request data sr notifying that it is the service start adjusting stage, and sends it as the data 202a to the compiling means 0203 (Step S05.1.04).

Upon detecting the label notifying of the service start adjusting stage in the data 202a sent from the capturing means 0202, the compiling means 0203 judges that the service start adjusting stage has started. Then, it sets up the standard frequency; however, in this construction, the portable telephone CL5 does not control the list of the maximum frequency, which is necessary to set up the standard frequency, and hence it entrusts the site SV5, so as to receive the offer of information of the maximum frequency controlled by the site SV5, it prepares the service kind information and maximum frequency entrust command, and the request data 203a carrying the identifying data id of the user side (such as the user's data, and the kind, specification data, and product number of this portable telephone) obtained from the id controlling unit 0113, and sends it to the sending means 0204 (Step S05.1.05).

Then, regarding the frequency control by the portable telephone CL5, it informs the frequency controlling means 0111 that is has entrusted the offer of information of the maximum frequency to the site SV5, the object of the frequency control is the position data providing means 0101 and the viewing direction data inputting means 0102, and the instruction 2035 for setting up the standard frequency (Step S05.1.06).

Then, upon receiving the request data 203a sent from the compiling means 0203, the sending means 0204 performs encrypting securing processing, protocol adjusting processing (for example, WAP request adjusting processing by the portable Internet utilization), compiles the request signal CL5a addressed to this site SV5, and sends it to the Internet system NT through the communication interface ifc (Step S05.1.07). The Internet system NT transmits it to the specified site SV5 (Step S05.1.08).

Then, the receiving means 0221 of the site SV5 receives the request signal CL5a, which has been sent from the portable telephone CL5 through the Internet system NT, through the communication interface ifs, and it performs protocol processing and decoding processing and carries out data expansion and restores the request data (Step S05.2.01) Then it extracts the user's identifying data id and the desired service kind information from the request data, and it judges, based on this, whether it corresponds to the currently registered service session (Step S05.2.02). Upon judging that it corresponds to the currently registered service session, it judges as continuation of service now in progress and confirms the presence or absence of label in Step S05.2.11. If label is absent, which means the service executing stage, it moves to the corresponding step, and if label is present, it proceeds to Step S05.2.08.

On the other hand, in Step S05.2.02, if there is not the currently registered service session or the corresponding one, then it performs the new registration procedure (Step S05.2.03). To entrust for authenticating that this portable telephone CL5 is the valid user side, it sends the command 221a carrying the mark indicating the entrust for authentication and the identifying data id to the authenticating means 0230 (Step 505.2.04).

And it receives the result notice 231a from the authenticating means 0230 and judges (Step S05.2.05); if it is the valid user side, it makes a new service session registration and fixes (Step S05.2.06); and if it is not the valid user side, it abandons this request signal CL5a (Step S05.2.07).

Then, the receiving means 0221, after the above-mentioned service session has been fixed, checks for the presence or absence of the maximum frequency entrust command in the request signal CL5a (Step S05.2.08); if the maximum frequency entrust command is detected, it recognizes as being in the service start adjusting stage, and it sends this maximum frequency entrust command and the extracted service kind information and the resource information (such as equipment kind) extracted from the identifying data id, as the data 2b1, to the frequency controlling unit 0122 (Step S05.2.09). On the other hand, if the maximum frequency entrust command is not detected, regardless of the new service, the maximum frequency processing is not performed, it moves to Step S05.2.07 as an error, and it abandons this request signal CL5a.

The frequency controlling means 0122 receives the data 2b1 from the receiving means 0221, and if it detects the maximum frequency entrust command and the service kind information and the resource information, it recognizes that the present time is the service start adjusting stage. Then based on this, it references the list "service kind & resource information" vs. "maximum frequency matching it", which is previously recorded and prepared in the maximum frequency table Tbs placed in the site SV5, and it extracts information of the applicable maximum frequency mxfQ and sends it to the compiling means 0224 (Step S05.2.10). Incidentally, this list corresponds to the position information p and the viewing direction information d.

Then, the compiling means 0224, as the information of the maximum frequency mxfQ as the data 2b4 is sent from the frequency control unit 0122, it recognizes as the service start adjusting stage, and it compiles data composed of he mark indicating the maximum frequency mxfQ, the identifying data id, and the maximum frequency mxfQ, and sends it to the sending means 0225 (Step S05.2.12). The identifying data id reads what is stored in the above-mentioned temporary memory.

The sending means 0225, as the marked data is sent from the compiling means 0224, recognizes as the service start adjusting stage, and it generates the sending signal SV5 carrying the mark indicating the sending of the maximum frequency mxfQ and the data of the maximum frequency mxfQ and the identifying data id, and sends it to the Internet system NT through the communication interface ifs (Step S05.2.13). The Internet system NT transmits the sending signal SV5 to the portable telephone CL5 (Step S05.2.14).

As soon as the sending signal SV5 sent from the site SV5 has reached, the receiving means 0205 of the portable telephone CL5 performs protocol processing and confirms the identifying data id and then receives the sending signal SV5a and performs decoding and data expansion for recovery (Step S05.1.09). If it detects the mark indicating that information of the maximum frequency is being carried, it recognizes as the service start adjusting stage, and sends the restored information of the maximum frequency mxfQ as the data 1b5 to the frequency controlling unit 0111 (Step S05.1.10). This maximum frequency mxfQ becomes the maximum frequency conforming to the combination of the currently applied portable telephone CL5, the Internet system NT, and the site SV5, the kind of the relevant contents information, the position data pd and viewing direction data dd as the relevant kind of event data, and the kind of the communication circuit to be used.

Upon receiving the information of the maximum frequency mxfQ as the data 1b5 from the receiving means 0205, the-frequency controlling unit 0111 sets up the standard frequency stfQ based on this (Step S05.1.11). The standard frequency stfQ may be set at any value not exceeding the maximum frequency mxfQ; in this example, the standard frequency stfQ is set equal to the maximum frequency mxfQ. Then, it sends the setting completion notice 1115 of the standard frequency stfQ to the compiling means 0224 (Step S05.1.12). By this setting, the service start adjusting stage is finished and it moves to the service executing stage.

As mentioned above, in the case where the object service kind is a huge number, having the maximum frequency table built in the equipment (like the portable telephone CL5) with a light degree of data processing resource and retrieving it is not advisable from the standpoint of memory capacity, processing step, equipment dimension, weight, and particularly batter consumption. So, this portable telephone CL5, in the service start adjusting stage, entrusts the site SV5 under the rich data processing resource environment, and has the maximum frequency table Tbs retrieved and the applicable maximum frequency mxfQ sent. By this entrust, the portable telephone CL5 can obtain the maximum frequency mxfQ by utilizing the resources in the site SV5 without holding and keeping the maximum frequency table for itself, and it is possible to set up the standard frequency stfQ based on this.

Actions in the Service Executing Stage in the Fifth Embodiment.

FIGS. 48 to 50 show the flow of actions in the service executing stage.

In FIG. 48, the frequency controlling unit 0111 starts the repetitive supply of the control signal 1a1 of the frequency equal to the standard(frequency stfQ to the position data providing means 0101 and the viewing direction data inputting means 0102 (Step S05.1.13). By the supply start of this control signal 1a1, the service executing stage starts.

The position data providing means 0101 and the viewing direction data input means 0102 operates by the supply start of the control signal 1a1 from the frequency controlling unit 0111; they execute respectively GPS positioning and viewing direction specifying and supply the results (as position data pd and viewing direction data dd) to the capturing means 0202 (Step S05.1.14). By this, the generation frequency g·fQ1 of the position data pd and the viewing direction data dd is controlled equal to the standard frequency stfQ and the excessive generation is avoided.

As soon as respective data is provided from the position data providing means 0101 and the viewing direction data inputting means 0102, the capturing means 0202 recognizes it as the service executing stage and captures it and takes out the service kind information which has been stored and held in the above-mentioned service start adjusting stage. Then it sends the compiling means 0203 the data 202b carrying the service kind information and the position data pd and the viewing direction data dd (Step S05.1.15). Here, since the said processing is executed following the generating frequency g·fQ1 of the position data pg and the viewing direction data dd, the capturing frequency a·fQ1 and the sending frequency of the data 202b are controlled equal to the standard frequency stfQ accordingly; thus the processing execution and sending at an excess or too small frequency do not occur in the said capturing means 0202.

The compiling means 0203 receives the data sent from the capturing means 0202; at this time no control signal is supplied from the frequency controlling unit 0111 and hence it captures at the timing as data reaches, since the above-mentioned label is absent, it recognizes that this data is the data 202b sent in the service executing stage, and then the identifying data id obtained from the controlling unit 0113 at the head, it sends the sending means 0204 the service kind information and the request data 203b carrying the position data pd and the viewing direction data dd (Step S05.1.16). Here, since the said processing is executed following the sending frequency of the data 202b from the preceding stage, the sending frequency of the compiling frequency cmp·fQ1 and the request data 203b is controlled equal to the standard frequency stfQ accordingly, and hence the processing execution and sending at an excess or too small frequency do not occur in the said compiling means 0202.

Then, the sending means 0204 receives the request data 203b sent from the compiling means 0203; at this time, since no control signal is supplied from the frequency controlling unit 0111, it captures with the timing at which the request data 203b has reached, and it performs with the said timing encrypting securing processing and protocol adjusting processing etc., compiles the request signal CL5a addressed to this site SV5, and sends it to the Internet system NT through the communication interface ifc (Step S05.1.17). Here, since the said processing is executed following the sending frequency of the request data 203b from the preceding stage, the sending frequency Req·fQ1 of the request signal CL5a is controlled equal to the standard frequency stfQ accordingly, and hence the processing execution and sending at an excess or too small frequency do not occur in the said sending means 0204.

Then, the internet system NT transmits it to the specified site SV5 (Step S05.1.18). Also, in this embodiment, no control command is supplied from the sending means 0204.

Here, since the transmission processing is executed following the sending frequency of the request signal CL5a from the preceding stage, the transmitting frequency trf·fQ1 of the request signal CL5a is controlled equal to the standard frequency stfQ accordingly, and hence the processing execution and sending at an excess or too small frequency do not occur in the said Internet system NT.

The receiving means 0221 of the site SV5 receives the request signal CL5a, which has been sent to itself from the portable telephone CL5 through the Internet system NT, through the communication interface ifs, and it performs protocol processing and decoding processing and carries out data expansion and restores the request data and it extracts the user's identifying data id and the desired service kind information from the request data (Step S05.2.15). In this embodiment, there is no supply of the control signal from the frequency controlling unit 0122.

Then, it judges whether it corresponds to the currently registered service session (Step S05.2.16). Upon confirming that it is the currently registered service session, it judges as a continuation of service now in progress and performs charge/settling processing. If it does not correspond, despite the fact that it is the service executing stage that follows the service start adjusting stage, it treats as an error for not corresponding to the registered service session (step S05.2.17).

Then, it sends the charge settling means 0231 the command 221a carrying the mark indicating the charge entrust and the user's identifying data id, thereby performing charge/settling processing (Step S05.2.18) and it judges the result in the return notice 231a (Step S05.2.19).

If the processing is normal completion by judgment, it moves to the step S05.2.21 and carries out the subsequent processing. By contrast, if the charge/settling processing result is a failure termination, it moves to the Step S05.2.20, and it abandons this request signal CL5.

Also, in this embodiment, it performs charge calculation each time the request signal CL5a is received and accumulates this, and it settles (future payment on the meter-rate system) when a prescribed number of times is reached. Charging in advance payment is also acceptable.

After charge/settling processing, the receiving means 0221 sends the processing means 0222 the service kind information and the data carrying position data pd and viewing direction data dd (Step S05.2.21). Here, since the said processing is executed following the sending frequency of the request signal CL5a from the preceding stage, the receiving frequency a·fQ2 and the sending frequency of data to the processing means 0222 are controlled equal to the standard frequency stfQ accordingly, and hence the processing execution and sending at an excess or too small frequency do not occur in the said receiving means 0221.

The processing means 0222 examines the event data based on the data sent from the receiving means 0221, and examines the validity of the format of position data pd and viewing direction data dd (Step S05.2.22). It also check whether or not this site is within the serviceable area (step S05.2.23).

If the examination result is not valid, it judges as unserviceable and moves to Step S05.2.20 and abandons the said request. On the other hand, if the examination result is valid, it sends the retrieving means 0223 the service kind information and the data carrying position data pd and viewing direction data dd (Step S05.2.24). Also, in this embodiment, there is no supply of control signal from the frequency controlling unit 0122.

Since the said processing is executed following the frequency (receiving frequency a·fQ2) of the data sent from the receiving means 0221, the processing frequency pr·fQ2 and the sending frequency of data to the retrieving means 0223 are controlled equal to the standard frequency stfQ accordingly, and hence the processing execution and sending at an excess or too small frequency do not occur in the said processing means 0222.

The retrieving means 0223 performs retrieving processing at the timing (processing frequency pr·fQ2) at which it has received data from the processing means 0222. Also, in this embodiment, there is no supply of control signal 2a3 from the frequency controlling unit 0122.

It references the retrieving standard information unit RTd of the database unit DB based on the service kind information, position data pd, and viewing direction data dd, and fixes the position information p corresponding to the position data pd and the viewing direction information d corresponding to the viewing direction data dd, and then searches the contents unit CTd based on the kind of contents information (carried by the service kind information), the position information p, and the viewing direction information d, and obtains the contents information Cts corresponding to them from the database unit DB (Step S05.2.25). Then it sends the compiling means 0224 the contents information Cts of the search result (Step S05.2.26).

Since the said processing is executed following the frequency (processing frequency pr·fQ2) of the data sent from the processing means 0222, the retrieving frequency rt·fQ2 and the sending frequency of data to the compiling means 0224 are controlled equal to the standard frequency stfQ accordingly, and hence the processing execution and sending at an excess or too small frequency do not occur in the said retrieving means 0223.

The compiling means 0224 performs compiling processing at the timing (retrieving frequency rt·fQ2) at which it has received data from the retrieving means 0223. Also, in this embodiment, there is no supply of control signal from the frequency controlling unit 0122.

The compiling processing causes the memory to temporarily store the immediate contents information Cts for the compression processing of the next contents information (Step S05.2.27). Then, it references the present service session registration which is stored and controlled by the receiving means 0221, thereby reading the identification data id (Step S05.2.28), and compiles the sending data on which are placed this identification data id and the contents information Cts based on the retrieval result information. Here, the compression processing of the contents information Cts is performed by the algorithm based on, for example, MPEG-4 and adjusts the format (such as HTML contents, WML contents, XHTML contents, etc.) (Step S05.2.29). The compression processing may be one which is based on another algorithm. Then, it sends the sending data compiled as mentioned above to the sending means 0225 (Step S05.2.30).

Since the said processing is executed following the frequency (retrieving frequency rt·fQ2) of the data sent from the retrieving means 0223, the compiling frequency cmp·fQ2 and the sending frequency of data to the sending means 0225 are controlled equal to the standard frequency stfQ accordingly, and hence the processing execution and sending at an excess or too small frequency do not occur in the said compiling means 0224.

The sending means 0225 performs sending processing at the timing (compiling frequency cmp·fQ2) at which it has received data from the compiling means 0224. Also, in this embodiment, there is no supply of control signal 2a5 from the frequency controlling unit 0122.

The sending processing prepares the sending signal SV5 by securing processing and protocol adjustment based on the sending data and sends it to the Internet system NT (Step S05.2.31). Protocol adjusts to the HTTP response or WSP response based on the format of the sending data.

Since the said processing is executed following the frequency (compiling frequency cmp·fQ2) of the sending data sent from the compiling means 0224, the sending frequency out·fQ2 of sending signal SV5a to the Internet system NT is controlled equal to the standard frequency stfQ accordingly, and hence the processing execution and sending at an excess or too small frequency do not occur in the said sending means 0225.

The Internet system NT transmits the sending signal SV5 to the relevant portable telephone CL15 (Step S05.2.32). Also, in this-embodiment, there is no supply of the control command from the sending means 0225.

Since the said sending processing is executed following the frequency of the sending signal SV5 from the preceding stage, the transmitting frequency trf·fQ2 of the sending signal SV5a is controlled equal to the standard frequency stfQ accordingly, and hence the processing execution and sending at an excess or too small frequency do not occur in the said Internet system NT.

Then, in the portable telephone CL5, the receiving means 0205 performs protocol processing and decoding processing on the sending signal SV5 which has reached from the site SV5 and collates the identifying data id carried on the restored sending data and receives it (Step S05.1.19), and it performs data expansion by the MPEG4 decoder etc. to restore the contents information Cts (Step S05.1.20). Here, processing is performed at the timing (transmission timing trf·fQ2) at which the sending signal SV5a was received from the Internet system NT. Also, in this embodiment, there is no supply of the control signal from the frequency controlling unit 0111.

Then it forms the receiving data by the content information Cts and supplies it to the displaying apparatus 0206 (Step S05.1.21).

Since the said processing is executed following the frequency (transmitting frequency trf·fQ2) of the sending data SV5 transmitted from the Internet system NT, the receiving frequency rv·fQ1 and the sending frequency of data to the displaying apparatus 00206 are controlled equal to the standard frequency stfQ accordingly, and hence the processing execution and sending at an excess or too small frequency do not occur in the said receiving means 0205.

Then, the displaying apparatus 0206 displays the received data received from the receiving means 0205 on the screen with sound playing (Step S05.1.22). In this embodiment, no control signal is supplied to the displaying apparatus 0206 from the frequency controlling unit 0111. Thus, the desired screen is updated at the displaying frequency Cts·fQ1 equal to the standard frequency stfQ.

After that, upon returning to Step S05.1.13, the above-mentioned processing loop is updated repeatedly, and its frequency is controlled to the standard frequency stfQ.

As mentioned above, in the service execution stage, the portable telephone CL5 repeats the processing of updating and sending to the site SV5 at the standard frequency stfQ momentarily the request signal CL5 in which the identifying data id and the service kind information are added to the momentarily changing position data pd and viewing direction data dd, and in this way it asks for the real time offer service of the contents information Cts corresponding to the momentary position and viewing direction.

On the other hand, in the site SV5, each time upon receiving the request signal SL5a which is updated and sent momentarily at the standard frequency from the portable telephone CL5, it updates and compiles repeatedly at the standard frequency stfQ the contents information Cts (containing data of one screen showing the scene of the said position and viewing direction) corresponding to the position data pd and viewing direction data dd carried, and it places them on the sending signal SV5 and updates and sends repeatedly real time momentarily to the portable telephone CL5 at the standard frequency stfQ.

The portable telephone CL5 receives the sending signal SV5a which is being sent momentarily at the standard frequency stfQ, and it updates and displays repeatedly real time at the standard frequency stfQ the contents information Cts corresponding to the momentary position and viewing direction. Thus the portable telephone CL5 can display updated images real time by updating repeatedly at the standard frequency stfQ the above-mentioned one loop by bi-directional data interchange which consists of repeated updating and sending of the request signal CL5 and the sending, receiving, and displaying repeatedly the corresponding contents information Cts (each containing the scene data for one screen).

As the result, with movement of the portable telephone, the changing image (recorded and stored contents information Cts) is updated and displayed real time on the screen of the portable telephone CL1 and sound is played, and this is watched as dynamic images by the user.

Also, in the foregoing, the viewing direction data dd, in addition to specifying the compass direction (such as south south east), can specify the direction inclined from the horizontal direction or the vertical direction. By this, an image in the inclined state is displayed on the displaying apparatus 0206.

As mentioned above, the fifth embodiment executes on the basis of the standard frequency stfQ the frequency control of each processing along the loop of the processing flow in the portable telephone CL5/site SV5/Internet system NT, thus it is possible to avoid excessive or insufficient repetitive updating in each processing, to suppress the data processing amount that increases due to excessive processing frequency, thereby preventing wasteful electric power consumption and extending the battery life, avoiding the wasteful data discharge to the network and hence reducing the communication load, and reducing the communication charge. Also, it is possible to eliminate the too small processing frequency that occurs due to somewhat processing, and to provide stably the information which satisfies the desired level.

In addition, by constituting such that the user can specify the desired arbitrary viewing direction, the facility is further expanded.

By the function relating to the viewing direction, the fifth embodiment is suitable especially to the use intended for network navigation and to the offer service of the contents information that utilizes the network navigation. Here, the network navigation may be either actual navigation application or navigation application by simulation. For the detail of each, the explanation in the first embodiment is cited; since the scene is displayed at a high screen updating frequency, as the result, it is watched as the dynamic images; moreover, as the effect different from the one in the above-mentioned first embodiment, in the real navigation application, it is possible to make very easily the comparison with the real scene which the user is watching before his eyes in the viewing direction. Thus it is possible to produce the remarkable navigation effect.

Moreover, the image offered by the conventional car navigation is the one which corresponds to the movement along the previously determined lines such as the existing highways and loads, and the viewing direction which the image shows is also restricted to the previously determined direction, for example, the load advancing direction is determined to the viewing direction, the user was not able to obtain the image in an arbitrary viewing direction; however, in the constitution of the fifth embodiment, it is not limited to movement in the existing line and line itself is not restricted, even though the user sets up an arbitrary viewing direction momentarily and changes it at an arbitrary timing, it is possible to offer the contents information corresponding to them; moreover, it is possible to offer at a high frequency, therefore, its use mode becomes wide and the degree of freedom of use expands.

In addition to the foregoing, the fifth embodiment can specify not only the viewing direction (such as norh north west) by the viewing direction data but also the direction (inclined direction) inclined from the horizontal direction or the vertical direction; therefore, the user specifies the desired inclination to cause the contents information inclined to the desired angle to be displayed on the screens thus its use mode becomes wide and the degree of freedom of use expands.

Moreover, the fifth embodiment can realize a business model such that the sending side SV5 of the contents information Cts offers for pay interactively on the on-demand basis the contents information Sts of high screen updating frequency to the receiving side CL5 through the communication network and charge is recovered by charging processing. The mode of charging may be either flat rate or meter rate. In the above-mentioned case, the sending side SV5 performs retrieving and offering of the contents information Cts conforming to the position data dd and the viewing direction data dd, and hence it is possible to charge by setting up the charging unit corresponding to it.

The Sixth Embodiment

The essence of the sixth embodiment of the contents information interchanging system is that, if the frequency of position data generation is low and the number of pieces of the data is insufficient, high-frequency position data is ensured by interpolation and this interpolation is performed at a receiving side.

The contents information interchanging system comprises a receiving side (client) CL6, a sending side (server) SV6, and a communication system NT which connects the receiving side and the sending side. Event data is made up of at least position data pd, and based on at least the principle expressed as mark of pd→Cst, the contents information interchanging system is constituted so that the receiving side CL6 generates the position data pd through selection from (1) positioning data pg which is generated intermittently by satellite positioning or (2) positioning data pint obtained by interpolation of the amount of movement (which is calculated from the speed data md from the movement of the receiving side CL6 and the time Δt the movement takes) and the positioning data pg obtained most recently, which interpolated positin data being generated while the above positioning data pg is not generated.

If based on the relation of TAT associated with the updating and generation of positioning data pg, the frequency of updating and generation of positioning data pg is limited to, for example, once for several seconds, interpolated position data pint is generated using moving data (speed data) md with quick response and short TAT, and intermittent portions in positioning data pg are complemented therewith.

The receiving side CL6 and the sending side SV6 only have to be so constituted that they can process request data including at least position data pd. Other embodiments, including the first embodiment (receiving side CL1 and sending side SV1) through the fourth embodiment (receiving side CL4 and sending side SV4) which use only position data pd for event data, the fifth embodiment (receiving side CL5 and sending side SV5) which uses position data pd and viewing direction data dd for event data, as mentioned above, and the ninth embodiment (receiving side CL9 and sending side SV9) which uses position data pd, viewing direction data dd, and time data td for event data, as mentioned below, are applicable. The description of each of these embodiments is the same as the above-mentioned embodiments, and the corresponding drawings and descrip-tion will be cited therefor. For the communication system NT, the above description will be similarly cited.

The characteristic construction of the contents information interchanging system lies in the position data providing means 0101B installed at the receiving side CL6. Further, the receiving unit CL6 comprises at least the frequency controlling means 0111 disclosed in each of the above-mentioned embodiments, and is so constituted that control signals 1a1 are supplied to the position data providing means 0101B at the above-mentioned standard frequency stfQ.

Figure 51:
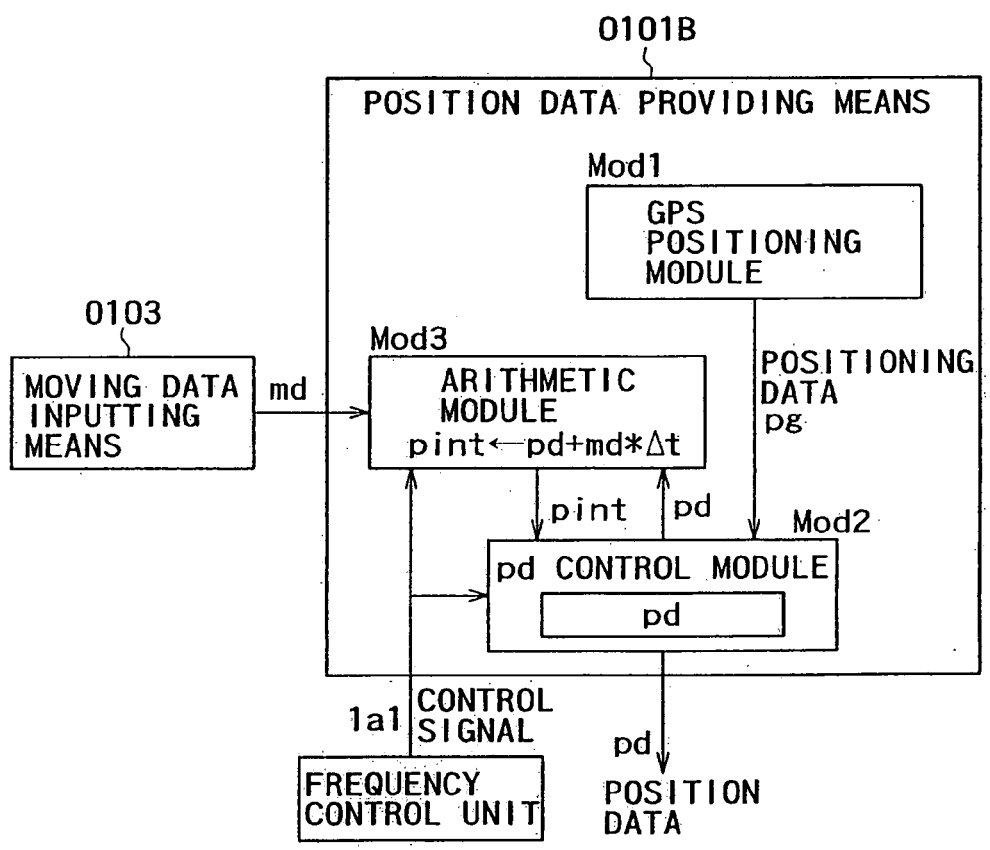
FIG. 51 is a block diagram of the position data providing means in the sixth embodiment of the contents information interchanging system according to the present invention.

FIG. 51 is a block diagram of the position data providing means 0101B. As illustrated in the figure, the position data providing means 0101B comprises the GPS positioning module Mod1 which outputs to the control module Mod2 the present positioning data pg based on satellite positioning using GPS satellites; the computing module Mod3 which computes interpolated position data pint; and the control module Mod2 which controls and outputs the latest position data.

The GPS positioning module Mod1 is provided with the above-mentioned GPS radio wave receiving function and so constituted that the module captures radio waves emitted by GPS satellites and navigation messages carried thereby through an antenna, performs positioning computation, and outputs the thus obtained present positioning data pg to the control module Mod2. Further, where differential GPS positioning is used, the positioning system PST1 based on differential GPS, illustrated in FIG. 23 above, is used for this GPS positioning module Mod1.

The computing module Mod3 is so constituted that the module reads moving data md inputted from the above-mentioned moving data inputting means 0103, control signals 1a1 supplied from the frequency controlling means 0111, and the latest position data pd from the control module. Mod2, and computes interpolated position data pint. The moving data md is data for moving speed, and in this embodiment, it indicates the values of moving speed in the direction of latitude and in the direction of longitude outputted from the moving data inputting means 0103 comprising a speed meter provided with two-dimensional speed sensors.

The computing module Mod3 is so constituted as to compute interpolated position data pint as follows: the module samples and captures moving data md with the timing of control signals 1a1, reads the latest position data pd, and then confirms the intervals Δt of generation of control signals 1a1. Since the frequency of generation of control signals 1a1 is equal to the standard frequency stfQ at this time, the generation interval Δt is a time interval corresponding to the standard frequency stfQ.

Taking the above-mentioned generation interval Δt as the time movement takes and using the equation pint=pd+md*Δt, the interpolated position data pint is computed every second at the standard frequency stfQ, and is sequentially sent to the control module Mod2.

Figure 52:
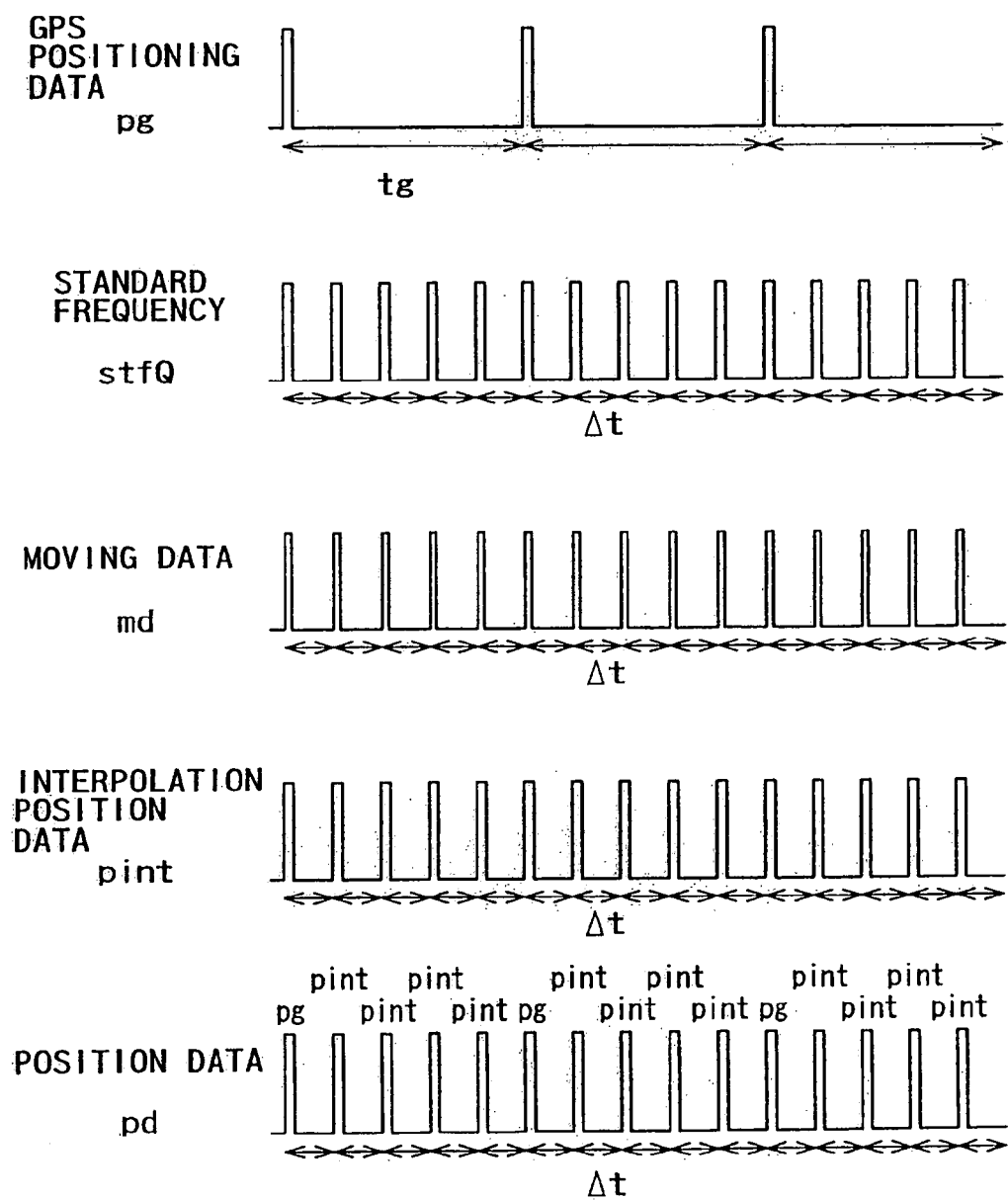
FIG. 52 is a timing chart of the position data providing means.

The control module Mod2 is so constituted that the module stores the latest position data pd in temporary memory and controls the data. Further, the control module Mod 2 is constituted as follows: when positioning data pg is sent from the GPS positioning module Mod1, the control module updates the latest position data pd based on the positioning data pg at that point in time; when interpolated position data pint is sent from the control module Mod2, the control module updates the latest position data pd based on the interpolated position data pint at that point in time; when positioning data pg and interpolated position data pint are both sent simultaneously or substantially simultaneously within a predetermined minute time difference, the control module uses the positioning data pg to update the latest position data pd; and further, the control module outputs the latest position data pd the module presently holds with the timing of the control signals 1a1 supplied from the frequency controlling means 0111;

FIG. 52 is timing charts for data in the individual components of the position data providing means 0101B. Referring to the figure, the action of the position data providing means 0101B will be described below.

Since the GPS positioning module Mod1 consumes time in capturing of GPS satellite radio waves, computation associated therewith, and satellite positioning, including correction processing, the module intermittently generates positioning data pg at time intervals (intervals) of tg. In case of satellite positioning based on high-positional accuracy differential GPS, this interval tg is approx. 5 seconds. The positioning data (latitude, longitude) pg generated at intervals of approx. 5 seconds is immediately sent to the control module Mod2.

Meanwhile, the sensors of the moving data inputting means 0103 continuously outputs moving data (speed in the direction of latitude, speed in the direction of longitude) md, which is sent to the computing module Mod3 on a steady basis. When control signals 1a1 come into the computing module Mod3 from the frequency controlling means 0111 at the standard frequency stfQ (e.g. 15 times/sec), the computing module Mod3 samples moving data md with this timing, and further captures the latest position data (latest latitude, latest longitude) pd from the control module Mod2. Further, the computing module Mod3 computes the interval $\Delta t$ of generation of control signals 1a1 (e.g. approx. 67 milliseconds), and then computes the amount of movement (amount of movement in the direction of latitude, amount of movement in the direction of longitude) md*$\Delta t$ during the passage of the time $\Delta t$. The computing module adds the latest position data (latest latitude, latest longitude) pd to the amount of movement to generate interpolated position data (latitude, longitude) pint and sends the data to the control module Mod2. Thus, the interpolated position data pint is generated at the standard frequency stfQ.

When positioning data pg arrives, the control module Mod2 immediately updates the latest position data pd in temporary memory with the incoming data. If interpolated position data pint arrives at the same time as positioning data pg or if interpolated position data pint arrives within a minute time sufficiently shorter than the above-mentioned time $\Delta t$ after the arrival of positioning data pg, the control module discards these pieces of interpolated position data pint. If interpolated position, data pint arrives after the minute time has passed, the control module updates the latest position data pd in temporary memory with the incoming data. The foregoing is based on that the most recent positioning data pg is reflected in interpolated position data pint after the passage of the minute time.

Further, the control module Mod2 sends the latest position data pd, stored in temporary memory, to the capturing means 0202 (illustrated in the drawings showing a plurality of embodiments, including FIG. 2) with the timing of control signals 1a1 coming in from the frequency controlling means 0111.

As the result of the above-mentioned operation, position data pd sent to the capturing means 0202 is what is selected from the most latest positioning data pg or the most latest interpolated position data pint, and thus the position data pd is sent to the capturing means 0202 at the standard frequency stfQ whose interval $\Delta t$ is shorter than the above-mentioned interval tg.

Thus, even if the interval tg of generation of positioning data pg is as long as, for example, approx. 5 seconds and the generation frequency is as low as one piece of data for every 5 seconds, the frequency of generation of position data pd can be kept at the high standard frequency stfQ by complementing the time intervals with interpolated position data pint. In the above-mentioned example, 15 pieces of position data pd can be sent per second Therefore, even if the turnaround time of a GPS positioning system is relatively long, contents information Cts can be displayed at high screen updating frequency by complementing it with interpolated position data pint. Moreover, any error accumulated in interpolated position data pint is replaced by the nest generated positioning data pg using the above-mentioned algorithm, and the high accuracy can be maintained by taking the data as the actual positioning position at that point in time.

Such a constitution that the control module Mod2 and the computing module Mod3 are installed in the capturing means 0202 (illustrated in the drawings showing a plurality of embodiments, including FIG. 2) may be used in place of the above-mentioned constitution. In this case, the GPS positioning module Mod1 functions as the position data providing means 0101 illustrated in these drawings.

Alternatively, such a constitution that a positioning module or the like which performs radiolocation based on a non-GPS positioning principle, for example, based on PHS base station information, is used in place of the above-mentioned GPS positioning module Mod1 may be adopted.

The Seventh Embodiment

The above-mentioned sixth embodiment is so constituted that the position data providing means 0101B at receiving side CL6 generates positioning data pg, computes interpolated position data pint, and controls the latest position data pd. In place of this constitution, the seventh embodiment is so constituted that a receiving side CL7 sends positioning data pg and moving data md untouched to a sending side SV7, and the latest position data pd is controlled and interpolated position data pint is computed at the sending side SV7.

Further, the seventh embodiment is so constituted that a loop formed by the receiving side CL7, the sending side SV7, and the communication system NT is operated at a predetermined beginning frequency bgfQ, and the frequency accomplished thereby is actually measured to set the standard frequency stfQ to control frequency.

In other words, the seventh embodiment of the contents information interchanging system comprises a receiving side (client) CL7, a sending side (server) SV7, and a communication system NT which connects the receiving side and the sending side. Event data generated by the client CL7 is made up of positioning data pg and moving data md, and based on the principle expressed as mark of pg and md→Cst, a beginning of service adjusting stage and a service performing stage are sequentially implemented. In the beginning of service adjusting stage, moving data md is generated at a predetermined relatively high beginning frequency bgfQ, and the data is inputted together with positioning data pg to the loop at the beginning frequency bgfQ. The loop is thus operated, and the accomplished screen updating frequency is measured. Based on the measurement, the standard frequency stfQ of the combined system of the client CL7/server SV7/communication system NT is set, and then based on the standard frequency stfQ, the service performing stage is implemented.

The seventh embodiment is so constituted that: the client CL7 sends moving data md to the server SV7 at the beginning frequency bgfQ in the beginning of service adjusting stage and at the standard frequency stfQ in the service performing stage. Further, the client sends positioning data pg to the server SV7 with the timing of the generation thereof, and at the server SV7 side, selection from (1) positioning data pg which is generated intermittently by satellite positioning or the like or (2) positioning data pint obtained by interpolation of the amount of movement (which is calculated from the client CL7 moving speed data md and the time Δt the movement takes) and the positioning data pg obtained most recently, which interpolated position data being generated while the above positioning data pg is not generated, is repeatedly made every second to generate position data pd. As mentioned above, when the frequency of updating and generation of positioning data pg is low (e.g. once for several seconds), the server SV7 computes interpolated position data pint using moving data md of short TAT and interpolates positioning data pg based thereon to control the latest position data pd.

Figure 53:
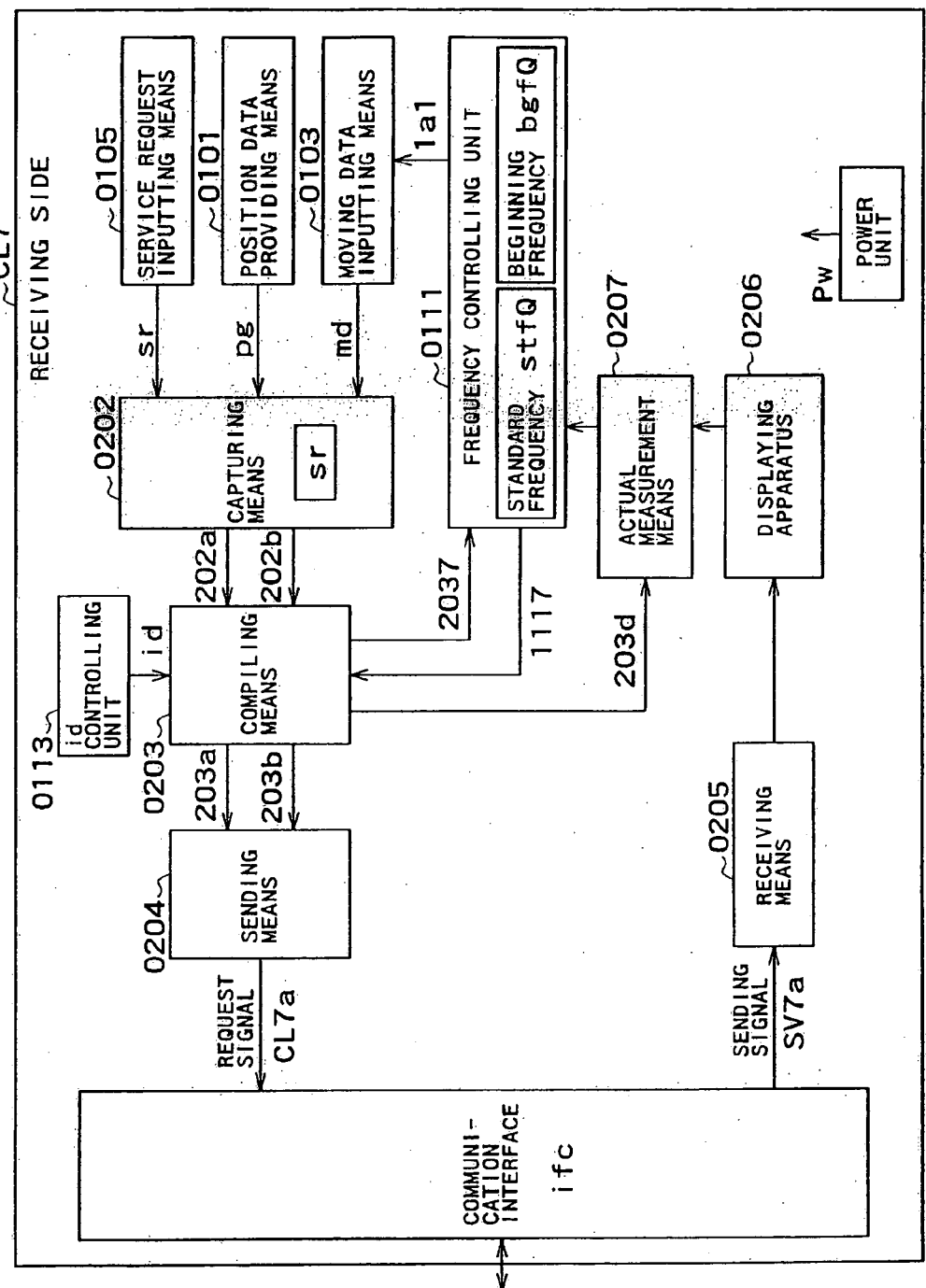
FIG. 53 is a block diagram of the client in the seventh embodiment of the contents information interchanging system according to the present invention.

FIG. 53 is a schematic block diagram of the client CL7 and FIG. 54 is a schematic block diagram of the server SV7. The above description will be cited here with the same numbers assigned to the same parts as in the above-mentioned embodiments.

FIGS. 55 through 59 are flowcharts illustrating the action of the client CL7 and the server SV7 in the beginning of service adjusting stage.

Figure 60:
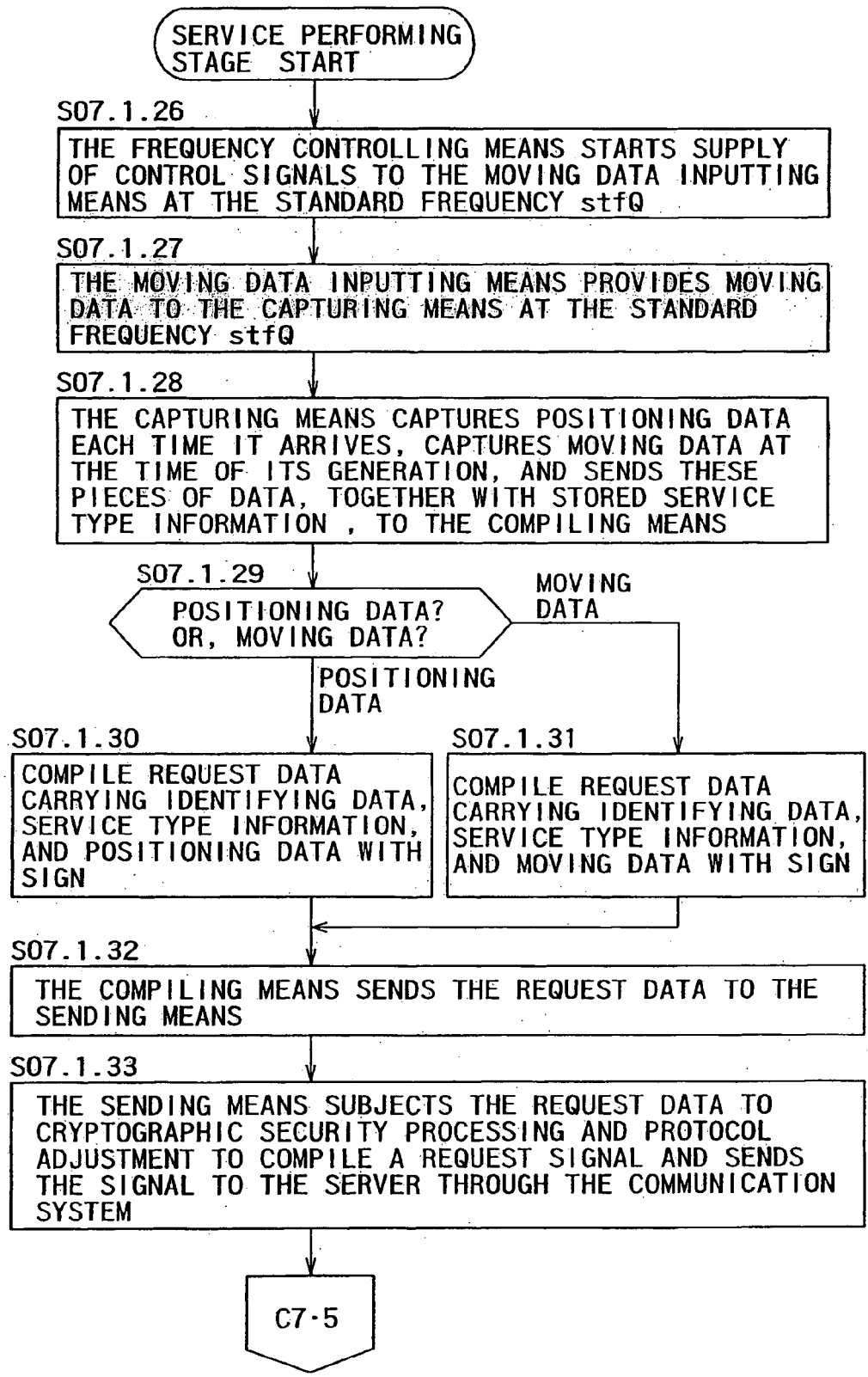
FIG. 60 is an action flowchart in the service execution stage according to the seventh embodiment.
Figure 61:
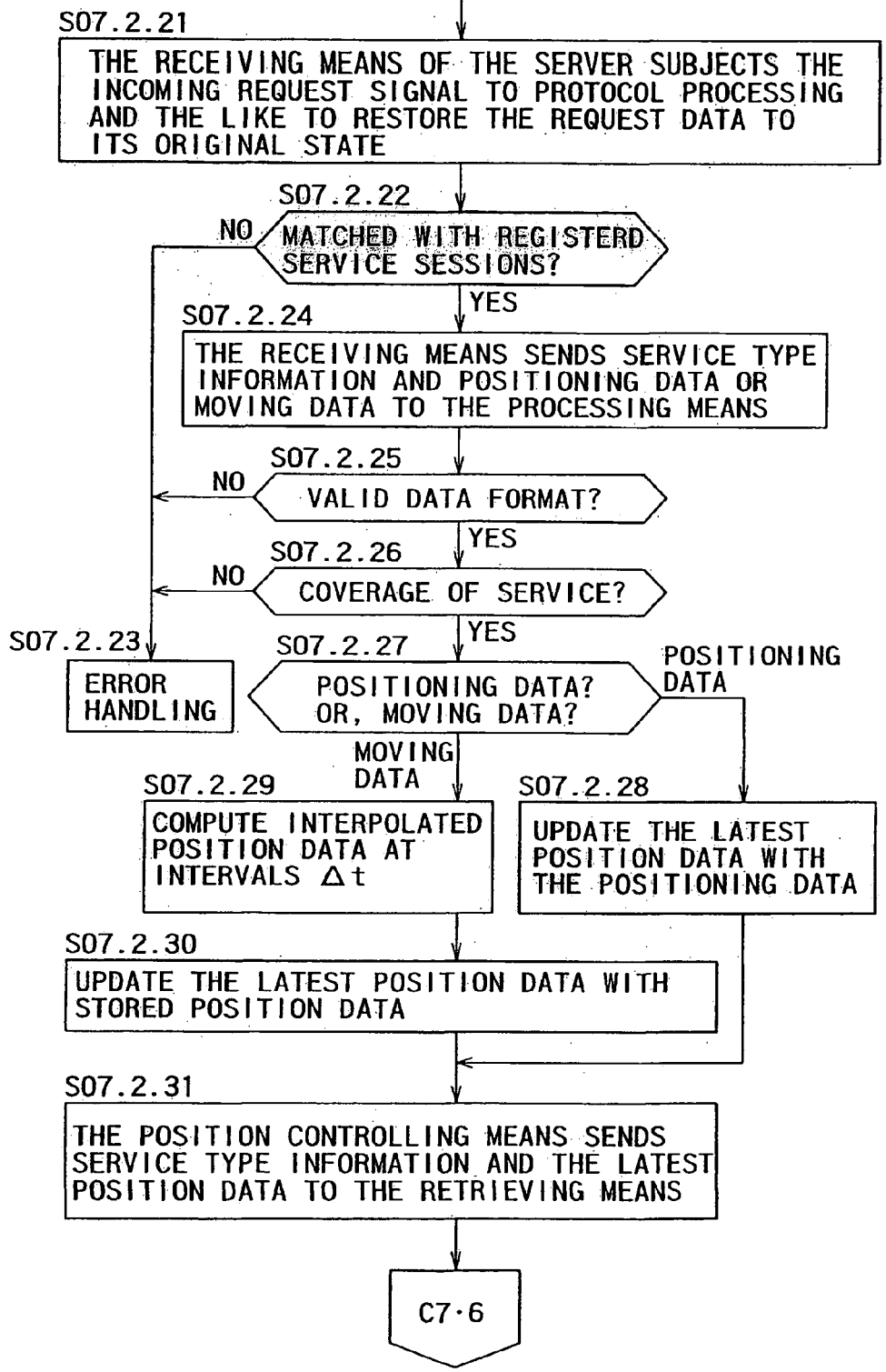
FIG. 61 is an action flowchart that follows FIG. 60.

FIGS. 60 through 62 are flowcharts illustrating the action of the client CL7 and the server SV7 in the service performing stage.

The client CL7 is formed of equipment configured like a computer provided with a wireless/wire communication function, and comprises a position data providing means 0101C which generates positioning data pg; a moving data inputting means 0103 which generates moving data md; a service request,inputting means 0105 for inputting service request data sr; a capturing means 0202; a compiling means 0203; a sending means 0204; a communication interface ifc; a frequency controlling means 0111; an id controlling unit 0113; a receiving means 0205; a display device 0206; an actual measurement means 0207; and a power unit Pw.

Further, the seventh embodiment is so constituted that frequency control is performed at the client CL7 and the object of frequency control is the moving data inputting means 0103.

The position data providing means 0101C is provided with a GPS radio wave receiving function and so constituted that the position data providing means receives radio waves and navigation messages emitted by GPS satellites through an antenna, performs positioning computation, and outputs the thus obtained present positioning data pg. Further, position data providing means may be constituted based on a differential GPS positioning method.

The position data providing means 0101C is actuated by application of power, continuously generates positioning data pg at its own frequency (geneation interval tg), and provides the data to the capturing means 0202. The position data providing means is so constituted that the action thereof is autonomous and the frequency is not influenced by control signals 1a1 or the like. The generation interval tg is as long as several seconds, and the frequency of generation of positioning data pg is low as compared with ordinary screen updating frequencies. Hence, interpolation is required.

The moving data inputting means 0103 is so constituted that the moving data inputting means operates in substantially the same manner as in the above-mentioned embodiments, excepting that the moving data inputting means receives control signals 1a1 from the frequency controlling means 0111 and generates and sends moving data md to the capturing means 0202 with the timing of the control signals. The moving data md is data for moving speed, and, as in the above-mentioned embodiments, it is the discrete values of moving speed in the direction of latitude and in the direction of longitude, obtained by the moving data inputting means 0103's sampling the output of two-dimensional speed sensors which can continuously produce output.

The control signal 1a1 is issued at the beginning frequency bgfQ or standard frequency stfQ. The moving data inputting means 0103 is so constituted that the moving data inputting means is operated and controlled at either of the frequencies.

The constitution and action of the service request inputting means 0105 are the same as in the third embodiment.

The capturing means 0202 is so constituted that: when service request data sr is sent and comes in, the capturing means 0202 judges that the present is the beginning of service adjusting stage, and captures and stores the data in memory. Further, the capturing means adds to the data an index indicating the beginning of service adjusting stage to generate data 202a and sends the data to the compiling means 0203. Further, each time the capturing means receives positioning data pg from the position data providing means 0101C and moving data md from the moving data inputting means 0103 when the beginning of service adjusting stage is in progress or when the service performing stage subsequent thereto is in progress, the capturing means sends these pieces of data to the compiling means 0203 as data 202b.

The compiling means 0203 is so constituted that: when the compiling means detects the above-mentioned index in the data 202a received from the capturing means 0202, the compiling means judges that the present is the beginning of the beginning of service adjusting stage, and sends to the frequency controlling means 0111 an instruction 2037 to supply control signals 1a1 to the moving data inputting means 0103 at the specified beginning frequency bgfQ. Further, the compiling means acquires identifying data id (including resource information, such as type of equipment) from the id controlling unit 0113, and, when positioning data pg from the position data providing means 0101C arrives through the capturing means 0202, the compiling means compiles request data 203a carrying the above-mentioned index, identifying data id, service type information, and positioning data pg with a sign indicating that the data is positioning data affixed thereto. Or, when moving data md from the moving data inputting means 0103 arrives through the capturing means 0202, the compiling means compiles request data 203b carrying the above-mentioned index, identifying data id, service type information, and moving data md with a sign indicating that the data is moving data affixed thereto. The compiling means sends this request data to the sending means 0204, and then sends an activating signal 203d to the actual measurement means 0207 to activate the actual measurement means 0207.

Further, the compiling means 0203 is so constituted that, when the compiling means receives a notification 1117 of the completion of standard frequency setting from the frequency controlling means 0111, the compiling means sends an activating signal 203d to the actual measurement means 0207 to stop the operation thereof and terminate the beginning of service adjusting stage.

Further, the compiling means is so constituted that, when positioning data pg from the position data providing means 0101C arrives through the capturing means 0202 in the subsequent service performing stage, the compiling means compiles request data 203a carrying identifying data id, service type information, and positioning data pg with a sign indicating that the data is positioning data affixed thereto, and sends the request data to the sending means 0204. Or, when moving data md from the moving data inputting means 0103 arrives through the capturing means 0202 at the standard frequency stfQ, the compiling means compiles request data 203b carrying identifying data id, service type information, and moving data md with a sign indicating that the data is moving data affixed thereto at the standard frequency stfQ, and sends the request data to the sending means 0204.

The sending means 0204, the receiving means 0205, and the displaying means 0206 are constituted in substantially the same manner as in the above-mentioned embodiments, and the above description will be cited.

The actual measurement means 0207 is so constituted that: in the beginning of service adjusting stage, the actual measurement means is actuated under actuation control (signal 203d) of the compiling means 0203, measures the frequency of updating of the display device 0206 screen, and sends the result of the actual measurement, or information on screen updating frequency, to the frequency controlling means 0111. For the method for actual measurement, the description of the first embodiment will be cited.

Further, the operation of the actual measurement means 0207 is stopped under stop control (signal 203d) of the compiling means 0203. Sine actuation and stop control is exercised as mentioned above, the actual measurement means operates only when required and battery drain is suppressed.

The frequency controlling means 0111 is so constituted that, when the frequency controlling means receives from the compiling means 0203 an instruction 2037 to supply control signals 1a1 to the moving data inputting means 0103 at a specified beginning frequency bgfQ, the frequency controlling means judges that the present is the beginning of service adjusting stage, and sequentially performs the following processing:

(1) issue control signals 1a1 at the specified beginning frequency bgfQ and repeatedly supply the signals to the moving data inputting means 0103, (2) when screen updating frequency data based on actual measurement is sent from the actual measurement means 0207, set an arbitrary standard frequency stfQ based on the measured screen updating frequency to the extent that the measured screen updating frequency is not exceeded, (3) send a notification 1117 of the completion of standard frequency stfQ setting to the compiling means 0203, and (4) thereafter, proceed to the service performing stage, issue control signals 1a1 at the standard frequency stfQ, and start repetitive supply thereof to the moving data inputting means 0103.

The server SV7 comprises a communication interface ifs, a receiving means 0221, an authenticating means 0230, a charge settling means 0231, a processing means 0222, a retrieving means 0223, a database unit DB, a compiling means 0224, and a sending means 0225, and is further provided with a power unit (not shown).

The receiving means 0221 is so constituted that, if a request signal CL7a sent from a client CL7 is provided with the above-mentioned index, the receiving means recognizes that the present is the beginning of service adjusting stage, drives the authenticating means 0230 to perform the authentication described above, and further sends service type information, positioning data pg, and moving data md carried by the request signal CL7a to the processing means 0222. Further, the receiving means is so constituted that, if a request signal CL7a is not provided with the above-mentioned index, the receiving means recognizes that the present is the service performing stage, and sends service type information, positioning data pg, and moving data md carried by the request signal CL7a to the processing means 0222.

The processing means 0222 is provided with a position controlling means 0222A which controls the latest position data and an interpolating means 0222B which computes interpolation positions, and is so constituted as to receive service type information, positioning data pg, and moving data md sent from the receiving means 0221 and send computed position data pd and service type information to the retrieving means 0223.

The interpolating means 0222B is so constituted as to compute the interval Δt between one piece of moving data md and another sequentially inputted from the receiving means 0221, reads the latest position data pd from the position controlling means 0222A, computes interpolated position data pint using the same equation as in the above-mentioned computing module Mod3 pint=pd+md*Δt, and inputs the data to the position controlling means 0222A in succession.

The position controlling means 0222A stores the latest position data pd in temporary memory, and controls and outputs the data. The position controlling means is so constituted that: when the position controlling means receives positioning data pg from the receiving means 0221, the position controlling means updates the latest position data pd based on that positioning data pg at that point in time; when the position controlling means receives interpolated position data pint from the interpolating means 0222B, the position controlling means updates the latest position data pd based on that interpolated position data pint at that point in time; when the position controlling means receives both positioning data pg and interpolated position data pint simultaneously or substantially simultaneously within a predetermined minute time difference, the position controlling means uses the positioning data pg to update the latest position data pd; and further, the position controlling means sends the latest position data pd the position controlling means presently holds, together with the above-mentioned service type information, to the retrieving means 0223 with timing with which the moving data md is received.

The charge settling means 0231 is so constituted that, in response to a signal 225a from the sending means 0225, the charge settling means performs charge settling processing and sends the result of processing as a reply 225a to the sending means 0225.

The sending means 0225 is so constituted as to communicate a signal 225a between the sending means and the charge settling means 0231 to perform charging processing, and sends a sending signal SV1a if the result of the charging processing is correct and does not send a sending signal SV1a if the result of the charging processing is incorrect.

For the functions and action of the retrieving means 0223 and the means and units downstream therefrom, the description of the above-mentioned embodiments will be cited. Adapted contents information Cts which underwent processing by the downstream means is sent to the client CL7 in the beginning of service adjusting stage and in the service performing stage.

Next, the action of the seventh embodiment will be described. The flow of action described below is divided into two stages: beginning of service adjusting stage and service performing stage.

Figure 55:
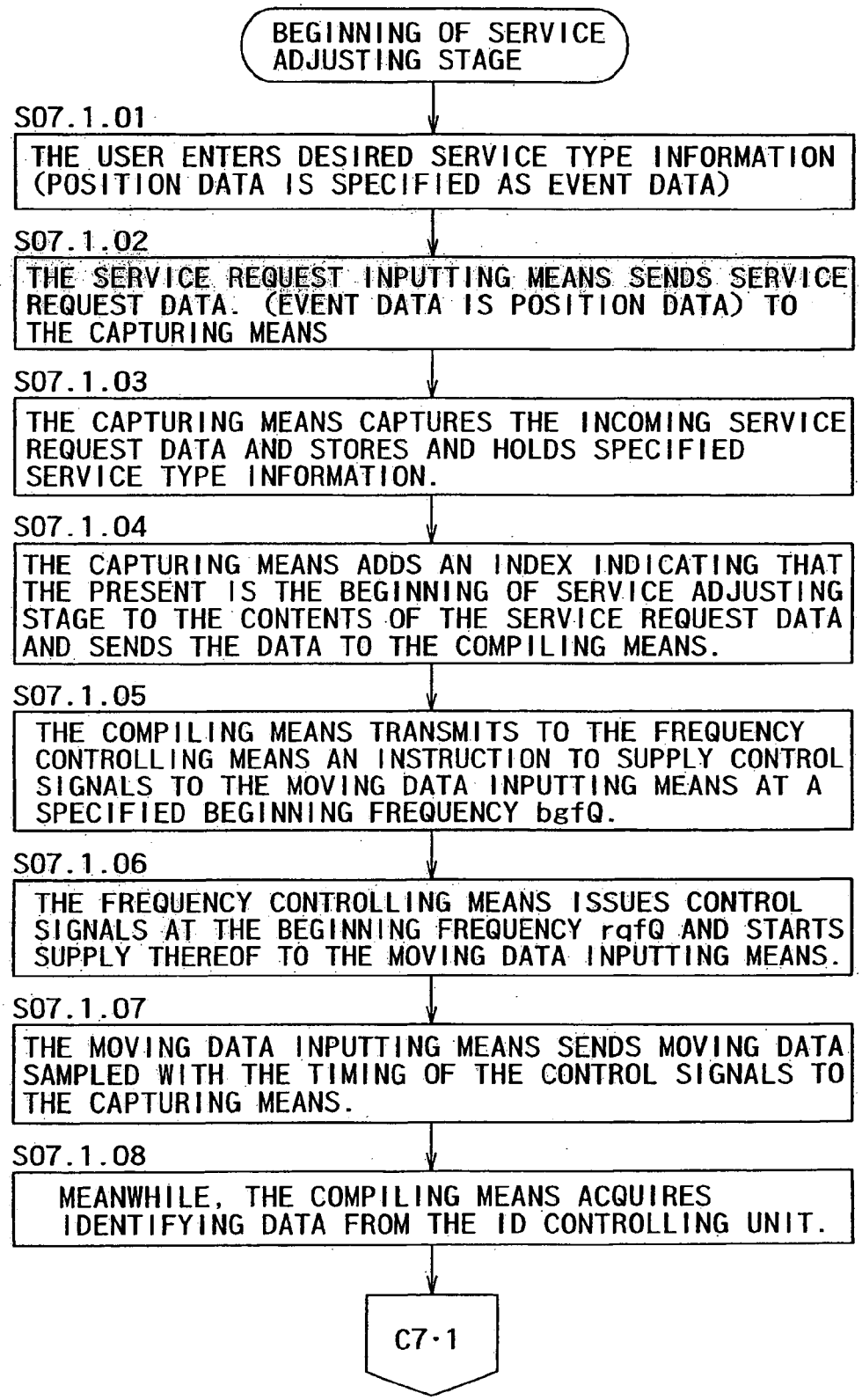
FIG. 55 is an action flowchart in the service start adjusting stage according to the seventh embodiment.

Action of the Seventh Embodiment in the Beginning of Service Adjusting Stage:

For a user to request to start service in the flow illustrated in FIG. 55, the user operates the service request inputting means 0105 of the client CL7 to manually enter service type information the user desires (including at least information on server, type of contents information, and type of event data the user desires) (Step S07.1.01). In response to this operation, the service request inputting means 0105 generates service request data sr carrying the service type information and sends the data to the capturing means 0202 (Step S07.1.02).

The capturing means 0202 of the client CL7 confirms that the incoming signal is generated by the service request inputting means 0105. Based on this confirmation, the capturing means detects that it is service request data sr indicating the trigger of the beginning of service adjusting stage and immediately captures the data. After confirming the contents of the data, the capturing means stores and holds specified service type information carried by the service request data sr (Step S07.1.03).

The client CL7 need check the frequencies which can be implemented by the prevent combinations of constitutions, before the service is performed. Hence the capturing means 0202 adds an index notifying that the present is the beginning of service adjusting stage to the contents of the received service request data sr, and sends that data as data 202a to the compiling means 0203 (Step S07.1.04).

When the compiling means 0203 detects the index notifying that the present is the beginning of service adjusting stage in the data 202a sent from the capturing means 0202, the compiling means judges that the beginning of service adjusting stage has been started. Thereafter, the compiling means sends to the frequency controlling means 0111 an instruction 2037 to supply control signals 1a1 to the moving data inputting means 0103 at the specified beginning frequency bgfQ (Step S07.1.05). As a result, the frequency controlling means 0111 is actuated and issues control signals 1a1 at the beginning frequency bgfQ and supplies the signals to the moving data inputting means 0103 (Step S07.1.06). The moving data inputting means 0103 is actuated by the control signal 1a1, starts updating and repetitive generation of moving data md, and sends the data to the capturing means 0202 (Step S07.1.07). If the processing cannot keep up with the beginning frequency bgfQ here, the operation is performed at a generation frequency g·fQ1 lower than the beginning frequency bgfQ.

The compiling means 0203 acquires identifying data id from the id controlling unit 0113 (Step S07.1.08).

Meanwhile, the position data providing means 0101C intermittently generates positioning data pg at its own generation frequency (largely lower than the beginning frequency bgfQ), and the positioning data pg is provided to the capturing means 0202 each time the data is generated.

Each time the provided positioning data pg arrives, the capturing means 0202 captures the data. The capturing means captures every second moving data md thereafter sent one after another and, after the above-mentioned processing, sends the data to the compiling means 0203 (Step S07.1.09). If the processing of moving data md cannot keep up with the above-mentioned generation frequency g·fQ1, the operation is performed at a capturing frequency a·fQ1 lower than the generation frequency.

The compiling means 0203 judges whether the data which arrived through the capturing means 0202 is positioning data pg or moving data md (Step S07.1.10). If the data is positioning data pg, the compiling means compiles request data 203a carrying identifying data id, service type information, and positioning data pg with a sign indicating that the data is positioning data affixed thereto (Step S07.1.11). If the data is moving data md, the compiling means compiles request data 203b carrying identifying data id, service type information, and moving data md with a sign indicating that the data is moving data affixed thereto (Step S07.1.12). The compiling means then sends the request data to the sending means 0204 (Step S07.1.13). If the above-mentioned processing cannot keep up with the above-mentioned capturing frequency a·fQ1, the request data is sent at a compiling frequency cmp·fQ1 lower than the capturing frequency.

Thereafter, the compiling means sends a signal 203d to the actual measurement means 0207 to actuate it (step S07.1.14). Further, the compiling means issues to the frequency controlling means 0111 an instruction 2037 to set a standard frequency based on the result of actual measurement from the actual measurement means 0207 (Step S07.1.15).

When the sending means 0204 receives the request data 203a or 203b sent from the compiling means 0203, the sending means subjects the data to cryptographic security processing, protocol adjustment, and the like at the frequency of reception. Thus, the sending means compiles this request signal CL7a destined for the server SV7 and sends the signal to the communication system NT through the communication interface ifc (Step S07.1.16). If the above-mentioned processing cannon keep up with the above-mentioned compiling frequency cmp·fQ1 here, the signal is sent to the communication system NT at a sending frequency Req·fQ1 lower than the compiling frequency.

As mentioned above, the client CL7 can omit complicated position computation to reduce processing load thereon, and only has to send positioning data pg and moving data md to the server SV7.

The communication system NT transmits the request signal CL7a to a specified server SV7 at the frequency at which the system actually receives the signal (Step S07.1.17). If this transmission cannot keep up with the above-mentioned sending frequency Req·fQ1, the signal is transmitted at a transmitting frequency trf·fQ1 lower than the sending frequency.

Figure 57:
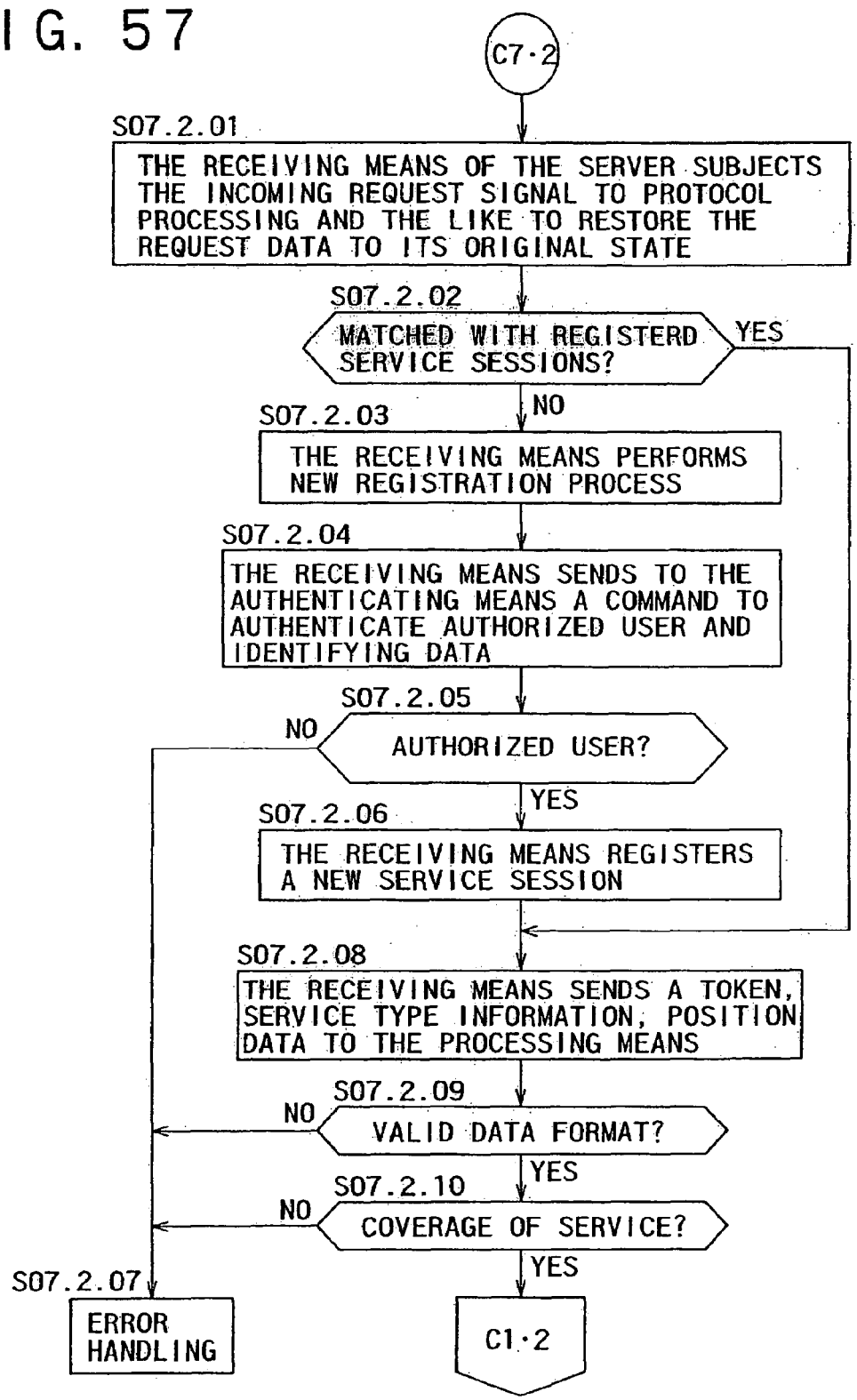
FIG. 57 is an action flowchart that follows FIG. 56.
Figure 58:
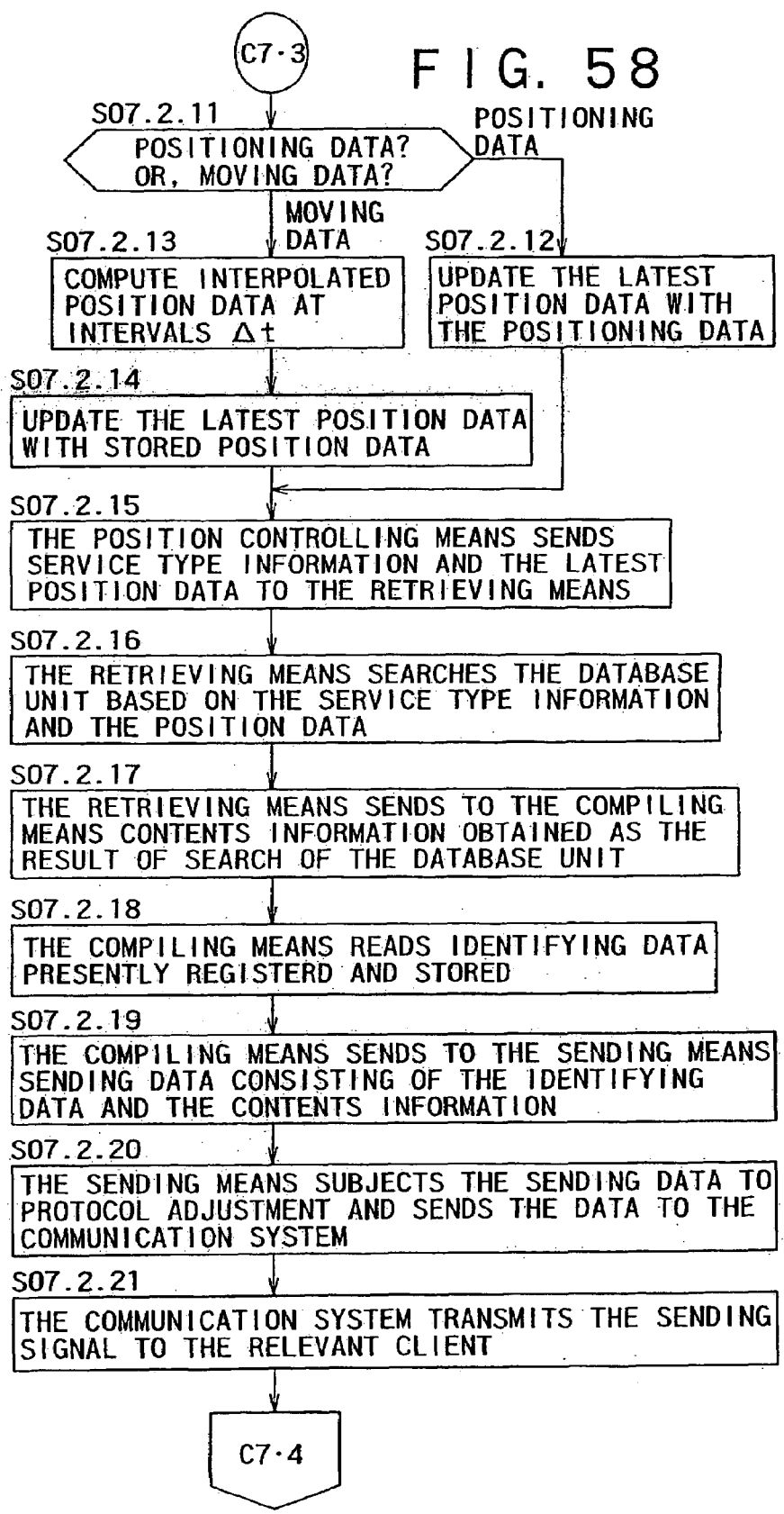
FIG. 58 is an action flowchart that follows FIG. 57.
Figure 59:
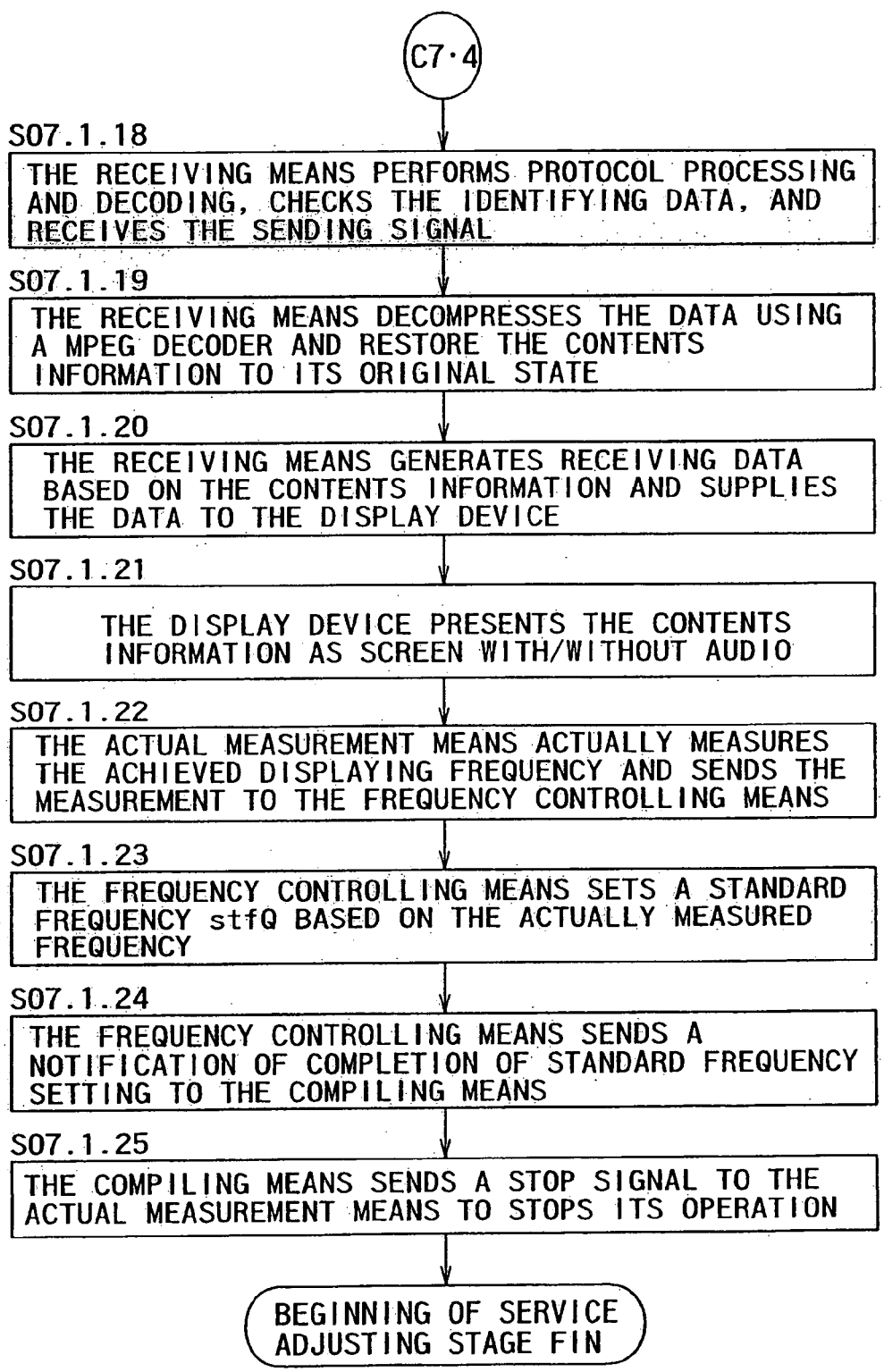
FIG. 59 is an action flowchart that follows FIG. 58.

Subsequently, the receiving means 0221 of the server SV7 receives the request signal CL7a, sent from the client CL7 to the server through the communication system NT in the flow illustrated in FIG. 57, through the communication interface ifs, subjects the signal to protocol processing and decoding, and thereby decompresses the data to restore the request data to the original state thereof (Step S07.2.01). Thereafter, the receiving means extracts the identifying data id of the user and information on the type of desired service from the request data, and, based on these pieces of data, judges whether the desired service is matched with any of service sessions presently registered (Step S07.2.02).

When it is confirmed that the desired service is one of the service sessions presently registered, it is judged that the service in progress should be continued, and the operation proceeds to Step S07.2.08.

If there is no service session presently registered or if the desired service is not matched with any of the service sessions presently registered, the receiving means performs a new registration process (Step S07.2.03). The receiving means sends a command 221a, carrying a sign indicating the commission of authentication and the identifying data id, to the authenticating means 0230 in order to commission to authenticate that the client CL7 is an authorized user (Step S07,2.04).

When the receiving means receives a notification 231a of the result from the authenticating means 0230, the receiving means makes judgment (Step S07.2.05). If the client is an authorized user, the receiving means registers a new service session and establishes the session (Step S07.2.06). If the client is not an authorized user, the receiving means abandons the request signal CL7a (Step S07.2.07).

After the establishment of the above-mentioned service session, the receiving means 0221 sends service type information and positioning data pg or moving data md to the processing means 0222 (Step S07.2.08). If the above-mentioned processing cannot keep up with the above-mentioned transmitting frequency trf·fQ1, the data is sent to the processing means 0222 at a receiving frequency a·fQ2 lower than the transmitting frequency.

When the processing means 0222 receives the data from the receiving means 0221, the processing means checks the validity of the data format thereof (Step S07.2.9). If the result of check reveals that the data format is invalid, the processing means judges the service infeasible and abandons the request in question. If the data format is valid, subsequently, the processing means examines whether the client is located in an area which is stored in the database DB and is in the coverage of service, based on positioning data pg (Step S07.2.10). If the result of examination reveals that the request in question is invalid, the processing means judges the service infeasible and abandons the request. If the result of examination reveals that the request in question is valid, the processing means performs the following interpolation and generates the latest position data pd.

If the received data is positioning data pg (Step S07.2.11), the position controlling means 0222A updates the latest position data pd stored in temporary memory with that positioning data pg (Step S07.2.12), and the operation proceeds to Step S07.2.15. If the received data is moving data md, the interpolating means 0222B computes the interval Δt between one piece of moving data md and another inputted one after another, reads the latest position data pd stored in temporary memory, computes interpolated position data pint using the above-mentioned equation, and inputs the data to the position controlling means 0222A in succession (Step S07.2.13), When the position controlling means 0222A receives the interpolated position data pint from the interpolating means 0222B, the position controlling means updates the latest position data pd in temporary memory with that interpolated position data pint (Step S07.2.14). However, if the position controlling means receives both positioning data pg and interpolated position data pint simultaneously or substantially simultaneously within a predetermined minute time difference, the position controlling means uses the positioning data pg to update the latest position data pd.

Thereafter, the position controlling means 0222A sends the latest position data pd the position controlling means presently holds in temporary memory, together the above-mentioned service type information, to the retrieving means 0223 with the timing with which the moving data md is received (Step S07.2.15). If the above-mentioned processing cannot keep up with the above-mentioned receiving frequency a·fQ2, the data is sent to the retrieving means 0223 at a processing frequency pr·fQ2 lower than the receiving frequency.

Based on the service type information and position data pd, the retrieving means 0223 searches database unit DB (Step S07.2.16). Thus, the retrieving means retrieves contents information Cts matched with the service type information and the position data pd from the database unit DB, and sends the information to the compiling means 0224 (Step S07.2.17) If the above-mentioned retrieving processing cannot keep up with the above-mentioned processing frequency pr·fQ2 here, the information is sent to the compiling means 0224 at a retrieving frequency rt·fQ2 lower than the processing frequency.

The compiling means 0224 refers to the present service session entries stored and managed by the receiving means 0221 to obtain an identifying data id (Step S07.2.18). Then the compiling means compiles sending data carrying the identifying data id and the contents information Cts based on the result of retrieval information and sends the data to the sending means 0225 (Step S07.2.19). For data compression and format adjustment, the description of the above-mentioned embodiments will be cited.

If the above-mentioned compiling processing cannot keep up with the above-mentioned retrieving frequency rt·fQ2 here, the data is sent to the sending means 0225 at a compiling frequency cmp·fQ2 lower than the retrieving frequency.

The sending means 0225 subjects the sending data sent from the compiling means 0224 to security processing, protocol adjustment, and the like to generate a sending signal SV7a, and sends the signal to the communication system NT through the communication interface ifs (Step S07.2.20). If the above-mentioned sending processing cannot keep up with the above-mentioned compiling frequency cmp·fQ2 here, the signal is sent to the communication system NT at a sending frequency out·fQ2 lower than the compiling frequency.

The communication system NT transmits the sending signal SV7a to the client CL7 (Step S07.2.21). If the above-mentioned transmission cannot keep up with the above-mentioned sending frequency out·fQ2, the signal is transmitted to the client CL7 at a transmitting frequency trf·fQ2 lower than the sending frequency.

The receiving means 0205 of the client CL7 subjects the sending signal SV7a which arrived from the server SV7 to protocol processing and decoding, checks the identifying data id carried by the restored sending data, and receives the data (Step S07.1.18). The receiving means decompress the data using an MPEG4 decoder or the like to restore the contents information Cts to the original state thereof (Step S07.1.19). Subsequently, the receiving means forms receiving data based on the contents information Cts and supplies the data to the display device 0206 (Step S07.1.20). If the above-mentioned processing cannot keep up with the above-mentioned transmitting frequency trf·fQ2 here, the data is supplied to the display device 0206 at a receiving frequency rv·fQ1 lower than the transmitting frequency.

Subsequently, the display device 0206 presents the receiving data received from the receiving means 0205 as screen with/without audio (Step S07.1.21). Thereafter, the loop of the above-mentioned processing is repetitively updated and performed, and the corresponding screen is repetitively updated and displayed on the display device 0206. If the above-mentioned displaying processing cannot keep up with the above-mentioned receiving frequency rv·fQ1, the screen is displayed at a displaying frequency Cts·fQ1 lower than the receiving frequency.

Here, the actual measurement means 0207 measures the receiving data from the screen output circuit of the display device 0206 or the receiving means 0205 to measure the achieved displaying frequency Cts·fQ1, and sends the result of the actual measurement to the frequency controlling means 0111 (Step S07.1.22).

When the frequency controlling means 0111 receives the information on the result of actual measurement from the actual measurement means 0207, the frequency controlling means sets a standard frequency stfQ based on the information (Step S07.1.23). The standard frequency stfQ can be set to any value that does not exceed the measured frequency. When setting of the standard frequency stfQ completes, the frequency controlling means 0111 sends a notification 1117 of the completion to the compiling means 0224 and the like (Step S07.1.24). When the compiling means 0203 receiver the notification 1117 of the completion of standard frequency setting from the frequency controlling means 0111, the compiling means sends a signal 203d for stop control to the actual measurement means 0207 to stop the operation of the actual measurement means 0207 (Step S07.1.25).

This completes the beginning of service adjusting stage and the operation proceeds to the subsequent service performing stage.

As mentioned above, in the beginning of service adjusting stage, the frequency of operation which can be achieved in the combined system in question can be confirmed by inputting actual event data to the first stage of the loop at a specified beginning frequency bgfQ and actually measuring the displaying frequency Cts·fQ1 achieved in the display device 0206. Even if the beginning frequency bgfQ is relatively high and the generation frequency of positioning data pg from GPS cannot be kept up with, the output of moving speed sensors can be sampled at a high frequency because the output is continuous. Event data can be generated at a frequency in line with the beginning frequency bgfQ by interpolation using this moving data md.

Action of the Seventh Embodiment in the Service Performing Stage:

In the service performing stage, the loop is operated at the standard frequency stfQ. As is evident from the above description, the standard frequency stfQ is a frequency at which every processing in the loop can be performed.

The position data providing means 0101C continuously generates positioning data pg at intervals Δtg, and the moving data inputting means 0103 is ready to sample and output the signals the speed sensors incorporated therein keep outputting.

The frequency controlling means 0111 supplies to the moving data inputting means 0103 control-signals 1a1 issued at the standard frequency stfQ (Step S07.1.26). The moving data inputting means 0103 generates moving data md at the standard frequency stfQ according to the control signals 1a1 and inputs the data to the capturing means 0202 (Step S07.1.27). The capturing means 0202 captures positioning data pg supplied at the above-mentioned intervals Δtg each time the data arrives. Further, the capturing means captures moving data md generated by the moving data inputting means 0103 at the time of generation (standard frequency stfQ), and sends the data, together with service type information the capturing means stores and holds, to the compiling means 0203 (Step S07.1.28).

The compiling means 0203 judges whether the data which arrived through the capturing means 0202 is positioning data pg or moving data md (Step S07.1.29). If the data is positioning data pg, the compiling means compiles request data 203a carrying identifying data id, service type information, and positioning data pg with a sign indicating that the data is positioning data affixed thereto (Step S07.1.30). If the data is moving data md, the compiling means compiles request data 203b carrying identifying data id, service type information, and moving data md with a sign indicating that the data is moving data affixed thereto (Step S07.1.31). Then the compiling means sends this request data to the sending means 0204 (Step S07.1.32).

When the sending means 0204 receives the request data 203a or 203b sent from the compiling means 0203, the sending means subjects the data to cryptographic security processing protocol adjustment, and the like at the frequency at which the data is received to compile a request signal CL7a destined for the server SV7, and sends the signal to the server SV7 through the communication interface ifc and the communication system NT (Step S07.1.33).

As mentioned above, the client CL7 can omit complicated position computation to reduce processing load thereon in the service performing stage as well, and only has to send positioning data pg and moving data md to the server SV7.

The receiving means 0221 of the server SV7 receives the request signal CL7a, sent from the client CL7 to the server through the communication system NT, through the communication interface ifs, subjects the signal to protocol processing and decoding, and thereby decompresses the data to restore the request data to the original state thereof (Step S07.2.21). Thereafter, the receiving means extracts the identifying data id of the user and information of the type of desired service from the request data, and, based on these pieces of data, judges whether the desired service is matched with any of service sessions presently registered (Step S07.2.22).

When it is confirmed that the desired service is one of the service sessions presently registered, it is judged that the service in progress should be continued, and the operation proceeds to Step S07.2.24. If there is no service session presently registered or if the desired service is not matched with any of the service sessions presently registered, the receiving means abandons the request signal CL7a (Step S07.2.23).

Subsequently, the receiving means 0221 sends the service type information and the positioning data pg or moving data md to the processing means 0222 (Step S07.2.24).

When the processing means 0222 receives the data from the receiving means 0221, the processing means checks the validity of the data format thereof (Step S07.2.25). If the result of check reveals that the data format, is invalid, the processing means judges the service infeasible and abandons the request in question. If the data format is valid, subsequently, the processing means examines whether the client is located in an area which is stored in the database DB and is in the coverage of service, based on positioning data pg (Step S07.2.26). If the result of examination reveals that the request in question is invalid, the processing means judges the service infeasible and abandons the request. If the result of examination reveals that the request in question is valid, the processing means performs the following interpolation and generates the latest position data pd.

If the received data is positioning data pg (Step S07.2.27), the position controlling means 0222A updates the latest position data pd stored in temporary memory with that positioning data pg (Step S07.2.28), and the operation proceeds to Step S07.2.31. If the received data is moving data md, the interpolating means 0222B computes the interval Δt between one piece of moving data md and another inputted one after another, reads the latest position data pd stored in temporary memory, computes interpolated position data pint using the above-mentioned equation, and inputs the data to the position controlling means 0222A in succession (step S07.2.29).

When the position controlling means 0222A receives the interpolated position data pint from the interpolating means 0222B, the position controlling means updates the latest position data pd in temporary memory with that interpolated position data pint (Step S07.2.30). However, if the position controlling means receives both positioning data pg and interpolated position data pint simultaneously or substantially simultaneously within a predetermined minute time difference, the position controlling means uses the positioning data pg to update the latest position data pd.

Thereafter, the position controlling means 0222A sends the latest position data pd the position controlling means presently holds in temporary memory, together with the above-mentioned service type information, to the retrieving means 0223 with the timing with which the moving data md is received (Step S07.2.31).

Based on the service type information and position data pd, the retrieving means 0223 searches the database unit DB (Step S07.2.32). Thus, the retrieving means retrieves contents information Cts matched with the service type information and the position data pd from the database unit DB, and sends the information to the compiling means 0224 (Step S07.2.33).

The compiling means 0224 refers to the present service session entries stored and managed by the receiving means 0221 to obtain an identifying data id (Step S07.2.34). Then the compiling means compiles sending data carrying the identifying data id and the contents information Cts based on the result of retrieval information and sends the data to the sending means 0225 (Step S07.2.35). Data compression and format adjustment are the same as in the above description.

The sending means 0225 subjects the sending data sent from the compiling means 0224 to security processing, protocol adjustment, and the like to generate a sending signal SV7a, and sends the signal to the client CL7 through the communication interface ifs and the communication system NT. At this time, the sending means communicates a signal 225a with the charge settling means 0231 to perform charging processing. The sending means sends a sending signal SV7a if the result of the charging processing is correct and does not send a sending signal SV7a if the result of the charging processing is incorrect (Step S07.2.36).

The receiving means 0205 of the client CL7 subjects the sending signal SV7a which arrived from the server SV7 to protocol processing and decoding, checks the identifying data id carried by the restored sending data, and receives the data. The receiving means decompress the data using an MPEG4 decoder or the like to restore the contents information Cts to the original state thereof (Step S07.1.34) Subsequently, the receiving means forms receiving data based on the contents information Cts and supplies the data to the display device 0206 (Step S07.1.35). The display device 0206 presents the receiving data received from the receiving means 0205 as screen with/without audio (Step S07.1.36). Thereafter, the operation goes back to Step S07.1.26, and the loop of the above-mentioned processing is repetitively updated and performed, and the corresponding screen is repetitively updated and displayed on the display device 0206.

As mentioned above, in the service performing stage, every processing in the loop is performed at the standard frequency stfQ, and the display device 0206 displays the contents information Cts at the standard frequency stfQ. The client CL7 can omit complicated position computation to reduce processing load thereon in the service performing stage as well, and only has to send positioning data pg and moving data md to the server SV7.

According to the seventh embodiment, even if the interval tg of generation of positioning data pg is long and the generation frequency is low, the frequency of generation of position data pd can be kept at the high standard frequency stfQ by complementing the time intervals with interpolated position data pint.

Therefore, even if the turnaround time of a GPS positioning system is relatively long, contents information Cts can be displayed at high screen updating frequency by complementing it with interpolated position data pint. Moreover, any error accumulated in interpolated position data pint is replaced by the next generated positioning data pg using the above-mentioned algorithm, and the high accuracy can be maintained by taking the data as the actual positioning position at that point in time.

Further, according to the seventh embodiment, the following advantages are produced by causing the sending side SV7 to perform efficient interpolation and control using the rich data processing resources and environments of the sending side SV7: the receiving side CL7 can omit complicated position computation and control of the latest position data pd. If the receiving side CL7 is battery-powered radio mobile equipment, such as cellular phone, the consumption of battery power can be reduced and the circuitry thereof can be simplified.

In the above-mentioned case, the sending side SV7 provides as service interpolation based on interpolated position data computation. Therefore, a business model can be built wherein a unit for charging is established in accordance therewith and thus bills can be accordingly collected.

Further, in the above-mentioned case, such a constitution that a positioning module or the like which performs radio-location based on a non-GPS positioning principle, for example, based on PHS base station information, in place of the GPS positioning module principle, is used may be adopted.

Such a constitution that, in addition to the foregoing, the sending side SV7 is also provided with a function of DGPS data center and performs distance correcting computation which is otherwise performed in the above-mentioned DGPS may be adopted. With this constitution, positioning data processing and data sending processing at the receiving side CL7 can be simplified or partly omitted, and load on the receiving side CL7 can be further mitigated.

More specifically, the position data providing means 0101 of the receiving side CL7 is composed only of the GPS receiving means 2301 illustrated in FIG. 23, and uncorrected position data pd (equivalent to the above-mentioned positioning data pg) outputted from the GPS receiving means 2301 and identifying information for a GPS satellite presently involved which should be otherwise sent to a DGPS data center 2305 are sent as a request command to a sending side SV7. Then, a DGPS data correcting means (not shown) installed in the sending side SV7 selects an appropriate reference station based on the above-mentioned uncorrected position data pd, identifies the relevant GPS satellite based on the GPS satellite identifying information, determines the computed coordinate position (uncorrected) of the reference station based on a distance calculated from a delay time at the present time (measured for the relation between the reference station and the GPS satellite), compares the determined coordinate position with a known exact coordinate position, and thereby determines the error correction coefficient at the present time. These operations are performed at the sending side SV7.

With conventional DGPS constitution, the error correction coefficient is sent back to the receiving side CL7, and, at the receiving side CL7, the above-mentioned positioning data pg is corrected based thereon and the corrected data is outputted as position data pd. In the present invention, sending of the error correction coefficient to the receiving side CL7 is omitted, and substantially all the DGPS processing is completed at the sending side SV7. As a result, positioning data pg corrected at as high positioning accuracy as less than 1 m is obtained at the sending side SV7 without imposing load on the receiving side CL7 and with load on the communication system NT mitigated. This corrected positioning data pg is generated at the above-mentioned intervals tg, for example, at a frequency of once for every five seconds.

Subsequently, the sending side SV7 complements gaps between one piece of the corrected positioning data pg and another with the above-mentioned interpolated position data pint. At this time, the sending side SV uses moving data md sent from-the receiving side CL7.

Therefore, the receiving side CL7 only has to send as event data moving data md, uncorrected positioning data pg, and the identifying information for a GPS satellite. Thus, correction and interpolation at the receiving side CL7 are omitted, and load on the receiving side CL7 is mitigated with the consumption of battery power reduced. In addition, load on the communication system NT is mitigated, and unnecessary data communication between the receiving side CL7 and the sending side SV7 is omitted for the improvement of processing speed.

Further, in the above-mentioned case, the sending side SV7 provides as service correction of positioning data and interpolation based on interpolated position data. Therefore, a business model can be built wherein a unit for charging is established in accordance therewith and thus bills can be accordingly collected.

The Eighth Embodiment

In the eighth embodiment of the contents information interchanging system, request data is made up of time data td and position data pd, and the embodiment is based on the principle expressed as mark of td and pd→Cst. Here the frequency of information interchange is no object.

The eighth embodiment comprises a receiving side (client) CL8, a sending side (server) SV8, and a communication system NT which connects the receiving side and the sending side.

Figure 63:
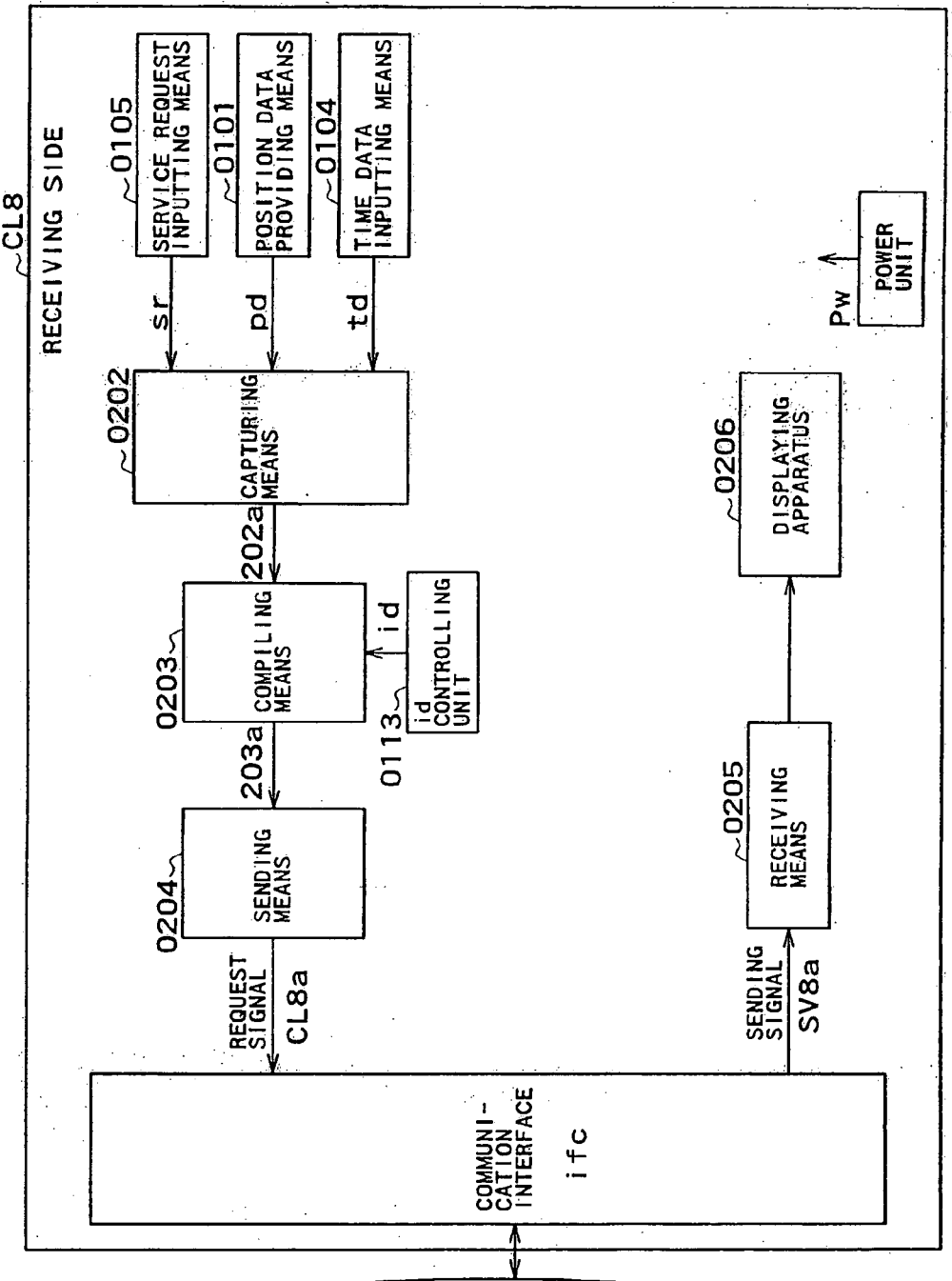
FIG. 63 is a block diagram of the client in the eighth embodiment of the contents information interchanging system according to the present invention.

FIG. 63 is a schematic block diagram of the client CL8. Mobile devices may be used for the client CL8 but stationary devices, such as personal computers, are more suitable.

Figure 64:
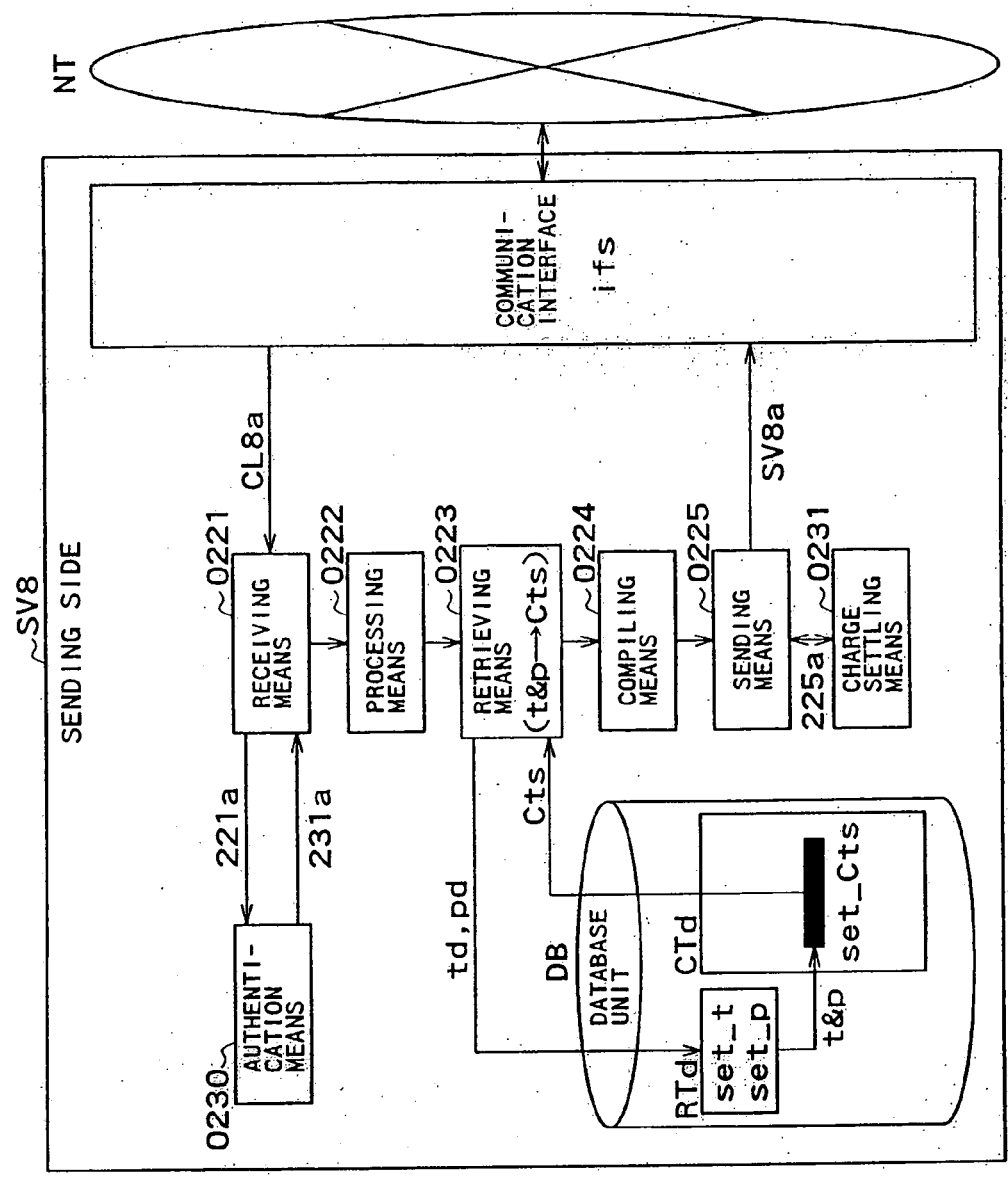
FIG. 64 is a block diagram of the server in the eighth embodiment of the contents information interchanging system according to the present invention.
Figure 65:
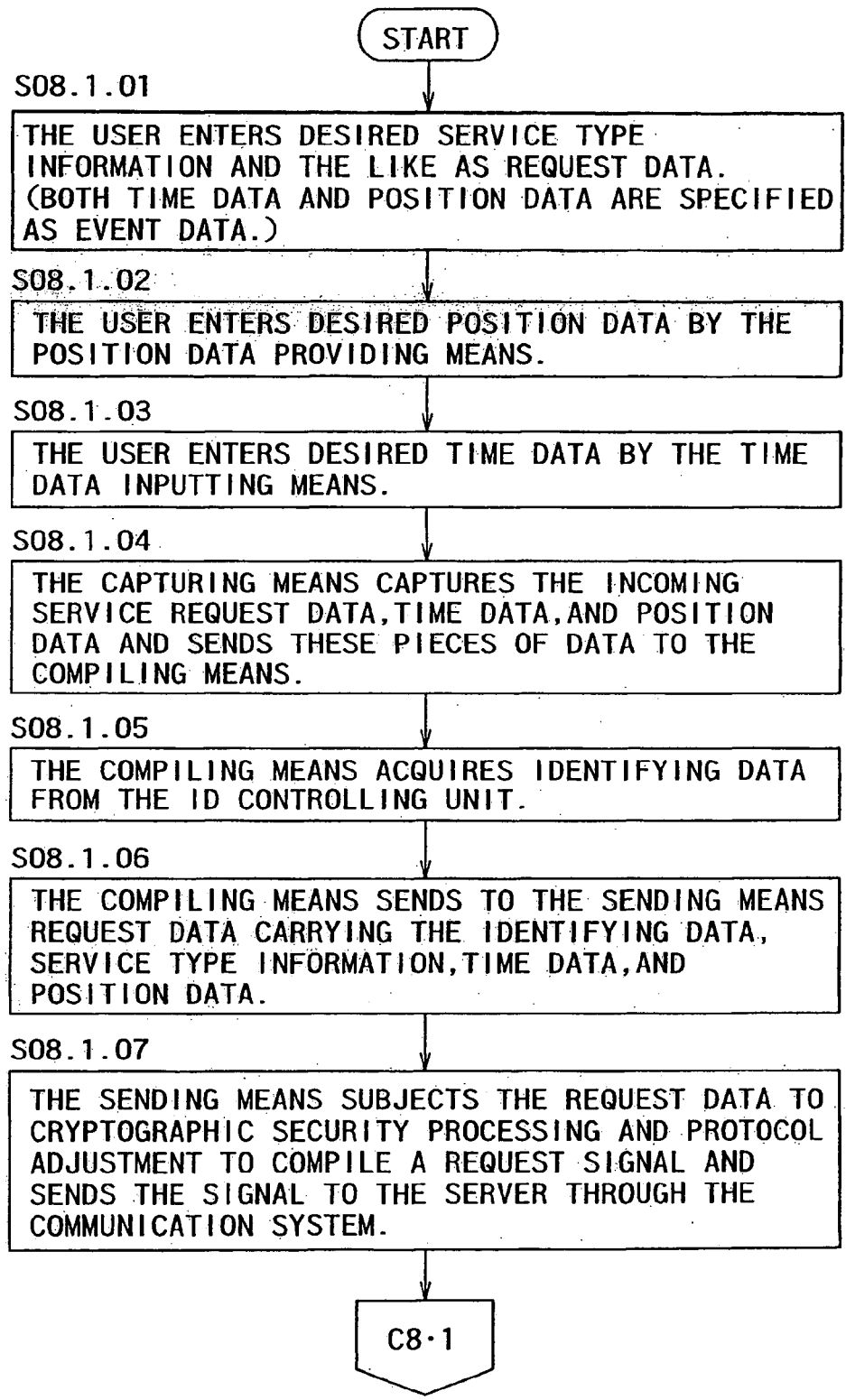
FIG. 65 is an action flowchart of the eighth embodiment.
Figure 66:
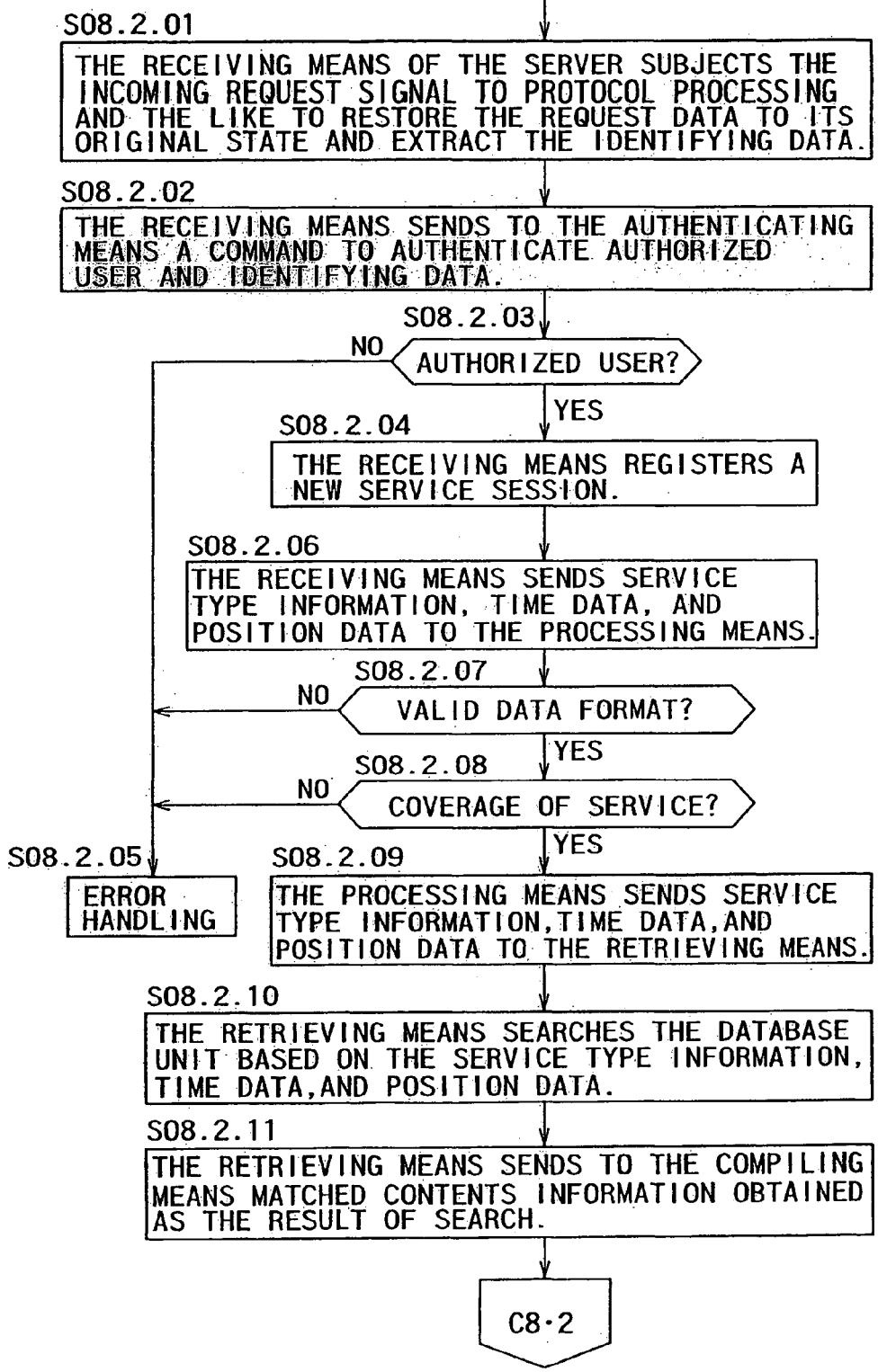
FIG. 66 is an action flowchart that follows FIG. 65.
Figure 67:
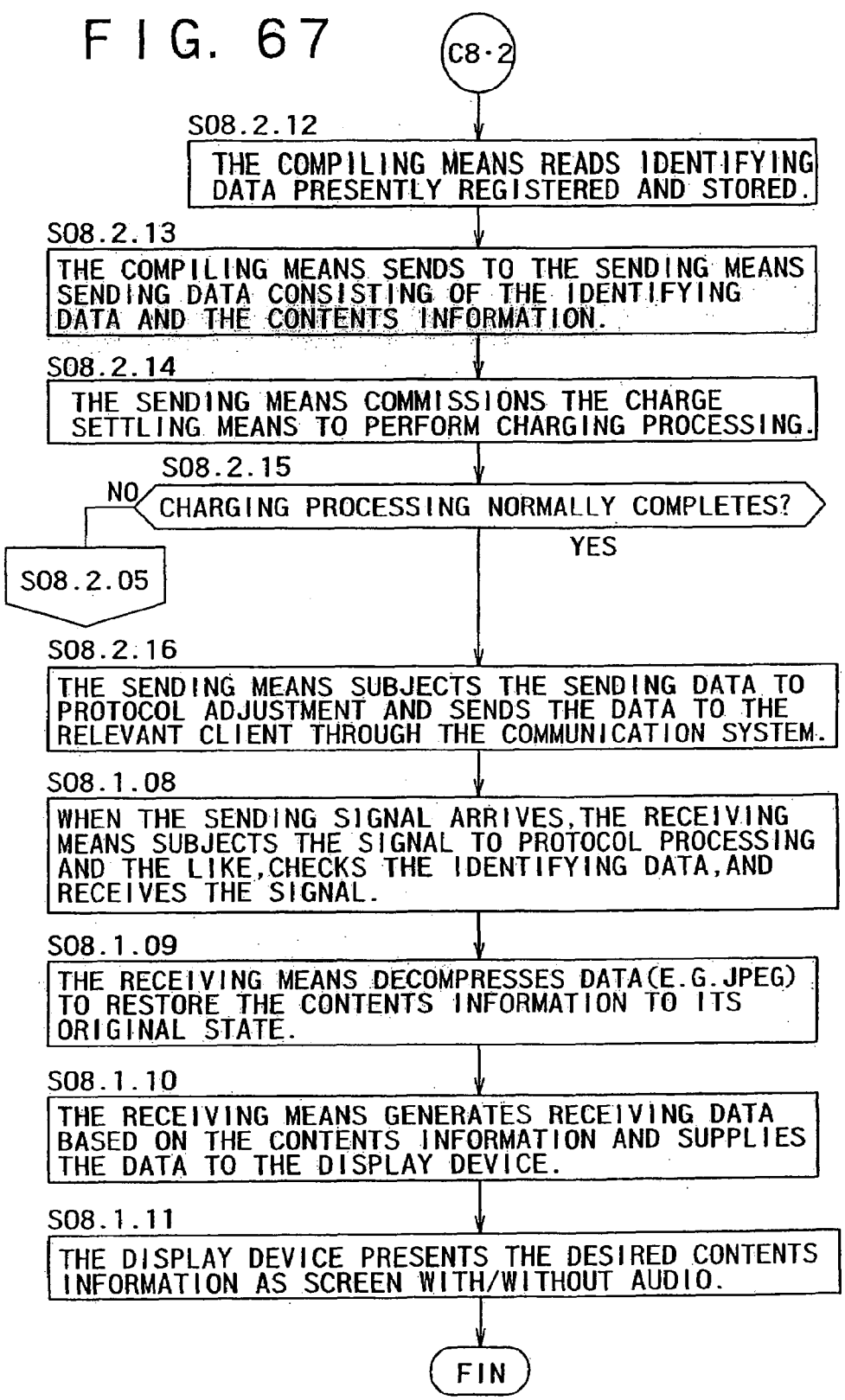
FIG. 67 is an action flowchart that follows FIG. 66.

FIG. 64 is a schematic block diagram of the server SV8, and FIGS. 65 through 67 are flowcharts illustrating the action of the client CL8 and the server SV8.

The above description will be cited with the same numbers assigned to the same parts as in the above-mentioned embodiments.

The client CL8 is formed of equipment configured like a computer provided with a wireless/wire communication function, and comprises a position data providing means 0101 which generates position data pd; a time data inputting means 0104 which generates time data td; a service request inputting means 0105 for inputting service request data sr; a capturing means 0202; a compiling means 0203; a sending means 0204; a communication interface ifc; an id controlling unit 0113; a receiving means 0205; a display device 0206; and a power unit Pw. A stationary device, such as personal computer, is preferably used for the client CL8, which is suitable for operation in simulating applications. However, mobile information equipment may be used for the client.

An input device, such as keyboard and mouse, and GUI software are preferably used for the position data providing means 0101, which is suitable for operation in simulating applications wherein arbitrary virtual positions are entered. However, positioning equipment, such as GPS receiver, may be used for the position data providing means.

Similarly, an input device, such as keyboard and mouse, and GUI software are preferably used for the time data inputting means 0104, which is suitable for operation in simulating applications wherein arbitrary virtual times, for example, eras are entered.

Other means, units, and apparatuses are the same as in the above-mentioned embodiments; therefore, the above description will be cited.

The server SV8 comprises a communication interface ifs, a receiving means 0221, an authenticating means 0230, a charge settling means 0231, a processing means 0222, a retrieving means 0223, a database unit DB, a compiling means 0224, and a sending means 0225, and is further provided with a power unit (not shown).

The database unit DB comprises a search criteria information portion RTd for storing sets set_p of position information p and sets set_t of time information t, and a contents, portion CTd for storing sets set_Cts of contents information Cts matched with position information p or time information t.

The retrieving means 0223 is so constituted as to enter position data pd and time data td into the database unit DB, select the relevant position information p and time information t from the search criteria information portion RTd, and search the contents portion CTd for contents information Cts matched both with the position information p and with the time information t.

Other means are substantially the same as in the above-mentioned embodiments, and the above description will be cited.

Action of the Eighth Embodiment:

Next, the action of the eighth embodiment will be described. For a user to request to start service, the user operates the service request inputting means 0105 of the client CL8 to manually enter service request data sr carrying service type information the user desires (including at least a desired server and type of contents information, and specification of position data and time data as type of event data). Then, the data is sent to the capturing means 0202 (Step S08.1.01). Further, the user operates the position data providing means 0101 to specify a desired position, and then it is sent as position data pd to the capturing means 0202 (Step S08.1.02). Similarly, the user operates the time data, inputting means 0104 to specify a desired time, and then it is sent as time data td to the capturing means 0202 (Step S08.1.03).

The capturing means 0202 confirms that the incoming signal is generated by the service request inputting means 0105. Based on this confirmation, the capturing means detects that it is service request data sr and captures the data. Similarly, the capturing means captures the time data td and the position data pd, and sends data 202a carrying these pieces of data to the compiling means 0203 (Step S08.1.04).

When the compiling means 0203 receives the data 202a, the compiling means reads identifying data id from the id controlling unit 0113 (Step S08.1.05), compiles request data 203a, and sends the data to the sending means 0204 (Step S08.1.06). The request data 203a carries identifying data id, service type information, time data td, and position data pd.

When the sending means 0204 subsequently receives the request data 203a sent from the compiling means 0203, the sending means subjects the data to cryptographic security processing, protocol adjustment, and the like. Thus, the sending means compiles a request signal CL8a destined for the server SV8 and sends the signal to the server SV8 through ;the communication interface ifc and the communication system NT (Step S08.1.07).

The receiving means 0221 of the server SV8 receives the request signal CL8a, sent from the client CL8 to the server through the communication system NT, through the communication interface ifs. The receiving means subjects the signal to protocol processing and decoding, decompresses the data to restore the request data to the original state thereof, and then extracts the identifying data id of the user from the request data (Step S08.2.01). Subsequently, the receiving means authenticates the client based on these pieces of data.

The receiving means sends a command 221a, carrying a sign indicating the commission of authentication and the identifying data id, to the authenticating means 0230 in order to commission to authenticate that the client CL8 is an authorized user (Step S08.2.02). The authenticating means 0230 may be externally installed.

When the receiving means receives a notification 231a of the result from the authenticating means 0230, the receiving means makes judgment (Step S08.2.03). If the client is an authorized user, the receiving means registers a service session (Step S08.2.04). If the client is not an authorized user, the receiving means abandons the request signal CL8a (step S08.2.05). As the result of service session registration, the identifying data is stored and brought under control.

Subsequently, the receiving means 0221 sends service type information, time data td, and position data pd to the processing means 0222 (Step S08.2.06).

When the processing means 0222 receives the data from the receiving means 0221, the processing means checks the validity of the data format thereof (Step S08.2.07). If the result of check reveals that the data format is invalid, the processing means judges the service infeasible, goes to Step S08.2.05, and abandons the request in question. If the data format is valid, subsequently, the processing means examines whether the client is located in an area which is stored in the database DB and is in the coverage of service (Step S08.2.08). If the result of examination reveals that the request in question is invalid, the processing means judges the service infeasible, goes to Step S08.2.05, and abandons the request, If the result of examination reveals that the request in question is valid, the processing means sends to the retrieving means 0223 data carrying service type information, time data td, and position data pd (Step S08.2.09).

Based on the service type information, time data td, and position data pd, the retrieving means 0223 searches the database unit DB (step S08.2.10). Thus, the retrieving means retrieves contents information Cts matched with the service type information, time data td, and position data pd from the database unit DB, and sends the information to the compiling means 0224 (Step S08.2.11).

The compiling means 0224 refers to the present service session entries stored and managed by the receiving means 0221 to obtain an identifying data id (Step S08.2.12). Then the compiling means compiles sending data carrying the identifying data id and the contents information Cts based on the result of retrieval information. At this time, the compiling means compresses the contents information Cts using an algorithm in adherence to, for example, JPEG, and adjusts the format thereof. Compression may be based on other algorithms. Subsequently, the compiling means sends the thus compiled sending data to the sending means 0225 (Step S08.2.13).

The sending means 0225 sends a signal 225a to the charge settling means 0231 to commission the charge settling means to perform charging processing (Step S08.2.14). The sending means judges the result sent back from the charge settling means 0231 (Step S08.2.15). If the charging processing normally completes, the operation goes to Step S08.2.16 and the subsequent processing is carried on. If the charge settling does not normally complete, the operation goes to Step, S08.2.05, and the request signal CL8a and, the above-mentioned service session entry are abandoned.

At Step S08.2.16, the sending means subjects the sending data sent from the compiling means 0224 to security processing, protocol adjustment, and the like to generate a sending signal SV8a, and sends the signal to the client CL8 through the communication interface ifs and the communication system NT.

The receiving means 0205 of the client CL8 subjects the sending signal SV8a which arrived from the server SV8 to protocol processing and decoding, checks the identifying data id carried by the restored sending data, and receives the data (step S08.1.09). The receiving means decompresses the data using a JPEG decoder or the like to restore the contents information Cts to the original state thereof (Step S08.1.10). Subsequently, the receiving means forms receiving data based on the contents information Cts and supplies the data to the display device 0206 (Step S08.1.11).

The display device 0206 presents the receiving data received from the receiving means 0205 as screen with/without audio (Step S08.1.12).

A series of the above-mentioned processes from the processing at the beginning to the processing at the end constitute one complete task. However, the information interchanging method and system may be so constituted that a loop is repetitively updated and performed as in the description of the above-mentioned embodiments.

In an example of the applications of the eighth embodiment, when a set (td&pd) of time data td specifying a point in time and position data pd specifying a location is entered, and an image showing the location at that point in time is displayed.

For example, position data pd and time data td are set to Shibuya, Tokyo and the present, respectively, on the client CL8 at the receiving side, the contents information Cts of the present cityscape (with audio such as street noise) is displayed on the screen. If the time data td is set to several hundred years ago with the same position setting, the display is changed to a landscape embracing mountain streams, creeks, valleys, and countrified villages. For a bird's eye view of the Kanto plains, the present screen shows a vast megalopolis where forests of buildings, urban areas, and residential areas extend as far as one can see, If the time data td is changed to over 10 thousand years ago here, the screen is immediately changed to a landscape where the sea extends to the bases of mountains around the Kanto plains (for example, in Hanno or Chichibu). These images are provided by the server SV8 in the form of past CG image or drawing.

If the waterfront area along Tokyo Bay and the present are specified, forests of skyscrapers on the reclaimed land are displayed. If the time data td is set to the future 100 years ahead, the screen is changed to a landscape where decayed skyscrapers are protruded from the surface of the expanse of sea as if they were the tombs of the civilization. This is a predicted future image provided by the server SV8.

If the time data td is fixed at some point in time and sent and further the position data pd is repetitively updated and sent at a high frequency, the images of the scene viewed at that point in time are formed as moving images.

Or, if the position data pd is fixed at some location and sent and further the time data td is repetitively updated and sent at a high frequency, images at that location which change with time are formed as moving images.

That is, a system wherein images which changes along the time axis are provided and received is constituted by updating the time data td at a high frequency from the past toward the present (or the future) or from the present (or the future) toward the past, and thereby repetitively updating and performing the loop, as in the above-mentioned embodiments. For example, the system can provide and receive moving images showing the transition of a well-developed urban waterfront area to a bleak reedy marshland with water birds flying in flocks by gradual time slip.

As mentioned above, the constitution of this embodiment is suitable for providing contents information which is based on time or involves transition along the time axis. The embodiment is suitable for the application to the fields of historical and human geographical studies, education, games, and the like. Also, the embodiment enables businesses using business models based on such a service.

The Ninth Embodiment

In the ninth embodiment of the contents information interchanging system, request data is made up of time data td, Position data pd, and viewing direction data dd, and the embodiment is based on the principle expressed as mark of td, pd, and dd→Cst. Here the frequency of information interchange is no object.

The ninth embodiment comprises a receiving side (client) CL9, a sending side (server) SV9, and a communication system NT which connects the receiving side and the sending side.

Figure 68:
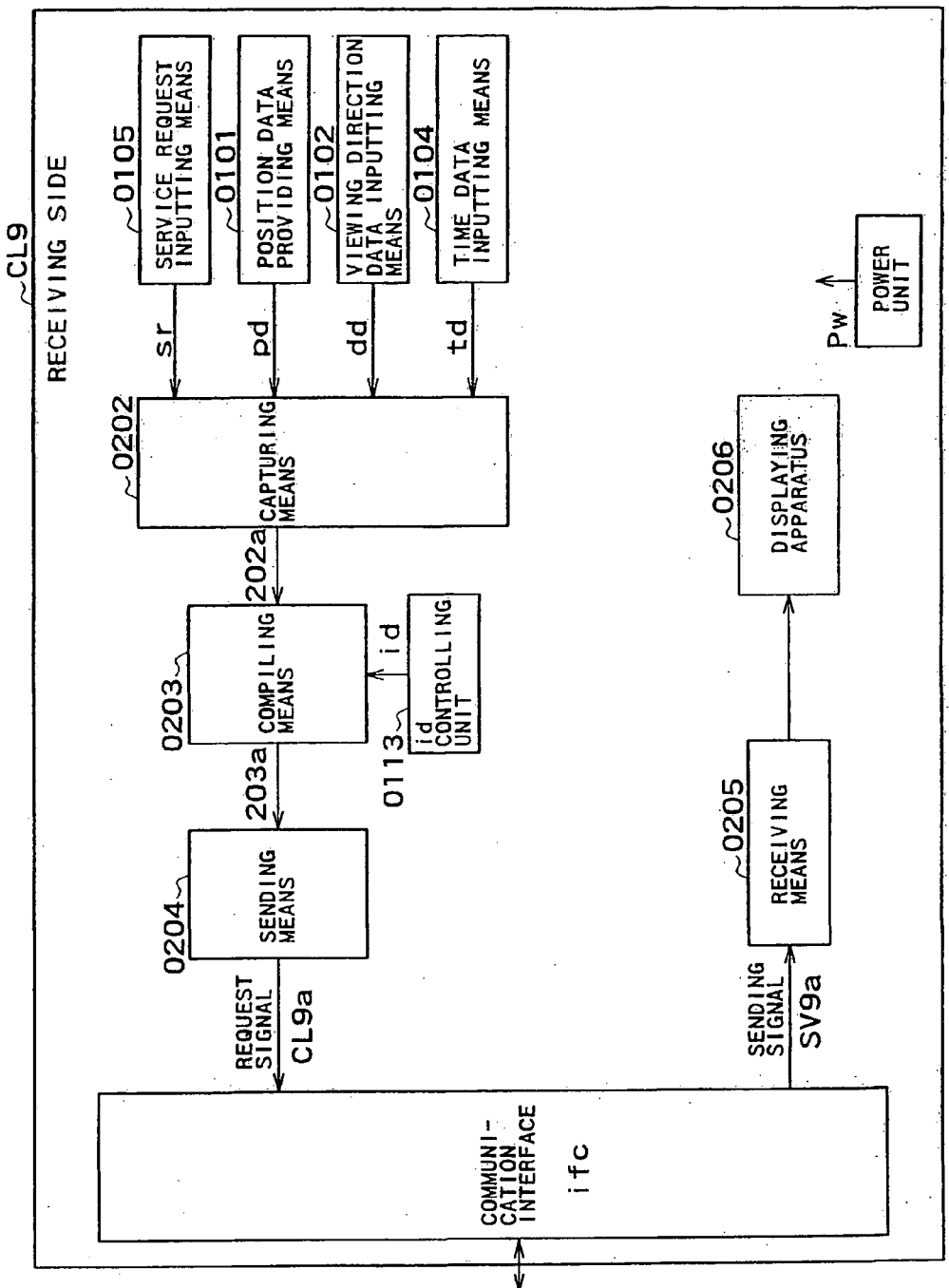
FIG. 68 is a block diagram of the client in the ninth embodiment of the contents information interchanging system according to the present invention.

FIG. 68 is a schematic block diagram of the client CL9. Mobile devices may be used for the client CL9 but stationary devices, such as personal computers, are more suitable.

Figure 69:
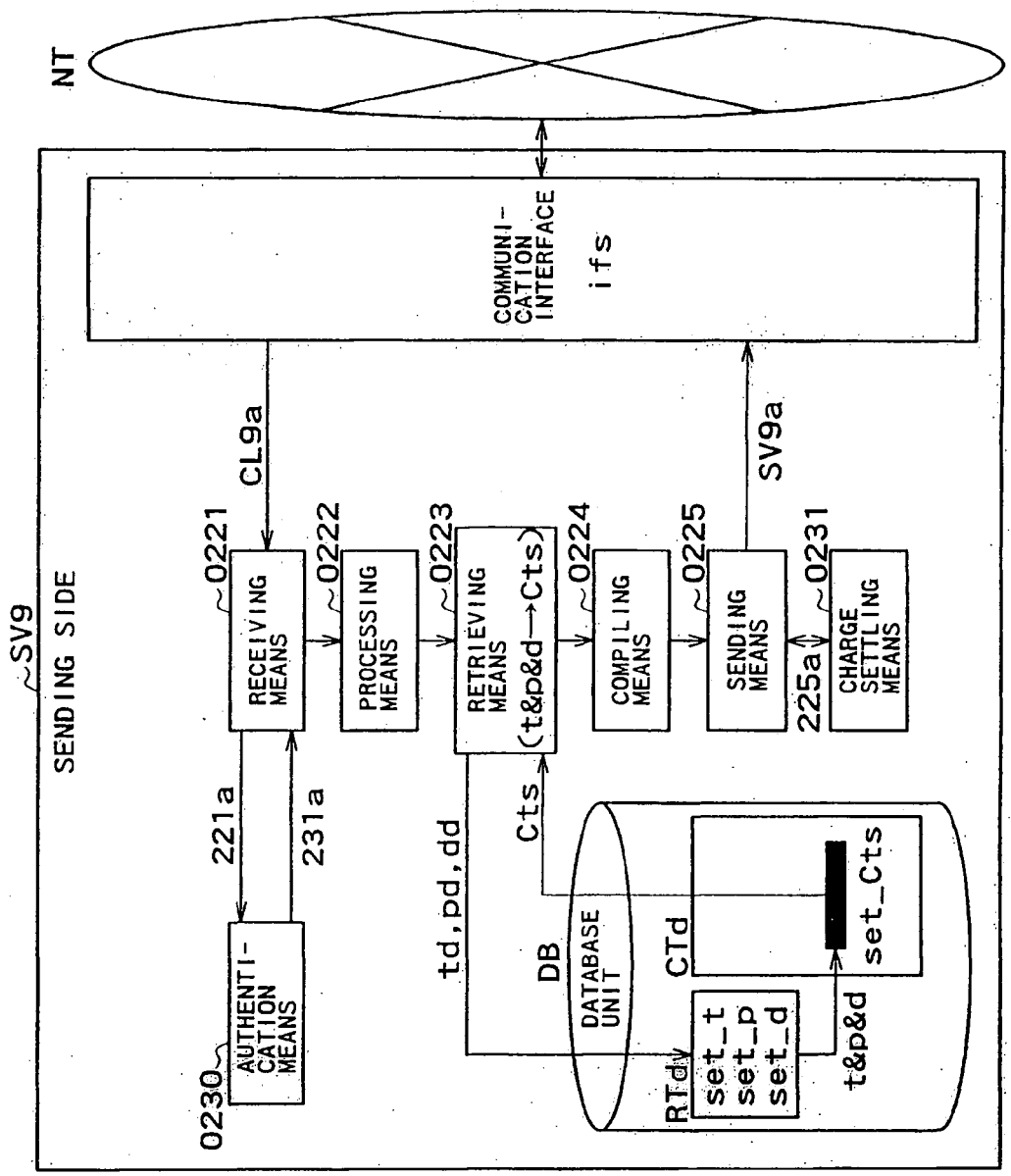
FIG. 69 is a block diagram of the server in the ninth embodiment of the contents information interchanging system according to the present invention.
Figure 70:
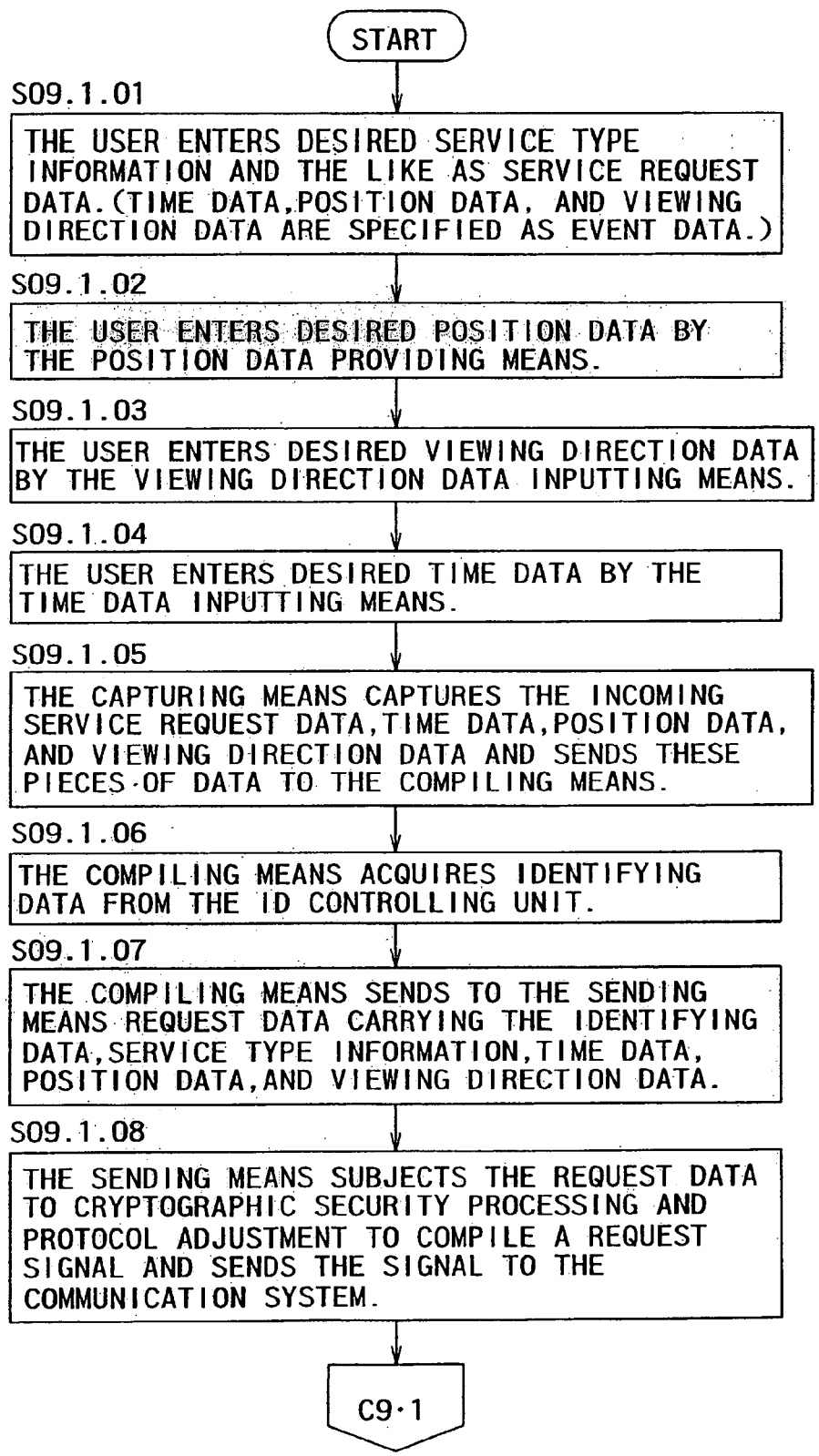
FIG. 70 is an action flowchart of the ninth embodiment.
Figure 73:
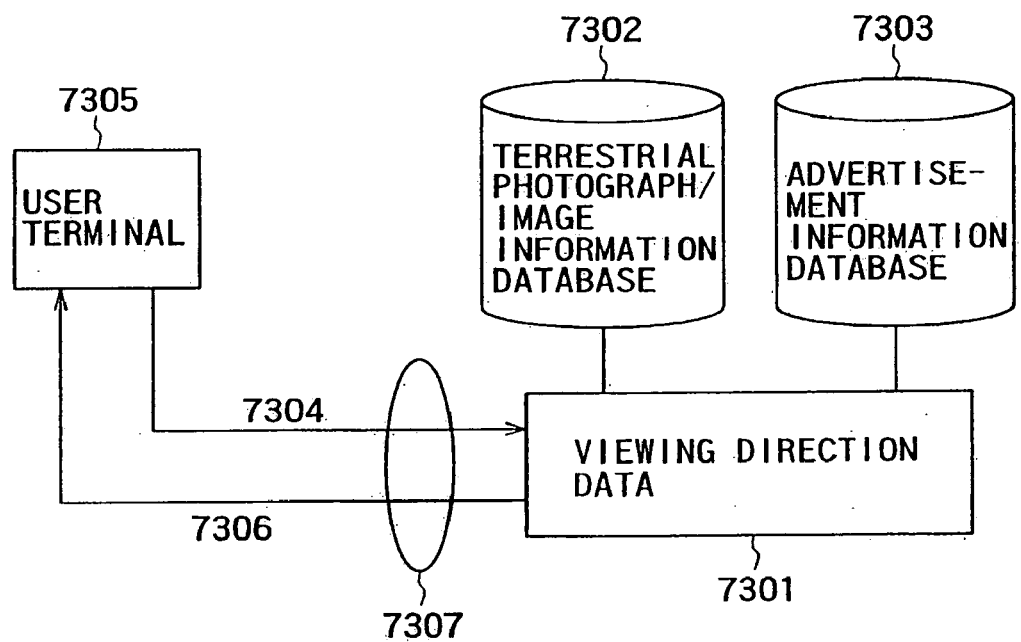
FIG. 73 is a block diagram relating to one example of the conventional construction.
Figure 74:
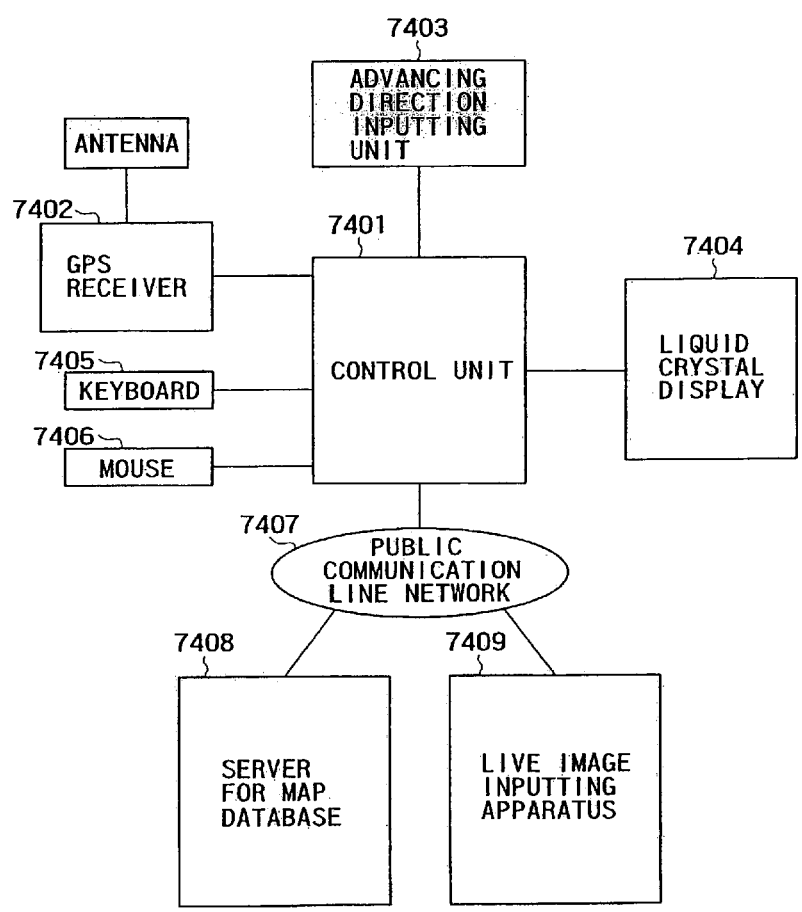
FIG. 74 is a block diagram relating to another example of the conventional construction.

FIG. 69 is a schematic block diagram of the server SV8, and FIGS. 70 through 72 are flowcharts illustrating the action of the client CL9 and the server SV9.

The above description will be cited for the same parts as in the above-mentioned embodiments.

Like the client CL8 mentioned above, the client CL9 is formed of equipment configured like a computer provided with a wireless/wire communication function, and comprises a position data providing means 0101 which generates position data pd; a viewing direction data inputting means 0102 which generates viewing direction data dd; a time data inputting means 0104 which generates time data td; a service request inputting means 0105 for inputting service request data sr; a capturing means 0202; a compiling means 0203; a sending means 0204; a communication interface ifc; an id controlling unit 0113; a receiving means 0205; a display device 0206; and a power unit Pw. A stationary device, such as personal computer, is preferably used for the client CL9, which is suitable for operation in simulating applications. However, mobile information equipment may be used for the client.

An input device, such as keyboard and mouse, and GUI software are preferably used for the position data providing means 0101, which is suitable for operation in simulating applications wherein arbitrary virtual positions are entered. However, positioning equipment, such as GPS receiver, may be used for the position data providing means.

The viewing direction data inputting means 0102 is constituted of input equipment, such as keyboard and mouse, but the equipment disclosed in the fifth embodiment is also applicable.

Similarly, an input device, such as keyboard and mouse, and GUI software are preferably used for the time data inputting means 0104, which is suitable for operation in simulating applications wherein arbitrary virtual times, for example, eras are entered.

Other means, units, and apparatuses are the same as in the above-mentioned embodiments; therefore, the above description will be cited.

The server SV9 comprises a communication interface ifs, a receiving means 0221, an authenticating means 0230, a charge settling means 0231, a processing means 0222, a retrieving means 0223, a database unit DB, a compiling means 0224, and a sending means 0225, and is further provided with a power unit (not shown).

The database unit DB comprises a search criteria information portion RTd for storing sets set_p of position information p, sets set_t of time information t, and sets set_d of viewing direction information d and a contents portion CTd for storing sets set_Cts of contents information Cts matched with position information p, time information t, or viewing direction information d.

The retrieving means 0223 is so constituted as to enter position data pd, time data td, and viewing direction data dd into the database unit DB, select the relevant position information p, time information t, and viewing direction information d from the search criteria information portion RTd, and searches the contents portion CTd for contents information Cts matched with all of the position information p, time information t, and viewing direction information d.

Other means are substantially the same as in the above-mentioned embodiments, and the above description will be cited.

Action of the Ninth Embodiment:

Next, the action of the ninth embodiment will be described. For a user to request to start service, the user operates the service request inputting means 0165 of the client CL9 to manually enter service request data sr carrying service type information the user desires (including at least a desired server and type of contents information, and specification of position data, viewing direction data, and time data as type of event data). Then, the data is sent to the capturing means 0202 (Step S09.1.01). Further, the user operates the position data providing means 0101 to specify a desired position, and then it is sent as position data pd to the capturing means 0202 (Step S09.1.02). Further, the user operates the viewing direction data inputting means 0102 to specify a desired viewing direction, and then it is sent as viewing direction data dd to the capturing means 0202 (Step S09.1.03).

Similarly, the user operates the time data inputting means 0104 to specify a desired time, and then it is sent as time data td to the capturing means 0202 (Step S09.1.04).

The capturing means 0202 confirms that the incoming signal is generated by the service request inputting means 0105. Based on this confirmation, the capturing means detects that it is service request data sr and captures the data. Similarly, the capturing means captures the time data td, the position data pd, and the viewing direction data dd and sends data 202*a* carrying these pieces of data to the compiling means 0203 (Step S09.1.05).

When the compiling means 0203 receives the data 202*a*, the compiling means reads identifying data id from the id controlling unit 0113 (Step S09.1.06), compiles request data 203*a*, and sends the data to the sending means 0204 (Step S09.1.07). The request data 203*a* carries identifying data id, service type information, time data td, position data pd, and viewing direction data dd.

When the sending means 0204 subsequently receives the request data 203*a* sent from the compiling means 0203, the sending means subjects the data to cryptographic security processing, protocol adjustment, and the like. Thus, the sending means compiles a request signal CL9*a* destined for the server SV9 and sends the signal to the server SV9 through the communication interface ifc and the communication system NT (Step S09.1.08).

The receiving means 0221 of the server SV9 receives the request signal CL9*a*, sent from the client CL9 to the server through the communication system NT, through the communication interface ifs. The receiving means subjects the signal to protocol processing and decoding, decompresses the data to restore the request data to the original state thereof, and then extracts the identifying data id of the user from the request data (step S09.2.01). Subsequently, the receiving means authenticates the client based on these pieces of data.

The receiving means sends a command 221*a*, carrying a sign indicating the commission of authentication and the identifying data id, to the authenticating means 0230 in order to commission to authenticate that the client CL9 is an authorized user (Step S09.2.02). The authenticating means 0230 may be externally installed.

When the receiving means receives a notification 231*a* of the result from the authenticating means 0230, the receiving means makes judgment (Step S09.2.03). If the client is an authorized user, the receiving means registers a service session (Step S09.2.04). If the client is not an authorized user, the receiving means abandons the request signal CL9*a* (Step S09.2.05). As the result of service session registration, the identifying data is stored and brought under control.

Subsequently, the receiving means 0221 sends service type information, time data td, position data pd, and viewing direction data dd to the processing means 0222 (Step S09.2.06).

When the processing means 0222 receives the data from the receiving means 0221, the processing means checks the validity of the data format thereof (Step S09.2.07). If the result of check reveals that the data format is invalid, the processing means judges the service infeasible, goes to Step S09.2.05, and abandons the request in question. If the data format is valid, subsequently, the processing means examines whether the client is located in an area which is stored in the database DB and is in the coverage of service (Step S09.2.08). If the result of examination reveals that the request in question is invalid, the processing means judges the service infeasible, goes to Step S09.2.05, and abandons the request. If the result of examination reveals that the request in question is valid, the processing means sends to the retrieving means 0223 data carrying service type information, time data td, position data pd, and viewing direction data dd (Step S09.2.09).

Based on the service type information, time data td, position data pd, and viewing direction data dd, the retrieving means 0223 searches the database unit DB (step S09.2.10). Thus, the retrieving means retrieves contents information Cts matched with the service type information, time data td, position data pd, and viewing direction data dd from the database unit DB, and sends the information to the compiling means 0224 (Step S09.2.11).

The compiling means 0224 refers to the present service session entries stored and managed by the receiving means 0221 to obtain an identifying data id (Step S09.2.12). Then the compiling means compiles sending data carrying the identifying data id and the contents information Cts based on the result of retrieval information. At this time, the compiling means compresses the contents information Cts using an algorithm in adherence to, for example, JPEG, and adjusts the format thereof. Compression may be based on other algorithms. Subsequently, the compiling means sends the thus compiled sending data to the sending means 0225 (Step S09.2.13).

The sending means 0225 sends a signal 225*a* to the charge settling means 0231 to commission the charge settling means to perform charging processing (Step S09.2.14). The sending means judges the result of the charging processing (Step S09.2.15), If the charging processing normally completes, the operation goes to Step S09.2.16 and the subsequent processing is carried on. If the charge settling does not normally complete, the operation goes to Step S09.2.05, and the request signal CL9*a* and the above-mentioned service session entry are abandoned. The charge settling means 0231 may be externally installed.

At Step S09.2.16, the sending means 0225 subjects the sending data sent from the compiling means 0224 to security processing, protocol adjustment, and the like to generate a sending signal SV9*a*, and sends the signal to the client CL9 through the communication interface ifs and the communication system NT.

The receiving means 0205 of the client CL9 subjects the sending signal SV9*a* which arrived from the server SV9 to protocol processing and decoding, checks the identifying data id carried by the restored sending data, and receives the data (Step S09.1.09). The receiving means decompresses the data using a JPEG decoder or the like to restore the contents information Cts to the original state thereof (Step S09.1.10). Subsequently, the receiving means forms receiving data based on the contents information Cts and supplies the data to the display device 0206 (Step S09.1.11).

The display device 0206 presents the receiving data received from the receiving means 0205 as screen with/without audio (Step S09.1.12).

In the ninth embodiment, when a desired point in time is specified for time data td, a desired direction is specified for viewing direction data dd, and a desired location is specified for position data pd and these pieces of data are sent, the image of a scene viewed in that viewing direction at that location at that point in time is displayed.

If the time data td is fixed at some point in time and the viewing direction data dd is fixed in a desired direction and these pieces of data are sent, and further the position data pd is repetitively updated and sent at a high frequency, moving images of a scene viewed in that viewing direction at that point in time are formed.

Or, if the position data pd is fixed at some location and the viewing direction data dd is fixed in a desired direction and these pieces of data are sent and further the time data td is repetitively updated and sent at a high frequency, the images of a scene viewed in the viewing direction at that location which change with time are formed as moving images.

That is, a system wherein images which change along the time axis are provided and received is constituted by updating the time data td at a high frequency from the past toward the present (or the future) or from the present (or the future) toward the past, and thereby repetitively updating and performing the loop, as in the above-mentioned embodiments.

As mentioned above, the constitution of the ninth embodiment is suitable for providing contents information which is based on time or involves transition along the time axis and which is the image of a scene viewed in a specified viewing direction at a specified location. The embodiment is suitable for the application to the fields of historical and human geographical studies, education, games, and the like. Also, the embodiment enables businesses using business models based on such a service.

In the above-mentioned embodiments, the object of frequency control is the means in the first half of the loop, for example, the position data providing means 0101 and the like in the generating group 0201 and the capturing means 0202 at the receiving side. However, the further downstream means at the receiving side, the communication system NT, and the means at the sending side may be subjected to frequency management and control. Especially, if such a constitution that frequency control is exercised at the sending side, it is unnecessary to provide the receiving side with the frequency controlling means 0111 or the like. As a result, existing cellular phones can be used as receiving side and the scope of the invention is expanded.

EFFECT OF THE INVENTION

The method for interchanging information according to the first aspect of the present invention offers the following advantage. At least any one of at least any one processing by the receiving side in the stage preceding the final stage, at least any one processing by the sending side, and at least any one processing by the communication system is updated repeatedly at a frequency not exceeding the frequency which has been confirmed to permit the repeated updating of said final stage processing. In this way it is possible to eliminate excess processing in the subsequent processing (including said processing) and hence it is possible to prevent useless processing from occurring in the subsequent processing (including said processing). Thus all of the processing are updated repeatedly.

Moreover, even though the frequency at which the final stage processing can be repeatedly updated varies depending on the applicable receiving side or is confirmed to vary depending on the receiving side's performance, repeated updating of said processing corresponding to them is executed. Thus even though the receiving side varies or the receiving side's performance varies, it is possible to exclude wastes in response to these changes as the occasion demands.

The frequency at which the final stage processing can be repeatedly updated is a value inherent in the applicable receiving side. According to the method for interchanging information as defined in the second aspect, said frequency is confirmed by actual measurement in said receiving side. As the result, even though the receiving side is replaced by the one which has different construction or the receiving side changes in performance, it is possible to confirm easily and certainly the individual inherent values and hence it is possible to eliminate said wastes resulting from individual receiving sides.

The method for interchanging information according to the third aspect of the present invention offers the following advantage. At least one processing in at least any one of the receiving side, sending side, and communication system is repeatedly updated at an arbitrary frequency not exceeding the maximum frequency of the loop as a whole. Thus, excess processing is eliminated in the subsequent process including said process. Hence it is possible to avoid waste in the subsequent processing including said process, and the entire processing is repeatedly updated.

According to the method for interchanging information as defined in the fourth aspect, the maximum frequency of the loop as a whole is confirmed by actual measurement of the final stage processing. As the result, the maximum frequency is easily and certainly confirmed even when the combination changes or the performance changes. Thus the occurrence of wastes is avoided.

The method for interchanging information as defined in the fifth aspect of the present invention offers the following advantages. When arbitrary position data is generated as request information, the contents information possessing the image with or without voice associated with this position data is transmitted as the specific information and this contents information is displayed and the contents information is displayed as a dynamic image as the position data is updated by said repeated updating. In addition, the frequency at which the image of the contents information is updated is the frequency at which the display is repeated. This facilitates confirmation and actual measurements.

The method for interchanging information as defined in the sixth aspect of the present invention offers the following advantage. When arbitrary position data and viewing direction data indicating an arbitrary direction as this position are generated as request information, the contents information possessing the image with or without voice associated with this position data and viewing direction data is transmitted as the specific information and this contents information is displayed and the contents information is displayed as a dynamic image as the position data and viewing direction is updated by said repeated updating. In addition, the frequency at which the image of the contents information is updated is the frequency at which the display is repeated. This facilitates confirmation and actual measurements.

The method for interchanging information as defined in the seventh aspect of the present invention offers the following advantage. The positioning data becomes the position data when it is generated, and the interpolated position data becomes the position data while said positioning data is not generated. Thus, even though the positioning data is generated at a low frequency, the interpolated position data make supplement so that the position data is generated at a high frequency.

The method for interchanging information as defined in the eighth aspect of the present invention offers the following advantage. When arbitrary position data and arbitrary time data are generated as request information, specific information composed of image with or without voice associated with said time data and position data are transmitted and displayed.

The method for interchanging information as defined in the ninth aspect of the present invention offers the following advantage. When arbitrary position data, arbitrary viewing direction data, and arbitrary time data are generated as request information, specific information composed of image with or without voice associated with said time data, viewing direction data, and position data are transmitted and displayed.

The method for interchanging information according to the tenth aspect offers the following advantage. Since the amount of request information sent or the amount of specific information transmitted depends on the frequencies of said each processing, charge is levied in response to how the sending side utilizes the system.

What is claimed is:

1. A method for interchanging information in which a receiving side, which receives information, sends to a sending side, which keeps said information, a request for transmission of said information through a communication system, said sending side, in response to said request, sends said receiving side said information through said communication system, and said receiving side receives said information which has been sent and displays said information in the form of an image with or without voice, on the assumption that generation of said request in said receiving side is a preliminary processing step and said displaying at said receiving side is a final processing step, there is at least one intermediate processing step in at least any of said receiving side, said sending side, and said communication system, between said preliminary processing step and said final processing step, the route along which an ensuing processing step is executed by using the result of a preceding processing step constitutes a loop, and the number of times for updating processing within a unit time is a frequency, wherein said method comprises:

repeatedly updating said request and said loop, and keeping the frequency of at least one step before the preceding processing step from said final stage processing step lower than a permissible frequency for which said final stage processing step has been confirmed.

2. The method for interchanging information according to claim 1, which characterized in that the frequency at which the final stage processing step can be repeatedly updated is confirmed by actual measurement by said receiving side.

3. The method for interchanging information according to claim 1, which is characterized in that said request has arbitrary position data and said information is contents information possessing said image with or without voice associated with said information, with said image being so constructed as to be displayed in frame units, and the frequency at which the final stage processing step is repeated is the frequency at which the image of said contents information is updated.

4. The method for interchanging information according to claim 3, which is characterized in that said position data is one which is selected from (1) positioning data which is generated intermittently by satellite or radio positioning or (2) position data obtained by interpolation of the amount of movement (which is calculated from the moving speed and moving time of the receiving side) and said positioning data obtained most recently, said position data being generated while said positioning data is not generated.

5. The method for interchanging information according to claim 1, which is characterized in that said request has arbitrary position data and viewing direction data indicating an arbitrary direction as said arbitrary position and said information is contents information possessing said image with or without voice associated with said position data and said viewing direction data, with said image being so constructed as to be displayed in frame units, and the frequency at which the final stage processing is repeated is the frequency at which the image of said contents information is updated.

6. The method for interchanging information according to claim 1, which is characterized in that charge is levied based on the amount of request information sent or the amount of information transmitted.

7. A method for interchanging information in which a receiving side, which receives arbitrary information, sends to a sending side, which keeps said information, a request for transmission of said information through a communication system, said sending side, in response to said request, sends said receiving side the information through said communication system, and said receiving side receives said information which has been sent and displays said information in the form of an image with or without voice, on the assumption that generation of said request in said receiving side is a preliminary processing step and said displaying in said receiving side is a final processing step, there is at least one intermediate processing step in at least any of said receiving side, said sending side, and said communication system, between said preliminary processing step and said final processing step, the route along which an ensuing processing step is executed by using the result of a preceding processing step constitutes a loop, and the number of times for said loop to repeatedly update within a unit time is a frequency, and the maximum permissible times for repeated updating of the said loop in a unit time is a maximum frequency, wherein said method comprises:

repeating the preceding processing step at an arbitrary frequency not exceeding said maximum frequency when repeatedly updating said request and repeatedly updating said loop.

8. The method for interchanging information according to claim 7, which is characterized in that the maximum frequency of the loop as a whole is confirmed by actual measurement of the frequency of the final stage processing step in the combination of said receiving side, said sending side, and said communication system.

9. The method for interchanging information according to claim 7, which is characterized in that charge is levied based on the amount of request information sent or the amount of information transmitted.

10. A method for interchanging information in which a receiving side, which receives information, sends to a sending side, which keeps said information, a request for transmission of said information through a communication system, said sending side, in response to said request, sends said receiving side said information through a communication system, and said receiving side receives said information which has been sent and displays said information in the form of an image with or without voice, wherein said method is characterized in that said request is composed of arbitrary position data and time data to specify arbitrary time and said information possesses said image with or without voice associated with said position data and said time data, with said image being so constructed as to be displayed in frame units, wherein said reQuest is repeatedly updated.

11. The method for interchanging information according to claim 10, which is characterized in that charge is levied based on the amount of request information sent or the amount of information transmitted.

12. A method for interchanging information in which a receiving side, which receives information, sends to a sending side, which keeps said information, a request for transmission of said information through a communication system, said sending side, in response to said request, sends said receiving side the information though a communication system, and said receiving side receives said information which has been sent and displays said information in the form of an image with or without voice, wherein said method is characterized in that said request is composed of arbitrary position data, viewing direction data indicating an arbitrary direction as said position, and time data to specific arbitrary time, and said information possesses said image with or without voice associated with said position data, said viewing direction data, and said time data, with said image being constructed as to be displayed in frame units, wherein said reciuest is repeatedly updated.

13. The method for interchanging information according to claim 12, which is characterized in that charge is levied based on the amount of request information sent or the amount of information transmitted.